United States Patent

Berkeley et al.

[15] 3,701,972

[45] Oct. 31, 1972

[54] DATA PROCESSING SYSTEM

[72] Inventors: Arnold D. Berkeley; Eugene W. Bold, both of Potomac; Donald E. Jefferson, Silver Spring; Gerard A. Zeller, Ellicott City, all of Md.

[73] Assignee: Computer Retrieval Systems, Inc., Bethesda, Md.

[22] Filed: Dec. 16, 1969

[21] Appl. No.: 885,608

[52] U.S. Cl. ....................340/172.5

[51] Int. Cl. .......G06f 15/40, G06f 11/00, G06f 3/14

[58] Field of Search ....................340/172.5; 235/157

[56] References Cited

UNITED STATES PATENTS

| | | | |
|---|---|---|---|
| 3,315,234 | 4/1967 | Ruth | 340/172.5 |
| 3,341,820 | 9/1967 | Grillmeier et al. | 340/172.5 |
| 3,374,465 | 3/1968 | Richmond et al. | 340/172.5 |
| 3,400,371 | 9/1968 | Amdahl et al. | 340/172.5 |
| 3,400,376 | 9/1968 | McDonnell | 340/172.5 |
| 3,407,387 | 10/1968 | Looschen et al. | 340/152 |
| 3,412,382 | 11/1968 | Couleur et al. | 340/172.5 |
| 3,346,853 | 10/1967 | Koster et al. | 340/172.5 |
| 3,360,783 | 12/1967 | Goldsberry et al. | 340/172.5 |
| 3,474,416 | 10/1969 | Mason | 340/172.5 |
| 3,487,368 | 12/1969 | Boennighausen et al. | 340/172.5 |
| 3,488,633 | 1/1970 | King et al. | 340/172.5 |
| 3,512,132 | 5/1970 | Jones et al. | 340/172.5 |

*Primary Examiner*—Paul J. Henon
*Assistant Examiner*—Mark Edward Nusbaum
*Attorney*—Rose and Edell

[57] ABSTRACT

A programmable special purpose data processor is provided with both circuits and stored programs for effecting one or more specific processing jobs. Data characters, sequentially provided by a data terminal and processed in accordance with similarly provided control characters, are stored in a memory unit after being processed. A stored program of instructions controls processing in a predetermined sequence which can be modified by the control characters. The stored characters may be selectively modified and/or displayed at the terminal. The various circuits provided as part of the processor operatively interconnect only in response to specific active instructions and are preferably modular in nature so as to be readily interchanged or, if desired, added to or deleted from the system.

The programs are a plurality of stored instructions of either fixed minimum length or variable length, packed one after the other without wasted space in a program memory unit. No instructions can be erased or otherwise changed during the course of processing, and all instructions contain an N-bit operation code. These operation codes are selectively addressed to effect various circuit operations when addressed. In one embodiment each instruction contains only an operation code; in another embodiment some instructions also include a next address portion and a match character portion stored at respective addresses immediately following the operation code of the same instruction. The next address portion designates the address of the next instruction to be performed where that address does not sequentially follow the address of the current instruction; the match character portion contains a reference number to be compared with data being processed.

In another respect of the invention multiple data terminals are serviced on a time-sharing basis. A multiplexer sequentially samples each terminal, which, when found ready for processing, has an entire unit record of data completely processed before sequential sampling is resumed. Once a processing job is begun for a terminal that terminal cannot be locked out during subsequent multiplexer cycles until the job is completed.

In another aspect of the invention, text processing is accomplished in a manner to permit a document to be edited by summoning specified stored lines of processed text characters from a random access memory. The summoned line can be modified in whole or in part. The processor, upon receiving text characters to be inserted in the summoned line, stores them at an available location in memory, irrespective of the proximity of that location to the stored portions of the original document. By a novel document-chaining technique, the corrected document may be selectively displayed in its proper sequence. Document chaining is also employed to keep track of successive pages in a document which are not necessarily stored successively in memory.

202 Claims, 17 Drawing Figures

INVENTORS
ARNOLD D. BERKELEY,
EUGENE W. BOLD,
DONALD E. JEFFERSON
& GERARD A. ZELLER

By Hurvitz & Rose
ATTORNEYS

INVENTORS
ARNOLD D. BERKELEY,
EUGENE W. BOLD,
DONALD E. JEFFERSON
& GERARD A. ZELLER
By Hurvitz & Rose
ATTORNEYS INVENTORS
ARNOLD D. BERKELEY,
EUGENE W. BOLD,
DONALD E. JEFFERSON
& GERARD A. ZELLER By *Hurvitz & Rose*

ATTORNEYS

INVENTORS
ARNOLD D. BERKELEY,
EUGENE W. BOLD,
DONALD E. JEFFERSON
& GERARD A. ZELLER

By Hurvitz & Rose
ATTORNEYS

INVENTORS
ARNOLD D. BERKELEY,
EUGENE W. BOLD,
DONALD E. JEFFERSON
& GERARD A. ZELLER

By Hurvitz & Rose

ATTORNEYS

INVENTORS
ARNOLD D. BERKELEY,
EUGENE W. BOLD,
DONALD E. JEFFERSON
& GERARD A. ZELLER

By Hurwitz & Rose

ATTORNEYS

PATENTED OCT 31 1972 3,701,972

SHEET 07 OF 15

INVENTORS
ARNOLD D. BERKELEY,
EUGENE W. BOLD,
DONALD E. JEFFERSON
& GERARD A. ZELLER

By Hurvitz & Rose
ATTORNEYS

INVENTORS
ARNOLD D. BERKELEY,
EUGENE W. BOLD,
DONALD E. JEFFERSON
& GERARD A. ZELLER
By Hurvitz & Rose
ATTORNEYS INVENTORS
ARNOLD D. BERKELEY,
EUGENE W. BOLD,
DONALD E. JEFFERSON
& GERARD A. ZELLER
By Hurvitz & Rose
ATTORNEYS INVENTORS
ARNOLD D. BERKELEY,
EUGENE W. BOLD,
DONALD E. JEFFERSON
& GERARD A. ZELLER By Hurvitz & Rose
ATTORNEYS INVENTORS
ARNOLD D. BERKELEY,
EUGENE W. BOLD,
DONALD E. JEFFERSON
& GERARD A. ZELLER
By Hurvitz & Rose
ATTORNEYS INVENTORS
ARNOLD D. BERKELEY,
EUGENE W. BOLD,
DONALD E. JEFFERSON
& GERARD A. ZELLER By Hurvitz & Rose
ATTORNEYS INVENTORS
ARNOLD D BERKELEY,
EUGENE W. BOLD,
DONALD E. JEFFERSON
& GERARD A. ZELLER By Hurvitz & Rose
ATTORNEYS INVENTORS
ARNOLD D. BERKELEY,
EUGENE W. BOLD,
DONALD E. JEFFERSON
& GERARD A. ZELLER By Hurvitz + Rose
ATTORNEYS

DATA PROCESSING SYSTEM

BACKGROUND OF THE INVENTION

The present invention relates to data processing machines for performing one or more specific tasks, and more particularly to a method and apparatus for processing data which combine important advantages of both special purpose and general purpose digital computers. The preferred embodiment illustrated and described herein is concerned with processing text material; however, the general approach to data processing employed in the disclosed system is demonstrated herein as being applicable to other areas of special purpose data processing.

The main advantage of general purpose digital computers is their flexibility, that is, their ability to perform a wide variety of tasks. Flexibility, however, is not achieved without certain sacrifices. For example, general purpose computers must include a substantial amount of hardware and be provided with an inordinate storage capacity in order to be able to perform any programmable tasks. In addition, input data for general purpose computers must be accompanied by an externally supplied program which directs the computer as to the manner in which the data is to be processed. Each task required of the computer requires, in turn, a different program, and programming is both time consuming and costly.

The main advantage of the special purpose computer is its relatively low cost. Such a computer is capable of performing a specific processing task in response to input data, and because of its limited task capability it requires relatively little hardware. In addition, the program for a special purpose computer is usually hard-wired circuitry designed into the unit which substantially eliminates the user's programming effort. The major disadvantage of the special purpose computer is its lack of task flexibility. The hard-wired program and specially provided circuitry cannot be changed without essentially rebuilding the entire unit.

It is an object of the present invention to provide both a method and a machine for processing data which combine the advantages of both special and general purpose computers yet avoid the primary disadvantages of both. More specifically, it is another object of the present invention to provide a programmable special purpose computer in which one or more internally stored programs cooperate with respective sets of hardware circuits to perform respective discrete processing tasks. Still more particularly, it is another object of the present invention to provide functionally modular and therefore readily interchangeable data processing circuits responsive to respective stored programs to perform corresponding specified data processing tasks.

It is another object of the present invention to provide a special purpose computer comprising a plurality of storage registers and counters wherein the contents of any register or counter can be transferred to any other register or counter via a common transfer circuit, and wherein the processing tasks performed by the computer are determined by the program or programs stored therein.

Time-sharing is often the only practical approach to data processing for most users. The term time-sharing, as used in the data processing art, encompasses two types of shared computer use, namely that in which the computer performs a complete processing task for each terminal before going on to the next, and that in which parts of different processing tasks are completed for all terminals in a continuous sequence. The former requires what is known as off-line operation whereby the user must prepare all of the data for the job on off-line equipment and then feed the prepared data in one large batch into the computer. This is where huge delays arise, making it almost impossible for a user with a sudden and immediate need for data processing to be serviced. In the other type of time-sharing the computer allocates a specified portion of a continuous scan cycle to each terminal while continuously scanning all of the terminals. Whatever processing can be completed within that period of time is effected, and the processing task is continued during the next scan interval for that terminal. This approach requires a significant amount of hardware in order to permit the computer to remember, between scan intervals: (1) which of the multiple tasks is being performed for each terminal; (2) where in the task process the computer left off at the end of the last scan interval; and (3) various control data associated with each terminal and the task being performed for it.

It is another object of the present invention to provide a method and apparatus for processing data for multiple terminals without causing significant delay in user access and without requiring a great amount of costly hardware to store information for each terminal when other terminals are being serviced. More particularly, it is another object of the present invention to provide a method and apparatus for processing data for multiple terminals wherein processing for each terminal is an on-line procedure and wherein one or more specified processing tasks can be selected at each terminal. Still more particularly, it is an object of the present invention to provide a method and apparatus for processing data wherein a predetermined unit record of data, forming only a part or all of the data to be processed in an overall processing task, is completely processed each time the processing system scans a terminal and finds it ready for processing, so that processing for that terminal during subsequent scan cycles begins with a new unit record. A unit record, as used herein contains a variable but limited number of data characters and is terminated by a predetermined characteristic of the last data character in the unit record. A more precise definition of unit record requires reference to the processing task. For example, a unit record may be a word, line, sentence, paragraph, etc. of text characters.

Computer programs, whether of the type which are partially stored in a processor or which are externally supplied to the processor for each processing task, usually comprise an operation code portion and one or more address portions. The operation code portion designates a particular machine function to be performed; the address portions designate the location of stored reference information to be used in a computation, or the address at which one or more results of computation are to be stored, or, in the case of a stored program, the address of the next instruction to be read from the program memory. This type of approach requires a storage medium for the reference information as well as a complex multi-part instruction format which is wasteful of memory capacity. More particularly, a predetermined number of program memory bits are reserved for each instruction, even for those instructions which do not require all of the address portions. Since memory capacity is costly, this is an extremely costly luxury.

It is therefore another object of the present invention to provide, in one embodiment, a method and apparatus for processing data wherein a stored program has an instruction format arranged to supply reference information whenever required as part of an instruction, thereby eliminating the need for a separate storage facility for the reference information. In addition, it is an object of the present invention to provide either a fixed minimum length or a variable length instruction format whereby instructions having different numbers of bits can be consecutively stored in a program memory unit, thereby eliminating wasteful non-use of memory.

The preparation of a document usually entails typing a series of drafts which are amended by hand until the desired version is obtained. The latter is then typed in final form. The typing of the document is quite time-consuming and prior art text processing systems have, to a large degree eliminated the need for multiple re-typing operations. More particularly, such systems make a machine-language record of the initial draft and then permit corrections to be made to specific portions of the record. The typist, in using such a system, after typing the original draft needs only to type some required control data and the desired correction data to amend the recorded document.

Although prior art text processing systems have effected significant reductions in time in the preparation of documents, such systems still have a number of significant disadvantages. Most of these systems utilize general purpose computers on an off-line basis, requiring the typist to type the entire document and obtain a machine-compatible version thereof before the document can be put into the computer. Then the typist must wait until computer time is available before the document can be stored. When amendment is necessary, all of the corrections must be prepared in a specified format and again the typist must wait for available computer time before corrections of the record are made; this clearly leaves room for some degree of time-saving.

Certain text processors operate on-line; however, these are capable of serving only one or two terminals and are much too expensive for most users. In addition, these processors accomplish text editing or amending by what is known as the "merge" principle. More particularly, an initial record containing the document as originally typed, and a second record containing the amendatory matter, are merged either onto one of the other two records or onto a third record. The process requires the system to scan the entire initial record, regardless of its length, in order that a corrected record may be stored as a unit. Scanning of the initial record is quite time-consuming and also costly if the user is paying for computer time. Some approaches to text editing in the prior art have avoided the merge technique; however, these approaches are limited with respect to the permitted length of text insertions that can be accommodated by the system and require manual handling of page records.

It is therefore another object of the present invention to provide a method and apparatus for processing text data on an on-line basis and wherein multiple documents can be processed simultaneously if desired. In addition it is an object of the present invention to provide an approach to text processing wherein editing of a stored document does not require either merging of two records or scanning of an entire record. More particularly, it is an object of the present invention to record insert text matter of any length at whatever memory location or locations are available when the insert matter is received, and then key the record to that memory location so that the insert matter is retrieved in proper sequence when the document is displayed.

Another significant disadvantage in prior art text processors resides in the fact that they require each processed document to be stored as a unit. This is a particularly unfortunate characteristic where the processor is servicing multiple terminals. To this end, a single memory segment of predetermined capacity is allocated to each document. If any document is shorter than the predetermined length, a substantial portion of the memory is wasted.

It is an object of the present invention to record text data substantially in the sequence received, irrespective of the terminal from which the data originates, and then key the record itself to keep track of individual documents. More particularly it is an object of the present invention to allocate the equivalent of the next available page (for example) of the record to each document as text data for that document becomes available so that consecutive memory pages do not necessarily belong to the same document.

Prior art text processors generally require substantial modification to the standard typewriter keyboard in order to generate the various commands required to process the typed text. This of course requires training of typists to be able to properly utilize the system.

It is therefore another object of the present invention to provide a text processing method and apparatus therefor wherein a standard keyboard is employed and only an on-off button is added thereto.

Another object of the present invention is to provide a method and apparatus for processing text data wherein multiplexer techniques are employed to service multiple terminals, and wherein any terminal found ready for processing in a multiplexer scan interval has a predetermined unit record of its text (word, line, page, etc.) completely processed during that interval.

Another object of the present invention is to provide a method and apparatus for processing text data wherein a typist can correct text errors while typing the original draft of a document by backspacing.

SUMMARY OF THE INVENTION

In accordance with one aspect of the present invention a special purpose data processor is provided with both circuits and stored programs for effecting one or more specific processing tasks. Data characters, intermixed with control characters are sequentially provided by a data terminal and the processed characters are stored, in a memory unit. A stored program of instructions controls processing in a predetermined sequence which can be modified by the control characters supplied by the terminal. The stored characters may be displayed at the terminal in the sequence stored, also under the control of a stored program which is responsive to control characters. The circuitry provided as part of the processor is preferably modular in nature and therefore readily interchanged or, if desired, added or deleted in the system. By choosing proper circuit modules in combination with appropriate stored programs, any one or more of a number of predetermined processing tasks, such as text processing, credit checking, accounting, inventory control, etc., can be effected. To this end, much of the circuitry and some of the programs can be designed so as to be common to more than one processing task.

The programs in the preferred embodiment are a plurality of stored instructions of fixed minimum length or variable length, packed one after the other without wasted space in a program memory unit. The program is unalterable during system operation; that is, no instructions can be erased or otherwise changed during the course of processing. All instructions contain an operation code of predetermined length, for example N bits. For the most part these operation codes are addressed in sequence and each effects various circuit operation when addressed. In one embodiment each instruction contains only an operation code; in another embodiment some instructions also include a next address portion, also of N bits, stored at the address immediately after the operation code of the same instruction. This next address portion, the presence of which is signified by part of the operation code, may designate the address of the next instruction to be performed where that address does not sequentially follow the address of the current instruction. Still other instructions may include a third portion, in addition to the operation code and next address. Containing a reference number of N bits which is to be compared with data being processed. If the reference number matches the data number, a jump or branch to the next instruction address (designated in part two of the instruction) is effected; otherwise, the instruction at the next sequential address is evoked. By employing this particular variable length instruction technique, instructions may be packed in the instruction memory without gaps therebetween, and efficient use of instruction memory capacity is assured. In either the fixed minimum length or variable length format, a read-only memory may be employed.

According to another aspect of the present invention, multiplexing techniques are employed to permit servicing of multiple data terminals simultaneously, each of which may require that a different processing task be performed. A multiplexer sequentially samples each terminal. When, in response to sampling, a terminal is found ready for processing, an entire predetermined unit record of data (e.g. - in text processing this may be a word, line, specified number of lines, page, etc. of text characters) is completely processed (e.g. - stored, displayed, etc.) for that terminal before the multiplexer resumes scanning. The complete processing of one unit record of data at a time permits the program to be re-entered at one point in each processing mode, thereby greatly simplifying both the circuitry and the program required to keep track of the processing information for each terminal between samplings. In other words, since the system always completely processes a unit record of data in each processing cycle, it automatically begins to process a new unit record in its next processing cycle. Successive processing cycles are not necessarily of the same time duration, the time duration depending upon the nature of the processing to be perfromed in each cycle, the nature of the processing depending upon the selected operating mode and any control characters supplied with the data. To this extent the system may be said to process asynchronously rather than in the synchronous manner employed in multiplexer data processing systems which allocate a specified time interval to each terminal during each multiplexer cycle. Once a processing task is begun for a data terminal, that terminal is sampled during each multiplexer cycle and cannot be locked out. In this respect, interruption of service never occurs under normal conditions, unlike prior art systems.

In another aspect of the present invention, text processing is performed in considerably less time and with considerably less cost than possible in the prior art. In editing of a recorded document, for example, the typist is able to summon a particular stored unit record in which corrections are to appear rather than having to display the entire document at the terminal. Portions of the summoned unit record can be deleted and/or corrected, and inserts of any length can be added. The processor, upon receiving the inserted material, stores it at the next available location in memory, irrespective of the proximity of that location to the stored portions of the original document. The memory address of the insert material is automatically recorded at the point of insertion in the original document and can therefore be automatically retrieved in its proper sequence when the corrected document is displayed. With this editing technique there is no need to either scan the original record or gather all of the recorded portions of a document together in memory at the time an insert is made.

The unit record processing principle, discussed in general terms above, permits efficient use of memory capacity when employed in the text processor of the present invention. If, for example, the unit record is a line of text, the termination of which is designated by the presence of a carriage return character, the processor automatically allocates a page of memory to a document upon receiving a line of text for that document. Sequential memory pages are allocated on a first come first serve basis so that successive document pages do not necessarily have successive corresponding memory pages. To assure that a document can be displayed in proper sequence, the system inserts, on the last line of each memory page the number of the next memory page on which the codument is continued. This technique, called document-chaining, permits both faster text processing and more efficient use of memory than is possible in prior art text processors.

Irrespective of the length of the unit record (a word, line, sentence, paragraph, page, etc.) of text, the system processes each unit record character-by-character and examines each character as processed to determine whether it is a data (text) character, control character, or function character (such as space, backspace, TAB, etc.). Backspace function characters are usually not place in the machine-language record; rather they cause the processor to replace the character preceeding the backspace with the one following the backspace.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

SYSTEM CONCEPT

Figures 1, 3:
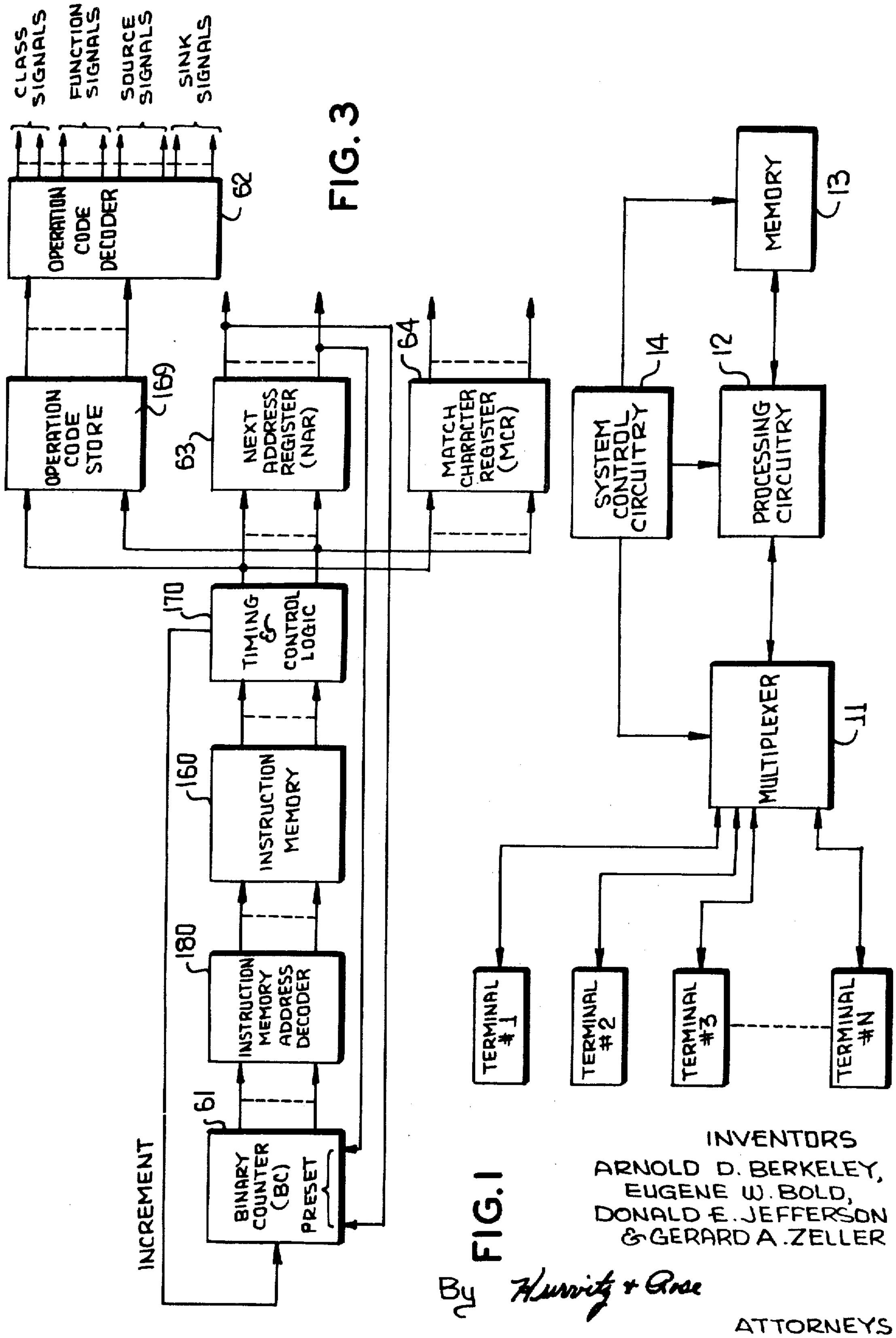
FIG. 1 is a block diagram illustrating the data processing approach of the present invention.
FIG. 3 is a block diagram illustration of a preferred embodiment of the sequence control circuitry of the present invention.

System operation for a preferred embodiment is illustrated broadly in FIG. 1; however, it is to be understood that the invention can be practiced with only one terminal. Terminals (No. 1, No. 2, No. 3, . . . N), capable of transmitting and/or receiving binary data representing text characters and control characters are sequentially sampled by a multiplexer 11. Where only one terminal is to be serviced, it is to be understood that multiplexer 11 can be dispensed with and still remain within the scope of the present invention; however, in the preferred embodiment, N Terminals are serviced on a time-sharing basis. As will be best understood from the detailed description provided below, the term "time-sharing" as used herein makes it appear to each user that he is the sole user of the system. The multiplexer, upon initiation of a processing sequence for a terminal, remains at that terminal until an entire unit of data (e.g., a line of text) is processed, irrespective of the time required to complete such processing; thus the multiplexer, in this frame of reference, is probably best described as being of the job or operation division type.

Processing circuitry 12 is provided to process data being transferred to/from the terminals from/to a memory element 13 under the control of system control circuitry 14. The latter includes a stored program of instructions which cannot be changed in response to system operation and also includes circuitry responsive to various control characters which are provided in binary form and which indicate to the system the nature of the processing operations to be performed. Depending upon the nature of the stored program and the nature of the hardware elements in processing circuitry 12, the system disclosed in FIG. 1 can serve any one of a number of special purposes such as text processing, accounting, inventory control, etc. The preferred embodiment disclosed herein, however, illustrates only the special purpose of text processing and to this end the system is capable of operating in any one of four major modes, namely: Input, Edit, List and Print. Any of these modes can be in force for any terminal at a given time; that is, all terminals need not be in the same mode. Other modes, as needed for special purposes other than text processing, may be utilized by providing appropriate circuitry and programs.

In the Input mode, the terminal supplies input text, a line at a time, to processing circuitry 12 where it is processed and transferred for storage in memory unit 13. Multiple lines, comprising a document, are thusly stored for future display at the terminal. In the List and Print modes, the terminal calls for a particular document by a unique reference number. The document is then displayed line by line, one line being displayed during each multiplexer cycle in which a terminal is available to receive data. Each line and page of a document during List mode is identified by reference numbers so that in the Edit mode the typist can directly summon any line in which changes are to be made, rather than initiating a complete document scan to reach the desired portion of the text. The summoned line is printed out and can be deleted in whole or part or added to by an insertion of any length. In addition, substitution of characters and words may be effected.

In the Print mode, the typist summons the entire document by reference number and receives a final version of the edited document, fully justified as to both right and left margins.

In the Edit mode, it is important to note that the typist can insert text material of theoretically unlimited length rather than some limited length.

Figure 2:
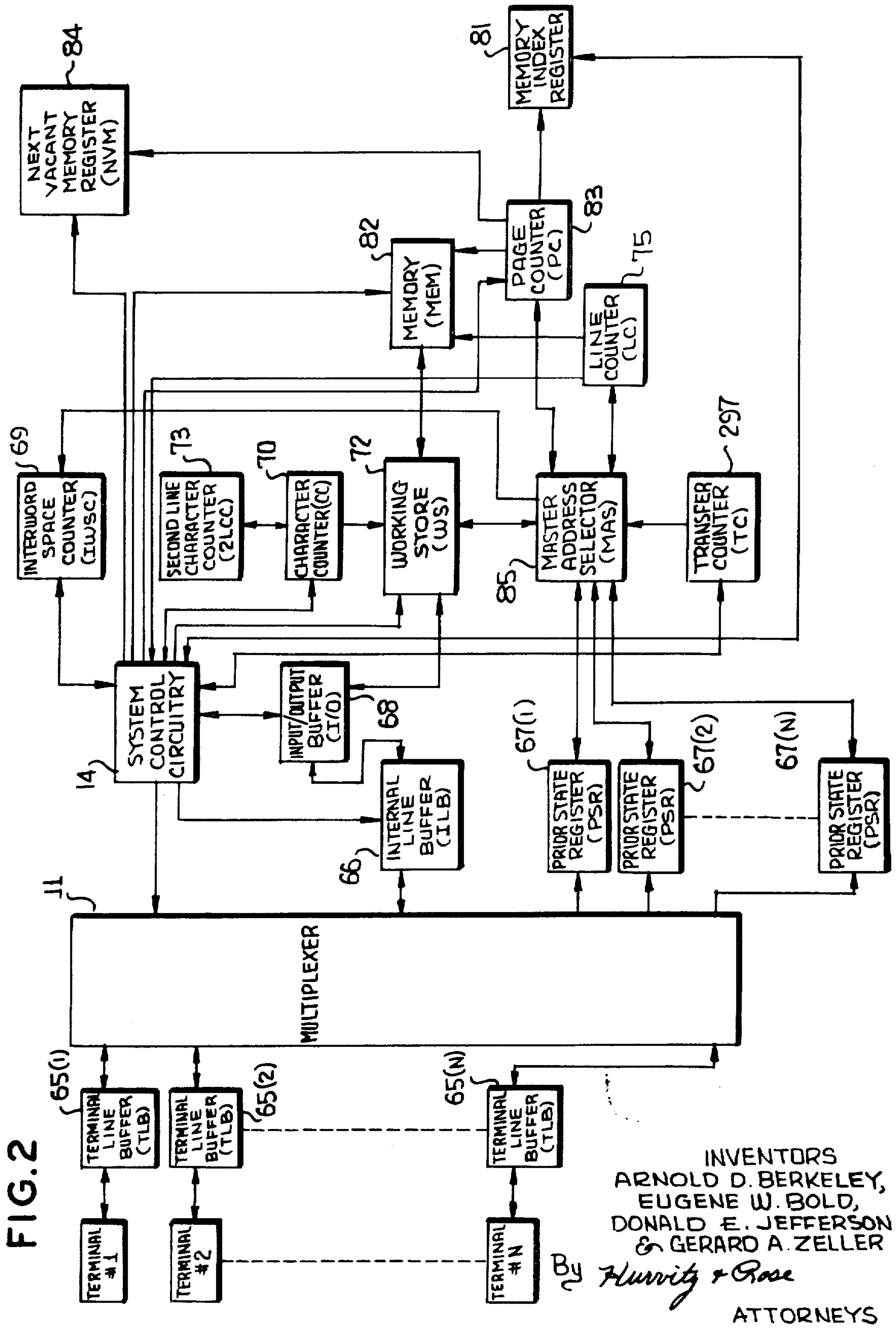
FIG. 2 is a block diagram illustration of a preferred embodiment of the processing circuitry of the present invention.

Referring now to FIG. 2 of the accompanying drawings, there is illustrated in somewhat greater detail than in FIG. 1, a block diagram of the preferred system embodiment wherein the various system components and their functional interrelationships are illustrated. The description of FIG. 2 which follows is segmented in accordance with the various system functional modes, namely Input Edit, Print and List.

In the Input mode, a terminal, for example Terminal No. 1, supplies data to the system for processing and storage. It is to be understood that the terminal can have both a transmit and receive capability or only one of these as particular requirements dictate. A typical terminal having both transmit and receive capability and compatible with the system described herein may be a Typewriter Transmitter-Receiver (TTR) of the type supplied by INVAC Corp., Waltham, Mass., as Model TTR Series 200. The display at any terminal may be of the CRT or other type rather than hard copy. Text and function characters transmitted by terminal No. 1, for example, are received by Terminal Line Buffer (TLB) 65(1), there being a Terminal Line Buffer provided for each terminal. Terminal Line Buffer 65 comprises eight shift registers (one register for each bit in the character code, it being assumed that there is an eight-bit character code utilized in the present system), each having a length determined by the desired character capacity for the unit. For example, if the maximum number of characters permitted in any line of text is 128 as assumed herein, the Terminal Line Buffer capacity should be in excess of that number, for example, 200 characters, in order to permit entry of function and control characters, such as Backspace, "Begin-text-character," etc. into the processor without decreasing the character capacity of a line of text. Transfer of data to and from Terminal Line Buffer 65 is accomplished serially-by-character and parallel-by-bit.

Figures 5, 5A:
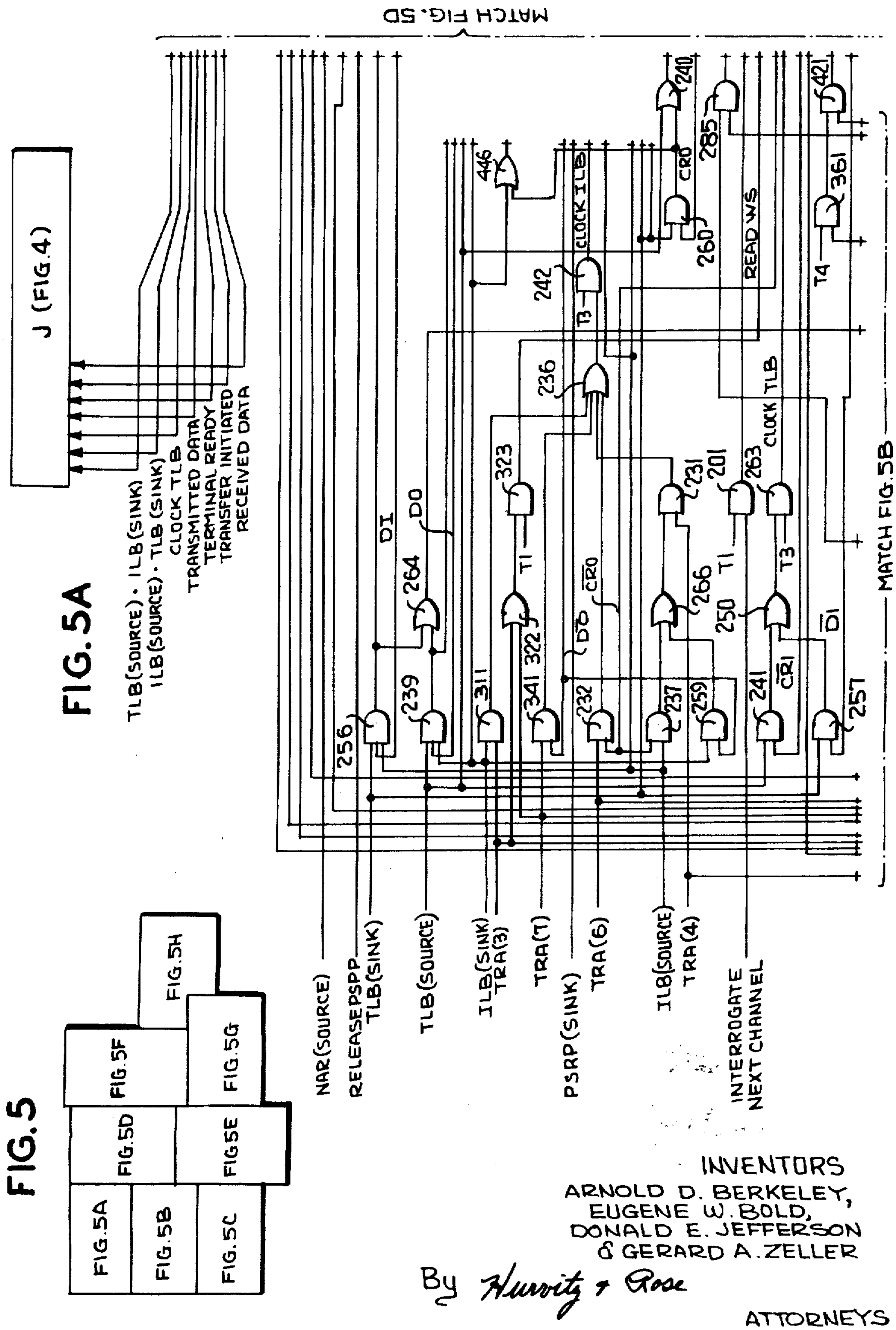
FIG. 5 is a block diagram of the layout of FIGS. 5A through 5H.
FIGS. 5A through 5H are schematic illustrations of a preferrec embodiment of the processing circuitry of the present invention.

Multiplexer 11, the detailed functioning of which is described in relation to FIG. 5, scans the various terminals until it finds one which is ready to supply data to or receive data from the processor. In the Input mode of a terminal, a ready terminal is one in which an entire line of text has been shifted into Terminal Line Buffer 65 for that terminal. Assuming this to be the case for terminal No. 1, when multiplexer 11 samples terminal 1 and finds it ready to supply a line of text to the processor, that line is transferred serially-by-character and parallel-by-bit into an Internal Line Buffer (ILB) 66, only one of which is provided to service all of the terminals. ILB 66 is substantially identical in structure and operation to TLB 65. After an entire line is transferred to ILB 66 it is then transferred character-by-character to a character-addressable Working Store (WS) 72, via Input/Output Buffer (I/O) 68. Working Store 72 has a character capacity substantially in excess of the capacity of Terminal Line Buffer 65 and Internal Line Buffer 66; for example, the capacity of Working Store 72 may be 512 eight-bit characters. WS may be core or solid state; however, when core, WS must have incorporated therein an eight-bit data register for storing the addressed character. Working Store 72 is addressed by Character Counter (CC) 70 so that only the character slot in Working Store 72 which is addressed by Character Counter 70 can be written into or read from at any time. Input/Output Buffer 68 is an eight-bit character buffer comprising eight flip-flops of the set-reset type, one flip-flop being provided for each character bit.

The character in Input/Output Buffer 68 is monitored by system control circuitry 14 in order to determine whether it is a text or function character. If the former, the transfer from Internal Line Buffer 66 to Working Store 72 continues; if the latter, the transfer terminates and appropriate action is taken at Control Circuitry 14 in accordance with the nature of the function indicated by the detected function character.

After the text line has been transferred to Working Store 72, it is then transferred to a Memory unit (MEM) 82, where it is stored for future retrieval. Memory unit 82 can be disk, core, solid state, or in fact any appripriate memory device consistent with the functions described herein. For example, the memory unit may be a disk of the type provided by the Information Storage Inc. of Detroit, Mich., as Model No. 7064. Such a disk comprises a plurality of tracks, each track representing a page on which data may be stored. The tracks are segmented into sectors, each sector representing a line on the page. The track and sector into which the text line from Working Store is transferred into Memory 82 is determined by the respective page and line counts in Page Counter (PC) 83 and Line Counter (LC) 75. These counters address Memory 82 to assure that the transferred line is written into the proper memory address. Page Counter 83 and Line Counter 75 are conventional binary counters capable of being reset, preset, or incremented. They comprise clocked-data flip-flops interconnected to achieve binary counting operation.

Once a line of data from a specified document is written into a track or page in Memory 82, that track or page is reserved for that document and subsequent lines of text in that document are stored on that page. When the line or sector capacity of the track or page is reached, the next available (i.e., no data recorded thereon) track or page is found and the document is continued thereon. Importantly, successive pages in a document are not necessarily stored in successive memory tracks; displayed, sequential memory tracks are allocated to any document on a first-come-first-serve basis. A "document chaining" technique, described in greater detail hereinbelow, is employed to keep track of which memory pages belong to which document.

A memory index register 81 is employed to keep track of which pages in memory have been written upon and therefore are not available to receive data. The memory index register is preferably a solid state memory element capable of storing as many one-bit words as there are tracks in Memory 82. Each time a new page in Memory 82 is utilized, a binary zero is written into a corresponding word in memory index register 81. By using Page Counter 83 to address memory index register 81, and by sequentially incrementing Page Counter 83 and sensing the state of the addressed word in memory index register 81, it is possible to find the number of the next available page in memory unit 82. This number, when found, is actually stored in the Next Vacant Memory register (NVM) 84 for future use each time a new page in memory 82 is written upon; in this way, the next available page number is readily available. Next Vacant Memory register 84 is actually a parallel-in parallel-out shift register having a sufficient number of bits to accommodate the maximum page count.

After the input line has been stored in Memory unit 82, its processing is effectively completed for the current cycle of multiplexer 11. However, control cannot be immediately restored into multiplexer 11 for scanning of the other terminals until some basic "-housekeeping" functions are accomplished in the processor. More particularly, it is necessary to store certain pertinent data for each document while other documents are being processed. Line Counter 75 and Page Counter 83, for example, service all of the terminals and their respective counts must reflect the state of the document being processed at any time. Other pertinent information, the nature of which will be described in subsequent sections hereof, for each document must also be stored while other documents are being processed. To this end, a Master Address Selector (MAS) 85 is provided along with a plurality of Prior State Registers (PSR) 67, one PSR for each terminal.

The Master Address Selector 85 is a working storage unit in which control information for the document being processed is being stored. It is a character addressable, multi-bit per character, multi-character storage unit in which each multi-bit character is assigned a function. For example, two character slots in MAS 85 are assigned to the line count and contain a two-digit number representative of the line on a particular memory page in which the line of text being processed is to be written or from which it is to be read. Likewise, two other character slots in MAS 85 are assigned to the page count and still other character slots are assigned to different functions described below. At the termination of a processing cycle for a given terminal, the various control information in MAS 85 is transferred to the Prior State Register 67 for that terminal. The Prior State Registers are all multibit per character, multi-character, static shift registers, each PSR character being assigned the same function as a corresponding character in MAS 85. Therefore, after a line of input text from terminal No. 1 is stored in Memory 82, the control information for the current document being processed for terminal No. 1 is transferred from MAS 85 to PSR 67(1). The character slot in MAS 85 into which information can be written or from which information can be read is determined, for the most part, by the count in Transfer Counter (TC) 297, which addresses MAS 85. Transfer Counter 297, like Line Counter 75, is a conventional binary counter capable of being incremented, reset and preset.

The stored control data in Prior State Register 67(1) is transferred back to MAS 85 the next time multiplexer 11 finds terminal No. 1 ready to transmit another line of data. It is important to note that multiplexer 11 remains fixed on terminal No. 1, or whichever terminal it finds ready, until an entire line of text has been processed for that terminal. In other words, the processing job or operation for a unit of text (a unit being a line in the current example) is completed irrespective of the time required to effect such completion. This differs from prior art multiplexing techniques employed in data processing systems wherein as much processing as can be achieved is effected in a limited predetermined time period; any processing not achieved within that time period is continued in the next time period allocated to the particular terminal. In such prior art systems, the status of the processing operation at the time the sampling period terminates cannot be predicted in advance and hence complex logic circuitry must be provided to determine where processing is to resume for each terminal the next time it is sampled. In the present invention, however, since a unit of text is completely processed when its terminal is sampled, the complexity of the hardware components and software control functions required to keep track of a given document between samples is greatly simplified.

In the Print and List modes, a line of text is transferred from Memory 82 to Working Store 72 and in turn to Internal Line Buffer 66 via Input/Output Buffer 68. From Internal Line Butter 66, the line is transferred to Terminal Line Buffer 65 for the appropriate terminal where it is displayed as hard copy, on a CRT display, or the like. The various elements described above in relation to the input mode provide the same functions in the Print and List modes. Thus, Page Counter 83 and Line Counter 75 keep track of the appropriate page and line number of the document, Character Counter 70 addresses Working Store 72 to write into or read out of Working Store the appropriate character, etc. In addition, while the line of text to be displayed is in Working Store 72, it is justified so that the right margin of the final copy is aligned. The justified line length (that is, the number of characters in a justified line) for a given document may be set to some standard number by the program in control circuitry 14, or may be selectively changed by the operator at each terminal. In any event, this number is placed in MAS 85 at the beginning of the input mode and remains available in Prior State Register 67 for each terminal. This number is transferred to Interword Space Counter (IWSC) 69 from MAS 85 before the line being processed is transferred from Working Store 72 to Internal Line Buffer 66. With Interword Space Counter 69 so set, it is then decremented each time a character is transferred from Working Store 72 to Internal Line Buffer 66. When the Interword Space Counter count reaches one, it is indicative that the number of characters present in Internal Line Buffer 66 is equal to the number of characters required for a justified line.

The course of the justification process requires a substantial amount of setting, presetting, and resetting of Character Counter 70 in order that appropriate Working Store character slots are properly addressed. Second Line Character Counter (2LCC) 73 is provided to, among other things, keep track of a location in Working Store to be remembered during a processing cycle when Character Counter 70 is required to address some other character slot. Interword Space Counter 69 and Second Line Character Counter 73 are of the same type as Character Counter 70.

Each of the above-described elements functions in the Edit mode in a similar manner to that described for the Input and Print modes, but cooperate to achieve a different overall result. In the Edit mode, the operator at a terminal is capable of summoning forth from Memory 82 any line of a stored document in which changes such as deletions, corrections, and insertions are to be made. Since pages and lines of Memory can be directly addressed, there is no need for this system to scan an entire document or series of documents in order to provide the summoned line. Rather, the summoned line, identified by page and line numbers printed out for the operator by the system during the List mode, is accessed directly and displayed at the terminal. The operator, as described in detail below, is then able to make whatever corrections to the text are necessary. It is important to note that insertions to the text are recorded on the next available memory page. Thus, for example, if an insertion is to be made in the middle of a memory page in a given document, continuity for that document would branch off from that page to some other memory page, the number of which is automatically inserted on the original page. When the insertion is completed, the number of the original page and line is automatically placed at the end of the insert to key the system for document continuity. This manner of insertion during Edit mode is a vast improvement over prior art techniques for inserting material in a recorded document. More particularly, the prior art approach of merging the original text and the insertion text from respective serial records requires that the entire document be scanned each time an insertion is made. There are also some prior art text editing systems where scanning of an entire document is not required; however, these are limited to insertions of fixed unit record length. The present approach simply allocates a new memory page to the insertion and identifies, in the original text, the memory page at which the insertion is stored. There is no limit to insertion length.

SYSTEM CONVENTIONS AND COMPONENTS

In the description which follows, binary signals are employed wherein a high signal (i.e. - more positive) is considered binary one and a low signal (i.e. - more negative) is considered binary zero. It is assumed that the terminals supply data to the system in a conventional six-bit selectric type binary code. This code is modified when received to provide a modified seletric type of binary code which is employed throughout the system except as otherwise indicated, such code comprising eight-bit characters wherein each typewriter character and function is uniquely represented. This code is set forth in Table I.

MODIFIED SELECTRIC CODE

| A B C D E F G H | charater | A B C D E F G H | character |
|---|---|---|---|
| 1 0 0 0 0 0 0 0 | *b* | 1 0 0 0 0 0 1 0 | B |
| 0 1 0 0 0 0 0 0 | *w* | 0 1 0 0 0 0 1 0 | W |
| 1 1 0 0 0 0 0 0 | 9 | 1 1 0 0 0 0 1 0 | ( |
| 0 0 1 0 0 0 0 0 | *q* | 0 0 1 0 0 0 1 0 | Q |
| 1 0 1 0 0 0 0 0 | *k* | 1 0 1 0 0 0 1 0 | K |
| 0 1 1 0 0 0 0 0 | *i* | 0 1 1 0 0 0 1 0 | I |
| 1 1 1 0 0 0 0 0 | 6 | 1 1 1 0 0 0 1 0 | ¢ |
| 0 0 0 1 0 0 0 0 | Y | 0 0 0 1 0 0 1 0 | Y |
| 1 0 0 1 0 0 0 0 | *h* | 1 0 0 1 0 0 1 0 | H |
| 0 1 0 1 0 0 0 0 | *s* | 0 1 0 1 0 0 1 0 | S |
| 1 1 0 1 0 0 0 0 | O | 1 1 0 1 0 0 1 0 | ) |
| 0 0 1 1 0 0 0 0 | p | 0 0 1 1 0 0 1 0 | P |
| 1 0 1 1 0 0 0 0 | *e* | 1 0 1 1 0 0 1 0 | E |
| 0 1 1 1 0 0 0 0 | ' | 0 1 1 1 0 0 1 0 | '' |
| 1 1 1 1 0 0 0 0 | 5 | 1 1 1 1 0 0 1 0 | % |
| 0 0 1 0 1 0 0 0 | = | 0 0 1 0 1 0 1 0 | + |
| 1 0 1 0 1 0 0 0 | *n* | 1 0 1 0 1 0 1 0 | N |
| 0 1 1 0 1 0 0 0 | . | 0 1 1 0 1 0 1 0 | . |
| 1 1 1 0 1 0 0 0 | 2 | 1 1 1 0 1 0 1 0 | @ |
| 0 0 1 1 1 0 0 0 | *j* | 0 0 1 1 1 0 1 0 | J |
| 1 0 1 1 1 0 0 0 | *t* | 1 0 1 1 1 0 1 0 | T |
| 0 1 1 1 1 0 0 0 | ! | 0 1 1 1 1 0 1 0 | o |
| 1 1 1 1 1 0 0 0 | z | 1 1 1 1 1 0 ! 0 | Z |
| 0 0 1 0 0 1 0 0 | , | 0 0 1 0 0 1 1 0 | , |
| 1 0 1 0 0 1 0 0 | *c* | 1 0 1 0 0 1 1 | C |
| 0 1 1 0 0 1 0 0 | *a* | 0 1 1 0 0 1 1 0 | A |
| 1 1 1 0 0 1 0 0 | 8 | 1 1 1 0 0 1 1 0 | * |
| 0 0 0 1 0 1 0 0 | / | 0 0 0 1 0 1 1 0 | ? |
| 1 0 0 1 0 1 0 0 | l | 1 0 0 1 0 1 1 0 | L |
| **0 1 0 1 0 1 0 0** | *o* | 0 1 0 1 0 1 1 0 | O |
| 1 1 0 1 0 1 0 0 | 4 | 1 1 0 1 0 1 1 0 | $ |
| 0 0 1 1 0 1 0 0 | ; | 0 0 1 1 0 1 1 0 | : |
| 1 0 1 1 0 1 0 0 | *d* | 1 0 1 1 0 1 1 0 | D |
| 0 1 1 1 0 1 0 0 | *r* | 0 1 1 1 0 1 1 0 | R |
| 1 1 1 1 0 1 0 0 | 7 | 1 1 1 1 0 1 1 0 | & |
| 0 0 1 0 1 1 0 0 | *f* | 0 0 1 0 1 1 1 0 | F |
| 1 0 1 0 1 1 0 0 | *u* | 1 0 1 0 1 1 1 0 | U |
| 0 1 1 0 1 1 0 0 | *v* | 0 1 1 0 1 1 1 0 | V |
| 1 1 1 0 1 1 0 0 | 3 | 1 1 1 0 1 1 1 0 | # |
| 0 0 1 1 1 1 0 0 | *g* | 0 0 1 1 1 1 1 0 | G |
| 1 0 1 1 1 1 0 0 | x | 1 0 1 1 1 1 1 0 | X |
| 0 1 1 1 1 1 0 0 | *m* | 0 1 1 1 1 1 1 0 | M |
| 1 1 1 1 1 1 0 0 | ] | 1 1 1 1 1 1 1 0 | [ |
| 1 0 0 0 1 1 0 0 | Space | 1 0 0 0 1 1 1 0 | Space |
| 0 1 0 0 1 1 0 0 | Backspa- | 0 1 0 0 1 1 1 0 | Backspa- |
| 1 1 0 0 1 1 0 0 | ce Tab | 1 1 0 0 1 1 1 0 | ce Tab |
| 0 0 0 1 1 1 0 0 | Carriage Return | 0 0 0 1 1 1 1 0 | Carriage Return |

It is to be understood that the modified selectric code is employed herein only to facilitate compatibility with certain existing commercial terminals. Various other codes can be employed within the scope of this invention. In addition, to facilitate counting, certain circuits operate on pure binary or binary-coded-octal codes with conventional converters being employed to effect code conversion. Code conversion is not a part of this invention, since, if desired, one code may be utilized throughout.

Numerous types of flip-flops, having a different operating characteristic, are employed in the system described herein. These flip-flop types, and their operating characteristics are listed below:

a. Clocked-data type - includes a data input terminal, a clock input terminal, a set input terminal, and a reset terminal, as well as Q and $\bar{Q}$ output terminals. The state of the binary signal applied to the data input terminal at the time of the leading edge of a clock pulse determines the state of the flip-flop. A binary one set or reset signal overrides the signal at the data input terminal in determining the flip-flop state. Typical of this type flip-flop is that provided by Texas Instruments Corp. as model SN7474.

b. Clocked J-K type - includes a J input terminal, a K input terminal and a clock input terminal as well as Q and $\bar{Q}$ output terminals. Whichever of the J nd K input terminals has a binary one signal applied thereto at the onset of a clock pulse determines the state of the flip-flop. An example of such a flip-flop is that provided by the Texas Instruments Corp. as model SN7472.

c. Set-Reset type - includes set an reset input terminals as well as Q and $\bar{Q}$ output terminals. This flip-flop may, for example, be of the same type as the clocked-data flip-flop wherein the clock and data input terminals are not utilized.

Each of the above flip-flops provides a binary one signal at their Q output terminals when set or in a binary one state; a binary one signal is provided at the $\bar{Q}$ terminal when the flip-flop is reset or binary zero.

In addition to the various flip-flops described above, various AND, NAND, OR and NOR gates and logic inverters are employed in the system disclosed to perform their wellknown functions. Moreover, in a number of circuits, a plurality of NAND gates are wire-OR connected in the manner set forth at page 2–7 of Texas Instruments Catalog No. CC201. More particularly, the output terminals of a plurality of NAND gates are connected to a common junction, the NAND gates being normally enabled to provide a high or binary one output signal. If any of the NAND gates becomes disabled and provides a binary zero output signal, the common junction goes to binary zero.

A number of comparators are described in the present system and provide a binary one output signal whenever two binary input signals match, or whenever a single binary input signal matches a stored reference signal. Comparators such as these are conventional, utilizing appropriate logic gates to effect the desired binary one output signal at the proper time.

Important to an understanding of FIG. 5 described below is the convention followed herein of illustrating only one bit of various registers and counters in order to simplify the drawings. For example, a particular buffer may comprise N-shift registers. M stages in length, each register being allocated to a particular bit in the eight-bit character code. The first stage of each of the N registers together thus comprise a character of N bits. Since the logic associated with each bit is substantially the same, only one such bit is illustrated. Likewise, one or more logic gates may be associated with each one of these bits; however, only one of each of the logic gates is illustrated for purposes of facilitating the present description. In certain special situations, where a more expanded illustration of the register or counter is believed beneficial to a proper understanding of the invention, more than one bit of that counter or register is in fact illustrated and described; such exceptions are indicated in the specification.

It is also to be understood, particularly in reference to FIG. 5, that the circuitry associated with only one data terminal, namely terminal J, is illustrated in its entirety. Each signal line extending to and/or from circuitry from and/or to the processor represent multiple parallel signal lines extending between circuitry for a respective terminal and a common junction.

Also omitted for the purpose of simplifying the drawings and thereby facilitating an understanding of the invention is the logic circuitry associated with initial setting and resetting of various flip-flops, registers and counters whenever power is turned on. Without such initial setting and resetting, the various flip-flops would be in random states which could adversely affect system operation. Circuitry for achieving desired initialization of bistable elements is well-known and is omitted herein to avoid a source of confusion.

The practice is followed herein of mentioning commercially available units which by way of example may be employed in the system. Certain of these units may provide high signals where the present system calls for low signals and vice versa. It is to be understood that logic inverters are employed as required to achieve compatibility and the circuitry illustrated is merely intended to provide a functional representation of the system.

INSTRUCTION FORMAT AND SEQUENCING

Referring now to FIG. 3 of the accompanying drawings, there is illustrated in block diagram form some of the circuitry represented by the system control circuitry block 14 of FIGS. 1 and 2. More particularly, there is provided a Binary Counter (BC) 61 comprising a plurality of clocked-data type flip-flops interconnected to perform a binary counting function. Binary Counter 61 is capable of being reset, preset, or incremented. The Q output signals from the various stages of BC 61 are applied to an instruction memory address decoder 180 which comprises a plurality of logic gates arranged to convert the binary count in counter 61 to a format consistent with the addressing requirements of instruction memory unit 160. The latter is a selectively addressable memory unit capable of storing instruction words of pre-determined length in a specified program sequence. Instruction memory 160 is preferably a read-only type memory, but may be of the read-write type but its contents should not be erased or otherwise modified during the course of system operation. The instruction words, all of which have the same number of bits, are selectively transferred to and stored in the operation code store unit 169, next address register (NAR) 63 and match character register (MCR). Selective transfer to these three units is achieved under the control of timing and control logic circuitry 170, the nature of which will be more fully understood upon reference to the detailed description of FIG. 5. Timing and control logic circuitry 170 also provides an increment pulse to binary counter 61 when the desired effect of each instruction word has been implemented in the system. Thus, in the usual course of operation, instruction words residing at sequential addresses in the instruction memory are sequentially evoked to bring about the desire system operation.

The instructions employed in accordance with the present invention fall into three broad classes, each class signifying an instruction of different length. More particularly, assume the standard instruction word is 16 bits in length. A Class I instruction is simply a 16-bit instruction word, which of itself comprises the entire instruction. A Class II instruction comprises two 16-bit instruction words stored sequentially in memory unit 160. Only one of these two 16-bit instruction words appears at the 16-bit output register of instruction memory 160 at a time; however, the second part of the instruction, namely the second 16-bit word, always follows the first part of the instruction. Thus, after the first part of the instruction has been effected, timing and control logic 170 increments Binary Counter 61 so that the second part of the instruction is addressed at instruction memory 160. This second part of the instruction or the second 16-bit word is then utilized for a specific function. The Class III instruction is simply a three part instruction in which each part comprises a 16-bit word, and each part is sequentially evoked by timing and control logic circuit 170.

For the system as disclosed herein there are 53 different operation codes employed, all of which are listed in Table II along with their corresponding 16-bit binary code representations. The Class I instruction comprises a 16-bit operation code which is always transferred to the operation code store unit 169 and in turn to the operation code decoder 62. Operation Code Decoder 62 comprises a plurality of logic gates responsive to the 16-bit operation code word to provide as many as four binary one signals to effect a particular system operation. More particularly, each 16-bit operation code word has two bits reserved to indicate the class of the instruction. Referring specifically to Table II, the class code portion of each instruction contains the bits 01, 10, or 11, indicating respectively a class I, class II, or class III type instruction. In response to this, either the class I, class II, or class III output signal from operation code decoder 62 becomes binary one.

In addition, four bits in each operation code word are reserved to define the function to be performed by that operation code. There are sixteen possible functions to be performed, each having a corresponding column at the right side of Table II. An "x" in one of these columns for a given operation code indicates the binary code number of the function portion of that operation code. Table III correlates the various function numbers with function name and provides a brief description of the operation effected for each function.

TABLE II

| No. | Operation code nomenclature | Source code | Sink code | Class code | Function code 0000 | 1111 | 1110 | 1101 | 1100 | 1011 | 1010 | 1001 | 1000 | 0111 | 0110 | 0101 | 0100 | 0011 | 0010 | 0001 |
|---|---|---|---|---|---|---|---|---|---|---|---|---|---|---|---|---|---|---|---|---|
| 1 | INTERROGATE NEXT CHANNEL | 00000 | 00000 | 01 | X | | | | | | | | | | | | | | | |
| 2 | TRANSFER NAR to CC | 01010 | 00001 | 10 | | | | | | | | | | | | | | | | X |
| 3 | TRANSFER NAR to BC | 01010 | 01101 | 10 | | | | | | | | | | | | | | | | X |
| 4 | TRANSFER CC to MCR | 00001 | 01110 | 01 | | | | | | | | | | | | | | | | X |
| 5 | TRANSFER CC to 2LCC | 00001 | 00010 | 01 | | | | | | | | | | | | | | | | X |
| 6 | TRANSFER 2LCC to CC | 00010 | 00001 | 01 | | | | | | | | | | | | | | | | X |
| 7 | TRANSFER NAR to TC | 01010 | 10011 | 10 | | | | | | | | | | | | | | | | X |
| 8 | TRANSFER MCR to IWSC | 01110 | 00011 | 01 | | | | | | | | | | | | | | | | X |
| 9 | BRANCH-TRANSFER NAR to BC on MATCH of MCR and I/O | 01010 | 01011 | 11 | | | | X | | | | | | | | | | | | |
| 10 | BRANCH-TRANSFER NAR to BC on MATCH of MCR and TC | 01010 | 10011 | 11 | | | | X | | | | | | | | | | | | |
| 11 | BRANCH-TRANSFER NAR to BC on MATCH of MCR and IWSC | 01010 | 00111 | 11 | | | | X | | | | | | | | | | | | |
| 12 | BRANCH-TRANSFER NAR to BC on MATCH of MCR and CC | 01010 | 00001 | 11 | | | | X | | | | | | | | | | | | |
| 13 | BRANCH-TRANSFER NAR to BC on MATCH of MCR and LC | 01010 | 01111 | 11 | | | | X | | | | | | | | | | | | |
| 14 | BRANCH-TRANSFER NAR to BC on MATCH of MCR and I/O | 01010 | 01011 | 10 | | | | X | | | | | | | | | | | | |
| 15 | BRANCH-TRANSFER NAR to BC on MATCH of MCR and TC | 01010 | 10011 | 10 | | | | X | | | | | | | | | | | | |
| 16 | BRANCH-TRANSFER NAR to BC on MATCH of MCR and IWSC | 01010 | 00011 | 10 | | | | X | | | | | | | | | | | | |
| 17 | BRANCH-TRANSFER NAR to BC on MATCH of MCR and CC | 01010 | 00001 | 10 | | | | X | | | | | | | | | | | | |
| 18 | BRANCH-TRANSFER NAR to BC on MATCH of MCR and LC | 01010 | 01111 | 10 | | | | X | | | | | | | | | | | | |
| 19 | TRANSFER WS to I/O | 01000 | 01011 | 01 | | | | | | | | | | | | | | X | | |
| 20 | TRANSFER MAS to CC | 00101 | 00001 | 01 | | | | | | | | | | | | | | | | X |
| 21 | TRANSFER CC to MAS | 00001 | 00101 | 01 | | | | | | | | | | | | | | | | X |
| 22 | TRANSFER MAS to MCR | 00101 | 01110 | 01 | | | | | | | | | | | | | | | | X |
| 23 | TRANSFER 1-WS to ILB | 01000 | 00110 | 01 | | | | | | | | | | | | | | X | | |
| 24 | TRANSFER MAS to PSR | 00101 | 00100 | 01 | | | | | | | | | | | | | | | | X |
| 25 | TRANSFER PSR to MAS | 00100 | 00101 | 01 | | | | | | | | | | | | | | | | X |
| 26 | TRANSFER TLB to ILB | 01100 | 00110 | 01 | | | | | | | | | | | | | X | | | |
| 27 | TRANSFER ILB to TLB | 00110 | 01100 | 01 | | | | | | | | | | | | | X | | | |
| 28 | TRANSFER WS to MEM | 00000 | 00000 | 01 | | | | | | | | | X | | | | | | | |
| 29 | TRANSFER WS to MAS | 01000 | 00101 | 01 | | | | | | | | | | | | | | X | | |
| 30 | TRANSFER MAS to WS | 00101 | 01000 | 01 | | | | | | | | | | | | | | | X | |
| 31 | TRANSFER WS to ILB | 01000 | 00110 | 01 | | | | | | | | | | X | | | | | | |
| 32 | TRANSFER NVM to MAS | 00111 | 00101 | 01 | | | | | | | | | | | | | | | | X |
| 33 | TRANSFER ILB to WS | 00110 | 01000 | 01 | | | | | | | | | | | X | | | | | |
| 34 | TRANSFER MEM to WS | 00000 | 00000 | 01 | | | | | | | | X | | | | | | | | |
| 35 | TRANSFER NAR to WS | 01010 | 01000 | 10 | | | | | | | | | | | | | | | X | |
| 36 | TRANSFER NVM to WS | 00111 | 01000 | 01 | | | | | | | | | | | | | | | X | |
| 37 | TRANSFER NAR to MAS | 01010 | 00101 | 10 | | | | | | | | | | | | | | | | X |
| 38 | TRANSFER MAS to BC | 00101 | 01101 | 01 | | | | | | | | | | | | | | | | X |
| 39 | TRANSFER MAS to PSRP | 00101 | 10100 | 01 | | | | | | | | | | | | | | | | X |
| 40 | LOCATE NVM | 10000 | 00111 | 01 | | | X | | | | | | | | | | | | | |
| 41 | DECREMENT CC | 00000 | 00001 | 01 | | | | | | | X | | | | | | | | | |
| 42 | INCREMENT CC | 00000 | 00001 | 01 | | | | | | X | | | | | | | | | | |
| 43 | INCREMENT LC | 01111 | 01111 | 01 | | | | | | X | | | | | | | | | | |
| 44 | RESET LC | 01111 | 01111 | 01 | | | | | X | | | | | | | | | | | |
| 45 | INCREMENT 2LCC | 00000 | 00010 | 01 | | | | | | X | | | | | | | | | | |
| 46 | RESET 2LCC | 00000 | 00010 | 01 | | | | | X | | | | | | | | | | | |
| 47 | RESET CC | 00000 | 00001 | 01 | | | | | X | | | | | | | | | | | |
| 48 | INCREMENT IWSC | 00000 | 00011 | 01 | | | | | | X | | | | | | | | | | |
| 49 | DECREMENT IWSC | 00000 | 00011 | 01 | | | | | | | | X | | | | | | | | |
| 50 | ERASE | 10000 | 00111 | 01 | | X | | | | | | | | | | | | | | |
| 51 | TRANSFER IWSC to CC | 00011 | 00001 | 01 | | | | | | | | | | | | | | | | X |
| 52 | TRANSFER CC to IWSC | 00001 | 00011 | 01 | | | | | | | | | | | | | | | | X |
| 53 | RELEASE PSRP | 00000 | 00000 | 01 | | | | | | | | | | | | X | | | | |

TABLE III

| Function Code | Function Name | Function Operation |
|---|---|---|
| 0001 | TRANSFER (1) | A one-character transfer between a source and a sink unit, not involving WS 72. |
| 0010 | TRANSFER (2) | A one-character transfer from a source unit to WS 72. |
| 0011 | TRANSFER (3) | A one-character transfer from WS to a sink unit. |
| 0100 | TRANSFER (4) | Multiple character transfer between TLB **65** and ILB **66**. |
| 0101 | TRANSFER (5) | Releases special prior state register for use by other terminals. |
| 0110 | TRANSFER (6) | Multiple character transfer to WS 72 from source other than MEM **82**. |
| 0111 | TRANSFER (7) | Multiple character transfer from WS **72** to sink other than MEM **82**. |
| 1000 | TRANSFER (8) | Multiple character transfer from WS **72** to MEM **82**. |
| 1001 | TRANSFER (9) | Multiple character transfer from MEM **82** to WS 72. |
| 1010 | DECREMENT | Decrease count in indicated counter by one. |
| 1011 | INCREMENT | Increase count in indicated counter by one. |
| 1100 | RESET | Reset count in indicated counter in zero. |
| 1101 | BRANCH | One character transfer from NAR **63** to BC **61** occurring only if the character in MCR **64** matches the character in the indicated counter or register. |
| 1110 | LOCATE NVM | Scan Memory Index **81** to find next available memory page number. |
| 1111 | ERASE | Reset Memory Index **81** at addressed bit. |
| 0000 | INTERROGATE NEXT CHANNEL | Initiates Multiplexer scanning and inhibits incrementation of BC **61** until a terminal is found to be ready. |

Operation code decoder 62 responds to the function code in the operation code word to supply a binary one signal on an appropriate one of its sixteen function signal lines. The binary one function signal effects the particular operation noted in Table III and described in detail with reference to FIG. 5 below.

The operation cod word also includes five bits reserved as a source code and five further bits reserved as a sink code. The purpose of the source code is to designate the source unit (register, counter, etc.) from which data is to be transferred in response to the operation code. The purpose of the sink code is to designate the sink unit (register, counter, etc.) to which data is to be transferred in response to the operation code. The source code and the sink code portions for each operation code are listed in Table II. The operation code decoder 62 responds to the source and sink codes of each operation code word to apply a corresponding binary one source and sink signal to the processor circuitry.

In summary then operation code decoder 62, in response to a given operation code word applied thereto, provides a binary one class signal to indicate the number of 16-bit words which comprise the instruction, a binary one function signal to designate the type of operation to be performed by the operation code, a binary one source signal to designate the unit from which data may be transferred in response to the operation code, and a binary one sink signal to designate the unit to which data may be transferred. Not all of the operation codes have source and/or sink codes, since not all of the operation codes are of the type which direct a transfer from one unit to another. Where a source and/or sink code is not present for a given operation code, five zeroes appear in the source and/or sink code bits.

If the instruction is of the Class II.type, a Class II signal from operation code decoder 62 informs the timing and control logic circuit 170 that the next instruction word to be addressed at instruction memory 160 is not an operation code, but rather some other number. Timing and control logic circuit 170 responds to this indication by sending the next addressed instruction word to Next Address Register 63 instead of to operation code store 169. Usually this 16-bit number, transferred to next address register 63 is the address of some instruction which should be effected next in the program sequence but which does not reside in the next sequential address in instruction memory 160. Rather than permit the timing and control logic circuit 170 to increment Binary Counter 61, therefore, the next address register transfers its contents directly to the binary counter so that the latter can address the desired instruction in instruction memory 160. In this way an unconditional program jump or branch can be effected. Note that the address of the first instruction in the program branch is obtained directly from the stored program itself and not from data operated upon by the system.

A class III type instruction comprises three 16-bit instruction words. The first word is an operation code which, as described above, provides as many as four binary one output signals from operation code decoder 62. One of these four output signals is the class signal indicating that the instruction is in fact of the Class III type. Timing and control logic circuit 170 responds to a binary one Class III signal from operation code decoder 62 to assure that the next sequential 16-bit instruction word is transferred to Next Address Register 63, and that the third 16-bit instruction word is transferred to Match Character Register 64. The word passed to next address register 63 is utilized as described above in relation to a Class II type instruction. The word passed to Match Character Register 64 is utilized for comparison purposes in achieving various types of system operation. For example, it is sometimes desirable to determine the nature of a particular function character which has terminated a transfer between Terminal Line Buffer 65 and Internal Line Buffer 66. To see if this function character is a carriage return character, a carriage return character is transferred as the third word of a Class II instruction into Match Character Register 64. From the match character register 64 this character can be compared in an appropriate comparison circuit against the function character in question. If a match occurs, the address transferred to Next Address Register 63 as the second part of the present instruction is used to preset Binary Counter 61 to effect a branch in the program. If no match is made with the character in Match Character Register 64, Binary Counter 61 is merely incremented and the instruction in the next sequential address is evoked. In this manner a conditional program jump or branch is effected. Note that the comparison is with the functional character supplied by or to the terminal rather than data generated by the processor.

In the manner described above, a variable length instruction format is provided to permit out of sequence jumps, both conditionally (Class III) and unconditionally (Class II) in the program stored in instruction memory 160. In addition, the operation code format permits the decoded class, function, source, and sink signals to effect the desired operation in response to a given operation code with a minimum of circuitry. This latter feature is characterized in substantially more detail in the description relating to FIG. 5 herein below.

DESCRIPTION OF TERMINAL

Figure 4:
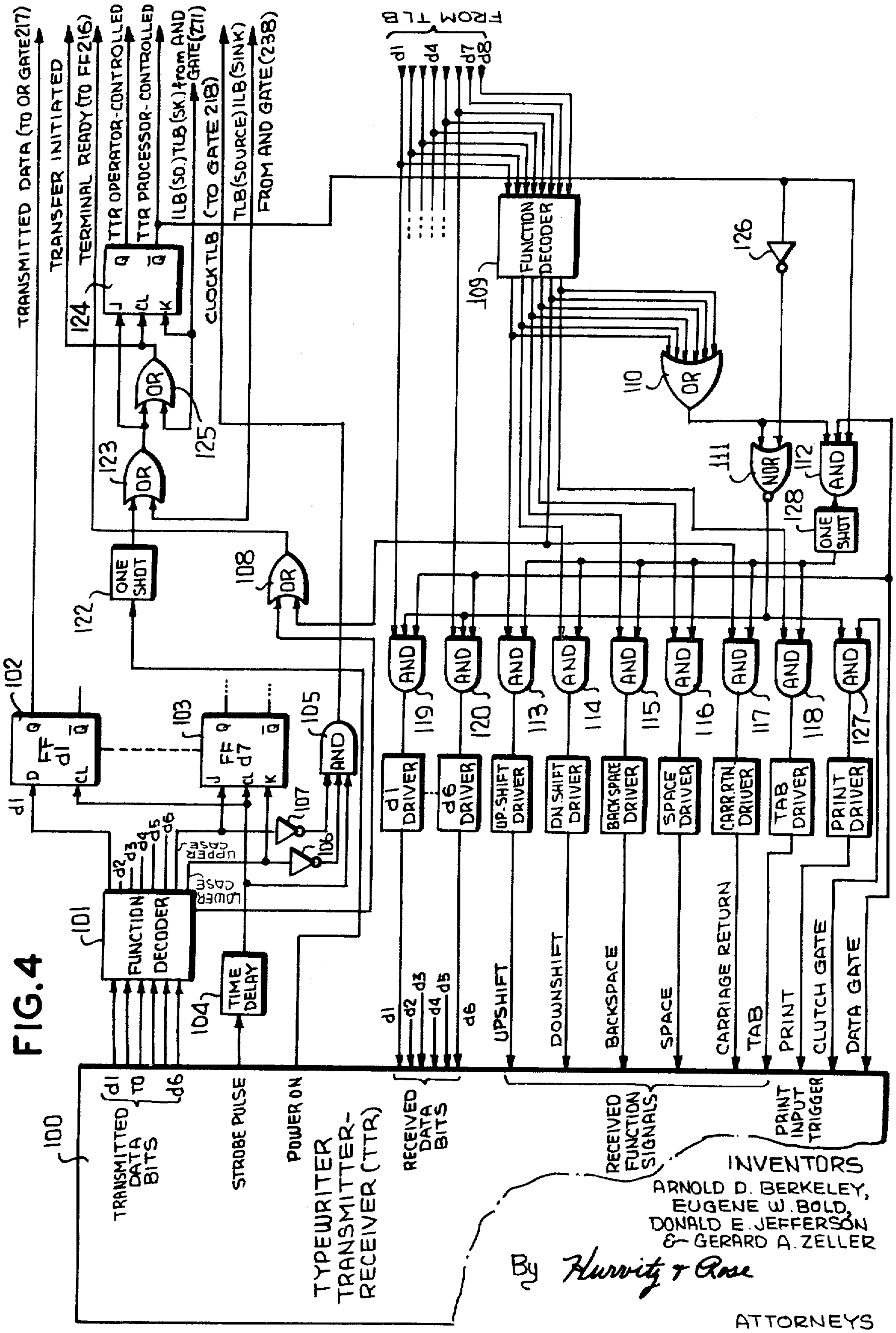
FIG. 4 is a schematic illustration of the control circuitry provided at a typical data terminal for the present invention.

Referring now to FIG. 4 of the accompanying drawings, there is illustrated in block diagrammatic form the typewriter transmitter-receiver (TTR) 100 and the logic circuitry provided at a typical terminal to render the typewriter transmitter-receiver compatible with the data processor. TTR 100 may be of the type supplied by the INVAC Corp., Waltham, Mass., as unit TTR Series 200. TTR 100, when in the transmitting mode, generates a six-bit data character and a strobe pulse for each key depression. The six data bits are in a selective code wherein each character and function generated at the keyboard is uniquely represented by bits d1 through d6 in accordance with Table I. Actually, an eight-bit code is presented in Table I, the additional two bits being provided in accordance with the considerations mentioned below. The six data bits are applied to a function decoder 101 which passes each of the six bits without alteration and additionally supplies binary one carriage return, upper case and lower case signals. Function decoder 101 comprises a plurality of logic circuits arranged to produce these signals whenever input bits d1 through d6 are in appropriate states. Each of bits d1 through d6 is passed through function decoder 101 and is applied to the data input terminal of a respective flip-flop. More particularly, only flip-flop 102, associated with bit d1, is illustrated in FIG. 4 in order to facilitate an understanding of the drawing and description to follow; however, it is to be understood that there are six such flip-flops 102, each receiving at its data input terminal a respective one of output bits d1 through d6 from the function decoder. Flip-flop 102 is of the clocked-data type. A seventh flip-flop of the clocked J-K type receives at its J and K input terminals the UPPER CASE and LOWER CASE signals, respectively, provided by function decoder 101. When bits d1 through d6 from TTR 100 indicate that a shift to upper case has been initiated at the TTR keyboard, flip-flop 103 provides a binary one signal at its Q output terminal; likewise, release of the up-shift lock at the TTR keyboard provides a lower case signal from function decoder 101 which in turn provides a binary zero Q signal from flip-flop 103.

A further data bit may be utilized, if desired, for purposes of parity checking. If so, appropriate logic is provided in decoder 101 to control the state of this eighth data bit. Rather than complicate the present description with conventional parity operation, it will be assumed herein that the eighth bit is always binary zero.

Flip-flops 102 and 103 and the flip-flops associated with the other data bits are all clocked by the strobe pulse after a delay by unit 104 on the order of 100 microseconds. Consequently, the Q output terminals of the data flip-flops 102, etc., and flip-flop 103, provide an eight bit modified selectric code uniquely representing each keyboard character and function. Only one such data output signal, namely that from the Q terminal of flip-flop 102, is illustrated in FIG. 4; this technique, namely illustrating only one of the eight bits comprising each character, is followed throughout the description hereinbelow for purposes of simplification. The data output from flip-flop 102 is applied to OR gate 217 in FIG. 5 as described subsequently.

The delayed strobe pulse from time delay unit 104 is also applied as an input signal to a three-input AND gate 105. Also supplied as input signals to AND gate 105 are the binary complements of the UPPER CASE and LOWER CASE signals provided by function decoder 101, the complements of these signals being obtained through respective logic inverters 107 and 106. AND GATE 105 provides an output signal upon reception of each delayed strobe pulse only when the keyboard actuation producing that strobe pulse was not an up-shift or a down-shift. In other words, since the strobe pulse accompanies any keyboard actuation at TTR 100, AND gate 105 provides an output signal upon depression of each character and function key depressed, with the exception of the upper case and lower case shifts. The resulting signal from AND gate 105 can thus be utilized to indicate that the eight-bit output signal from the terminal contains a data character or function character to be fed to the data processing circuitry. This signal is, in fact, fed as a clocking signal to Terminal Line Buffer 65 via OR gate 218 in FIG. 5.

The CARRIAGE RETURN signal provided by function decoder 101 is applied as an input signal to OR gate 108 and, when binary one, indicates that a typed line at TTR 100 has been completed. The output signal from OR gate 108, designated TERMINAL READY, is supplied to the data processor, more particularly to the set input terminal of DATA Ready flip-flop 216 in FIG. 5.

In addition to being capable of transmitting uniquely coded data and function characters, TTR 100 is also capable to receiving uniquely coded data and function character signals. Basically, the input data to TTR 100 falls into two primary classes: printed symbols and machine format function, all of which are derived from data bit signals d1 through d8 received from the Terminal Line Buffer 65 illustrated in FIG. 5. The eight received data bits are applied to a second function decoder 109 which comprises a plurality of logic gates arranged to provide a respective machine function signal whenever bits d1 through d8 represent a function to be effected by that signal. The various function bits illustrated in FIG. 4 are Upshift, Downshift, Backspace, Space, Carriage Return, and Tab. All of the six function signals are applied to a six-input OR gate 110, the output signal from which is applied to a two-input NOR gate 111 and a three-input AND gate 112. In addition, each of the function signals provided by function decoder 109 is applied as an input signal to a respective one of six two-input AND gates 113, 114, 115, 116, 117 and 118; the second input signal for these gates is the output pulse of a one-shot multivibrator 128 which is triggered by AND gate 112. Received bits d1 through d6 from TLB 65, excluding bits d7, which represents the upper and lower case nature of the character, and d6 which checks parity, are applied to respective ones of six three-input AND gates of which only AND gates 119 (associated with d1) and 120 (associated with d6) are illustrated.

Whenever the power is turned on at TTR 100 after having been off for a period of time, a POWER ON signal triggers one-shot multivibrator 122 which responds by providing an output pulse. This pulse is applied as an input signal to two-input OR gate 123, the other input signal to which is provided from AND gate 238 in FIG. 5. The latter signal is provided whenever instruction No. 26, requiring transfer of data from TLB 65 to ILB 66, is in force. The output signal from OR gate 123 is applied to input terminal J of clocked J-K flip-flop 124 and also as an input signal to two-input OR gate 125 which receives another input signal from AND gate 271 of FIG. 5. The latter signal is also applied to the K input terminal of flip-flop 124 and is present whenever instruction No. 27, calling for transfer of data from the Internal Line Buffer 66 to the Terminal Line Buffer 65, is in force. The output signal from OR gate 125 is applied to the clock input terminal of flip-flop 124 and also as a TRANSFER INITIATED SIGNAL to the reset terminal of data ready flip-flop 216 in FIG. 5. The state of flip-flop 124 indicates whether TTR 100 is controlled by the operator or by the data processor. More specifically, at "power-on," the output pulse from one-shot 122 is applied through OR gate 123 directly to the J input terminal of flip-flop 124, and through OR gates 123 and 125 to the clock input terminal of flip-flop 124. Consequently, this flip-flop switches to its binary one state wherein a binary one output signal is provided by its Q output terminal. Flip-flop 124 in this state signified that it is operator-controlled. It remains in this state until such time as the ILB(source) · TLB (sink) signal is received from AND gate 271, at which time the flip-flop receives an input signal at its input terminal K and is clocked by OR gate 125 to provide a binary one output signal at its $\bar{Q}$ output terminal. In this state, the flip-flop indicates that TTR 100 is controlled by the data processor. Should the TLB(source) · ILB(sink) signal be supplied by AND gate 238, a binary one signal is applied to the J input terminal via OR gate 123 and to the clock input terminal by OR gate 123 and 125 so that flip-flop 124 is returned to its state wherein the Q output terminal provides a binary one signal. Once again, in this state, the TTR 100 is indicated as being operator-controlled.

The $\bar{Q}$ signal from flip-flop 124 is applied as an input signal to AND gate 112 and to inverter 126, the output signal from which is applied to NOR gate 111. The output signal from NOR gate 111 provides an input signal to a two-input AND gate 127 and to each of AND gates (119, 120) associated with data bits d1 through d6.

When in the receiving mode, TTR 100 generates a DATA GATE signal which times the energization of selected data solenoids in the TTR to insure that the solenoids are operated during the correct interval of the print cycle. This DATA GATE is applied as an input signal to AND gate 112 and to each of the data AND gates 119, 120, etc. In addition, TTR 100 generates a clutch GATE signal which is a timing gate for energizing the print trigger solenoid in the TTR which releases the clutch on the typewriter cycle shaft to cause a print cycle to occur. This CLUTCH GATE signal is applied as an input signal to AND gate 127. The output signals from each of AND gates 113 through 120 and 127 ARE applied to respective driver circuits and then to respective data solenoids in the TTR.

An example of the operation of TTR 100 and its associated logic circuitry when in the receiving mode will best facilitate an understanding of the TTR when employed in conjunction with the data processing circuitry of the present invention. Assume bits d1 through d8 represent a data character rather than a function character, In such case, none of the six output signals from function decoder 109 are binary one and therefore AND gates 113 through 118 are inactive; likewise, there is no output signal from OR gate 110. If, and we assume that this is the case here, TTR 100 is processor-controlled so that input data may be received, there is a binary zero output signal from inverter 126 applied to NOR gate 111. Since both input signals to NOR gate 111 are binary zero, this gate applies a binary one signal to AND gate 127 as well as to the AND gates (119, 120) associated with the data bits d1 through d6. The DATA GATE signal provided by TTR 100, therefore, enables AND gates 119, 120, etc. If the signal received by any of these AND gates is in fact binary one, it is amplified by a respective driver d1 through d6. The states of the received bit signals at TTR 100 will thus be the same as the states of bit signals D1 through D6 received by the logic circuitry from TLB 65. When the CLUTCH GATE is provided by TTR 100, AND gate 127 is enabled, supplying a PRINT signal or trigger to TTR 100 which releases the clutch on the typewriter cycle shaft to cause a print cycle to occur. The character represented by the received data bits at the TTR is thus printed out in hard copy.

If instead of a data character a function character is received from TLB 65, function decoder 109 provides a binary one signal on the appropriate one of its six output lines. Assume, for example, that the function character is a backspace, in which case a binary one signal is applied to AND gate 115. In addition, OR gate 110 is enabled and provides an inhibiting signal to NOR gate 111. When a DATA GATE appears, it enables AND gate 112 which in turn triggers a pulse from one-shot multivibrator 128, this pulse being applied to AND gate 114 to energize the Backspace Driver. The AND gates 119, 120, etc., associated with the various data bits are not enabled at this time since no binary one signal is provided by NOR gate 111.

MASTER TIMING OPERATION

Figure 5B:
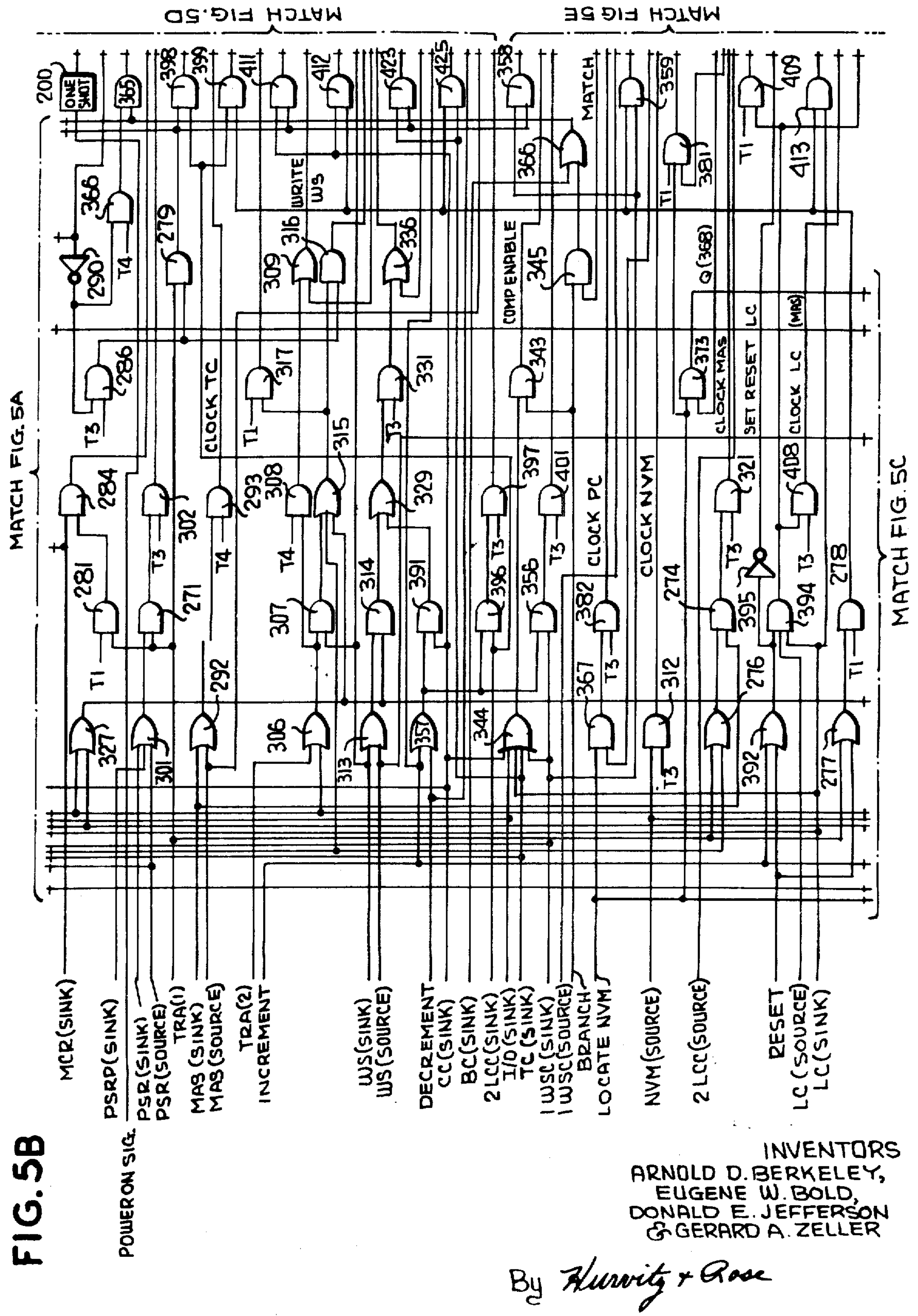
Figure 5C:
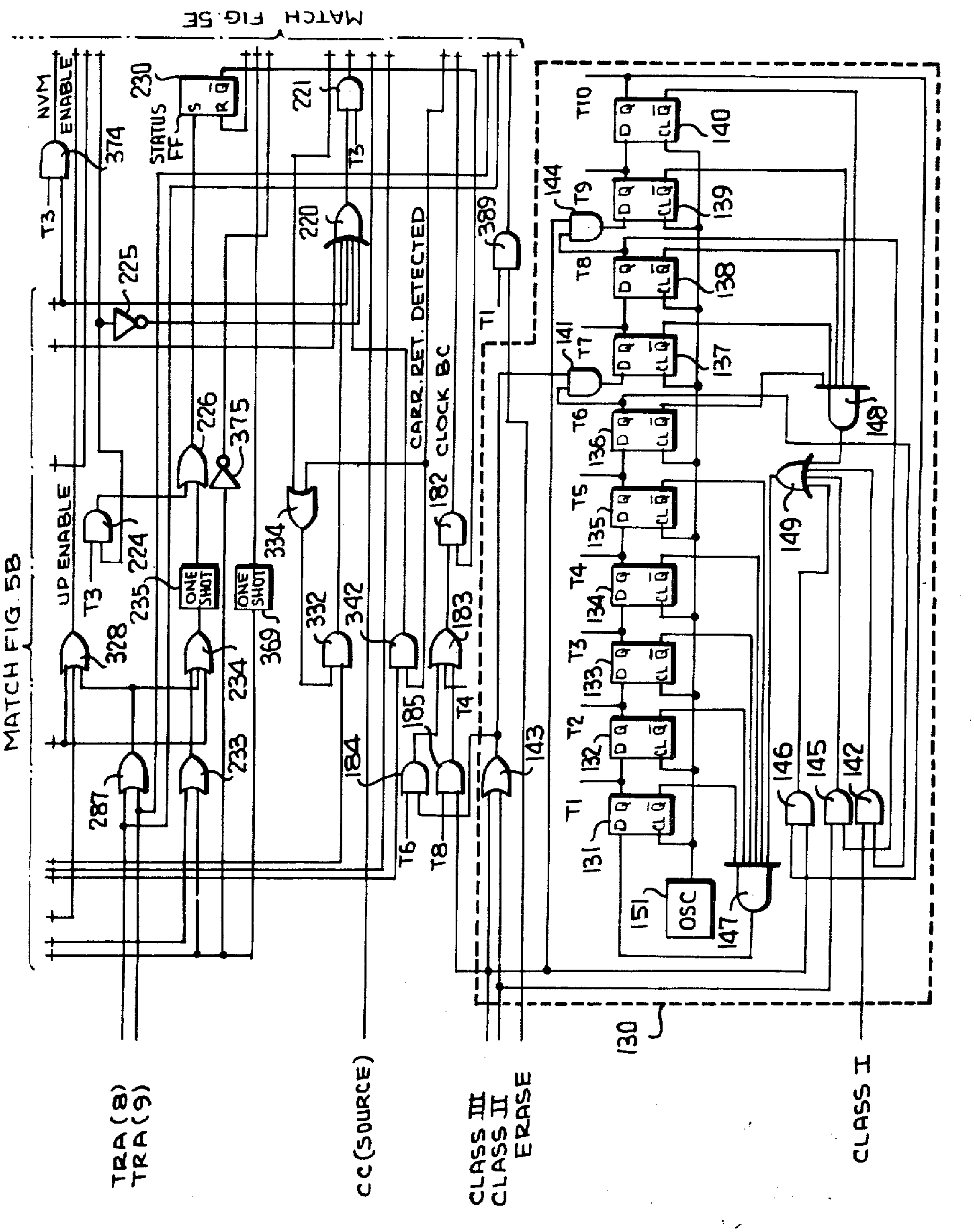

Referring now specifically to FIG. 5C of the accompanying drawings, there is illustrated in schematic form a preferred embodiment of the circuitry utilized in the system of the present invention. In order to perform the various logic functions to be described hereinbelow, a master clock circuit is required which generates appropriate timing signals in proper fashion. This master clock circuit comprises a variable length ring counter 130 comprising ten sequentially arranged flip-flops 131 through 140, respectively. Each of these flip-flops is a clocked-data-type flip-flop. The Q output signal from each of flip-flops 131 through 140 comprise respective timing signals T1 through T10 which are utilized in the processing circuitry in a manner described below. Signals T1 through T5 are also applied directly to the data input terminals of respective flip-flops 132 through 136. Signal T6 is applied as an input signal to each of two-input AND gates 141 and 142. AND gate 141 also receives an input signal from two-input OR gate 143, which provides an output signal whenever the CLASS III or the CLASS II output signals from operation code decoder 62 are binary one. The output signal from AND gate 141 is applied to the data input terminal at flip-flop 137 so that a binary one is applied to this terminal only when flip-flop 136 is binary one and either of the CLASS II or CLASS III signals is binary one.

Signal T7 is applied directly to the data input terminal of flip-flop 138. Signal T8 is applied as an input signal to each of two-input AND gates 144 and 145. AND gate 144 also receives the CLASS III signal. The output signal from AND gate 144 is applied to the data input terminal of flip-flop 139 so that a signal is applied to this terminal only when flip-flop 138 is binary one and a binary one CLASS III signal is present. Signal T9 is applied directly to the data input terminal of flip-flop 140 and signal T10 is applied as an input signal to a two-input AND gate 146.

The $\bar{Q}$ output signals from flip-flops 131 through 135 are applied as respective input signals to a six-input AND gate 147, and the $\bar{Q}$ output signals from flip-flops 136 through 140 are applied as input signals to a five-input AND gate 148. The output signal from AND gate 148 is applied as an input signal to four-input OR gate 149, which receives its three other input signals from the output terminals of respective AND gates 142, 145 and 146. The output signal from OR gate 149 provides the sixth input signal for the six-input AND gate 147. The second input signals to AND gates 142, 145 and 146 are the CLASS I, CLASS II AND CLASS III signals respectively.

A master oscillator circuit 151, including an appropriate shaping network to provide a train of output pulses, has its output signal pulses applied in parallel to the clock input terminals of each of flip-flops 131 through 140. The output signal from AND gate 147 is applied directly to the data input terminal of flip-flop 131.

In operation, it will be appreciated that the circuitry described above constitutes a cycling ring counter in which only one stage at any time is binary one. More specifically, assume, for example, that at turn-on, flip-flops 131 through 140 are all binary zero, so that each flip-flop provides a binary one $\bar{Q}$ signal. This enables AND gate 148, OR gate 149, and AND gate 147 to cause the next clock pulse from oscillator 151 to enter a binary one in the first stage 131 of the ring counter. Stage 131 now has binary zero at its $\bar{Q}$ output terminal so that AND gate 147 is inhibited. Thus, the only data input terminal of the ring counter receiving a binary one signal at this time is the one at flip-flop 132. Consequently, with the next clock pulse, flip-flop 132 changes to binary one and flip-flop 131 changes to binary zero, the remaining flip-flops remain binary zero. In like manner, the next four pulses from oscillator circuit 151 cause respective flip-flops 133, 134, 135 and 136 to switch to binary one for a period determined by the clock pulse signal frequency. If the operation code decoder 62 provides a binary one CLASS I signal, the latter is applied to AND gate 142 so that this gate is enabled by the T6 pulse from flip-flop 136. This enables both OR gate 149 and AND gate 147 since the latter receives a binary one $\bar{Q}$ signal from each of stages 131 through 135. It is seen that the data input terminal in stage 131 receives a binary one signal so that at the next clock pulse, the seventh in the presently described sequence, stage 131 switches to binary one and of course stage 136 returns to binary zero. This sequence continues for every six clock pulses as long as a binary one CLASS I signal is applied at AND gate 142.

Let us now assume that Operation Code Decoder 62 applied a binary one CLASS II signal to AND gate 145. The sequential switching of flip-flops 131 through 136 proceeds as described above for a CLASS I instruction. However, at T6 AND gate 141 is enabled by the T6 pulse along with the binary one signal from OR gate 143, the latter being enabled by the binary one CLASS II signal. Consequently, the seventh clock pulse in this sequence switches flip-flop 137 to binary one. The eighth clock pulse switches flip-flop 138 to binary one to apply the second required input to AND gate 145 to enable the latter and in turn enable OR gate 149 and AND gate 147 so that a binary one signal is applied to the data input terminal of flip-flop 131. The next clock pulse therefore switches flip-flop 131 to binary one and returns flip-flop 138 to binary zero. In this manner, as along as a binary one CLASS II signal is provided by Operation Code Decoder 62, ring counter 130 operates on an eight-pulse cycle, utilizing stages 131 through 138, respectively.

If now we assume a binary one CLASS III signal to be provided by Operation Code Decoder 62, AND gates 144 and 146 are primed. AND gate 141, of course, is primed by the binary one signal from OR gate 143. The sequence under these conditions proceeds as described above for the first eight stages of the ring counter; however, at the ninth pulse from oscillator 151, AND gate 145 is no longer enabled, but instead flip-flop 139 is switched to binary one by AND gate 144. The next pulse switches flip-flop 140 to binary one and applies signal T10 to AND gate 146. This enables OR gate 149 and AND gate 147 to apply a binary one signal to the data input terminal of flip-flop 131. Consequently, the eleventh clock pulse switches the first flip-flop stage 131 to binary one. In this manner, a ten-pulse cycle is provided for ring counter 130 whenever a CLASS III type instruction is in force.

INSTRUCTION SEQUENCING

Figure 5D:
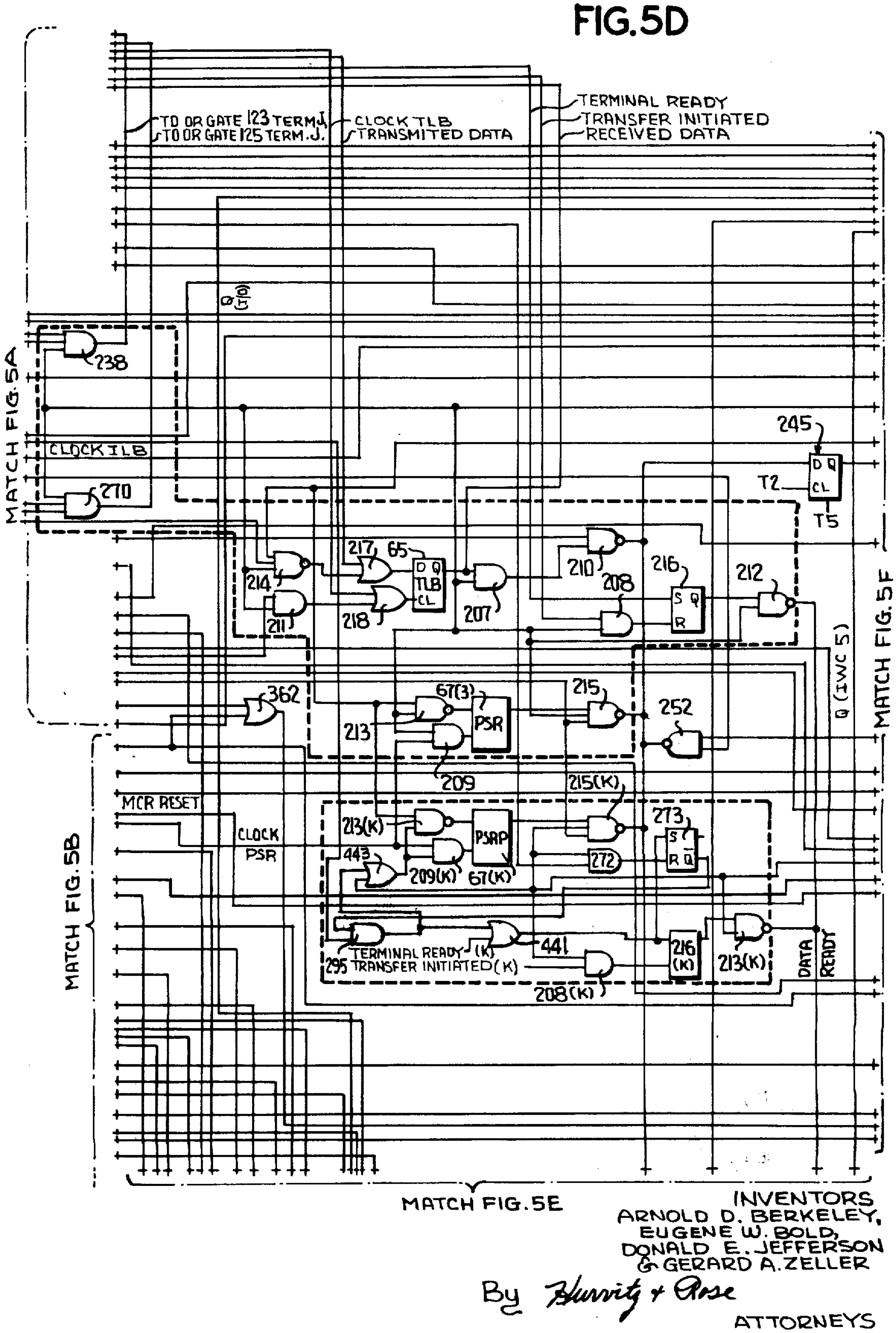
Figure 5E:
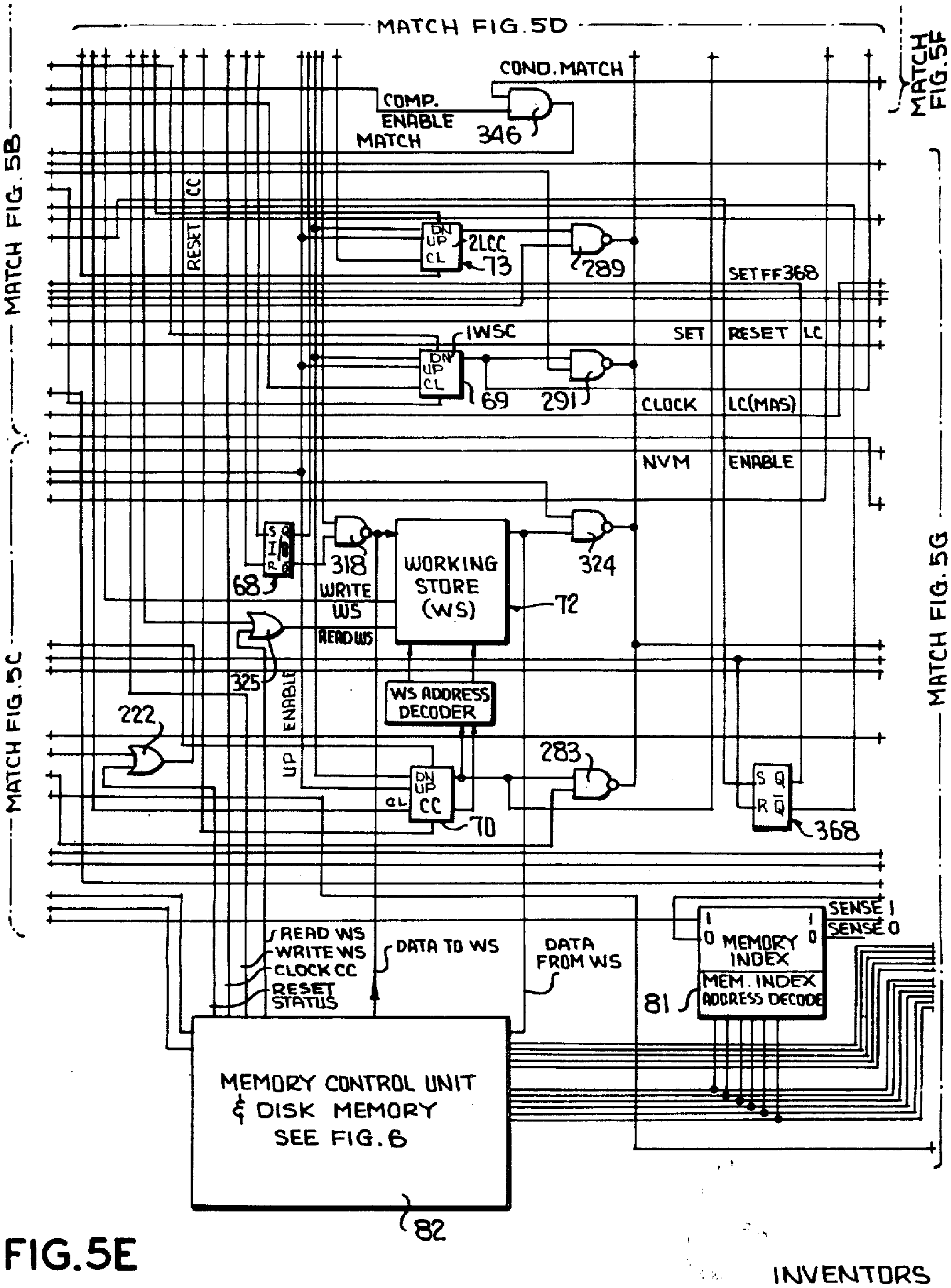
Figure 5F:
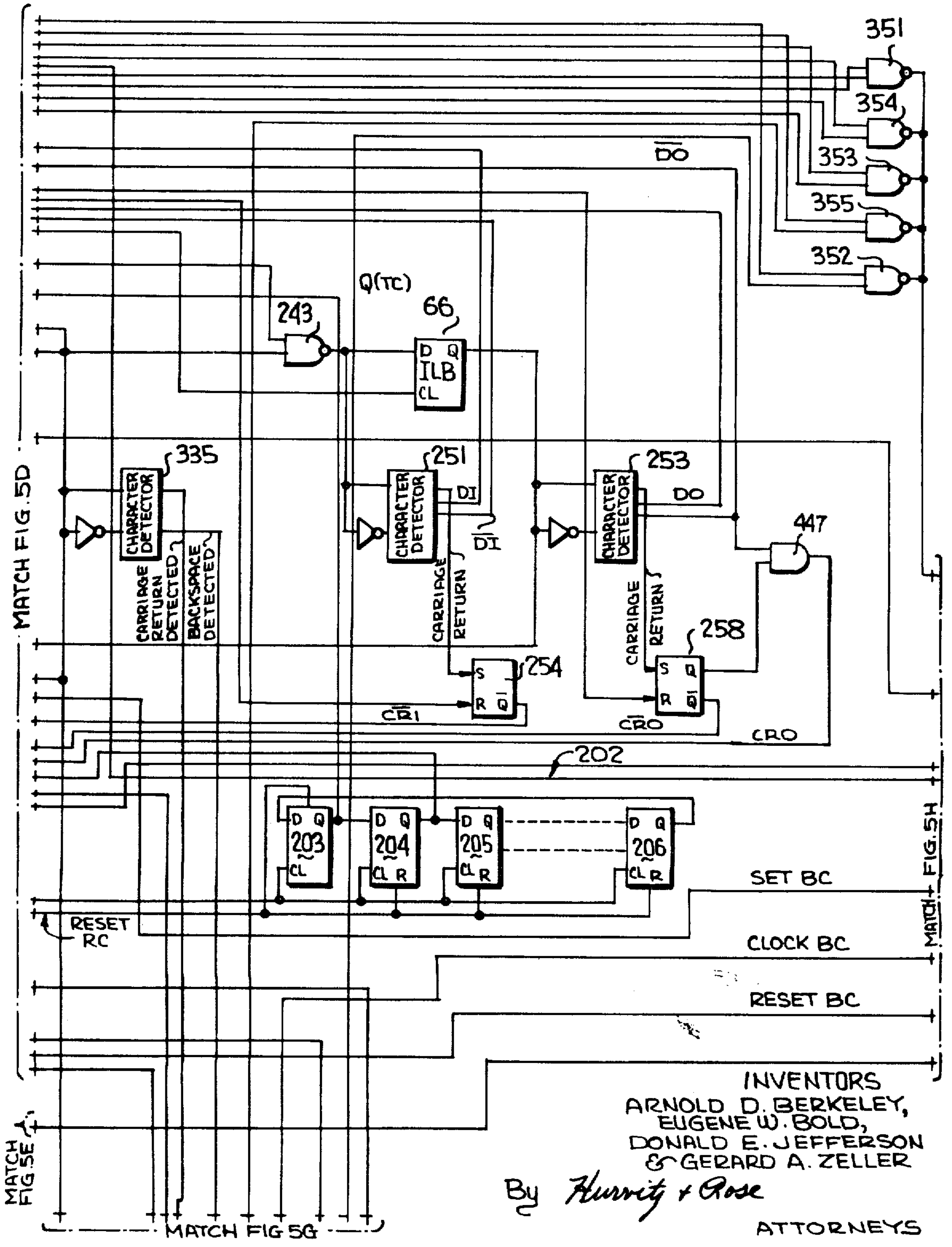
Figure 5G:
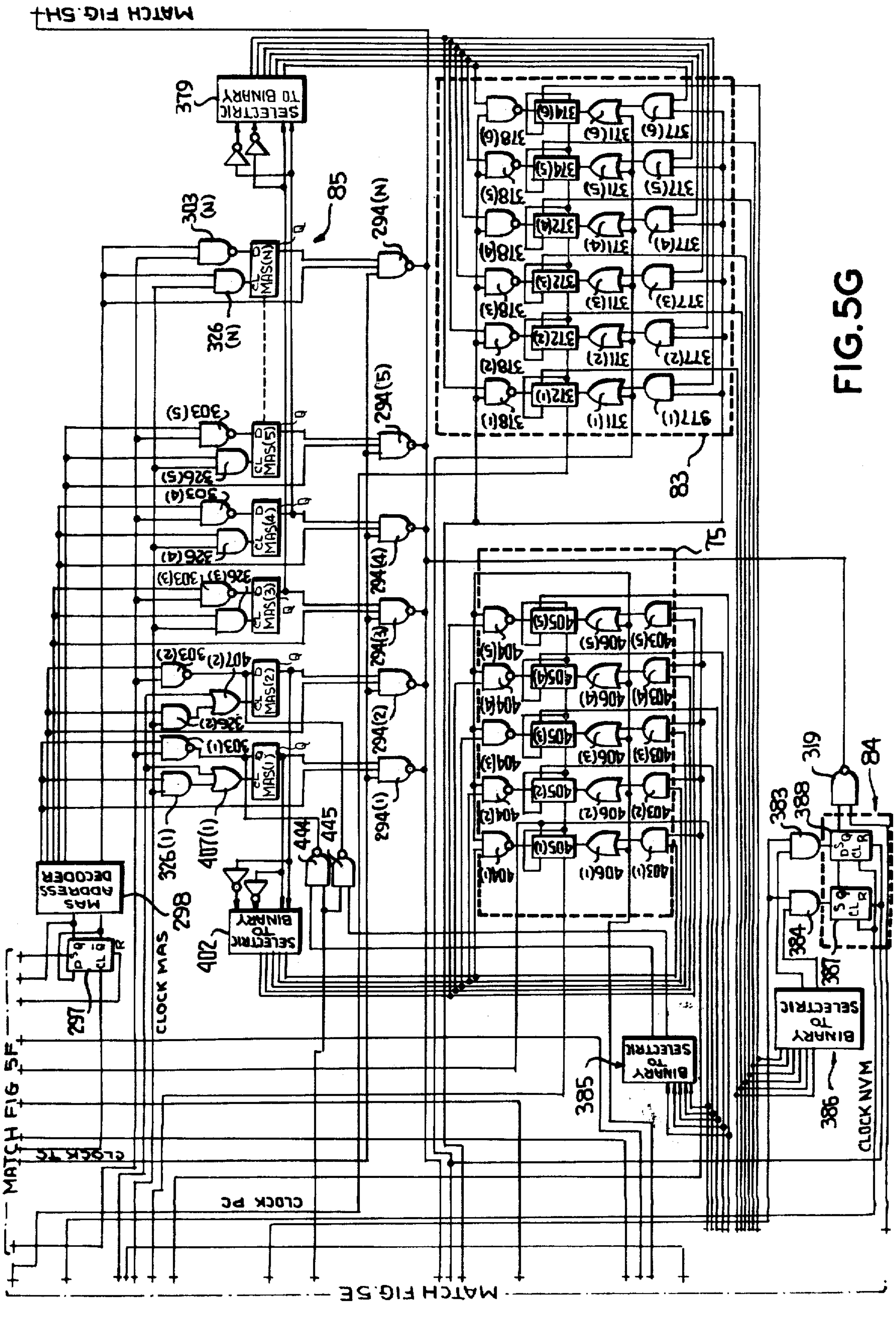
Figure 5H:
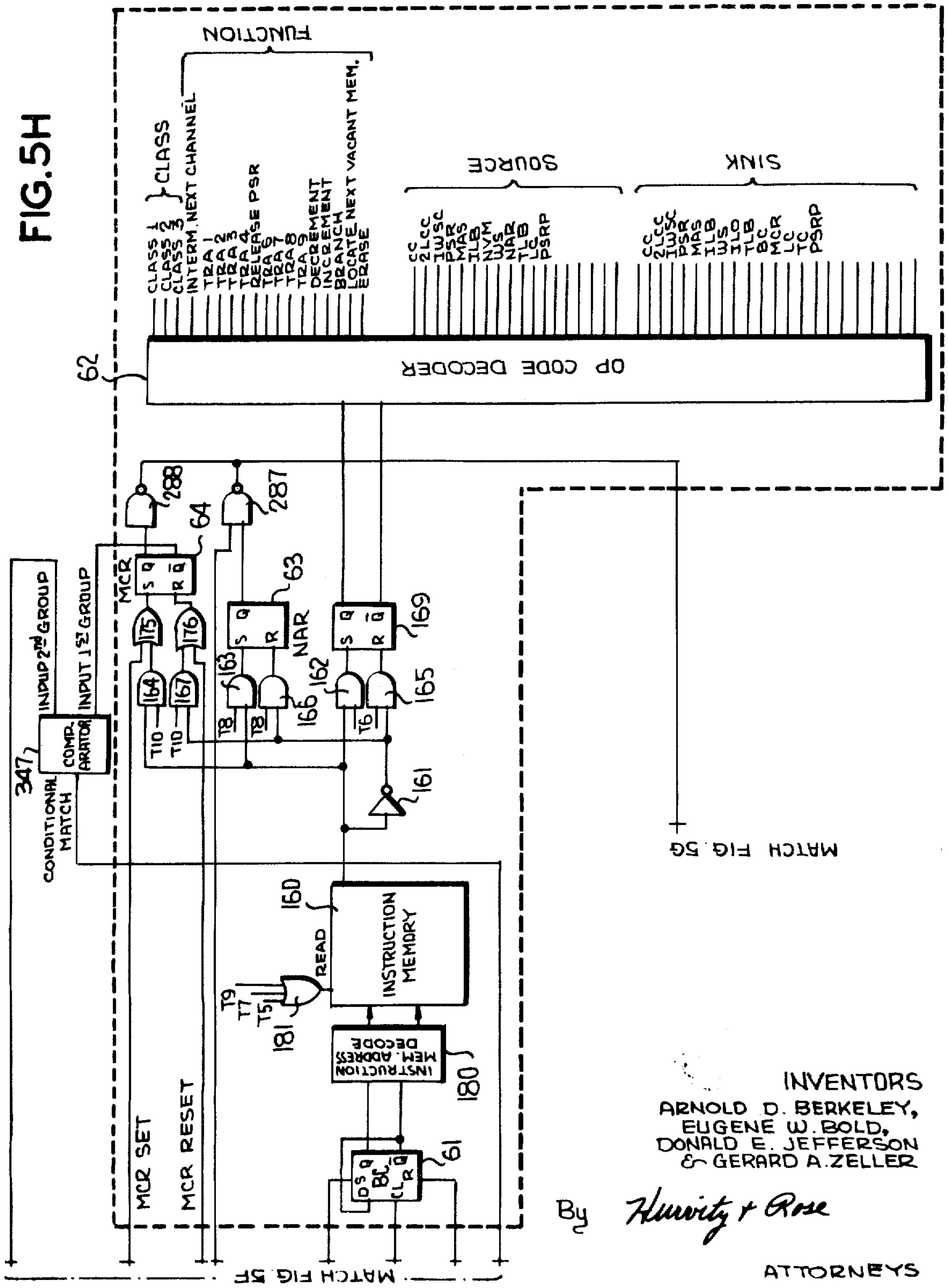

Referring now to FIG. 5H of the accompanying drawings, there is illustrated an instruction memory unit 160 in which a program or programs of instructions are stored in a predetermined sequence. Instruction memory 160 may be a core, for example, and of necessity is character-addressable so that selected instructions or portions of instructions may be read-out as desired. More particularly, the instructions are either 16, 32, or 48 bits in length, depending upon whether the instructions are of the CLASS I, II, or III type respectively. While there are sixteen data output bits provided by instruction memory 160, only the connections and circuitry associated with one such output bit is illustrated in the drawings and described in detail herein in order to simplify the explanation of the present invention; it is to be understood, however, that the circuitry illustrated and described below for output bit one is repeated for each of the 16 bits.

The data output signals are actually provided from a storage register comprising part of unit 160 so that a READ signal applied to the unit puts the addressed word in the storage register. It remains there until a newly addressed instruction is read from unit 160. Data output bit number one is connected to logic inverter 161 and to each of three two-input AND gates 162, 163 and 164, respectively. The output signal from inverter 161 is an input signal for each of three further two-input AND gates 165, 166 and 167, respectively. The other input signal to each of AND gates 162 and 165 is the T6 pulse from ring counter 130; thus at T6, the addressed 16-bit instruction word is transferred from the data register comprising part of instruction memory unit 160 into the operation code store register 169. The latter comprises 16set-reset type flip-flops, one each operatively associated with a respective instruction word bit. AND gates 162 and 165, of which there are also 16 each, have their output terminals connected to the set and reset input terminals respectively of their associated flip-flops represented by flip-flop 169. If a bit is the operative instruction word is binary one, it is gated through its AND gate 162 to the set input terminal of the flip-flop 169, if the bit is a binary zero, it is inverted to binary one via its inverter element 161 and applied via its AND gate 165 to the reset input terminal of its flip-flop 169. Thus, operation code store unit 169 receives each 16-bit word gated from instruction memory 160 at time T6. The Q and $\bar{Q}$ signals from each flip-flop in the operation code store unit 169 are applied to the operation code decoder 62 which converts the various instruction word bits to appropriate operational signals.

The second input signal for each of AND gates 163 and 166 is the T8 pulse from ring counter 130. Thus, at each T8 pulse, each data bit in the output register of the instruction memory unit, if a binary one, enables AND GATE 163, and, if binary zero, enables AND gate 166. AND gates 163 and 166 each represent 16 such AND gates, one for each instruction word bit. The output signal from AND gate 163 is applied to the set input terminal of the Next Address Register 63, represented as a single flip-flop in the drawings. The output signal from AND gate 166 is applied to the reset input terminal of the Next Address Register. Thus, at each T8 pulse, the instruction word bit in the output register of unit 160 is transferred to Next Address Register 63.

The second input signal to AND gates 164 and 167 is signal T10 from the ring counter 130. Each time a T10 pulse occurs, the 16-bit word in the instruction memory storage register is fed via AND gates 164 and 167 to Match Character Register 64, represented in the drawing by single flip-flop but being understood, of course, to represent 16 flip-flops which receive respective ones of the sixteen bits in the operative instruction memory word. The output signal from each of the 16 AND gates represented by AND gate 164 is fed to the set input terminal of a respective MCR flip-flop via a respective two-input OR gate 175, and the output signal from each of the 16 AND gates represented by gate 167 is fed into the reset input terminal of a respective MCR flip-flop via a respective two-input OR gate 176. It is clear that, depending upon the state of each bit in the instruction word, the respective MCR flip-flop will be either set or reset at T10 in order that the MCR can contain the proper match character for comparison purposes.

The various instructions stored in instruction memory unit 160 have respective addresses. Actually, each 16-bit word, whether comprising a CLASS I instruction or part of a CLASS II or CLASS III instruction, has its own address which is different from the address of any other 16-bit word stored in the instruction memory. Each 16-bit word can be selectively addressed by Binary Counter 61 which, of course, is capable of being reset, preset and incremented. Only one BC flip-flop is illustrated in the drawing to facilitate description. The various flip-flops comprising binary counter 61 are interconnected to permit the counter to be incremented each time a clock pulse is applied to the first counter stage. The Q and $\bar{Q}$ signals from each Binary Counter stage are connected to an instruction memory address decoder 180 which converts the count in Binary Counter 61 to a corresponding address in instruction memory unit 160 and thereby addresses an appropriate 16-bit word in that unit.

A READ signal applied to Instruction Memory 160 is received from OR gate 181 which receives three input signals, namely T5, T7 and T9, from ring counter 130. Whenever a binary one READ signal from OR gate 181 is received by instruction memory, the instruction word appearing at the address designated by Binary Counter 61 and instruction memory address decoder 180 is read into the output register of instruction memory 160. This permits the next T6, T8 or T10 pulse to gate this instruction word into the appropriate register as described above.

Where a series of CLASS I type instructions are stored in sequence in the instruction memory, these instructions are sequentially addressed by Binary Counter 61 by means of the CLOCK BC signal applied to the clock input terminal of the first stage of the counter. The CLOCK BC signal is received from AND gate 182 (in FIG. 5C), a two-input AND gate receiving the $\bar{Q}$ signal from Status flip-flop 230 and the output signal from OR gate 183. OR gate 183 has three input signals applied thereto, namely T4 from ring counter 130, and the output signals from each of two-input AND gates 184 and 185. AND gate 184 receives pulse T6 ring counter 130 and either the CLASS II or CLASS III signal from OR gate 143; AND gate 185 receives the T8 signal and the CLASS III signal as its two inputs. The binary one $\bar{Q}$ signal from Status flip-flop 230 is generated under the conditions described hereinbelow; for present purposes, it is sufficient to state that this signal is binary one only after the functions required of the presently effective instruction have been completed. Assuming that such is the case, it is seen that at T4 Binary Counter 61 is incremented so that the next instruction in sequence is addressed by the Binary Counter. Assuming a CLASS I instruction, AND gate 184 is inhibited at T6 so that Binary Counter 61 is not incremented and ring counter 130 recycles.

If we now assume a CLASS II instruction to be operative, Binary Counter 61 is again incremented at T4; in addition, however, at T6 AND gate 184 is enabled and, via OR gate 183, enables AND gate 182 to increment Binary Counter 61. The next sequential 16-bit word in instruction memory 160 is a next address number which, at time T8, is gated into Next Address Register 63. Also at T8, since we do not have a CLASS III instruction, AND gate 185 is not enabled and consequently Binary Counter 61 is not incremented and ring counter 130 recycles. Thus, ring counter 130 executes an eight-pulse sequence for this CLASS II type of instruction.

If we now assume a CLASS III type instruction, which, as described above, includes an operation code portion, a next address number portion, and a match character portion, we see that at T6 Binary Counter 61 is incremented so that it now addresses the next address number portion of the instruction. At T8, this next address portion is transferred into Next Address Register 63 and also at T8 Binary Counter 61 is once again incremented via AND gate 185, OR gate 183 and AND gate 182. The incremented binary counter now addresses the match character portion of the instruction which is then gated into Match Character Register 64 at T10.

The variable length ring counter 130 thus cooperates with the CLASS I, CLASS II, or CLASS III signal provided with each instruction and each instruction portion to permit instructions of variable length to be consecutively stored in Instruction Memory 160 without any waste of instruction memory capacity. The CLASS I, CLASS II and CLASS III signals determine for the logic circuitry whether or not a next address portion or match character portion is associated with each instruction, and also signify that these portions of the instructions, when addressed, are to be treated differently than the other portions of the instructions.

Binary Counter 61 may also be preset to some number present in Next Address Register 63 under the command of particular instructions provided by the instruction memory unit 160. The manner in which this is accomplished will be understood more readily from the detailed description which follows; however, suffice it to say at this point that Binary Counter 61 can be set to any desired number rather than incremented so that an effective program jump is accomplished when called for. The setting and resetting of the binary counter stages is accomplished at the respective set and reset input terminals of each binary counter flip-flop, the setting and resetting being parallel by bit.

STATUS FLIP-FLOP OPERATION

Status flip-flop 230 provides the system with the capability of utilizing a particular instruction for a plurality of cycles of ring counter 130. More specifically, under certain logic conditions to be described below, the Status flip-flop is set by OR gate 226 so that the $\bar{Q}$ output terminal of the Status flip-flop 230 provides a binary zero signal. As long as the $\bar{Q}$ signal is binary zero, AND gate 182 is inhibited so that a T4 pulse, applied to AND gate 182 via OR gate 183, cannot provide a binary one CLOCK BC signal. Consequently, Binary Counter 61 remains at the number to which it had previously been set, and the presently addressed instruction in instruction memory 160 remains in force for another cycle of ring counter 130. The conditions under which OR gate 226 sets Status flip-flop 230 are as follows:

1. the TRANSFER(8) or TRANSFER(9) function signal is applied via OR gate 287 to OR gate 234 to enable one-shot multivibrator 235; the latter applies a binary one to OR gate 226 which sets the Status flip-flop; or 2. either the TRANSFER(4) function signal or the LOCATE NVM function signal is applied via OR gate 233 to OR gate 234 and in turn to one-shot multivibrator 235 and OR gate 226; or 3. OR gate 226 receives an input signal from AND gate 224 at time T3 if Data Ready flip-flop 216 (FIG. 5D) is reset; this condition permits the INTERROGATE NEXT CHANNEL instruction to remain in force until the multiplexer detects a terminal having a set data ready flip-flop; or 4. the TRANSFER(6) or TRANSFER(7) function signals are applied to OR gate 327 (FIG. 5B), and in turn to OR gate 234, to actuate one-shot multivibrator 235 and OR gate 226.

CHANNEL INTERROGATION OPERATION

Before describing the effects of the various instructions on the data processing circuitry, a description of the operation of the multiplexer operation is appropriate. In FIG. 5F, ring counter 202 includes N-stages, one each for each multiplexer channel and for each terminal being serviced by the system. Ring counter 202 is illustrated as having four stages 203, 204, 205 and 206, each comprising a clocked-data type flip-flop; it is to be understood, however, that four such flip-flops are illustrated by way of example only, the number of terminals being serviced being theoretically unlimited.

Each of the ring counter stages has its Q output signal connected to a logic circuit associated with a respective one of the terminals. More specifically, stage 203 is illustrated as having its Q output signal connected to a group of logic gates in FIG. 5D associated with a particular terminal designated as J. The logic circuitry for only one such terminal is illustrated and described herein; however, the same logic circuitry is repeated for each terminal, each set of logic circuitry receiving a respective different one of the Q output signals from ring counter 202. In addition, one of the terminals which is capable of a special print-out mode, has additional logic circuitry associated therewith. It is assumed that terminal K is that special terminal and only the circuitry of terminal K which is needed for the special print-out logic is illustrated in FIG. 5 D.

The power-on signal for the processor, when energized after having been off for a period of time, actuates one-shot multivibrator 200 (FIG. 5B) which in turn provides a binary one pulse designated as the RESET RC signal. This signal is applied to the set input terminal of stage 203 and to the reset input terminal of stages 204, 205 and 206 of ring counter 202. Thus, when the power is turned on at the processor, stage 203 is set to binary one and the remaining stages are reset to binary zero. In addition, the Q output signal from each stage in the ring counter is connected to the data input terminal of each succeeding stage in the counter. Further, each of the clock input terminals receives a common clock signal so that all are clocked simultaneously.

It must be stressed that only one stage in the ring counter is binary one at any time. Moreover, this indicates that the logic circuitry associated with each terminal is actuated in sequence according to the sequence of respective stages in the ring counter. As is described in more detail below, unless the logic circuitry associated with a given terminal does in fact receive a Q output signal from its associated ring counter stage, that logic circuitry acts to inhibit processing of data to and from its terminal. It may be appreciated therefore that it is the operation of this ring counter which permits the system to service more than one terminal on a multiplex basis.

Figure 7:
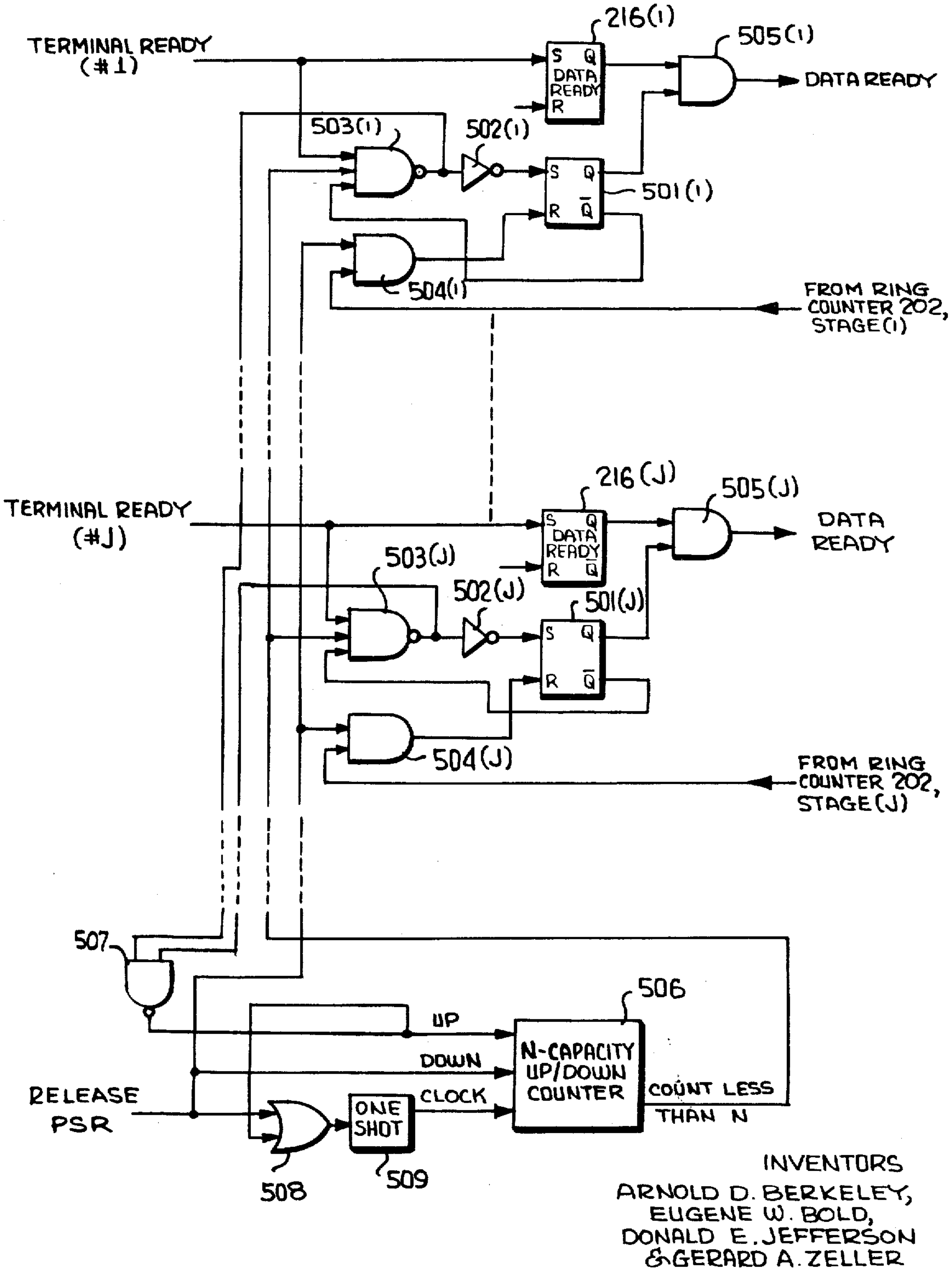
FIG. 7 is a schematic illustration of an alternative multiplexer circuit which may be employed in place of the multiplexer circuit illustrated in FIG. 5.

It is an important feature of the present invention that, whereas there is one ring counter stage fixedly associated with each terminal, this of itself is not a limiting characteristic of the invention. More specifically, it is possible within the scope of the present invention to service M-terminals, only N of which are processed at any time, M being greater than N. This embodiment is described in greater detail in relation to FIG. 7 below.

Also to be mentioned before going into a description of the operation of the system in response to the various instructions, is the fact that if data from a given terminal, for example J, is continuously fed to Terminal Line Buffer 65 associated with that terminal, and terminal J is in its transmit mode, shifting of characters into Terminal Line Buffer 65 proceeds irrespective of the instruction sequence controlling the processing circuitry. More particularly, the eight transmitted data bits supplied by flip-flop 102, etc., in FIG. 4, are applied to respective OR gates 217, eight of which are provided for each terminal. The output of each OR gate 217 is applied to a data input terminal of TLB 65 for terminal J. The Terminal Line Buffer is in reality eight multistage shift registers, each register being assigned a respective bit in the eight-bit character, so that data is applied to the Terminal Line Buffer parallel-by-bit and serially-by-character. Each character transmitted by TTR 100 at terminal J is accompanied by a clock TLB signal from AND gate 105 in FIG. 4. This signal is applied to OR gate 218 and in turn to the clock input terminal of every flip-flop in Terminal Line Buffer 65. In addition, whenever a carriage return character is detected by function decoder 101 in FIG. 4, a binary one TERMINAL READY signal is applied by OR gate 108 to the set input terminal of Data Ready flip-flop 216. Further, whenever a transfer of data to or from TLB 65 of terminal J from or to ILB 66 is initiated (in accordance with the procedure described in greater detail below) the TRANSFER INITIATED signal from OR gate 125 at terminal J becomes binary one and is applied as an input signal to a two-input AND gate 208. AND gate 208, which also receives the Q output signal from ring counter stage 203, has its output signal applied to the reset input terminal of Data Ready flip-flop 216. Thus, the Data Ready flip-flop, when in the set condition, indicates that terminal J is ready to either have its Terminal Line Buffer contents transferred to Internal Line Buffer 66 (in the transmit mode of terminal J) or to receive a line of text from the processing circuitry (in the receiving mode of terminal J). This feature is described in greater detail below.

The logic circuitry illustrated only for terminal J but repeated for each of the terminals in a working system includes the following: Prior State Register (PSR) 67 (J) (which though illustrated as a single flip-flop actually comprises N-shift registers, one for each bit, each register being M stages long, the corresponding stages of each register representing an N-bit character); Terminal Line Buffer (TLB) 65; two OR gates 217 and 218, where OR gate 217 actually represents eight OR gates, one for each of the shift registers comprising the Terminal Line Buffer; two-input AND gates 207, 208, 209 and 211; two-input NAND gates 210, 212 and 213; three-input NAND gates 214 and 215; three-input AND gates 238 and 270, and Data Ready flip-flop 216. Gates 207, 210 and 213 each represent eight gates.

The Q output signal from ring counter stage 203 is employed as a priming signal for each of AND gates 207, 208, 209, 211, 212, 238 and 270 and is also applied to each of NAND gates 213, 214 and 215.

INTERROGATE NEXT CHANNEL FUNCTION OPERATION

The first instruction to be described in detail is instruction No. 1 of Table II namely, the INTERROGATE NEXT CHANNEL instruction. This instruction, when read from the instruction memory, provides a binary one INTERROGATE NEXT CHANNEL function signal from Operation Code Decoder 62. This function signal primes AND gate 201 (FIG. 5A) which also receives the T1 pulse from ring counter 130 and applies its output signal to the clock input terminal of each of the stages of ring counter 202. Instruction No. 1 also provides a binary one CLASS I signal which assures a six-pulse timing cycle at ring counter 130. Let us assume for present purposes that at the time the !INTERROGATE NEXT CHANNEL function signal becomes binary one, ring counter stage 206 is in its binary one state with the remaining ring counter stages at binary zero. Of course, it will be understood that during the course of operation of the system, the status of ring counter 202, upon the enabling of AND gate 201, may be such that a binary one can appear in any one of the ring counter stages depending upon which terminal was most recently serviced. Assuming a binary one state in stage 206, at T1 AND gate 201 is enabled and each of the stages in ring counter 202 is clocked. Since only stage 206 has a binary one output signal, only stage 203, which receives a binary one Q signal from stage 206, is switched to binary one at this time. The binary one Q signal from stage 203 is applied to NAND gate 212 which also receives the Q signal from the Data Ready flip-flop 216 for terminal J. If terminal J is not ready to either transmit or receive data. Data Ready flip-flop 216 is binary zero and provides a binary zero Q output signal to keep NAND gate 212 enabled. When NAND gate 212 is enabled it applies a binary one signal to two-input AND gate 224 (FIG. 5B), the latter receiving as its second input signal the T3 pulse from ring counter 130.

At T2 nothing of significance, relative to instruction No. 1, occurs.

At T3 AND gate 224 is enabled and thereby enables OR gate 226 to provide the SET STATUS signal which sets Status flip-flop 230. This keeps instruction No. 1 in force for another six-pulse cycle of ring counter 130.

Nothing of significance is accomplished for this instruction at T5 and T6. With the next T1 pulse, AND gate 201 once again clocks ring counter 202 so that stage 204 becomes binary one, the other stages remaining binary zero. Assuming that the terminal for stage 204 is also not ready either to transmit or receive data, the six pulse cycle repeats as described above and the next time around the ring counter will be clocked so that stage 205 achieves a binary one state. Assume that the ring counter continues to cycle this way, with no terminal being ready to transmit or receive data, until stage 203 is once again binary one. At this time, let us assume that Data Ready flip-flop 216 is set, indicating that terminal J is ready to either transmit or receive data. NAND gate 212 is now disabled to provide a binary zero DATA READY signal which is inverted by inverter 225 (FIG. 5C) to apply a binary one signal to OR gate 220 to in turn prime AND gate 221. At T3 AND gate 224 cannot be actuated; however, AND gate 221 receives both the binary one DATA READY signal from OR gate 220 and the T3 pulse and is thus enabled to thereby enable OR gate 222 (FIG. 5E) to reset the status flip-flop 230. This permits Binary Counter 61 to be incremented and address the next instruction in the program being performed.

In summary then the INTERROGATE NEXT CHANNEL instruction causes the multiplexer to scan the various terminals until it finds a terminal which is ready to either transmit or receive data. At that time, scanning is suspended and processing of data for that terminal is initiated. Scanning cannot begin again until such time as the INTERROGATE NEXT CHANNEL instruction is reapplied to the system, and in accordance with the principles of the present invention, this instruction is not in fact reapplied until an entire line of data is processed.

PARTY LINE MEMORY UNIT

FIG. 5D includes a party line memory (PLM) unit 245 which serves as a temporary storage element during many of the transfer operations in which data is transferred from one unit to another. There must be as many PLM flip-flops as there are bits of data in the largest data word transferred from one unit to another in parallel-by-bit fashion via PLM 245. Each flip-flop in the party line memory unit is of the clocked-data type. The connections to the data input terminal of each PLM flip-flop comprise the parallel-connected output terminals of a plurality of NAND gates to be described in detail below. For example, if the flip-flop illustrated for PLM unit 245 is the first bit of the PLM unit, its data input terminal is connected to the output terminals of a plurality of NAND gates each serving as a source gate for the first data bit in a respective register or counter from which data is to be transferred. These NAND gates are all normally maintained in their enabled condition whereby they provide a binary one output signal, so that a binary one output signal is applied to the data input terminal of the flip-flop 245. If any one of the NAND gates is turned off the parallel output connections are such that the input line to the data terminal of flip-flop 245 goes to binary zero. In accordance with the logic to be described below, only one such NAND gate will be inhibited at any time, and that will only occur when a particular bit, for example, the first bit of the register acting as a source in a given transfer, is binary one. This logic scheme is known as wire-OR logic and is described in detail in Raytheon Bulletin SP-230D, page 21. Because of the use of the NAND logic, when PLM 245 is clocked, it receives the logic complement of the state of the bit in the source register or counter. This inversion is repeated by providing NAND logic at the Q output terminal of PLM flip-flop 245. More particularly, output terminal Q has its output signal applied in parallel to each of a plurality of NAND gates, one gate for each corresponding bit in a respective sink register or counter. These latter NAND gates are also normally maintained enabled so that their output signals are binary one. Only when the PLM flip-flop is in a binary zero state will the NAND gate of the selected sink unit be turned off and thereby apply a binary zero signal to a respective bit in the sink register or counter.

All PLM flip-flop are always clocked by the T2 pulse provided by the ring counter 130 and are always reset by the T5 pulse from that ring counter.

TRANSFER(1) 1) FUNCTION OPERATION

A binary one TRANSFER(1) function signal is provided by Operation Code Decoder 62 in response to instructions Nos. 2–8, 20–22, 24, 25, 32 37–39, 51 and 52 in Table II. This function signal primes the following two-input AND gates: 271; 274, via OR gate 276; 278, via OR gate 277; 279; and 281. As indicated in Table III, the TRANSFER(1) function signal unconditionally initiates a single character transfer from a source unit to a sink unit, where neither the source nor sink unit is Working Store 72. In general, the sequence by which this is accomplished is as follows: at time T1, the sink unit is reset, except when the sink unit is MAS 85, PSR 67 or PSRP 67 (K). At T2, Party Line Memory unit 245 is clocked, transferring thereto the logic complement of the character at the source unit output terminals. At T3, the sink unit is set or reset to the logic complement of the character in the Party Line Memory, except where the sink unit is MAS, PSR or PSRP. If the sink unit is one of the latter, the sink unit is clocked, rather than set or reset at T3 and thus receives the logic complement of the characters in the Party Line Memory unit 245. At T4, Binary Counter 61 is incremented so that the next instruction, or portion thereof, is addressed at Instruction Memory 160. In addition, if either the source or sink unit is MAS 85, Transfer Counter 297 is incremented at T4 so that the next slot in MAS is addressed.

To illustrate the above-outlined sequence by way of example, the effects of a few of the TRANSFER(1) instructions are described in detail. Taking for example instruction No. 4 of Table II, namely TRANSFER CC to MCR, this instruction provides the following binary one signals at Operation Code Decoder 160: CLASS *I*; TRANSFER(1); CC(source); and MCR(sink). The CLASS I signal assures that a six-pulse sequence is in effect at ring counter 130. The TRANSFER(1) function signal primes the various two-input AND gates described above. The CC(source) signal primes two-input NAND gate 283 (FIG. 5E), which receives as its second input signal the Q output signal from the Character Counter 70. It is to be understood that Character Counter 70 is actually multiple flip-flops in an up/down counter and that consequently the NAND gate 283 represents multiple NAND gates, one for each stage in the character counter, each of which receives the CC(source) signal and the Q output signal from a respective counter flip-flop. The output signal from each of NAND gates 283 is applied to the data input terminal of a respective flip-flop in Party Line Memory 245. Thus, stage one of Character Counter 70 feeds NAND gate 283 whose output signal is applied to the data input terminal of stage one of Party Line Memory 245; likewise stage N of Character Counter 70 feeds a different NAND gate 283 whose output signal is applied to the data input terminal of stage N of Party Line Memory 245.

The MCR(sink) signal primes two-input AND gate 284 (FIG. 5B) and two-input AND gate 285 (FIG. 5A). AND gate 284 receives its second input signal from AND gate 281 and supplies the MCR RESET signal via OR gate 176 to the reset input terminal of Match Character Register 64. AND gate 285 receives its second input signal from AND gate 279 and provides the MCR SET signal via OR gate 175 to the set input terminal of Match Character Register 64. The input signals to AND gate 279 are the TRANSFER(1) function signal and the output signal from AND gate 286, the latter being a two-input AND gate which receives the T3 pulse from ring counter 130 and an inverted version of the Q output signal from PLM flip-flop 245 via inverter 290. AND gate 286 actually represents multiple AND gates, one each for each stage in Party Line Memory 245, each AND gate receiving the T3 signal as well as the Q output signal from the party line memory bit with which it is associated. Likewise, AND gate 279 represents multiple AND gates, one each for each of AND gates 286, each receiving the TRANSFER(1) function signal and the output signal from a respective one of AND gates 286. AND gate 285 is also representative of multiple AND gates, one each for each stage in Match Character Register 64, each of AND gates 285 receiving the MCR(sink) signal and the output signal from a respective one of AND gates 279.

At T1 Match Character Register 64 is reset. This is accomplished by the T1 pulse applied to AND gate 281 which enables the latter and in turn enables AND gate 284 so that a binary one MCR RESET signal is applied via OR gate 176 to the reset input terminal of each MCR stage. At T2, Party Line Memory 245 is clocked, effectively transferring the logic complement of the Character Counter number into the Party Line Memory. Specifically, if a particular stage in the Character Counter is binary zero, its associated source NAND gate 283 remains binary one and a binary one is transferred into the associated party line memory bit. If the Q output signal of any Character Counter Stage is binary one, the NAND gate 283 associated with that stage provides a binary zero output signal which at T2 is clocked into a respective PLM flip-flop.

At T3, the logic complement of the number in Party Line Memory 245 is transferred into Match Character Register 64. This is accomplished in the following manner: the T3 pulse applied to each of AND gates 286 conditionally enables that gate in accordance with the state of a respective party line memory bit. More specifically, if a PLM bit is binary zero, its AND gate 286 is enabled by the T3 pulse so that actuating AND gates 279 and 285 are enabled to apply a binary one MCR SET signal to the set input terminal of a respective MCR stage via a respective OR gate 175. If, on the other hand, any party line memory bit is binary one, its associated AND gate 286 remains off at time T3 and the associated MCR stage is not set.

At T4, Binary Counter 61 is incremented to address the next instruction in sequence in Instruction Memory 160. This is accomplished via AND gate 182, which receives the T4 pulse from OR gate 183, and also receives a binary one $\bar{Q}$ signal from Status flip-flop 230. Status flip-flop 230 is able to provide this signal because it is always reset upon completion of an instruction sequence during which it had been set.

The above description of the TRANSFER CC to MCR instruction is exemplary for instructions Nos. 2–8, 51 and 52. The only differences in effectuation of these instructions involve the particular gates associated with the various source and sink elements. Thus, the source NAND gate 283 for Character Counter 70 has counterpart source NAND gates 287 for Next Address Register 63, 288 for Match Character Register 64, 289 for Second Line Character Counter 73, and 291 for Interword Space Counter 69. Each of these NAND gates represents a multiplicity of NAND gates, one for each stage in a respective source unit, and each of these NAND gates receives the Q output signal from a respective associated flip-flop and the unit (source) signal associated with a respective counter or register.

In order to assure a fuller understanding of the TRANSFER(1) function operation, the following description for the TRANSFER MAS to PSR instruction, No. 24 in Table II, is provided. The TRANSFER MAS to PSR instruction results in the following binary one signals being provided by Operation Code Decoder 61: CLASS I; TRANSFER(1); MAS(source); and PSR(sink). The CLASS I signal assures a six-pulse cycle at ring counter 130. The TRANSFER(1) function signal primes the various AND gates described above. The MAS(source) signal is applied via OR gate 292 to AND gate 293, the latter also receiving the T4 pulse from ring counter 130. The MAS(source) signal is also applied as an input signal to each of three-input NAND gates 294(1), 294(2), 294(3), 294(4), 294(5), . . . 294(N). These NAND gates each represent multiple NAND gates and serve as source NAND gates for respective slots in MAS. Each has its output signal applied to the data input terminal of a respective party line memory bit so that the illustrated NAND gates 294(1) through 294(N) feed the illustrated PLM flip-flop 245; likewise, each set of non-illustrated NAND gates 294(1) through 294(N) feed another respective PLM flip-flop 245.

When the MAS(source) signal is binary one, NAND gates 294(1) through 294(N) are primed so that each provides a binary zero signal when both of its other two input signals are binary one. The second input signals for NAND gates 294 are provided by the Q output terminal of a respective one of the MAS(1), MAS(2), MAS(3), MAS(4), MAS(5) . . . MAS(N) flip-flops; the third input signal is received from a respective one of the output terminals of the MAS Address Decoder unit 298, only one of which terminals provides a binary one signal at a time. The particular MAS Address Decoder terminal which provides a binary one signal at any time is determined by the count in Transfer Counter 297, only one flip-flop of which is illustrated. Each flip-flop of Transfer Counter 297 has its Q and $\bar{Q}$ output signals applied to MAS Address Decoder 298 which provides a binary one signal at that one of its output terminals which corresponds to the Transfer Counter count.

The various MAS(1) through MAS(N) flip-flops are of the clocked-data type and are not interconnected. Each actually represents a plurality of flip-flops which are simultaneously clocked and whose input and output gates are simultaneously primed.

Proceeding further with the description of the TRANSFER MAS to PSR instruction, Operation Code Decoder 62 also provides a binary one PSR(sink) signal to OR gate 301 which in turn primes AND gate 271. The second input signal to AND gate 271 is the TRANSFER(1) function signal, which is binary one for this instruction, and therefore AND gate 271 primes two-input AND gate 302, the second input of which is the T3 pulse from ring counter 130. The output signal from AND gate 302 is the CLOCK PSR signal which is applied to AND gate 209 along with the Q output signal of flip-flop 203 in ring counter 202 so that AND gate 209 is only primed when ring counter 202 selects terminal J for a processing operation. Prior State Register 67 is actually a plurality of shift registers, one for each bit in each of the slots in MAS 85. Consequently, it should be borne in mind in following the detailed description below, that input data to PSR 67 is received parallel-by-bit, serially-by-character, and is shifted along each register with each CLOCK PSR pulse.

The sequence involved in the TRANSFER MAS to PSR instruction is as follows:

At T1, no operation of significance relative to the present instruction occurs. At T2, PLM 245 is clocked so that its data input terminal receives the logic complement of the character in the MAS slot whose NAND gates 294 are addressed by the Transfer Counter 297. At T3 AND gate 302 is enabled to provide a binary one CLOCK PSR signal which in turn primes AND gate 209 to CLOCK PSR 67(J) so that the latter receives, via NAND gate 213, the logic complement of the character in PLM 245. At T4, AND gate 293 is enabled to provide a binary one CLOCK TC signal, which in fact clocks Transfer Counter 297 to increment its count. In addition, AND gate 182 is enabled at T4 via OR gate 183 to clock Binary Counter 61 and change the instruction being addressed at Instruction Memory 160. Transfer Counter 297, having been incremented at T4, now addresses the next sequential slot in the MAS register 85 so that if the next sequential instruction in Instruction Memory 160 is TRANSFER MAS to PSR, the contents of the next slot in MAS is transferred to the next slot in Prior State Register 67(J).

The above description of the TRANSFER CC to MCR instruction is illustrative of a TRANSFER(1) function in which the contents of a counter are transferred to a register; likewise, the description of the TRANSFER MAS to PSR instruction is representative of a TRANSFER(1) function in which the contents of a register are transferred to another register. The only other type of TRANSFER(1) function with which we are concerned is the transfer of the contents of a register to a counter or counter to counter. The input and output gating is substantially the same as described above for the two described instructions, depending upon whether the source and sink units are counters or registers respectively. For example, each input data terminal for respective MAS flip-flops is connected to the output terminal of a respective NAND gate 303(1) through 303(N). Similarly, each of the output stages of the various shift registers in PSR 67(J) is connected to a respective NAND gate 215 which is primed whenever PSR is a source unit.

TRANSFER(2) FUNCTION OPERATION

There are three instructions in Table II in which a transfer(2) type function is effected. These instructions are instructions Nos. 30, 35 and 36 in Table II, each of which involves a transfer of a single character from some source unit into WORKING STORE. Instruction No. 36, TRANSFER NVM to WS is described in detail below as representative of all TRANSFER(2) type instructions. In response to this instruction being addressed in instruction memory 160 and stored in operation code store unit 169, operation code decoder 62 generates the following signals: CLASS I; TRANSFER(2); NVM(source); and WS(sink). The CLASS I signal assures that the ring counter 130 operates on a six-pulse cycle. The TRANSFER(2) function signal, when binary one actuates OR gate 306 (FIG. 5B) to prime two-input AND gate 307 and two-input AND gate 308; AND gate 308 also receives the T4 pulse from from ring counter 130 and, when enabled, applies a binary one signal to OR gate 309 which in turn provides a binary one WRITE WS signal.

The NVM(source) signal, when binary one, performs the following:

1. primes AND gate 312, which awaits the pulse T3 from ring counter 130 before providing a binary one CLOCK NVM signal;

2. primes NAND gate 319 (FIG. 5G) a two-input NAND gate, which receives a second input signal, the Q output signal from NVM(2) flip-flop 388 and which has its output terminal connected to the data input terminal of PLM flip-flop 245.

The WS(sink) signal, when binary one, performs the following:

1. enables OR gate 313 to prime two-input AND gate 314; however, this AND gate is not enabled in response to the presently described instruction because its second input signal is binary one only during the TRANSFER(6) and TRANSFER(7) functions;

2. primes AND gate 307 which, as described above, also receives the output signal from OR gate 306 when the TRANSFER(2) signal is binary one; therefore enabled AND gate 307 supplies a binary one signal to OR gate 315 which in turn provides a binary one signal to prime two-input AND gates 316 and 317; AND gate 316 receives as its second input the output *signal from* AND gate 286; AND gate 317 also receives the T1 pulse from ring counter 130;

3. primes two-input NAND gate 318 which also receives the Q output signal from input-output buffer 68 and supplies the binary input signal to the data input terminal of WORKING STORE 72 (FIG. 5E).

At time T1, AND gate 317 is actuated to apply a binary one RESET I/O signal to the reset input terminal of I/O Buffer 68. It is understood that the I/O Buffer actually represents eight set-reset flip-flops, and that the RESET I/O signal is applied to the reset input terminal of all of these flip-flops from the single AND gate 317. At time T2, PARTY LINE MEMORY 245 is clocked so that each of its flip-flops assumes the state of a respective NAND gate 319 associated therewith; this state, of course, is the logic complement of the state of a respective NVM(2) flip-flop 388.

At time T3, the logic complement of the state of each PLM flip-flop 245 is gated through AND gate 286 to primed AND gate 316. This logic complement is produced by a respective inverter 290 so that, if one or more of flip-flops 245 is set, the AND gate 286 to which it is connected applies a binary zero signal to AND gate 316; likewise if one or more of flip-flops 245 is reset, the associated AND gate 286 applies a binary one signal to AND gate 316. AND gate 316 therefore represents a plurality of AND gates, one each for each bit in Input-Output Buffer 68, each receiving one input signal from OR gate 315 and another input signal from a respective one of AND gates 286. Those of AND gates 316 which are enabled set the Input-Output Buffer flip-flop 68 to which they are connected; those Input-Output Buffer flip-flops which receive binary zero signals at their set input terminals remain reset. The $\bar{Q}$ output signal from each Input-Output Buffer flip-flop is connected to a respective NAND gate 318 which also receives the WS(sink) signal as described above. NAND gate 318 represents a plurality of NAND gates, one each for each Input-Output Buffer flip-flop. The output signal from each of NAND gates 318 is connected to a respective data input terminal in working store 72.

AND gate 312 is also enabled at T3 to provide the binary one CLOCK NVM signal to the clock input terminal at all of the NVM flip-flops. The effect of this is to transfer the word presently in NVM(1) into NVM(2).

At time T4, AND gate 308 is enabled to in turn enable OR gate 309 and apply the WRITE WS signal to the write input terminal of Working Store 72. This permits the character at Input-Output buffer 68 to be transferred into the slot in Working Store 72 which is addressed by the character counter 70. Consequently, the character transferred to this slot in working store corresponds to the character in NVM(2) unit 388. Also occurring at T4 is the provision of a binary one CLOCK BC signal which increments Binary Counter 61 to address the next sequential instruction in Instruction Memory 160. If it is desired to read both NVM characters into Working Store, specifically, the characters in NVM(1) and NVM(2), the program is arranged to increment character counter 70 to address the next slot in Working Store and then provide another TRANSFER NVM to WS instruction to cause the transfer of the NVM(1) character, shifted to NVM(2) from NVM(1) in the above-described sequence, to Working Store.

For instruction No. 35, TRANSFER NAR to WS, the sequence proceeds as described above utilizing the NAND gates represented by gate 287 to perform the functions for NAR 63 which were provided for NVM by NAND gates 319; however, Next Address Register 63 is not clocked at T3 as is Next Vacant Memory register. Clocking of NVM is required simply to transfer the character in NVM(1) to NVM(2); no such dual character condition exists for the Next Address Register. Similarly, instruction No. 30, TRANSFER MAS to WS, proceeds as described above relative to the TRANSFER NVM to WS instruction, however only the particular MAS slot whose AND gate 295 is addressed by Transfer Counter 297 has its output NAND gate 294 primed to feed PLM unit 245. In addition, there is no clocking associated with MAS 85 at time T3 as there is in the TRANSFER NVM to WS instruction; rather, Transfer Counter 297 is clocked at T4 via AND gate 293 and OR gate 292 so that the MAS slot following the one from which data has just been transferred will be addressed by the transfer counter at the conclusion of the TRANSFER MAS to WS sequence.

TRANSFER(3) FUNCTION OPERATION

There are three instructions in response to which a TRANSFER(3) function is effected, namely instructions Nos. 19, 23 and 29 in Table II. All of these instructions involve a transfer of one character from Working Store 72 to a respective sink unit. The sink units for the various instructions which effect the TRANSFER(3) function are Input-Output Buffer 68, Internal Line Buffer 66, and MAS 85. In order to provide the capability of comparing any character transferred from Working Store to some selected character at any time, the system is arranged so that all characters transferred from Working Store, regardless of their sink unit destination, are also transferred to Input-Output Buffer 68. With this in mind, the description of the TRANSFER(3) function is set forth for instructions Nos. 19, 23 and 29 in the following paragraph.

The signals generated by the operation code decoder 62 in response to any one of instructions Nos. 19, 23 and 29 are as follows: CLASS I; TRANSFER(3); WS(source); and the appropriate sink signal which will be either MAS(sink), I/O(sink) or ILB(sink). The CLASS I signal, when binary one, assures a six pulse timing cycle at ring counter 130. The TRANSFER(3) signal, when binary one, provides the following functions:

1. primes two-input AND gate 311 which receives as a second input signal the ILB(sink) signal and which provides an output signal to OR gate 236;
2. enables OR gate 315 to prime each of AND gates 316 and 317;
3. enables OR gate 276 to prime AND gate 274; the latter receiving as a second input signal the MAS(sink) signal and providing an output signal to prime AND gate 321;
4. enables OR gate 322 to in turn prime AND gate 323, the latter being a two-input AND gate which receives the T1 timing pulse from ring counter 130 as a second input signal.

The WS(source) signal, when binary one, performs as follows:

enables OR gate 313 to prime two-input AND gate 314; however, AND gate 314 is not actuated during the TRANSFER(3) function mode because neither the TRANSFER(6) nor TRANSFER(7) function signals are binary one. The WS(source) signal also is applied to NAND gate 324, the latter representing a plurality of NAND gates, each of which receives two input signals. One input signal to each of NAND gates 324 is the WS(source) signal; the other input signal to each of the NAND gates 324 is the binary output signal from a respective one of the Working Store data output terminals. Thus, assuming as we have here an eight bit data character, there will be eight NAND gates represented by NAND gate 324 and the state of each of these NAND gates, when the WS(source) signal is binary one, is dependent upon the states of each of the eight output terminals in the Working Store slot addressed by Character Counter 70. The output signal from each of NAND gates 324 is connected to the data input terminal of a respective PLM flip-flop 245.

The various sink signals, when binary one, perform the following functions:

1. MAS(sink)
   a. enables OR gate 292 to prime two-input AND gate 293 which awaits T4 as a second input signal to generate a CLOCK TC signal;
   b. primes two-input AND gate 274 which receives as a second input signal the output signal from OR gate 276 which has been enabled by the TRANSFER(3) signal; AND gate 274 is thus enabled to prime two-input AND gate 321 which awaits T3 as a second input signal to generate a CLOCK MAS signal;
2. I/O(sink) enables OR gate 344 to prime two-input AND gate 343; AND gate 343 requires a BRANCH function signal as a second input signal and thus plays no part in this instruction; a similar situation exists for NAND gate 353 which is primed by this signal; (note that the TRANSFER(3) function signal is itself sufficient to make the I/O buffer 68 serve as a sink);
3. ILB(sink) provides the functions described below in the discussion of TRANSFER(4) operation.

The timing sequence effected during a TRANSFER(3) function is as follows: At time T1, AND gate 317 is enabled to reset Input-Output Buffer 68. In addition, AND gate 323 is enabled to in turn enable OR gate 325 which provides a binary one READ WS signal. This latter signal causes the eight-bit character in the Working Store slot addressed by Character Counter 70 to be transferred to the eight NAND gates 324 so that the logic complement of this word is applied to the data input terminal of the party line memory flip-flops 245.

At time T2, the PLM flip-flops 245 are clocked to enter the data applied to their data input terminals.

At time T3, AND gates 286 are pulsed and, depending upon the logic state of their associated PLM flip-flop 245, are enabled or not. If a PLM flip-flop 245 is binary one, its associated signal is inverted by Logic Inverter 290 which applies a binary zero signal to a respective AND gate 286 which thus remains off; if, however, a PLM flip-flop 245 is binary zero, AND gate 286 is enabled to in turn enable AND gate 316 and provide a binary one signal to the set input terminal of a respective Input-Output Buffer bit. Thus, irrespective of which UNIT(sink) signal is provided during a TRANSFER(3) function, Input-Output buffer 68 is set to the logic complement of the character in the party line memory unit. In addition, at time T3, the input gate to the sink unit is enabled or not in accordance with the state of party line memory 245. More specifically, if the MAS(sink) signal is binary one, AND gate 321 is enabled to apply a binary one CLOCK(MAS) signal to an input terminal of each of the eight two-input AND gates represented by each of AND gates 326(1), 326(2), 326(3), 326(4), 326(5) . . . 326(N). The second input terminal of each of AND gates 326(1) receives that output signal from the MAS address decoder 298 which is binary one when the count in Transfer Counter 297 is one; likewise AND gates 326(N) receive a binary one signal from MAS Address Decoder 298 whenever Transfer Counter 297 has a count of N therein. Thus, at time T3, whenever instruction No. 29, TRANSFER WS to MAS is effective, those AND gates 326 which are associated with the addressed slot in MAS are enabled to provide binary one output signals to the clock input terminal of respective MAS flip-flops. Consequently, the NAND gate 303 associated with the ADDRESSED MAS slot will transfer the logic complement of the character in the party line memory unit into that MAS slot.

When the ILB(sink) signal is binary one, as is the case for instruction No. 23, AND gate 242 is enabled at time T3 and a binary one CLOCK ILB signal is applied to the clock input terminal to each of the input bits of Internal Line Buffer 66; thus, the logic complement of the character in Party Line Memory unit 245 is transferred via NAND gates 243 into Internal Line Buffer 66.

At time T4, the CLOCK BC signal increments Binary Counter 61 so that the next sequential instruction is addressed in Instruction Memory 160. In addition, if the instruction TRANSFER WS to MAS is the one previously implemented as part of the currently described cycle, AND gate 293 is enabled at T4 to apply a binary one CLOCK TC signal to the clock input terminal of Transfer Counter 297. The Transfer Counter is thus incremented and the MAS address selector output signal now addresses the next sequential MAS slot.

TRANSFER(4) FUNCTION OPERATION

The next type of instruction to be described is that in which a binary one TRANSFER(4) function signal is supplied by Operation Code Decoder 62. There are only two such instructions listed in Table II, namely TRANSFER TLB to ILB, and TRANSFER ILB to TLB.

In describing the operational sequence for the TRANSFER TLB to ILB instruction, for example, it is first necessary to understand how the transfer is accomplished. Once during each six-pulse cycle at ring counter 130, a character is transferred from Terminal Line Buffer 65 to Party Line Memory 245 and then to Internal Line Buffer 66. The transfer continues, character by character, with the input and output characters of the Internal Line Buffer being monitored at all times. When the ILB input character is a carriage return, it signifies that an entire line has been transferred from the Terminal Line Buffer 65 to the Internal Line Buffer 66. At this time, the clocking of the Terminal Line Buffer is terminated in order to prevent any additional characters which might be part of a subsequent text line from being transferred into the Internal Line Buffer. However, when the carriage return character is at the ILB input terminal, the position of the transferred line within ILB 66 is not necessarily optimized for utilization of that line by the data processor. More specifically, it is desired that the first character of the transferred line be positioned at the output stage of Internal Line Buffer 66. To accomplish this, Internal Line Buffer 66 continues to be clocked, once each cycle of ring counter 130, thereby shifting the line of characters along the Internal Line Buffer until a data character appears at the ILB output. At this time, the clocking of Internal Line Buffer 66 is terminated and the transferred line is properly positioned.

The TRANSFER TLB to ILB instruction, No. 26 in Table II, provides the following binary one output signals at the operation code decoder unit 62: CLASS I; TRANSFER(4); TLB(source); and ILB(sink). The CLASS I signal effects a six-pulse cycle for ring counter 130. The TRANSFER (4) function signal effects the following:

1. primes two-input AND gate 231 which receives as a second input signal the output signal from OR gate 266;
2. sets Status flip-flop 230 via OR gates 233 and 234, one-shot multivibrator unit 235 and OR gate 226.

The TLB(source) signal effects the following:

1. primes three-input AND gate 238 which also receives the ILB(sink) signal and the Q signal from ring counter stage 203, and which provides an output signal to OR gate 123 for terminal J (FIG. 4);
2. primes two-input AND gate 241 which receives as a second input signal a $\overline{CRI}$ signal from the $\overline{Q}$ output terminal of flip-flop 254 and which provides an output signal to OR gate 250 which in turn applies its output signal to a two-input AND gate 263;
3. primes three-input AND gate 239, the latter receiving as its two other input signals the ILB(sink) signal and a DO signal from Output Character Detector 253;
4. enables OR gate 240 to in turn prime NAND gate 210, the latter being the output NAND gate for Terminal Line Buffer 65 and utilized for transfers therefrom into Party Line Memory 245.

In addition to priming AND gates 238 and 239 as described above, the ILB(sink) signal effects the following:

1. primes two-input AND gate 311 which receives as a second input signal the TRANSFER(3) function signal and is therefore not enabled by the present instruction;
2. primes AND gate 259 which receives as a second input signal the $\overline{DO}$ output signal from output character detector 253 and applies an input signal to OR gate 266 which in turn applies an input signal to AND gate 231; the latter enables OR gate 236 to prime AND gate 242;
3. primes NAND gate 243, which is actually a plurality of two-input NAND gates, each receiving as a second input signal the Q output signal from a respective flip-flop in PLM 245.

Before describing the timing sequence for the TRANSFER TLB to ILB instruction, the character detector units mentioned above should be described. Input Character Detector 251 monitors the character applied to the data terminals of the input stages of ILB 66, irrespective of whether this character has been clocked into the ILB or not. When the detected character is a carriage return, detector 251 provides a binary one CARRIAGE RETURN signal which sets set-reset flip-flop 254. The latter, when not set, provides a binary one $\overline{CRI}$ signal from its $\overline{Q}$ output terminal which, as mentioned above, is applied to AND gate 241. When the character detected by detector 251 is a data character, a binary one DI signal is applied to AND gate 256 to be discussed subsequently. When detector 251 detects neither a data nor function character, it provides a binary one $\overline{DI}$ signal which is applied to AND gate 257 as described below.

Output character detector 253 monitors the output bits in ILB 66. When a carriage return character is detected at the ILB output stages, a binary one CARRIAGE RETURN signal is provided by detector 253 to set set-reset flip-flop 258. When set, the latter applies a binary one CRO signal to AND gate 260; when reset flip-flop 258 applies a binary one $\overline{CRO}$ signal to AND gates 232 and 237. When detector 253 detects a data or function character at the ILB output stage, it applies a binary one DO signal to AND gate 239. When there is no data or function character at the ILB output stages, a $\overline{DO}$ binary one signal is applied to AND gates 259 and 341.

Considering now the timing sequence effected for the TRANSFER TLB to ILB instruction, nothing of consequence occurs at T1. At T2, the PLM 245 is clocked thereby entering the logic complement of the character at the Terminal Line Buffer output stage into PLM 245 in the manner described above with reference to the detailed description of PLM operation. At T3, AND gate 221 is not enabled to reset Status flip-flop 230 because OR gate 220 is not enabled due to the fact that OR gate 264 is not enabled. The latter cannot be enabled in this mode unless AND gate 239 is also enabled which cannot occur until a binary one DO signal is provided by detector 253. This requires the presence of data at the ILB output stage. However, at T3, AND gate 242 (which receives its priming signal via OR gate 236, AND gate 231, OR gate 266, and AND gate 259) is enabled to provide the CLOCK ILB signal directly to the clock input terminal of each flip-flop in Internal Line Buffer 66. The Internal Line Buffer thus receives, at the first stage of each of its shift registers, a character which is the logic complement of the character in PLM 245. Also at T3, AND gate 263 (which receives a priming signal via OR gate 250 and AND gate 241 since there is in fact no carriage return character assumed to be present at the input stages of Internal Line Buffer 66 at this time) provides a CLOCK TLB signal to AND gate 211. The latter is a two-input AND gate receiving as a second input signal the Q signal from ring counter stage 203 and provides a binary one signal via OR gate 218 to all clock input terminals of Terminal Line Buffer 65. At T4, since Status Flip-flop 230 has not been reset, instruction No. 26 remains in force for another cycle.

The above-described cycle repeats until such time as a carriage return character is detected by input character detector 251. When this occurs, and it will occur at T2 after Party Line Memory 245 is clocked, the CRI signal sets flip-flop 254 to change the latter's $\bar{Q}$ output signal to binary zero. This inhibits AND gate 241 so that AND gate 263 is not clocked by the next T3 pulse. TLB 65 is thus not clocked for this cycle; however, clocking of Internal Line Buffer 66 at T3 continues as described above.

This modified cycle, wherein the ILB is clocked and the TLB is not, continues until such time as data appears at the output stages of the ILB. This occurs at time T3 and results in a binary one DO signal from character detector unit 253 which enables AND gate 239. The latter in turn enables OR gate 264 to enable OR gate 220 which primes AND gate 221. The T3 pulse which shifted data into the last output stage in the Internal Line Buffer is wide enough, or is at least delayed long enough at AND gate 221, to enable AND gate 221 and thereby reset Status flip-flop 230 through OR gate 222. With the Status flip-flop reset, the inhibiting factor at AND gate 182 is removed and the next T4 pulse clocks Binary Counter 61 to effectuate the next sequential instruction at Instruction Memory 160.

In the transfer sequence described above, it is assumed that terminal J has been selected by ring counter 202. This causes the Q signal from ring counter stage 203 to prime AND gate 211 to permit TLB clocking. In addition, it is assumed that flip-flops 254 and 258 are initially in their reset states, which in fact is the case. More specifically, flip-flop 254 is set only during a TRANSFER TLB to ILB instruction which cannot be terminated until AND gate 239 is enabled to reset the Status flip-flop. .The AND gate also resets flip-flop 254. A similar situation exists for flip-flop 258.

Let us now examine the instruction TRANSFER ILB to TLB, also a CLASS I instruction, and one which presupposes TTR 100 to be in the receiving mode. In response to this instruction, the following binary one signals are provided by Operation Code Decoder 62 at T6: CLASS I; TRANSFER(4); TLB(sink); and ILB)source).

Before describing the details of the transfer sequence, a brief description of the theory involved is in order. When TTR 100 at terminal J is in the receiving mode, it signals the processor that it is ready to receive data, and when the multiplexer finds the Data Ready flip-flop of that terminal in a set condition, it begins to transfer a line of data from Internal Line Buffer 66 to the Terminal Line Buffer 65 of terminal J via PLM 245. As the line being transferred passes from ILB 66 to TLB 65, output character detector 253 maintains a close watch over each character until carriage return character is detected, indicating that the entire line has been transferred out of the ILB. At this time, clocking of the ILB terminates; however, the transferred line is not yet properly positioned in the TLB because the first character in the transferred line is not yet located at the output stages of the TLB. Consequently, clocking of the terminal line buffer continues, NAND gate 243 is enabled via OR gate 446, and in addition, data from the TLB output stages is now transferred into the PLM unit each time the terminal line buffer is clocked. When a data character reaches the output stages of TLB 65 and is clocked into PLM 245, input character detector unit 251 detects the presence of the data character and terminates the clocking of the TLB. The terminal line buffer therefore sits in a properly aligned right adjusted position.

The TRANSFER(4) function signal primes the same AND gates described above in relation to the instruction TRANSFER TLB to ILB. The ILB(source) signal effects the following:

1. primes two-input AND gate 237 which receives the $\overline{\text{CRO}}$ signal from character detector 253 and provides an output signal via OR gate 266 which in turn primes AND gate 231; the latter also receives the TRANSFER(4) signal and so enables OR gate 236 to in turn prime AND gate 242 which awaits the T3 pulse before providing a CLOCK ILB signal;
2. primes AND gate 256, along with the TLB (sink) signal, to await the DI signal from the output of input character detector 251 before effecting a reset of the Status flip-flop 230 and flip-flop 258;
3. primes AND gate 270 which also receives the TLB(sink) signal and the Q signal from ring counter stage 203 and applies its output signal to OR gate 125 in FIG. 4 to place flip-flop 124 in its K state; this state of flip-flop 124 indicates to the processor that TTR 100 of terminal J is processor-controlled; in addition, OR gate 125 provides a binary one TRANSFER INITIATED signal to AND gate 208 which feeds the reset input terminal of Data Ready flip-flop 216 for terminal J; and
4. primes NAND gates 252, the source NAND gates for ILB 66 so that data may be transferred from ILB 66 to PLM 245.

The TLB(sink) signal effects the following:

1. primes NAND gates 214, the sink NAND gates for TLB 65 so that data can be transferred from PLM 245 to TLB 65;
2. primes AND gate 260 which awaits the CRO signal from detector 253 before enabling OR gate 240 and priming NAND gates 210, the source NAND gates for TLB 65;
3. primes AND gate 257 which also receives the $\overline{\text{DI}}$ signal to enable OR gate 250 and prime AND gate 263 so that TLB 65 can be clocked at T3; and
4. primes AND gates 256 and 270 along with the ILB (source) as described above.

When ring counter 202 has stage 203 in its binary one state, and Data Ready flip-flop 216 is also binary one (as would be the case when the TERMINAL READY signal is provided by OR gate 125), scanning by the multiplexer stops and terminal J is ready to receive the processed data. At T1, no operation of significance relative to the present instruction is performed.

At T2, PLM flip-flop 245 is clocked so that the complement of the character in the output stages of ILB 66 is fed via NAND gates 252 into PLM 245.

At T3, Status Flip-flop 230 is not reset because AND gate 221 is inhibited by the binary zero signal provided by OR gate 220. OR gate 220 can be activated for this instruction only by a binary one signal from OR gate 264, and OR gate 264 in this mode can only be enabled by a binary one signal from AND gate 256. The latter is inhibited by the binary zero state of the DI signal from input character detector 251. At T3, both Terminal Line Buffer 65 and Internal Line Buffer 66 are clocked, effectively shifting each character in both buffers over one stage and transferring the logic complement of the character in PLM 245 into the input stage of Terminal Line Buffer 65 via NAND gate 214 and OR gate 217. More specifically, this clocking is accomplished for Terminal Line Buffer 65 by the T3 pulse applied to AND gate 263, the latter being primed by OR gate 250. AND gate 257 which remains enabled as long as the $\overline{DI}$ signal, provided by input character detector 251, is binary one. Internal Line Buffer 66 is clocked by means of AND gate 242 which receives the T3 signal and the binary one output signal from OR gate 236. The latter gate is enabled by AND gate 231 for the instruction presently being considered.

At T4, Binary Counter 61 cannot be clocked because AND gate 182 is inhibited by the binary zero Q signal from the set Status flip-flop 230. Consequently, binary Counter 61 remains at the count which addresses the TRANSFER ILB to TLB instruction. At T5, PLM 245 is reset and at T6, because the TRANSFER ILB to TLB instruction is of the CLASS I type, the ring counter 130 is reset and a new counting cycle begins.

The cycle described above repeats itself until such time as a carriage return character is detected by the output character detector 253. This occurs at T3 after Internal Line Buffer 66 is clocked. The resulting binary one CARRIAGE RETURN signal from character detector 253 sets flip-flop 258 to provide a binary one CRO signal and a binary zero $\overline{CRO}$ output signal. The binary zero $\overline{CRO}$ signal inhibits AND gate 237 which in turn disables OR gate 266 and AND gate 231. With AND gate 231 off, OR gate 236 is likewise off and AND gate 242 is inhibited and cannot clock ILB at the next T3 pulse. However, the CLOCK TLB pulse continues to occur at T3. In addition, with the CRO signal from detector 253 now at a binary one level. AND gate 260 is enabled to enable OR gate 240 and prime NAND gate 210. The latter now begins to transfer the logic complement of the output character at TLB 65 into PLM 245 whenever the latter is clocked. This occurs at T2 in subsequent cycles and continues until detector 251 senses data and provides a binary one DI signal to enable AND gate 256 and thereby reset both Status flip-flop 230 and flip-flop 258. Note that after clocking of ILB 66 is terminated, PLM 245 is utilized to permit detector 251 to sense when the transferred line is properly adjusted in TLB 65. The use of PLM 245 in this manner does not mean that data is transferred from TLB into ILB; this is prevented because ILB is no longer clocked after detection of a carriage return character at its output stage.

RELEASE PSRP FUNCTION OPERATION

The system is capable of responding to a specific command from any terminal, for example, terminal J, by listing or printing a document originally received from terminal J at a special predetermined terminal, for example, terminal K. Terminal K may have a special printer associated therewith which is not present at the other terminals and which prints text material in a desired format. The command which causes the system to print or list a document provided by terminal J at terminal K is that which places terminal J in the Special Print or Special List modes. These modes and the manner in which they are entered are described in detail in the section entitled "Description of Operation Modes." For present purposes, it is sufficient to be aware that, if terminal J requests a Special Print or List mode for a specified document, the control information associated with that document is transferred into PSRP 67 (K) rather than PSR 67 (J) during a multiplexer sample of terminal J. Terminal K is then prevented from being used by any other terminal until the specified document has been displayed. Display of the document at terminal K proceeds as at any other terminal, line by line during each multiplexer sample of terminal K. When the document is completed, terminal K must be released for use by some other terminal. At this time, the instruction RELEASE PSRP is effected.

The RELEASE PSRP instruction, No 53, provides a binary one CLASS I signal and a binary one RELEASE PSRP function signal at operation code decoder 62. There are no source or sink signals enabled in response to this operation code. The circuitry illustrated for terminal K in FIG. 5D is only that necessary for an understanding of the RELEASE PSRP function. It is to be understood that terminal K also has a TLB 65 and associated logic circuits just as do all of the terminals.

The binary one RELEASE PSRP function signal primes a two-input AND gate 272, the second input signal from which is the Q signal from stage 204 of ring counter 202 which is associated with terminal K. The output signal from AND gate 272 is applied to the reset input terminal of set-reset flip-flop 273 which receives a set input signal from OR gate 441 which also feeds Data Ready flip-flop 216(K). The input signals for OR gate 441 are the TERMINAL READY signal from terminal K and a pulse from AND gate 295 which receives as its input signals the $\overline{Q}$ signal from flip-flop 273 and a binary one PSRP(sink) signal, a condition which occurs in response to a TRANSFER MAS to PSRP instruction. Of the above-described components, only AND gates 272 and 295, flip-flop 273, and OR gates 441 and 443 are not present at the other terminals. Flip-flop 273 is set each time a terminal calls for a Special Print or List mode and cannot be reset until a RELEASE PSRP instruction is effected. It is this flip-flop which, when set, prevents other terminals from effecting a Special Print or List mode. When the RELEASE PSRP function signal becomes binary one during a sampling period of terminal K, AND gate 272 is enabled to reset flip-flop 273 and thereby release terminal K.

An additional component, OR gate 443, permits clocking and application of data to PSRP 67 (K) both in the normal multiplexer cycle for terminal K and in any other terminal's cycle when the PSRP(sink) signal is binary one.

It should be explained at this point that special terminal K need not be a printer, but rather could be a memory unit such as a disk, core, incremental magnetic tape recorder, etc. Likewise this terminal can include a buffer (line, page, etc.) from which data applied to the terminal is then recorded or printed. The special terminal can thus serve to permit offline storing of documents from any terminal, minimizing the required capacity for memory unit 82. The off-line stored data can thus be selectively re-applied into the system from any terminal. It will thus be appreciated that the special terminal permits re-sequencing of documents stored at randomly located pages in memory 82. More particularly, a document can be transferred from memory 82 to a memory unit at terminal K so that the entire document is consolidated at the latter memory unit.

TRANSFER(6) FUNCTION OPERATION

There is only one instruction in which a TRANSFER(6) function is effected, namely the TRANSFER ILB to WS instruction, No. 33 in Table II. What is accomplished in response to this instruction is the transfer of an entire line of data or text characters from Internal Line Buffer 66 into Working Store 72. The characters are transferred serially-by-character and parallel-by-bit so that eight bits of data are transferred into Working Store at a time. The instruction is of the CLASS I type so that a six-pulse cycle is effected at ring counter 130, one character being transferred from Internal Line Buffer 66 during each ring counter cycle. To prevent Binary Counter 61 from changing the instruction between cycles, Status flip-flop 230 is set upon initiation of the instruction, thereby inhibiting incrementation of Binary Counter 61 until a carriage return character is detected by character detector 253, whereupon the status flip-flop is reset.

Describing this instruction in greater detail, the following binary one signals are provided by Operation Code Decoder 62: CLASS I; TRANSFER(6); ILB (source) and WS (sink). The CLASS I signal assures a six-pulse ring counter cycle. The TRANSFER(6) function signal effects the following:

1. primes AND gate 232, which also receives the $\overline{CRO}$ output signal from the $\overline{Q}$ output terminal of flip-flop 258 so that AND gate 232 remains enabled until a carriage return character is detected by character detector 253, at which time flip-flop 258 is set;

2. enables OR gate 327 to prime AND gate 314 and also apply an input signal to OR gate 328; AND gate 314 also receives the WS(sink) signal from OR gate 313, so that the output signal from AND gate 314 is applied to OR gate 329 to prime two-input AND gate 331; the latter now awaits the T3 pulse from ring counter 130; the output signal from OR gate 328 is designated the UP ENABLE signal which is applied to the UP input terminal of each stage of Character Counter 70, Interword Space Counter 69, and Second Line Character 73; the latter two counters are not clocked in this mode so that application of the UP ENABLE signal to their respective UP input terminals has no effect; however, the character counter, as described below, is in fact clocked during this function mode;

3. enables OR gate 306 to in turn prime AND gate 307; the latter also receives the WS(sink) signal so that it provides a binary one signal to OR gate 135 which primes AND gates 316 and 317; the output signal from OR 306 also primes AND gate 308;

4. primes two-input AND gate 332, the latter receiving its second input signal from OR gate 334; and 5. sets Status flip-flop 230 via OR gate 327, OR gate 234, and one-shot multivibrator 235.

The ILB(source) signal and the WS(sink) signal prime and enable the same gates described above in relation to the TRANSFER(3) function mode.

At T1, Input-Output Buffer 68 is reset via AND gate 317 in a manner set forth above in the description of the TRANSFER(3) function operation. At T2, Party Line Memory 245 is clocked to transfer, via NAND gate 252, the logic complement of the output character of Internal Line Buffer 66 into Party Line Memory unit 245. At T3, the logic complement of the state of Party Line Memory 245 is transferred into the Input-Output buffer 68 via inverter 290, AND gates 286 and AND gates 316 in the manner set forth in detail in the description of the TRANSFER (3) function operation.

Also at T3, AND gate 331 is enabled to in turn enable OR gate 336 which applies a binary one CLOCK CC signal directly to the clock input terminal of each Character Counter stage so the Character Counter 70 is incremented at this time. In addition, assuming that a carriage return character is not the character just transferred into Input-Output buffer 68, and further assuming that a backspace character is not detected at this time, AND gate 332 remains off and therefore OR gate 220 provides a binary zero output signal. Under such circumstances AND gate 221 is inhibited at T3 so that Status flip-flop 230 remains set.

At T4, the character in Input-Output buffer 68 is written into Working Store 72 by the binary one WRITE WS signal provided by OR gate 309 in response to triggering of AND gate 308 by the T4 pulse. At this time, because Status flip-flop 230 is set, Binary Counter 61 does not address a new instruction. Rather, the same instruction cycle repeats until such time as either a carriage return character or backspace character is detected by character detector 335. Character detector unit 335 is similar in type to detector units 251 and 253 and is employed primarily to monitor the character in the party line memory unit. There are two output terminals from the character detector which are binary one respectively when the character in the party line memory unit is: a carriage; or backspace. These output terminals provide the BACKSPACE DETECTED signal and the CARRIAGE RETURN DETECTED signal, respectively. The circumstance during which this unit provides a binary one CARRIAGE RETURN DETECTED or BACKSPACE DETECTED signal occurs after the output ILB character has been clocked into the party line memory unit. This occurs at T2. Either of these detector output signals enable OR gate 334 to in turn enable AND gate 332 and thereby prime AND gate 221 via OR gate 220. The next occuring T3 pulse will then enable AND gate 221 to reset Status flip-flop 230. The binary counter may now be incremented at T4.

The reason for terminating transfer from ILB 66 into WS 72 upon detection of a carriage return character is that the carriage return character indicates the end of the line being processed. Thus, at this time, it is desirable to terminate transfer into Working Store 72 and initiate, by programmed sequence, the processing of the line now in Working Store.

Termination of the transfer from ILB to WS upon detection of a backspace character is necessary in order to permit the system, by program instruction, to eliminate the space occupied by the backspace character in the transferred line and delete the prior character so that the next character, following the backspace character, is written into Working Store in place of the character preceding the backspace character.

TRANSFER(7) FUNCTION OPERATION

There is only one TRANSFER(7) function instruction in the system as disclosed, namely instruction No. 31 in Table II TRANSFER WS to ILB. In general, the operation ensuing in response to this instruction is a character-by-character transfer from Working Store 72 into Internal Line Buffer 66, one character being transferred for each cycle ring counter 130. In addition, each character, as it is transferred into Internal Line Buffer 66, is also transferred into Input-Output buffer 68 so that each character may be compared to the contents of Match Character Register 64 by comparator 347 when and if desired. The implementation of this operation is described in the following paragraphs.

In response to the TRANSFER WS to ILB instruction, Operation Code Decoder 62 generates the following binary one signals: CLASS I; TRANSFER(7); WS(source); and ILB(sink).

The CLASS I signal, as described above, assures a six-pulse cycle for ring counter 130. The TRANSFER(7) signal performs the following functions:

1. primes two-input AND gate 341 which receives as a second input the $\overline{DO}$ signal from output character detector unit 253;

2. enables OR gate 327 to prime AND gate 314 and enable OR gates 328, 315 and 234; OR gate 328 provides the UP ENABLE signal to the character counter 70 and OR gate 234 enables one-shot multivibrator 235 which sets Status flip-flop 230; OR gate 315 primes AND gates 316 and 317;

3. primes AND gate 342 which also receives the CARRIAGE RETURN DETECTED signal from character detector 335 and applies its output signal via OR gate 220 to AND gate 221; and 4. enables OR gate 322 to prime AND gate 323; the latter also receives the T1 pulse from ring counter 130.

The WS(source) signal:

1. enables OR gate 313 and in turn AND gate 314 to provide a priming signal to AND gate 331 via OR gate 329; AND gate 331 receives as a second input signal the T3 pulse from ring counter 130 so that at T3 Character Counter 70 is clocked via OR gate 336; and 2. primes the NAND gates represented by gate 324. The output signal from NAND gates 324 are applied to the data input terminal of respective flip-flops in Party Line Memory unit 245.

The ILB(sink) signal primes the various AND gates described in detail above in relation to TRANSFER(4) function operation.

The sequence involved in implementing the TRANSFER WS to ILB instruction is as follows: at time T1, AND gate 323 is enabled to in turn enable OR gate 325 and apply the READ WS signal to Working Store 72. At this time, the state of each of the bits in working store character addressed by the Character Counter actuates or not the NAND gates represented by NAND gate 324; thus, the logic complement of the addressed working store character is applied to the data input terminal of respective PLM flip-flops.

Also at T1, AND gate 317 is enabled to apply a binary one RESET I/O signal to the reset input terminal of each of the I/O Buffer bits.

At T2, the Party Line Memory unit is clocked to receive the logic complement of the addressed Working Store character.

At T3, since there is assumed to be no data character at the output stages of ILB 66, there is a binary one $\overline{DO}$ signal which, along with the TRANSFER(7) signal, enables AND gate 341 and in turn OR gate 236 so that the T3 pulse enables AND gate 242 and clocks each of the various flip-flops in Internal Line Buffer 66. This transfers, via NAND gates 243, the logic complement of the character in party line memory to Internal Line Buffer 66 to complete the transfer of the addressed working store character into the Internal Line Buffer. Also at time T3, the various AND gates represented by AND gate 286 are enabled or not via inverters 290 and timing pulse T3 in accordance with the state of the PLM flip-flop 245 with which they are respectively associated. If its associated PLM flip-flop 245 is set, a binary zero is applied by inverter 290 to AND gate 286 and the latter remains off; consequently, AND gate 216 remains off and the Input-Output buffer bit associated with that AND gate remains reset. If on the other hand a party line memory flip-flop is reset, a binary one is applied to AND gate 286 and in turn to AND gate 316 so that a respective I/O Buffer flip-flop is set.

Also occurring at T3 is the enabling of AND gate 331, which had been primed via OR gate 329, AND gate 314, and OR gates 313 and 327. The output signal from AND gate 331 enables OR gate 336 to clock Character Counter 70 to address the next character in Working Store 72. Assuming that the character in Party Line Memory 245 is not a carriage return character, the CARRIAGE RETURN DETECTED signal provided by character detector 335 remains binary zero and AND gate 342 is not enabled. Since AND gate 342 is not enabled during this timing cycle, OR gate 220 is not enabled and consequently the instruction is not changed. The cycle now repeats the next character addressed in Working Store 72 is transferred via the Party Line Memory unit into both I/O Buffer 68 and ILB 66. The cycle continues as described above until such time a carriage return character is detected by character detector 335, this occurring at time T2 after the Party Line Memory unit is clocked. When this occurs, AND gate 342 enables OR gate 220 so that AND gate 221 is primed. When the next T3 pulse arrives, in addition to the clocking of Internal Line Buffer 66 and Character Counter 70, and setting the I/O Buffer 68, Status flip-flop 230 is reset thereby, removing the inhibiting signal from AND 182. The latter is enabled at T4 to clock Binary Counter 61 so that the next instruction in Instruction Memory 160 is addressed.

TRANSFERS BETWEEN MEMORY AND WORKING STORE

There are two transfer functions involving both Memory 82 and Working Store 72, namely TRANSFER(8) and TRANSFER (9). The former is effected in response to instruction No. 29, TRANSFER WS to MEM; the latter is effected in response to instruction No. 34, TRANSFER MEM to WS. Transfer of data to and from Working Store 72 is parallel-by-bit but serial-by-character; transfer of data to and from Memory 82 is serial-by-bit only. Consequently, special control circuitry must be provided to convert data being transferred between these units to the form acceptable by the sink unit. This circuitry is illustrated in FIG. 6.

Figure 6:
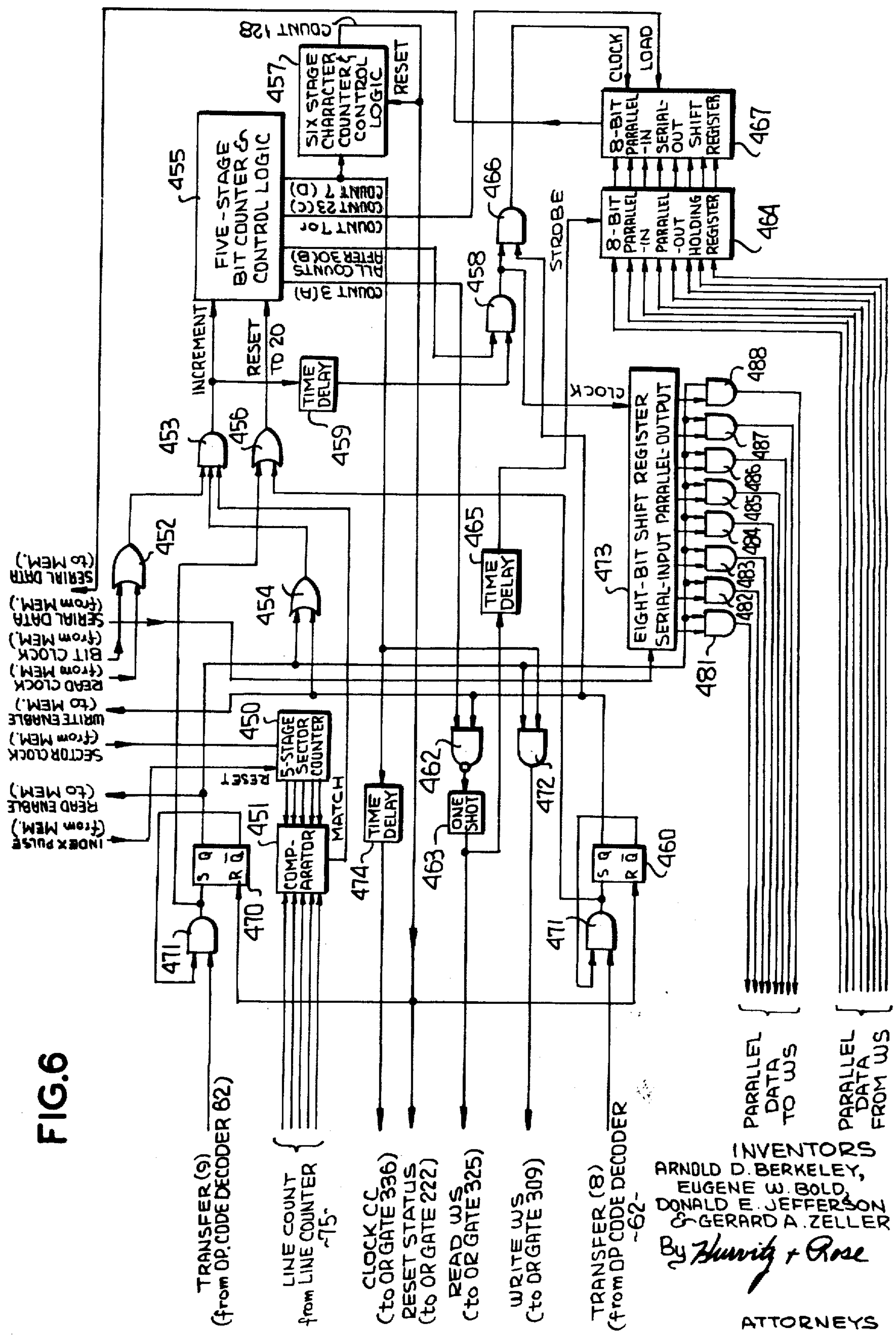
FIG. 6 is a schematic illustration of control circuitry which provides access to the memory disk employed in the preferred embodiment of the present invention.

FIG. 6 also illustrates circuitry which renders Memory 82 compatible with the system in other respects. For example, the Memory unit employed for the preferred embodiment is a disk-type memory requiring certain control signals for proper operation and which provides certain timing signals indicating its readiness to accept or provide data. The disk contains a plurality of endless tracks, each track having a respective record-playback head with respect to which the track is continuously translated. Only one head is active at any time, the active head being selectively addressable by Page Counter 83. Each track of the disk thereby corresponds to a page on which data can be written or from which data can be read.

The tracks are subdivided into sectors which are themselves subdivided into bits. The sectors correspond to lines on a page and the bits are units of the line which are capable of storing respective binary signals. Data may be written into or read from whichever bit is passing the active record-playback head. There are one thousand, 24 bits capable of storing data in each sector. This number represents the product of the maximum number of text characters permitted in a line of text (assumed herein to be 128 times the number of bits per character (eight). In addition, each sector contains nine preamble bits at the beginning of the sector which are not permitted to receive or play back data.

As the start of each sector passes the record-playback head associated with its track it provides a SECTOR CLOCK pulse. In addition, when the first sector of each track passes the head an INDEX pulse is provided. When the system applies a binary one READ ENABLE signal to Memory 82, the latter provides a train of READ CLOCK pulses, one pulse for each bit passing the active record-playback head. Likewise, a binary one WRITE ENABLE signal applied to Memory 82 causes the latter to provide a train of BIT CLOCK pulses. The SECTOR CLOCK pulse and the first BIT or READ CLOCK pulse in each sector are of equal width and co-phasal. Data can be written into or read from the bit passing the active record-playback head only at the time of the trailing edge of the BIT or READ CLOCK pulse associated with that bit.

Referring now to FIG. 6 of the accompanying drawings, there is illustrated the control circuitry required to render Memory 82 compatible with the system. A five-stage sector counter 450 is connected to be continuously incremented by each SECTOR CLOCK pulse and to be reset by each INDEX pulse. Sector counter 450 thus keeps a current record of the sector number passing the active record-playback head. Binary signals representative of the count in sector counter 450 are applied to comparator 451 which also receives binary signals representative of the count in Line Counter 75 in FIG. 5. When the counts in sector counter 450 and Line Counter 75 are equal, comparator 451 provides a binary one MATCH signal which is applied to three-input AND gate 453. The latter receives either BIT CLOCK or READ CLOCK pulses from OR gate 452 and either of the READ ENABLE or WRITE ENABLE signal (generated in a manner described below) from OR gate 454. When enabled, AND gate 453 applies output pulses corresponding to the BIT or READ CLOCK pulses to a five-stage bit counter 455. Each pulse thus received increments counter 455. Included with counter 455 but not specifically illustrated because of its conventional nature is circuitry to effect the following:

a. present counter 455 upon reception of a binary signal from OR gate 456;

b. reset counter 455 to zero at count 30 and every eighth pulse thereafter;

c. provide a binary zero signal (A) whenever the count in counter 455 is three; signal (A) is otherwise binary one;

d. provide a binary one pulse (B) for each increment pulse received after count 30 has been achieved;

e. provide a binary one signal (C) whenever counter 455 is at count seven or count 23; and f. provide another binary one signal (D) whenever the count in counter 455 is seven.

One function of counter 455 is to prevent reading from or writing into the nine preamble bits in each sector of Memory 82. In addition, counter 455 recycles after each eight bits (one character) have been read from or written into Memory 82. Once each cycle of counter 455, more specifically at count seven, binary one signal (D) is applied to a six-stage character counter 457 which is incremented thereby. When counter 457 registers a count of 128, it resets itself and applies a binary one RESET STATUS SIGNAL TO OR gate 222 in FIG. 5. Thus, after 128 characters (1,024 bits) have been read from or written into MEM 82, Status flip-flop 230 is set and the instruction can be changed.

Signal (D), in addition into incrementing counter 457 once each cycle of counter 455, also increments Character Counter 70 of FIG. 5 via OR gate 336. In this manner, Character Counter 70 can address the next character in Working Store 72 in sequence each time eight bits of data are transferred to or from Memory 82.

With the benefit of the foregoing background description, the following description of the TRANSFER(8) and TRANSFER(9) function operation will be more readily understood.

TRANSFER(8) FUNCTION OPERATION

In response to instruction No. 29, TRANSFER WS to MEM, the following binary one signals are provided by Operation Code Decoder 62: CLASS I; and TRANSFER(8). The CLASS I signal effects a six-pulse cycle at ring counter 130. The TRANSFER(8) signal effects the following:

1. applies a binary one UP ENABLE signal to the UP input terminal of Character Counter 70 via OR gates 287 and 328 (FIG. 5);

2. sets Status flip-flop 230 via OR gates 287, 234, one-shot multivibrator 235 and OR gate 226 (FIG. 5);

3. sets flip-flop 460 via two-input AND gate 461 which is pulsed by the onset of the TRANSFER(8) signal because the second input signal to AND gate 461 is the $\bar{Q}$ signal from previously reset flip-flop 460; and 4. presets bit character 455 to a count of twenty via AND gate 461 and OR gate 456.

The setting of flip-flop 460 effectively places Memory 82 in its WRITE mode. More specifically, the binary one Q signal from flip-flop 460 effects the following:

a. applies a binary one WRITE ENABLE signal to Memory 82, permitting the BIT CLOCK pulses to be generated;

b. enable OR gate 454 to prime AND gate 453;

c. turns off NAND gate 462 to trigger one-shot multivibrator 463 which provides a binary one output pulse in response to a negative-going signal; this output pulse is applied via OR gate 325 (FIG. 5) as a READ WS signal to Working Store 72 so that the eight-bit addressed character in Working Store is applied to the eight input terminals of holding register 464; the pulse from one-shot multivibrator 463 is also delayed at time delay element 465 and then applied as a STROBE pulse to holding register 464;

d. primes two-input AND gate 466 which receives as a second signal the output pulses provided by AND gate 458.

The application of the STROBE pulse to holding register 464 effectively transfers the addressed Working Store character into the holding register. The latter may be eight clocked-data type flip-flops which are simultaneously clocked by the STROBE pulse.

After receiving the binary one TRANSFER(8) function signal, the system waits until the count in sector counter 450 matches the count in Line Counter 75. Before such match, passage of BIT CLOCK pulses to counter 455 is inhibited by the binary zero MATCH signal applied to AND gate 453. When the proper sector is positioned to receive data, the MATCH a signal becomes binary one and AND gate 453 is enabled by each BIT CLOCK pulse. The pulses from AND gate 453 increment counter 455 and are applied via time delay 459 to AND gate 458. The delay in element 459 is a small fraction of the BIT cLOCK pulse width.

When counter 455, which has been preset to a count of twenty, reaches count 23, signal (C) becomes binary one and effects a loading operation at eight-bit parallel-in, serial-out shift register 467. The latter by way of example may be of the type supplied by National Semiconductor Corp. as Model DM8590. The eight output signals from holding register 464 are applied to the eight respective input terminals of register 467 so that the LOAD signal, when binary one, transfers the character present in the holding register into the shift register 467. The latter cannot be clocked at this time (that is, data cannot be shifted therethrough) because AND gate 458 is inhibited by signal (B) until counter 455 reaches a count of thirty.

At the trailing edge of each BIT CLOCK pulse, Memory 82 tries to write the state of the output stage of register 467 into the appropriate Memory bit. For the first nine preamble bits, this writing attempt has no effect. The tenth BIT CLOCK pulse, however, corresponds to a data bit in Memory 82. The leading edge of this pulse increments the count in counter 455 to 30 thereby changing signal (B) to binary one and priming AND gate 458. The delayed version of this tenth BIT CLOCK pulse is then passed by AND gates 458 and 466 as the CLOCK signal to shift register 467; however, the latter is not clocked until the trailing edge of the delayed pulse. The trailing edge of the undelayed BIT CLOCK pulse writes the binary state of the output bit of shift register 467 into Memory 82, after which register 467 is clocked to transfer the second bit in the register to the output stage.

The BIT CLOCK pulse which effects a count of thirty in counter 455 also resets the counter to zero, thereby serving as the first pulse in a new cycle for counter 455. The next BIT CLOCK pulse increments the counter to one with its leading edge and writes the state of the output bit of register 467 into Memory 82 with its trailing edge. The trailing edge of the delayed version of this pulse then clocks register 467 again. This sequence continues so that an eight-pulse cycle at counter 455 is achieved, each ninth pulse resetting the counter to zero and thereby serving as the first pulse of a new cycle. The fourth pulse of each cycle (count three) triggers one-shot multivibrator 463 to read the addressed Working Store character and strobe into it holding register 464. Each eight pulse (count seven) increments counter 457 and loads register 467. In addition, each eighth pulse increments Character Counter 70 so that the next character is addressed at Working Store 72. The cycle continues until a count of 128 is achieved at counter 457 at which time the latter is reset along with flip-flop 460 and status flip-flop 230.

TRANSFER(9) FUNCTION OPERATION

In response to instruction No. 34, TRANSFER MEM to WS, the following binary one signals are provided by Operation Code Decoder 62: CLASS I; and TRANSFER(9). The CLASS I signal assures a six-pulse cycle at ring counter 130. The TRANSFER(9) signal effects the following:

1. applies a binary one UP ENABLE signal to the Up input terminal of Character Counter 70 via OR gates 287 and 328 (FIG. 5);

2. sets Status flip-flop 230 via OR gates 287, 234, one-shot multivibrator 235 and OR gate 226 (FIG. 5);

3. sets flip-flop 470 via two input AND gate 471 which is pulsed by the onset of the TRANSFER(9) signal because the second input signal to AND gate 471 is the $\overline{Q}$ signal from previously reset flip-flop 470; and 4. presets bit counter 455 to a count of 20 via AND gate 471 and OR gate 456.

The setting of flip-flop 470 effectively places Memory 82 in its READ mode. More specifically, the binary one Q signal from flip-flop 470 effects the following:

1. applies a binary one WRITE ENABLE signal to Memory 82, permitting the READ CLOCK pulses to be generated;

2. enables OR gate 454 to prime AND gate 453;

3. primes AND gate 472 to await each signal (D) pulse; and 4. primes each of two-input AND gates 481 through 488.

AND gates 481 through 488 receive their second input signals from respective ones of the eight output terminals of eight-bit serial-in, parallel-out shift register 473. The latter, by way of example, may be of the type supplied by National Semiconductor Corp. as Model DM8570. The data input terminal of register 473 is connected to receive the serial data signal from Memory 82. In addition, register 473 receives the output signal from AND gate 458 as a CLOCK signal, data bits being clocked along the register at the trailing edge of each pulse received from gate 458. The output signals from AND gates 481 through 488 are applied to respective data input terminals at Working Store 72.

As described in relation to TRANSFER(8) function operation, counter 455 cannot be incremented by READ CLOCK pulses until a match between sector and line counts is detected at comparator 451. When this occurs, each READ CLOCK pulse increments counter 455 which has been preset to a count of twenty. At count 30, a delayed READ CLOCK pulse is passed by AND gate 458, and the trailing edge of this pulse clocks register 473. However, before register 473 can be clocked the trailing edge of the undelayed READ CLOCK pulse reads the binary state of the tenth memory bit into the input stage of the register. Clocking of the register transfers this bit to the second stage. The tenth pulse from Memory 82 also resets counter 455 to a count of zero, thereby serving as the first pulse in an eight-pulse counter cycle. Operation continues from this point with the trailing edge of each READ CLOCK pulse reading data into the input stage of register 473 and the trailing edge of each delayed READ CLOCK pulse clocking register 473.

The eighth pulse (count seven) in each cycle of counter 455 provides a binary one signal (D) which effects the following:

1. increments counter 457;
2. applies a WRITE WS pulse via OR gate 309 (FIG. 5) to the WRITE input terminal of Working Store 72, thereby writing into the addressed Working Store slot the eight-bit character present in register 473; and
3. after a suitable delay by time delay 474, sufficient to permit completion of the writing operation at Working Store 72, provides a CLOCK CC signal via OR gate 336 (FIG. 5) which increments Character Counter 70 to address the next character slot in Working Store 72.

The cycle described above continues until all 1,024 bits in the addressed Memory sector are written into Working Store 72. At such time, counter 457 achieves a count of 128 and provides a signal which resets counter 457, flip-flop 470, and Status flip-flop 230.

LOCATE NEXT VACANT MEMORY FUNCTION OPERATION

This operational sequence is effected only in response to instruction No. 40 in Table II. As a preclude to a description of this instruction, it is to be noted that Memory Index unit 81 keeps track of which pages in Memory unit 82 have already been utilized to store data; this function is necessary in order to prevent destruction of the data on any page in Memory by writing over that data with some subsequently received data. More specifically, Memory Index 81 may be a solid state memory unit, for example, comprising four units of the type manufactured by Texas Instrument Company as Model No. SN7484. There are N-bits in Memory Index 81, where N is equal to the number of pages or tracks into which Memory unit 82 is segmented. Each of the N-bits in Memory Index 81 is set to binary one initially before any data is written into Memory 82. As each memory page or track receives data, the bit in Memory Index 81 corresponding to that page receives a binary zero WRITE signal. Consequently, by scanning the index unit, the system can ascertain the next sequential memory page which is available to receive data. Instruction No. 40 is used to store the number of the next available memory page in NVM register 84 in advance of its need. Memory Index 81 is selectively addressable so that the state of any bit in the Memory Index unit can be sensed at any time. In the operation sequence to be described in detail below, Page Counter 83 is utilized to address Memory Index 81. More particularly, this is accomplished by sequentially addressing the Memory Index bits by incrementing Page Counter 83 once during each cycle of ring counter 130. As long as the sensed state of the addressed bit in Memory Index 81 is binary zero, sequential incrementation of the Page Counter continues; that is, a binary zero bit in Memory Index 81 indicates that the memory page corresponding to that bit is already being used. Upon detection of a binary one at the addressed Memory Index bit, Page Counter incrementation terminates; the count in Page Counter 83 now represents the next available memory page number. This number is transferred to Next Vacant Memory 84 and a binary zero is written into the addressed memory index bit.

When the LOCATE NEXT VACANT MEMORY instruction, No. 40, is decoded by the operation code decoder 62, the latter provides the following binary one output signals: CLASS I; and LOCATE NVM function signal; there are no source or sink signals provided by this instruction.

The CLASS I signal, as described above, assures a six-pulse cycle for ring counter 130. The LOCATE NVM function signal, when binary one, performs as follows:

1. primes AND gate 367, the latter being a two-inpug AND gate which receives the $\overline{Q}$ output signal from flip-flop 368 as a second input signal;
2. enables OR gate 233 and in turn OR gate 234 to enable one-shot multivibrator 235; the latter provides a pulse to OR gate 226 to set Status flip-flop 230;
3. triggers one-shot multivibrator 369 to generate a pulse signal which performs the three following functions: resets flip-flop 368; resets each of the flip-flops in the Next Vacant Memory register 84; and resets all of the stages in Page Counter 83 via respective OR gates 371;
4. primes AND gate 373, a two-input AND gate which receives a second input signal from the Q output terminal of flip-flop 368;
5. primes AND gate 381, the latter being a three-input AND gate which also receives the T1 pulse from ring counter 130 and the memory index SENSE(1) signal; and
6. provides a binary one signal to the input of inverter element 375 which then applies a binary zero signal to each of AND gates 377(1) through (6), and each of NAND gates 378(1) through (6). AND gates 377(1) through (6), associated with respective ones of Page Counter stages 372(1) through (6), apply their output signals to respective OR gates 371(1) through (6) so as to be capable of resetting the various Page Counter flip-flops. Gates 377(1) through (6) are two-input AND gates which receive respective ones of six output signals provided by selectric-to-binary converter unit 379. NAND gates 378(1) through (6) have their output terminals connected to the set input terminal of respective ones of Page Counter stages 372(1) through (6). The second input terminals of these two-input NAND gates are connected to the six output terminals of the aforementioned selectric-to-binary code converter unit 379.

The timing sequence for the LOCATE NVM instruction proceeds as follows, it being remembered that status flip-flop 230 has been set, the stages in the Next Vacant Memory 84 have been reset, and the stages in the Page Counter 83 have been reset. Under these circumstances, the first bit in Memory Index 81 is addressed. Consequently, the SENSE 1 and SENSE O signals assume states determined by the state of the first bit in the Memory Index. More particularly, if page one of the memory 82 is occupied with data, the SENSE O signal is binary one and the SENSE 1 signal is binary zero. Assuming that this is in fact the situation, at time T1, AND gate 381 is not enabled because to SENSE 1 signal is binary zero. At time T2, Party Line Memory 245 is clocked; however, for this instruction, the Party Line Memory does not perform any significant function. At time T3, AND gate 221 cannot be enabled to reset status flip-flop 230 because AND gate 373 is inhibited by the binary zero $\overline{Q}$ output signal from flip-flop 368. Since the LOCATE NVM function signal and the Q output signal from flip-flop 368 have enabled AND gate 367, at time T3 AND gate 382, a two-input AND gate, provides a binary one CLOCK PC signal at the clock input terminal of Page Counter 83. This serves to increment the Page Counter to count number one. Consequently, Memory Index 81, whose address decoder section receives the Q output signal from each of the stages 372(1) through (6) now has its second slot addressed and the SENSE O and the SENSE 1 output signals assume respective states in accordance with the state of that slot.

T3 pulse is also applied to AND gate 374 which is inhibited by the binary zero output signal from AND gate 373. Since the status flip-flop is set, no new instruction is addressed at T4.

Let us assume that the second memory page is not yet being used, in which case the second slot in Memory Index 81, now addressed by Page Counter 83, provides a binary one SENSE 1 signal and a binary zero Sense O signal. Under these conditions, at time T1, AND gate 381 is enabled to set flip-flop 368. This provides a binary one signal at AND gate 373 which immediately applies a binary one signal to AND gate 374 and OR gate 220, and in turn to AND gate 221; AND gates 221 and 374 are thus primed to await the next T3 pulse. At time T2, nothing of significance occurs with respect to the LOCATE NVM instruction. At time T3, AND gate 221 is enabled and provides, via OR gate 222, a binary one RESET STATUS signal which resets status flip-flop 230. This changes the $\overline{Q}$ output signal from status flip-flop 230 to binary one to prime AND gate 182. In addition, the T3 pulse provides a binary one NVM ENABLE signal from AND gate 374 which signal is applied to the WRITE O input terminal at Memory Index 81 and as an enabling signal to each of two-input AND gates 383 and 384. Since Memory Index 81 is addressed at its second slot, the binary one WRITE O signal changes the state of the second Memory Index slot to binary zero. This now indicates that the second memory page is no longer vacant.

AND gates 383 and 384 each represent eight AND gates, each of which receives the SET NVM ENABLE signal. Each of the AND gates represented by AND gates 383 and 384 also receives a respective output signal from binary-to-selectric converter unit 386. The input signals to binary-to-selectric converter 386 are the Q output signals from each of stages 372(1) through (6) of Page Counter 83. Binary-to-selectric converter 386 provides an eight-bit selectric code representation of both the first and second characters in page counter 83. The enabling of AND gates 383 and 384 serves to transfer both Page Counter characters to respective sections NVM(1) and NVM(2) of Next Vacant Memory register 84. Thus, the number representing the next page upon which data is to be written in the memory unit is now stored in Next Vacant Memory register 84.

Also occurring at time T3 is the resetting of status flip-flop 230 via AND gate 373, OR gate 220, AND gate 221 and OR gate 222.

Since the status flip flop is now reset, the next T4 pulse increments Binary Counter 61, so that the next sequential instruction in Instruction Memory 160 is addressed.

It is important to note at this time the effect of changing the LOCATE NVM function signal to binary zero. More specifically, when this signal is binary zero, inverter 375 applies a binary one signal to each of AND gates 377(1) through (6) and NAND gates 378(1) through (6). This effectively permits the six output signals from selectric-to-binary converter 379 to control the states of the respective stages in Page Counter 83. The signals applied to selectric-to-binary converter 379, which control and determine the states of the six output signals from that unit, are provided by the Q and $\overline{Q}$ output terminals of each of the MAS(3) and MAS(4) flip-flops. Thus, for example, if MAS unit 85 has eight bits per character, there are sixteen signals from MAS(3) and sixteen signals from MAS(4) applied to selectric-to-binary converter 379. Thus, whenever the LOCATE NVM function signal is binary zero, the character in MAS(3) determines the number in Page Counter stages 372(1) through (3) and the character in MAS(4) determines the number in Page Counter stages 372(4) through (6). Thus, MAS(3) contains the first character of the current page count and MAS(4) contains the second character in the current page count. The count in Page Counter 83 is maintained at the number in these MAS slots whenever the LOCATE NVM function signal is binary zero. As a consequence of this interrelationship between MAS(3) and (4) and Page Counter 83, there exists a capability for these MAS slots to indirectly (that is through the page counter), address Memory Index 81.

The ERASE function signal is generated by Operation Code Decoder 62 in response to the presence in operation code store unit 169 of the ERASE instruction, No. 56 in Table II. The other signals generated by the Operation Code Decoder in this mode are the same as those generated in response to the LOCATE NVM instruction described above. The ERASE function signal primes AND gate 389, the latter being a two-input AND gate which also receives a T1 timing pulse from ring counter 130. At time T1, AND gate 389 generates a binary one WRITE 1 signal which enters a binary one in the Memory Index slot currently addressed by Page Counter 83. As described briefly above, this number by which the Page Counter addresses Memory Index 81, is received from MAS(3) and MAS(4). A binary one in any Memory Index slot indicates that the corresponding memory page or track is available to receive data. Since Memory 82 is of the type wherein prior data is automatically erased by writing in subsequent data, an indication in Memory Index 81 that a page is available in Memory 82 has the same effect, insofar as operation is concerned, an erasing data from that memory page or track.

INCREMENT AND DECREMENT FUNCTION OPERATION

There are two instructions, namely instructions Nos. 41 and 49, which effect a decrement function capability in the present invention, and four instructions, namely instructions Nos. 42, 43, 45 and 48, which effect an increment function in the present invention. To facilitate the present description, both of these functions are described below simultaneously.

For each increment and decrement instruction, the counter involved, if it is of the up/down type, receives an UP ENABLE (in the case of increment) or DOWN ENABLE (in the case of decrement) signal. Any counter designated as the unit to be incremented or decremented is then clocked to effect the incrementation or decrementation as the case may be; Binary Counter 61 is then incremented to effectuate the next sequential instruction. As a typical example, let us examine instruction No. 45, INCREMENT 2LCC. In response to this instruction, Operation Code Decoder 62 provides the following binary one signals: CLASS I; INCREMENT: there is no source signal; and 2LCC(sink). The binary one INCREMENT function signal provides the following actions:

1. enables OR gate 357 to prime two-input AND gate 391, the latter however remaining off in this mode because the CC(sink) signal is binary zero;
2. enables OR gate 392 to in turn prime AND gate 394 and also provide a binary one signal to inhibit inverter 395 (both AND gate 394 and inverter 395 have effect only in the case where Line Counter 75 is being incremented so that neither of these elements are considered in detail at this time);
3. enables OR gate 328 to in turn apply the UP ENABLE binary one signal to the up input terminal of each of Character Counter 68, Interword-Space Counter 69, and Second Line Character Counter 73. It is the latter with which we are concerned in the mode being described.

The 2LCC(sink) signal primes AND gate 396, the latter being a two-input AND gate which also receives the output signal from OR gate 357 and is therefore enabled in this mode, since OR gate 357 is enabled by the INCREMENT function signal as described above. The output signal from AND gate 396 primes AND gate 397 which awaits the T3 pulse from ring counter 130. In addition, the 2LCC(sink) signal primes each of two-input AND gates 398 and 399; however, these AND gates are operative only during a TRANSFER(1) function.

At time T1, nothing of significance occurs with respect to the INCREMENT 2LCC instruction. At time T2, Party Line Memory 245 is clocked; however, this also has no significance with respect to the INCREMENT 2LCC instruction. At time T3, AND gate 397 is enabled and applies a binary one CLOCK 2LCC signal to the clock input terminal of Second Line Character Counter 73. This clock signal in conjunction with the binary one UP ENABLE signal increments the Second Line Character Counter.

Identical sequences are followed for Character Counter 70 and Interword Space Counter 69 in response to respective instructions Nos. 42 and 48. In the case of Interword Space Counter 69, AND gates 401 and 356 serve the respective functions provided by AND gates 397 and 396 for Second Line Character Counter 73. Also, clocking of Character Counter 70 at T3 in this mode proceeds in the manner described above with AND gates 331 and 391 serving the functions provided by AND gates 401 and 396 respectively.

With respect to the DECREMENT function, only Interword Space Counter 69 and Character Counter 70 can be decremented in accordance with preferred system operation; therefore the only difference to be considered for the decrement operation is that the DOWN ENABLE signal, provided directly by the DECREMENT function signal, is applied to the down input terminal in Character Counter 70 and Interword Space Counter 69.

One other instruction which should be mentioned at this point is the INCREMENT LC instruction, No. 43 in Table II. This instruction differs from the other increment instructions in that after Line Counter 75 is incremented the new line count must be transferred, automatically, into slots 1 and 2 in MAS 85. The relationship of MAS(1) and MAS(2) to Line Counter 75 can be analogized to the relationships MAS(3) and MAS(4) to Page Counter 83. The departure from this analogy resides in the fact that OR gates 407(1) and 407(2) have output terminals which are directly connected to the clock input terminals of MAS(1) and MAS(2) respectively; in contrast, AND gates 326(3) through 326(N) are directly connected to clock input terminals of respective flip-flops in MAS(3) through MAS(N) and AND gates 326(1) and 326(2) feed through OR gates 407(1) and 407(2). The second input signal to these OR gates is the CLOCK LC(MAS) signal provided by AND gate 408 which receives as its input signals the T3 pulse from ring counter 130 and the output signal from AND gate 394. The latter AND gate is a three-input AND gate receiving as input signals the LC(source) signal, the LC(sink) signal, and the output signal from OR gate 392. The latter receives the RESET function and the INCREMENT function signals as its two input signals. Thus, in response to instruction No. 43 INCREMENT LC, the following binary one signals appear at operation mode decoder 62: CLASS I; INCREMENT; LC(source); and LC(sink). At T1, AND gate 409, which receives the output signal from AND gate 394, is enabled to apply a binary one CLOCK LC signal to the clock input terminal of Line Counter 75 which is incremented thereby. At T2, Party Line Memory 245, which serves no purpose for the increment function, is clocked. At T3, AND gate 408, which receives the output signal from AND gate 394, is enabled and applies a binary one CLOCK LC(MAS) signal to OR gates 407(1) and 407(2) to clock data into MAS(1) and MAS(2). This data comes from a pair of respective NAND gates 411 and 412, each representing eight NAND gates. One input signal for each of these NAND gates is the output signal from AND gate 394; the other input signal is a respective output signal from the binary-to-selectric converter unit 385. Converter 385 converts the first and second characters of Line Counter 75 from binary to selectric code and is connected to receive the Q output signal from Line Counter flip-flops 405(1) through (6). Thus, Line Counter 75 transfers a selectric version of its binary line count into MAS(1)and MAS(2) whenever a T3 pulse occurs and the RESET LC or the INCREMENT LC instruction is operative. It is to be noted that whenever there is a RESET LC or INCREMENT LC instruction present, transfer from MAS(1) and MAS(2) into the Line Counter is inhibited; thus, whenever the Line Counter is reset or incremented, it is important to also update MAS(1) and MAS(2) to conform to the new line count so that when the instruction is changed MAS(1) and MAS(2) cannot transfer the old number into Line Counter 75. At T4, Binary Counter 61 is incremented and a new instruction is addressed in Instruction Memory 160.

RESET FUNCTION OPERATION

There are three instructions, namely instructions Nos. 44, 46, and 47 in Table II, which effect a reset function. All three of the reset instructions effect similar sequences so that description of one, with a certain limited exception to be described below, serves as a description for all. Taking instruction No. 47, RESET CC, by way of example, this instruction provides the following binary one signals at operation code decoder 62: CLASS I; RESET; no source signal; and CC(sink). The RESET function signal, when binary one, provides the following functions:

1. enables OR gate 392 to inhibit inverter 395 so that the SET-RESET ENABLE LC signal is binary zero and the line count in MAS(1) cannot be automatically transferred into Line Counter 75;

2. enables OR gate 277 to prime AND gate 278 which awaits the T1 pulse from ring counter 130.

The CC(sink) signal, when binary one, provides the following functions:

1. primes AND gate 391 which however is maintained off in this function mode due to the fact that neither the DECREMENT nor INCREMENT function signals is binary one;

2. primes AND gate 411, a two-input AND gate which receives as a second input signal the output signal from AND gate 279; since the latter is enabled only when the TRANSFER(1) signal is binary one, AND gate 411 is not enabled in this sequence;

3. primes AND gate 412, a two-input AND gate which receives as a second input signal the output signal from AND gate 278; the output signal from AND gate 412 is the RESET CC signal which is connected directly to the reset input terminal of each stage in Character Counter 70. (And gate 399, a two-input AND gate receiving the 2LCC(sink) signal and the output signal from AND gate 278, serves an analogous function to that of AND gate 412 for the RESET 2LCC instruction; AND gate 413, a two-input AND gate receiving the LC(sink) and the output signal from AND gate 278, provides an analogous function to that of AND gate 412 for the RESET LC instruction).

At T1, AND gate 278 is enabled to in turn enable AND gate 412 and thereby reset Character Counter 70. At times T2 and T3, nothing of significance occurs for the RESET CC or RESET 2LCC instructions; however, with regard to the RESET LC instruction, the T3 pulse enables AND gate 408 because the RESET, LC(source) and LC(sink) signals are all binary one so that AND gate 294 and, in turn, AND gate 408 are enabled at T3. This provides the CLOCK LC(MAS) signal which, as described above, is applied to the clock input terminals of each of MAS(1) and MAS(2) so that the newly reset count in Line Counter 75 is transferred into MAS(1) and MAS(2).

At time T4, for all of the reset functions, binary counter 61 is incremented via AND gate 182 to effect a change in the instruction at Instruction Memory 160.

BRANCH FUNCTION OPERATION

Instructions Nos. 9–18 in Table II accomplish Branch functions and are either CLASS II or CLASS III types depending upon whether or not a match character (to be compared for purposes of determining if a branch is appropriate) is made part of the instruction. If it is, the match character is transferred directly from instruction memory 160 into Match Character Register 64; if not, the character is otherwise transferred into Match Character Register 64 from some other unit by means of a prior instruction. For all of instructions Nos. 9–18, a binary one BRANCH function signal is provided by operation Code Decoder 62 to:

1. prime two-input AND gate 343, the other input signal to which is provided by OR gate 344;

2. prime two-input AND gate 345, which receives as a second input signal the MATCH signal from AND gate 346; AND gate 346 is a two-input AND gate which receives as one of its input signals the COMPARATOR ENABLE signal from the output terminal of AND gate 343; the second input signal for AND gate 346 is the CONDITIONAL MATCH signal from comparator 347, the latter providing a binary one signal whenever the bits at a first group of its input terminals correspond identically to the bits at a second group of its input terminals.

Each terminal in the first group of input terminals for comparator 347 receives a $\overline{Q}$ output signal from a respective stage in Match Character Register 64. Each of the second group of input terminals receives a signal from a respective group of wired-or NAND gates. There are five such NAND gates shown in the drawings in wire-OR configuration, these gates being designated by the reference numerals 351–355 inclusive. Taking NAND gate 351 by way of example, there is one such NAND gate for each bit in I/O Buffer 68. Each of gates 351 receives the I/O(sink) signal as well as the Q output signal from a respective one of the I/O Buffer stages. Likewise, NAND gate 352 associated with the Transfer Counter 297, NAND gate 353 associated with the Interword Space Counter 69, NAND gate 354 associated with the Character Counter 70 and NAND gate 355 associated with Line Counter 75 receive their respective UNIT(sink) signals as well as the Q output signal from each stage of their respective sink units. Thus, when any one of these UNIT(sink) signals is binary one, the states of the flip-flops in that unit determine the states of their respective NAND gates, so that the logic complement of the character in that unit is fed into the second group of input terminals at comparator 347. When this character is identical to the character applied to the first group of input terminals, namely from the $\bar{Q}$ output terminals of each Match Character Register stage, the CONDITIONAL MATCH output signal from comparator 347 is binary one.

As an example of Branch function operation, instruction No. 16, BRANCH-TRANSFER NAR to BC on Match of MCR and IWSC, will be described in detail. This instruction, when addressed at the instruction memory, provides the following binary one signals at the output of operation code decoder 62: CLASS II; BRANCH; NAR(source); and IWSC(sink). The CLASS II signal assures an eight-pulse cycle at ring counter 130 wherein a particular function is performed during the first six pulses of the cycle and then the address of the next instruction to be effected if there is a match detected at comparator 347, is transferred from Instruction Memory 160 into Next Address Register 63. The BRANCH function signal primes the various gates described above. The NAR(source) signal primes AND gate 287 which receives as its second input signal the Q output signal from a respective stage of the next address register 63.

The IWSC(sink) signal:

1. enables OR gate 344 to prime AND gate 343, the latter also receiving the BRANCH function signal;
2. primes AND gate 356, a two-input AND gate, which receives a second input signal from OR gate 357 which is enabled only upon receiving a binary one INCREMENT or DECREMENT signal and therefore is not enabled in this mode;
3. primes AND gate 358 which is only enabled in a TRANSFER (1) function mode and therefore likewise is ineffective during Branch function operation;
4. primes AND gate 359 which receives as its second input signal the output signal from AND gate 278, the latter being enabled only in the TRANSFER(1) function mode or the RESET function mode so that AND gate 359 also plays no part in Branch function operation; and
5. primes the various NAND gates represented by NAND gate 353 at the second group of input terminals for comparator 347.

Whenever there is a character match at comparator 347, a CONDITIONAL MATCH signal primes AND gate 346. The MATCH signal from this AND gate enables two-input AND gate 345 which was primed by the BRANCH function signal. Gate 345 primes two-input AND gates 365 and 421 via OR gate 366. Gate 365 receives a second input signal from AND gate 364 which is actuated or not at T4 in accordance with the logic complement of a respective one of PLM flip-flops 245 via inverter 290. Gate 421 receives a second input signal from two-input AND gate 361 which is enabled at T4 in accordance with the state of its associated flip-flop in PLM unit 245.

The branch function in effect is a conditional instruction which looks for a match at comparator 347 between the character in Match Character Register 64 and the character at a selected one of I/O buffer 68; Transfer Counter 297; Interword Space Counter 69; Character Counter 70; and Line Counter 75. If in fact there is a match, the number in the second portion of the branch instruction, namely that portion which is addressed at the instruction memory and read into Next Address Register 63 at T7, is transferred to Binary Counter 61. Consequently, the next instruction addressed at Instruction Memory 160 is not the next sequential instruction stored in the Instruction Memory but rather the instruction at the address corresponding to the Next Address Register contents. If in fact no match occurs, Binary Counter 61 is incremented at the completion of the eight or 10-pulse cycle of ring counter 130; the next sequential instruction in Instruction Memory 160 is then addressed.

The following detailed description of instruction No. 16 proceeds from a point in the last ring counter cycle for the previous instruction. At T4 in that cycle, Binary Counter 61 is incremented so that the next instruction, assumed here to be No. 16, is addressed. At T5, this instruction is read by OR gate 181 from Instruction Memory 160 into Operation Code Store 169. For instruction No. 16, this causes a binary one CLASS II signal to be provided by operation code decoder 62 and this signal primes AND gate 141 at ring counter 130. This assures that the present cycle of ring counter 130 extends past time T6 so that at least an eight-pulse cycle is generated. At time T7, the Instruction Memory is read again, and the number in Instruction Memory 160 is fed into Next Address Register at T8 via AND gates 163 and 166. Since we are considering a CLASS II instruction, AND gate 144 is not primed so that the pulse from oscillator 151 following timing pulse T8 reinitiates the cycle for ring counter 130. At the start of the next ring counter cycle, the first portion of the present instruction, namely the four-part operation code portion, is stored in Operation Code Store 169, and the next address portion of the present instruction is stored in the next address register 173.

Nothing of significance occurs at T1 in the Branch mode.

At T2, PLM unit 245 is clocked so that the complement of the character in Next Address Register 63 is transferred into PLM 245. At T3, assuming the presence of a MATCH output signal from AND gate 346, nothing of consequence occurs with respect to the presently described instruction. At T4, AND gate 364 assumes a state which is the logic complement of the PLM flip-flop with which it is associated, there being one AND gate 364 for each binary counter stage. Also, at T4, AND gates 361 assume the state of their respective PLM flip-flops. Actuation of AND gate 364 enables AND gate 365, the latter receiving a second binary one signal via OR gate 366 which is enabled by AND gate 345 because of the presence of a binary one MATCH signal and a binary one BRANCH signal. Or gate 366 also enables AND gates 421. Thus, AND gates 365 and 421, and actually all of the AND gates represented by AND gates 365 and 421 are primed by OR gate 366 so as to assume a binary one or binary zero state in accordance with the state of the PLM flip-flop with which it is associated. If AND gate 365 is binary one, it provides a SET BC signal whereby its respectively associated stage in Binary Counter 61 is set. If AND gate 421 is enabled, it provides a binary one RESET BC signal via OR gate 362 whereby its respectively associated stage in binary counter 61 is reset. It is also noted that at T4 AND gate 182 provides a CLOCK BC signal to the clock input terminal of the first stage in Binary Counter 61. As described above, the clocked-data type flip-flop is designed such that a binary one SET or RESET signal applied to the set and reset input terminals respectively overrides the clocked data input. Thus, irrespective of the nature of the input signal applied to the data input terminals at the time this CLOCK BC signal is applied to binary counter 61, the SET BC signal (from AND gate 365) and RESET BC signal (from AND gate 421 via OR gate 362) dominate.

With the next address now in binary counter 61, at T5, the next addressed instruction is read from instruction memory 160, and at T6, this instruction is transferred into operation code store 169. The sequence occurring in response to subsequent pulses from ring counter 130 depends upon this newly addressed instruction.

Referring back to time T4 in the cycle for instruction No. 16, if there is a binary zero MATCH signal provided by AND gate 346, AND gate 345 remains inhibited and Binary Counter 61 receives neither a BC SET nor BC RESET signal. The character from NExt Address REgister 63 is in fact clocked into the party line memory at T2, but this has no effect without match. Thus, BC 61 is incremented rather than preset at T4 and the next sequential instruction becomes effective.

Instruction No. 11 of Table II, which is also designated BRANCH-TRANSFER NAR to BC on MATCH of IWSC AND MCR, differs from instruction No. 16 only in that the former is a CLASS III type instruction. This means that in addition to the next address portion of the instruction there is a third portion, namely the match character portion. The detailed description of this instruction differs from the detailed description of instruction No. 11 only in that a binary one CLASS III, rather than CLASS II signal is provided by the operation code decoder 62 at the T6 pulse occurring immediately after this instruction is addressed. Thus, ring counter 130 provides a ten-pulse sequence wherein at T10 the match character section of the instruction is transferred into Match Character Register 64 for purposes of comparison with the character in Interword Space Counter 69.

ALTERNATIVE MULTIPLEXING OPERATION

The preferred embodiment described above in relation to FIG. 5 is based on a multiplexing technique wherein all N terminals associated with the system are sampled in turn and a unit of data associated with the sampled terminal is processed, if ready, before the next terminal is sampled. For some applications, it is desirable for the system to have M associated terminals wherein only N can be actively serviced at a time, where M> N. More particularly, in the system as disclosed, it is important that the time between multiplexer samples of an active terminal, for example terminal J, not be so long as to permit the typist to begin typing a line of text into Terminal Line Buffer 65(J) before the previous line has been transferred to Internal Line Buffer 66; otherwise spaces could appear in the text where not intended. There are a number of approaches to solving this problem. For example, the Terminal Line Buffer can be designed to contain two or more lines in respective registers which are unaffected by transfer of the contents in one register to Internal Line Buffer 66. Each carriage return character signifying the end of a line would set associated logic circuitry to cause the next line to be received by a different register. Still another solution to the problem is to duplicate (or further multiply) the processing circuitry and process two (or more) terminals simultaneously in respective processors. Still another solution would be to change Memory 82 from intermediate speed addressable type (e.g., magnetic disk) to high-speed addressable type (e.g., magnetic core) since it is the access time for a disk-type memory which consumes far more time than any other processing function. While each of these solutions has its own merit, they all involve considerable additional cost which can be avoided by utilizing the modified multiplexing technique described below. This technique is based on the supposition that not all of the terminals associated with a processor will be in use at the same time. For example, it is assumed that in the usual situation, no more than N terminals out of a total of M are requesting service from the processor. If more than N terminals request service, only the first N to so request are serviced and the remainder are locked out until servicing of one of the N serviced terminals has been completed. As servicing of a terminal is completed, the system is able to service another requesting terminal. The above technique is implemented by the circuit illustrated in FIG. 7 wherein circuitry for only two terminals, No. 1 and No. J is illustrated along with additional control circuitry therefor. Like elements for each terminal are designated by the same reference numerals but are followed by the terminal number in parenthesis. Each terminal includes the Data Ready flip-flop 216 described above in relation to FIG. 5 which is set by the TERMINAL READY pulse provided by OR gate 108 for that terminal in FIG. 4. The reset circuitry for the Data Ready flip-flop is not illustrated in FIG. 7 but is the same as described in relation to FIGS. 4 and 5. An additional set-reset flip-flop 501 is provided for each terminal, receiving its set input signal from a respective inverter 502 which is fed by three-input NAND gate 503. The reset signal for each flip-flop 501 is provided by a respective two-input AND gate 504. The Q output signals from Data ready flip-flop 216 and flip-flop 501 at each terminal are applied to a respective two-input AND gate 505 which replaces the AND gate 212 of FIG. 5. The TERMINAL READY pulse from each terminal, in addition to setting Data Ready flip-flop 216, is applied as an input signal to NAND gate 503. The priming signal from the appropriate stage in ring counter 202 of FIG. 5 is applied as an input signal to a respective AND gate 504. The $\bar{Q}$ signal from flip-flop 501 is connected as a second input signal to NAND gate 503.

There is also provided, common to all terminals, an N-capacity Up/Down Binary Counter 506 which receives its UP enabling signal from a multiple-input NAND gate 507 which in turn is connected to receive the output signals from all of NAND gate 503. The DOWN enabling signal for counter 506 is a RELEASE PSR function signal supplied by Operation Code Decoder 62 in response to an appropriate instruction received from Instruction Memory 160. This function signal is also applied to a two-input OR gate 508 which receives the output signal from NAND gate 507 as its second input signal and applies its output signal to a one-shot multivibrator 509. Any output pulse from the latter acts to clock counter 506 which is thereby incremented or decremented in accordance with whether the UP or DOWN enabling signal is binary one.

In operation, assume flip-flops 216 and 501 to be initially reset at all terminals and that counter 506 registers a count of zero indicating no terminals are being serviced. If terminal No. 1 provides a binary one TERMINAL READY signal, Data Ready flip-flop 216(1) is set and NAND gate 503(1) is turned off. The latter thus sets flip-flop 501(1) via inverter 502(1). In addition, a binary zero signal is applied to NAND gate 507 to apply a binary one UP enabling signal to counter 506. This latter signal triggers one-shot 509 to increment the counter. Thus, terminal No. 1 is now active and is serviced by the system as soon as ring counter 202 (FIG. 5) has a binary one in its first stage. When the latter occurs, a binary one signal is applied to AND gate 504(1) which remains inhibited by the binary zero RELEASE PSR function signal.

As each terminal is ready for servicing its associated NAND gate 503 is disabled. Each of these NAND gates applies a binary zero to NAND gate 507 each time one of the NAND gates 503 is disabled, and consequently counter 506 is incremented. In addition, flip-flop 501 is set each time its associated NAND gate 503 is disabled. When flip-flops 216 and 501 are set, AND gate 505 provides a DATA READY signal which is terminated by resetting of flip-flop 216 when the ready terminal is serviced. When counter 506 reaches a count of N, it applies a binary zero to all of NAND gates 503. This prevents all of these gates from turning off in response to a binary one TERMINAL READY pulse, and consequently those flip-flops 501 which are not yet set cannot be set. In addition, counter 506 cannot be incremented.

After one of the N terminals being serviced has its document processing completed, a binary one RELEASE PSR function signal is provided and decrements counter 506. In addition, this function signal enables AND gate 504 at whichever terminal the document processing has just been completed to thereby reset flip-flop 501 at that terminal. The next terminal generating a TERMINAL READY pulse then increments counter 506 and sets its flip-flop 501 to permit servicing.

In addition to being less expensive than the above described prior art techniques, the present system avoids locking out a terminal being serviced.

DESCRIPTION OF OPERATING MODES

Operation of the hardware components described above to effect special purpose processing is achieved by appropriate programs stored in instruction memory 160. The programs required to effect text processing are listed in Appendix A attached hereto. The programs are set forth as respective lists of instructions arranged in appropriate sequences. By way of example only, one illustrative set of operating programs have been disclosed. However, in order to facilitate an understanding of these processes by those not skilled in the programming art, the following brief verbal descriptions of the various programs and hence the various system operation modes are provided.

SELECT MODE

When a terminal is in none of the input Edit, List or Print modes, it is automatically in the Select mode. From the Select mode, the terminal enters any of the other five major modes when the appropriate control character (for example, B for input, E for Edit, P for Print, L for List, T for Special Print, W for Special List and X for Erase) is typed in at the first character location of the line. The terminal remains in the mode thus selected until that mode is expressly terminated such as by detection by an "end-of-text" character (*) or "end-of-correction" character (#), at which time the terminal is automatically returned to the Select mode. The universal control character (a capital comma) is not used in the Select mode.

Assume terminal J has been off for a period of time and then turned on. The next time multiplexer 11 samples terminal J, Binary Counter 61 is set to zero to address the first instruction in Instruction Memory 160. A count of four is then placed in Next Address Register 63 and transferred to Transfer Counter 297. This permits MAS(5) to be addressed so that the next instruction can transfer into MAS(5) the address of the instruction to be performed for terminal J during the next multiplexer cycle in which terminal J is found ready. The standard justified line length (i.e., the number of characters for a justified line) is then transferred to MAS(10); if the desired justified line length is other than the predetermined standard length, the operator is capable of indicating this to the system. The entire contents of MAS 85 are transferred to PSR 67(J) after which the INTERROGATE NEXT CHANNEL instruction is evoked and multiplexer scanning resumes. Scanning continues until the next active terminal is encountered by the multiplexer.

INPUT MODE OPERATION

Assume that terminal J is the next active terminal found, and that it is ready to begin an input mode of operation. The typist has typed the "begin text character" (B) followed by a carriage return, the latter serving to set Data Ready flip-flop 216 for terminal J so that when the multiplexer samples terminal J it suspends scanning and changes the active instruction. The next instruction is TRANSFER TLB to ILB which acts to transfer the "begin text character" and carriage return character to ILB 66. The contents of PSR 67(J) are then transferred to MAS 85. The number in MAS(5) is transferred to BC 61; this number is the next address number that was put in MAS(5) during the previous sample of terminal J when in Select mode. The next instruction is therefore that residing at this next address. The above illustrates how in one multiplexer cycle the system can keep track of where in the program processing should begin in the next multiplexer cycle. More specifically, the desired instruction address for entry into the program during the next cycle is placed in MAS(5), transferred to PSR 67(J) where it remains during processing operations for other terminals, and is then recalled when terminal J is once again sampled by multiplexer 11 and found ready.

The "begin text character" and carriage return character are then transferred to WS 72, the transfer continuing character-by-character until the carriage return character is detected at I/O Buffer 68 by character detector 335. When the carriage return character is so detected, the entire line will have been transferred from ILB 66 to WS 72. Character Counter 70 is then reset to point to the first character position or slot in WS 72 and the first character of the line is transferred from WS 72 to I/O 68. If this character is a "begin text character" as we have in fact assumed, operation proceeds as described in the following paragraph. If some other character is detected instead, operation proceeds in accordance with the function signified by that character. If some improper character is detected a question mark character and carriage return character are placed in the first and second character slots, respectively, of WS 72 and transferred via ILB 66 to TLB 65 from which the question mark is displayed at terminal J to indicate to the typist that she has made a mistake. The address SO207, which serves as entry to the select mode, is then stored in MAS(5) so that the Select mode can be entered the next time terminal J is sampled and found ready. The contents of MAS 85 are transferred to PSR 67(J) where they are stored until the next time terminal J is ready and is sampled by the multiplexer. Multiplexer scanning is then resumed until another active terminal is found.

We have assumed that a "begin text character" was the first character typed in by the typist. Upon its detection in character slot one of WS 72, the system allocates the next available track or page in MEM 82 to terminal J. To do this, the number in NVM register 84 is transferred to Page Counter 83 which then directly addresses the desired track in Memory 82. Memory index 81 is then scanned to find the next vacant page number which is transferred to NVM 84. The latter is thus utilized to keep the number of the next available page number ready for use, and is updated each time that next available page is in fact used. MAS(3) and MAS(4) are then transferred to character slots one and two respectively in WS 72, effectively placing the two-digit number currently in Page Counter 83 into WS 72. A carriage return character is then transferred to WS character slot three and the contents of the first three character slots are transferred via ILB 66 to TLB 65 for terminal J. The page number is thus displayed for the typist to use as a future reference in summoning forth the document about to be typed. Instruction address I0210, which serves as entry to the input mode, is placed in MAS(5) and transferred to PSR 67(J) to set up the program entry point in the next multiplexer cycle in which terminal J is ready. Multiplexer scanning is then resumed.

It is assumed that the third time terminal J is ready a line of text characters and a carriage return character are present in TLB 65. These are transferred to ILB 66 and the contents of PSR 67(J) are transferred to MAS 85. The reentry address, namely the I0210, is then transferred to binary Counter 61 and the line is transferred to WS 72.

Assuming that the line of text has a single character mistake, the operator or typist can correct this by depressing the backspace key until the incorrect character is reached and then by typing the correct character over the incorrect character. As the line is transferred from ILB 66 to WS 72 via I/O 68, the presence of either a backspace character or carriage return character in I/O 68 is sensed by detector 335 and stops the transfer, leaving that character in I/O 68 as well as in WS 72. This character is compared to the backspace and carriage return characters at comparator 347 to determine the nature of the character which has stopped the transfer. If a backspace character has stopped the transfer, as assumed herein, Character Counter 70 is decremented twice so as to address the character slot prior to the backspace character in WS 72, namely the incorrect character. The transfer from ILB 66 to WS 72 is then resumed whereby the next character transferred is put in WS 72 in place of the incorrect character. The transfer from ILB 66 to WS 72 continues until a carriage return character is detected by detector 335, indicating that a complete line has been transferred to working store 72. This line of text is then transferred to MEM 82 at a location in memory dependent upon the numbers present in Page Counter 83 and Line Counter 75. These counts are kept current for each terminal by setting the Page Counter with each page number as used and incrementing the Line Counter with each new line. PSR 67 for each terminal is employed to keep track of these page and line numbers while other terminals are being serviced. More specifically, MAS(1) and MAS(2) always contain the number in Line Counter 75 and MAS(3) and MAS(4) contain the number in Page Counter 83. After a line of text from terminal J has been processed, these line and page numbers are transferred to PSR 67(J) where they remain until the next time data for terminal J is processed. Meanwhile, the PSR contents for other terminals are fed to MAS 85 when data from those terminals are processed so that the current page and line count for those terminals can be placed in the page in line counters for use during processing.

The line of text is transferred to MEM 82 from WS 72. After the entire line has been transferred to MEM 82, Line Counter 75 is incremented, which also increments the line count in MAS(1) and MAS(2). The line count is then compared with the number representing the maximum number of lines per page, for example, 30 the comparison taking place at comparator unit 347. If there is no match, and there obviously will not be for the first line on a page, the entry address for Input mode I0210, is placed in MAS(5) and the entire contents of MAS 85 are transferred to PSR 67(J). Multiplexer scanning resumes again.

Assume that after the typist has finished typing the second line, or possibly before finishing the second line, it is found that the entire line is badly garbled and should be ignored or "killed." This can be done by typing in the universal control character (capital comma) followed in turn by "K" (kill line character) and a carriage return. The carriage return character sets Data Ready flip-flop 216 for terminal J so that when multiplexer 11 reaches this terminal during its scan operation the contents of TLB 65(J) are transferred to ILB 66. The line is then transferred to WS 72, character-by-character, until the carriage return character is sensed by detector 335. At this time, Character Counter 70 is decremented three times so that it addresses the second character preceding the carriage return in WS 72. This character is transferred to I/O 68 where it is compared with a universal control character in comparator 347. Upon a match, Character Counter 70 is incremented to address the "kill line character" in working store 72 which is likewise transferred to I/O 68. Upon detection of the "kill line character" at I/O 68, Character Counter 70 is reset and the entire contents of MAS 85 are transferred to PSR 67(J). Multiplexer scanning is then resumed. Note that the line of text containing the "kill line character" was not transferred to Memory 82 but rather remains in WS 72 until it is written over with subsequent characters and thereby destroyed.

Subsequent lines of text from terminal J are handled in a similar manner to the previous two if they contain either backspaces or "kill line characters." Each line is transferred into WS 72 until detection of a carriage return character. Where a line is not killed, it is transferred into MEM 82. At some stage in this process, a complete page (of 30 lines, for example) is finished. After each line is transferred into memory, Line counter 75 is incremented and the count compared to the number 30 in comparator 347. When there is a match, an end-of-page character is transferred via Next Address Register 63 to character slot one in WS 72. The two-digit number in NVM register 84 is transferred to character slots two and three of WS so that the next available memory page now appears therein. The first three characters in WS 72 are then transferred to MEM 82 so that this line, containing the "end of page character" followed by the next available page number, is transferred to MEM. For this purpose, the last line of every memory page is reserved for this non-text information. Specifically, this information tells the processor which page number in Memory 82 should sequentially follow the present page for the document being processed. This technique permits the system to use sequential memory pages as needed for any terminal without regard to keeping the pages of a given document in sequence. When, in the Print or List modes, an "end of page" character is sensed at the beginning of any line, the system merely determines the next two numbers in order to find the page in memory at which the document is continued. This technique is called document chaining. After transferring the document chaining information to Memory 82, the system determines the next vacant memory page and places its number in NVM register 84. The contents of MAS 85 are transferred to PSR 67(J) and multiplexer scanning is once again resumed.

Processing of text lines continues as described above, line by line, until finally the last line of the document is reached. After typing the last line of the document the typist types a universal control character (capital comma), an "end of text" character (*), and a carriage return. This last line is processed in the same manner as the lines previously described so that the line is stored in WS 72. When the carriage return character is detected at I/O 68 by detector 335, transfer into WS 72 is terminated and the character two spaces preceding the carriage return is examined. If this character is a universal control character, as assumed herein, the next character, namely the "end of text" character, is transferred to the I/O 68 and sensed. When this character is in fact sensed as an "end of text" character, the character counter is reset and the contents of WS 72 are transferred to MEM 82. Thus, the entire line, including the universal control character and the "end of text" character can be recognized when the stored line is later read from MEM 82.

It is important to note that after transferring any line of text into WS 72 from ILB 66, the character two spaces preceding the carriage return character is sensed by transferring it into the Input/Output Buffer and providing an appropriate instruction to compare this character with some predetermined character at comparator unit 347. As described above, if a universal control character is present in this space, and is followed by a "kill line character," the line in WS 72 is not transferred into memory and multiplexer sequencing is resumed. If the universal control character is present and followed by an "end of text" character, the system proceeds as described above by transferring the entire line, including the universal control character and the "end of text" character into memory. If the universal control character is present and followed by an "insert" control character (I), another procedure is followed which is described in greater detail below in reference to Edit mode operation. If a universal control character is present and not followed by any of the three abovementioned control characters, the line is transferred into memory and control of the system is returned to the multiplexer which again resumes scanning.

It should be noted also that the typist is capable of changing from one document to a second when in the middle of typing the first. More specifically, if it is desired to call forth an already stored document while a second document is being typed, the typist types a universal control character followed by an "end of text" character and a carriage return. This puts the terminal back in Select mode and the typist proceeds to enter the Print mode or any other mode for any document related to terminal J. To later get back to typing the first document, the typist must enter Edit mode and insert the remaining material to be typed in the manner described below regarding the insert capability of the system.

PRINT AND LIST MODE OPERATION

To enter any of the Print, List, Special Print or Special List modes, wherein it is desired to have a stored document or part thereof printed out at terminal J or special terminal K, the operator at terminal J types in the following characters in sequence:

1. P (the print function character), L (the list function character), W (the special print function character), or T (the special list function character);
2. The first digit of the two-digit number of the first line to be printed or listed;
3. The second digit of the two-digit number of the first line to be printed or listed;
4. The first digit of the two-digit number of the memory page to be printed or listed;
5. The second digit of the two-digit number of the memory page to be printed or listed;
6. Space;
7. The first digit of the two-digit number of the last line to be printed or listed;
8. The second digit of the two-digit number of the last line to be printed or listed;
9. The first digit of the two-digit number of the last page to be printed or listed;
10. The second digit of the two-digit number of the last page to be printed or listed; and
11. Carriage return.

The starting line and page numbers, appearing in spaces two through five of the typed line, are numbers which are known to the typist. Specifically, if the terminal is in the List mode, the typist knows the starting memory page number for the document to be displayed for the typist during Input mode. The starting line number is 01. In Print mode, the document will already have been displayed in a previously effected List mode and during List each memory page and line number are displayed. The ending page and line numbers, if known, are typed in spaces seven through ten of the entry line; if not known the typist can insert "99" in these spaces for both page and line and listing or printing of the document will stop when the "end of text" character is detected.

Upon receiving the initial print or list mode line, the processor transfers it to WS 72 and then enters the starting and ending page and line numbers in the appropriate slots in MAS 85. The first character in WS 72 is examined. Assuming a Print mode, the print character "P" is detected and the print program entry address (P0306) is transferred to MAS (5). The entire contents of MAS 85 are then transferred to PSR 67(J) and multiplexer scanning resumes.

While the multiplexer is scanning and servicing other terminals, the typist, when ready to receive the document, depresses the carriage return key which enables OR gate 108 in FIG. 4 to set Data Ready flip-flop 216 for terminal J. Thus, the next time the multiplexer samples terminal J, it finds it ready to receive data and scanning of the multiplexer is suspended. The contents of PSR 67(J) are transferred to MAS 85 and the justified line length (previously transferred to MAS(10) and stored in PSR slot 10 during the initialization of the subject document before it was stored into the system) is transferred to Interword Space Counter 69. The current line and page number, which at this time are those supplied by the typist upon entering the Print mode, are transferred to WS 72 and then examined to see if they correspond to the last line and page numbers of the material to be printed. If there is such a correspondence, the subject line is retrieved from memory and returned to terminal J for display. In addition, the entry address for the Select mode (S0207) is placed in MAS(5) for transfer, along with all of the MAS 85 contents, to PSR 67(J).

If there is no correspondence between the current and last page and line numbers, the current line is transferred from MEM 82 to WS 72 with the first character in the line being placed in the first character slot in Working Store. After the transfer, the first character in Working Store is examined to see if it is either a carriage return, a universal control character, or an end of page character. Since we are considering the first line of the document, this is not likely; however, this discussion is kept sufficiently general to be applicable to subsequent lines. If the first character is a carriage return, it is indicative of the start of a new paragraph, it being assumed herein that the spacing between paragraphs will be double the spacing between lines in a paragraph. In such case, the carriage return character is transferred to ILB 66 and in turn to TLB 65, the multiplexer scanning is once again assumed. If the first character is not a carriage return but is a universal control character, the character immediately following the universal control character is examined to determine the function to be performed and the appropriate address in the program which is appropriate. The possible functions to be indicated at this point are flush right, flush left, center, header, insert and end of text. The sequences followed to achieve these functions are described in detail subsequently. For present purposes, it is assumed that there is no universal control character present in the first character slot in Working Store. If the first character in WS 72 is an "end-of-page" character, the end-of-page sequence, to be described below, if effected. Assuming as we have here that neither the carriage return, universal control character, nor end of page character are present in the first character slot of WS 72 at this time, Character Counter 70 and Second Line Character Counter 73 are incremented so that each registers a count of two, and Interword Space Counter 69 is decremented so that it registers a count which is one less than the number of characters in a justified line. The second character in Working Store is then transferred to I/O 68 so that this character can be examined to see if it is a control character. Before examining this character, however, the count in Interword Space Counter 69 is examined to see if it is equal to one, in which case a sufficient number of characters to comprise a justified line have been examined, and the justification routine, described in detail herein below, is effected. If the count in Interword Space Counter 69 is not equal to one, the character transferred from working store character slot two into I/O 68 is examined to see if it is a carriage return character or a universal control character. The former indicates the following: the number of characters examined thus far is insufficient for a justified line yet the physical end of a memory line has been reached. If this is the case, the next physical line in memory is brought to WS 72 in order to get sufficient number of characters to display a justified line. This process also is described in detail below. If the character in the input output buffer is a universal control character, a check is made to see if the next character is an "insert" control character, indicating that text material on some other memory page is to be inserted at this point. The process by which this inserted subject matter is retrieved and in fact inserted is described in detail hereinbelow. For present purposes, it is assumed that the character presently in I/O 68 is neither a carriage return character nor a universal control character. Under such circumstances, Character Counter 70 and Second Line Character Counter 73 are incremented and Interword Space Counter 69 is decremented. The next character in working store is now transferred to I/O 68 and the procedure described above for the previous character is repeated. More specifically, a check is made to see if sufficient characters to provide a justified line have been examined, and if not, the character in I/O 68 is checked to see if it is a carriage return, or a universal control character followed by an insert control character.

Let us assume that a sufficient number of characters in working store have been examined to comprise a justified line. Under such circumstances, the count in Interword Space Counter 69 is equal to one. There are five possibilities which may exist:

a. A carriage return character is the last character examined as part of the justified line. Under these circumstances, the carriage return is not counted as a character, but instead as an interword space which must be added to achieve a justified line.

b. The character immediately following the last character examined is a carriage return, in which the line is justified as it stands and no interword space is needed. The line counter is then incremented so that the next time the multiplexer services terminal J, the next memory line is summoned from memory unit 82.

c. A space follows the last character examined, in which case the line as examined is already justified and no interword spaces need be added. The line counter is not incremented at this point, because we want to summon this line to utilize the remaining text the next time terminal J is serviced.

d. The last character examined is a space, in which case one interword space is need to provide a justified line. The line counter is not incremented since the remaining text characters in the present memory line are to be utilized in the next multiplexer cycle for terminal J.

e. Neither the character just examined nor the subsequent character is either a space or a carriage return, in which case the procedure set forth immediately below is followed.

The condition designated by the letter (e) above is actually the most general of the cases to be encountered. The operation occurring in response to condition (e) is that the system counts backward from the last character examined until an interword space is detected. The number of characters thus counted before reaching this interword space determines the number of interword spaces which must be added to the justified line in order for it to be in fact justified. Before proceeding with this general case, however, the nature of the last-examine character and the characters subsequent thereto must be examined to assure that the general case does in fact exist.

The justification approach taken herein is to add interword spaces as necessary to justify each line. In case (a) above, a carriage return character resides at the working store slot corresponding to the justified line length, indicating that only one space need be added to the line. To accomplish this, Interword Space Counter 69 is incremented by one count, corresponding to the one space needed for justification. If the character which reduced the count in Interword Space Counter to one is not a carriage return, the next character in working store is examined to see if it is a carriage return (case b). If so, the line is justified as it stands without the necessity for providing additional spaces between words. If neither of these characters is a carriage return the following process ensues: Second Line Character Counter 73 is incremented. The character which follows the character that produces a count of one in interword space counter 69 is examined to see if it is a space. If it is, no additional spaces need be provided to achieve justification. If the character following that which produced a count of one in Interword Space Counter 69 is neither a carriage return character nor a space, Character Counter 70 and Second Line Character Counters 73 are decremented and Interword Space Counter 69 is incremented. The addressed Working Store character, which is the character originally causing Interword Space Counter 69 to reach a count of one, is then examined to see if it is a space. If not, case (d) exists and Character Counter 70 and Second Line Character Counter 73 are decremented once again and Interword Space Counter 69 is incremented once again, so that the preceding character can be examine to see if it is a space. This procedure continues until a space is detected, and the number of counts in Interword Space counter 69 at the time the space is detected corresponds to the number of interword spaces which must be added to achieve a justified line. Character Counter 70 and Second Line Character Counter 73, meanwhile both contain the count corresponding to the position in Working Store at which the detected space is located.

Assuming the processor finds that a number of spaces are to be added to achieve a justified line, the character counter is set to the count in MAS(11). This count is zero for the special case of the first line processed in print mode so that Character Counter 70 is effectively reset to address the first character slot in WS 72. This number was transferred to MAS(11) from Character Counter 70 after the Print Initialization line was processed and transferred from WS 72 to MAS 85. The number in MAS(11) is not zero for the general case, as will be understood from subsequent description. Each character in WS 72 is sequentially transferred to Internal Line Buffer 66, each character being examined to see if it is a space while it is being transferred. As the present line is transferred into Internal Line Buffer 66, each character is checked to see if it is a space. If the first and immediately adjacent characters are spaces, no additional space is added thereafter in order to keep the indentation of the next material correct. However, each space occurring after the first data character is followed by another space, this procedure being effected simply by transferring the same space from working store ILB 66 two times; this, of course, is accomplished by not incrementing the character counter so that the space is addressed in working store for two successive transfers between WS 72 and ILB 66. Each time a space is added in this manner, Interword Space Counter 69 is decremented, thereby reducing by one the number of spaces yet to be added to the line to achieve justification. After a space has been added, the next character in WS 72 is passed to ILB 66 without checking to see if it is a space; otherwise, in the case of a period followed by two spaces, two additional spaces would be added, giving a total of four after the period.

If a carriage return is transferred from WS 72 to ILB 66 before the count in Interword Space counter 69 reaches zero, it is an indication that the end of the line to be justified has been reached before all of the interword spaces necessary to achieve justification have been inserted. Under such circumstances, the line has to be processed once again, so that the contents of ILB 66 are returned to WS 72 to permit insertion of additional spaces.

Additional spaces are inserted by using the same routine described above the first time the line was transferred from WS 72 to ILB 66. More specifically, each interword space occurring after the first data character in the line results in the insertion of another interword space immediately thereafter. When an interword space is so inserted, the next character is transferred without checking to see if it is a space; this prevents two previous interword spaces from resulting in four rather than the desired three interword spaces. Again, as each interword space is added to the line, Interword Space Counter 69 continues to be decremented until such time as it reaches a count of one. If before such time another carriage return is detected in the transferred line, the line in ILB 66 is transferred back to WS 72 for reprocessing. This time around two additional spaces are added between words to give a total of five. If the line is still not justified, any number of spaces can be added on subsequent reprocessing of the line.

Let us now examine the situation wherein, upon transferring a line of text from Memory 82 to Working Store 72, an insufficient number of characters exist in that line to provide a properly justified line. More particularly, each character is examine d in sequence for a carriage return and Interword Space Counter 69 is decremented upon each examination. If a carriage return is detected prior to the Interword Space Counter 69 reaching a count of one, it is necessary to transfer a second line of text from MEM 82 into WS 72 before the present line can be displayed at the terminal. For example, let us suppose that a justified line contains 90 characters and Interword Space Counter 69 has been decremented to thirty, at which time a carriage return is detected. The next line is then transferred into WS 72 from MEM 82 immediately following the detected carriage return character in WS 72. If this second line contains a text character in the first slot, the detected carriage return is converted into a space and examination of each character in the second line proceeds until such time as Interword Space Counter 69 registers a count of one. A justified line is then transferred to Internal Line Buffer 66 and in turn to Terminal Line 65 for display at Terminal (J) in the manner set forth in the preceding paragraphs. If, however, the first character in the second line is not a text character, but rather is a control character such as a carriage return, universal control character or end-of-page character, the previously detected carriage return at the end of the first line is not converted into a space, but rather the first line is read out as is and the second line is ignored during the present processing cycle for this terminal. During the next processing cycle for this terminal the first character in that second line is examined in the manner set forth above, since now this first character in the second line of the previous cycle becomes the first character in the first line of the present cycle. Operation then proceeds as described above.

The next condition to be discussed is that in which part of a memory line of text was displayed in a previous cycle and the remainder is to be processed and displayed in the present cycle. By way of example, if upon examining the previous line during the previous cycle, it was found that a carriage return existed before Interword Space Counter 69 was decremented to one, and a second line of memory text was then transferred to WS 72 and a portion thereof utilized and displayed, a situation will exist for the current cycle wherein that same second line of the previous cycle is transferred from MEM 82 into WS 72, starting at the first character slot therein. A consideration which must be born in mind here is that the system must keep track of which characters in the second line of the previous cycle have in fact been processed; obviously working store cannot be used for this purpose, because working store must service other terminals between samples of the subject terminal. The manner in which this is done is as follows: When a second line is transferred into working store from MEM 82 is a given cycle, Second Line Character Counter 73 is reset and then incremented as each character from that second line is processed. When the justified line is transferred from WS 72 for display, the second line character counter will register a count corresponding to the first character of the second line to be processed during the next cycle for the subject terminal. This count is transferred from Second Line Character Counter 73 to Character Counter 70, and in turn to MAS(11). Since the contents of MAS 85 are always transferred to PSR 67(J) before turning control over to the multiplexer for scanning, the Second Line Character Count is preserved for use during the next sampling interval. After the justified line has in fact been displayed and a ready indication at terminal J is detected by the multiplexer, the contents of PSR 67(J) are transferred back to MAS (11) which is transferred to Character Counter 72. The line transferred into WS 72 from MEM 82 now corresponds to what was the second line in the previous sampling cycle and Character Counter 70 points to the first character to be processed during this cycle. Processing proceeds as described above to provide a justified line of text at terminal. In this manner, it is apparent that any number of lines can be read from Memory 82 into WS 72 in a given cycle, and the breakoff point, that is, the character in any line which is not processed during the present cycle but should be the first character processed in the next cycle, is kept track of by the second line character count stored in PSR 67.

It is important to note that the current line count for any document is maintained in line counter 75, and line counter 75 is incremented each time a new line from memory is transferred into WS 72. Thus, if only a portion of a memory line is processed in a cycle, line counter 75 is not incremented and the entire partially processed line is transferred from MEM 82 to WS 72 in the next cycle.

As described above, each time a line is transferred from Memory 82 into Working Store 72, the first character in that line is examined to see if it is a text character or a control character. If that character is an end-of-page character, it is followed by the two-digit page number and two-digit line number of the next address in Memory 82 where the document being processed is continued. This page and line number, it will be remembered, is automatically transferred into the appropriate slots in the last line of a memory page during the Input mode in accordance with the document chaining technique employed in the present invention. Thus, when an end-of-page character is detected, the first line of text on the next memory page for this document is immediately transferred into working store at the slot beginning where the end of page character was detected. In other words, the next line of text is written into WS 72 over the end-of-page character and the page and line number immediately following that character. Processing then continues as described above.

Let us now assume that a universal control character is detected at the first character in the second or subsequent lines transferred to working store from memory in a given cycle. Under such circumstances, the next character is checked to see if it is a header character, center character, flush right character, flush left character or insert control character. If the character is a header, center, flush right, or flush left control character, this line is to be spaced differently than a conventional line, so that the previous line or lines present in working store at this time are transferred to the terminal for display unjustified. System control is then transferred back to the multiplexer so that during the next cycle for terminal J the first character in WS 72 will be the universal control character followed by the appropriate header, center, flush right or flush left control character. This further illustrates that one task or job is completed for each cycle in which a given terminal is processed. In other words, the system displays the previous line, justified or not, as the case may be, without initiating a second task during the present cycle, namely setting up the header or other appropriate control conditions. These conditions are set up during the next multiplexer cycle.

Let us assume, for example, that a header control character informs the system that the present line is to be displayed as it exists in the memory unit, without any attempt at justification. Thus, if the typist wishes to provide vertical columns on a given page, each line for which characters are to be provided in those columns is begun with the universal control character followed by a header control character. The system responds by providing the appropriate line unjustified. If a flush right control character immediately follows the universal control character in working store, the line of text in working store is to be displayed with its last text character positioned at the right margin of the paper in the last character position of the line. This is accomplished by simply transferring the desired justified line length into Interword Space Counter 69, and then counting the number of characters in the line until a carriage return is reached. As each character is counted, the interword space counter is decremented. When the carriage return is reached, the count in the Interword Space Counter 69 is equal to the number of spaces which are to precede the first character in the line before it is to be displayed in a flush right position. At this time a space is placed in the second character slot in working store and transferred to Internal Line Buffer 66 a number of times equal to the count registered by Interword Space Counter 69. After the appropriate number of spaces are so transferred the text characters are transferred for eventual display and appear in a flush right position.

The flush left control character implements an operation whereby the text material in a given memory line is displayed with the first text character in the first position of the line immediately adjacent to the left margin of the paper. The line is simply displayed unjustified. In addition, any spaces preceding text material in the line are deleted so that a true flush left alignment is achieved.

Assume now that a universal control character is followed by a center control character in the first two character slots of working store. This indicates that the typist wishes to have the current line centered precisely with respect to the margins of the paper. In order to accomplish this function, Interword Space Counter 69 is set to the justified line length and Character Counter 70 is reset. The latter is then incremented and the former decremented for each character present in the line until the carriage return is reached. When a carriage return is in fact detected, Interword Space Counter 69 registers a count corresponding to the number of spaces which must appear in the line if it is to be centered. However, these spaces are to be divided equally on either side of the text material present in the line. In order to find the position at which the first character of the text material is to be placed, the character counter is reset and the following procedure is followed: The character counter is incremented and its count is compared to that in the Interword Space Counter; if these counts are not equal, the Interword Space Counter is decremented and the two counters are once again compared for equality. Incrementation of the character counter followed by a comparison of the counts and decrementation of the Interword space counter followed by a comparison of the counts continues until such time as a count equality is detected. At that time, the count in both counters registers the number of spaces which should follow the text material if the line is properly centered. This number of spaces is then inserted into WS 72 immediately following the text material, and after the last space a carriage return is inserted in the next WS character slot. Transfer of this line to ILB 66 and in turn to TLB 65 is accomplished in the same manner as described above for the flush right operation so that the line is in fact centered when displayed.

If, in the course of detecting the nature of characters displayed in WS 72, a universal control character is detected and followed by an insert control character, it is indicative that the typist, when in a prior Edit mode (to be described in detail below) has inserted text material at the location in the current line at which the universal control character appears. The insert control character is always followed by the two-digit page number and two-digit line number at which the insert text material has been stored in memory, these numbers being automatically inserted during the Edit mode prior to storage of the inserted material at the designated location. MEM 82 is then addressed at these page and line numbers and transfers the first line of the insert material into working store. Transfer and display of a justified line proceeds in the manner described above, and the processor, during subsequent sample cycles for terminal J, returns to the page containing the insert material until such time as an "end of insert" control character is detected. This character is automatically placed at the end of the insertion in the manner set forth in the description of the Edit mode. At this time, it is desired to return to the point in the document at which the universal control character and the insert control character appeared. The page and line number of this location appears immediately following the "end of insert" control character and serves as the address to which the processor now points in MEM 82. The entire line at which the insert was made is then transferred into WS 72 from MEM 82 immediately following the "end of insert" control character. It is necessary at this point to delete whichever portion of this line precedes the universal control character and insert control character since this portion of the line has already been displayed. In order to accomplish this the first text character following the insert control character is transferred to that location in working store occupied by the "end of insert" control character and a space is inserted immediately prior thereto. Each subsequent character is then transferred in sequence to a location following that of the previously transferred character until the entire line is transferred the appropriate number of spaces. To effect this transfer, MAS (4) is employed as a temporary character storage register and MAS(8) and (9) serve as temporary character counter registers. In order to assure that the contents of MAS are not lost while MAS is thus serving these functions, the contents of MAS are transferred to PSR 67(J) until the shifting of the remainder of the line is completed.

Detection of an "end of text" character in a line transferred from Memory 82 to Working Store 72 results in the transfer of all preceding characters to the terminal for display without justification. In the input mode, detection of an "end of text" character in WS results in the provision of another "end of text" character in the first position of the next line in memory. Thus, in the next cycle, after the last line of a document is printed out, the second "end of text" character is detected and terminal J is placed in Select mode from which the typist can choose any one of the other modes. Of course, if the last line of text, specified in the control information typed into the system at the start of the print or list modes, is reached before the end-of-text character is reached, the same sequence occurs; that is, the last line is displayed and the terminal is placed in Select mode.

There are two significant differences between the Print mode and the List mode. The first of these is manifested after a line to be displayed is transferred to ILB 66, at which time a check is made to determine whether or not the system is in the Print or List mode. If in the Print mode, the line is displayed as is. If in the List mode, however, the line is transferred back to working store, the carriage return is replaced by a space, and the current page and line numbers are transferred into working store following the space. These numbers are followed by a carriage return and this line, as amended with the page and line numbers is transferred to the terminal for display. The second difference between the Print and List modes occurs when parts of two lines from memory are displayed in the same output line. In this case, the carriage return appearing at the end of the first of these lines is replaced by a space in the Print mode and by an underscored space in the List mode. The underscore indicates that a transition between memory lines has occurred in the displayed line and that the line number which follows the displayed line refers to the line following the underscored space. This permits a proper reference for the typist in later summoning forth specific portions of the text for display at the terminal.

EDIT MODE

The Edit mode permits the typist, having examined the hard copy returned during the List mode, to make the following alterations in the stored text material:

a. Delete a line of text or portion thereof;

b. Insert into any line as much new text material as desired;

c. Change existing text as desired on a character-by-character basis.

While it is most usual for the typist, in the Edit mode, to refer to hard copy displayed at the terminal during a prior List mode, it is also possible that reference can be made to the hard copy typed at the terminal during the Input mode. More specifically, during List mode, the typist receives the page and line number at which the listed material is stored at the end of each displayed line. During the Input mode, the number of the first page of the document at which text is stored in memory is printed out automatically for the typist. This, combined with the ability of the typist to count lines, provides some source of reference to the text.

To enter the Edit mode, the typist types in the following characters, in sequence, starting with the first character in the line:

1. E (the edit control character)::

2. The first digit of the two-digit line number at which the text to be corrected appears in memory;

3. The second digit of the two-digit line number at which the text to be corrected appears in memory;

4. The first digit of the two-digit page number at which the text to be corrected appears in memory;

5. The second digit of the two-digit page number at which the text to be corrected appears in memory;

6. Carriage return.

The carriage return, as described above, sets Data Ready flip-flop 216 to indicate to the processor that the terminal, for example terminal J, is ready for processing. The line typed by the typist is thus transferred from TLB 65(J) to ILB 66 when the multiplexer samples terminal J. The typed line is transferred into WS 72 and the appropriate line and page numbers are transferred into MAS(1), (2), (3) and (4). The entire contents of MAS 85 are then transferred to PSR 67(J) and the line of text at the address in MAS(1), (2), (3) and (4) is displayed. With the summoned line displayed, the typist is able to perform the desired corrections. It is to be borne in mind that, in making corrections to the line, the typist has the line, as stored in memory, displayed directly above the line about to be typed at the terminal.

Let us assume that the line so displayed reads as follows: "The graas iss green." Let us also assume that the intended line should have read "The grass is always green." Obviously what has to be done to the original line as stored is change the second "a" in "grass" to "s," delete the second "s" in "iss," and insert "always" before "green." In this mode, the typist types a space under each character which is to remain the same in the corrected line so that seven spaces are typed in initially for the given example. An "s" is then typed in the slot corresponding to the second "a" in the word "-graas." This is followed by three additional spaces, and in the space corresponding to the first "s" in the word "iss," a universal control character is typed and followed by a "D," the delete control character. The next position in the correction line is aligned with the space between "iss" and "green" in the line to be corrected. At this slot, the typist types in another universal control character followed by the insert control character and a carriage return. It is important to note that whenever an insert is provided, the insert control character must be followed immediately by a carriage return. This, of course, indicates that only one insert can be effected in a line per cycle.

The correction line typed by the typist is transferred from TLB 65(J) to ILB 66 and in turn to WS 72. More particularly, the correction line is placed in working store with its first character in the first working store character slot. The line to be corrected is then transferred from MEM 82 immediately following the carriage return character in the correction line. Working store now contains the following characters, starting with the fist character slot (a "-" is used for designating a space and a "," to designate a universal control character in the following illustration):

-------s---,D,I. C/R The-graas-iss-green. C/R

The process employed to achieve the desired correction is to examine each character in turn in the correction line to see if it is a space or a character. If it is a space, the corresponding character in the line to be corrected is correct as stands and is transferred from its slot in the line to be corrected to the slot containing the detected space in the correction line. Thus, the first seven spaces in working store are sequentially replaced by "The gra" from the line to be corrected. In order to keep track of the character number in each of the lines, Interword Space Counter 69 is employed for the correction line and Second Line Character Counter 73 is employed for the line to be corrected. Each of these counters is incremented for each character comparison between the correction line and the line to be corrected. The appropriate count is transferred to the character counter 70 for purposes of addressing the desired working store slot during transfer operations.

When the "s" is detected in the eighth slot in working store, there is no transfer from the line to be corrected. Both Interword Space Counter 69 and Second Character Counter 73 are incremented again and the incorrect "a" present in the line to be corrected is effectively replaced by the "s" in the correction line. The next three spaces are then sensed and the corresponding characters in the line to be corrected are transferred to respective slots in the correction line. When the universal control character is detected, the next character in the correction line is examined. In this case, it is the delete character, D, indicating that the character in the slot represented by the number in the second line character counter is to be deleted. This corresponds to the first "s" in the word "iss." This character is therefore not transferred from the line to be corrected to the correction line; rather Second Line Character Counter 73 is incremented and the next character, the second "s" in the word "iss," is transferred instead. The second "s" has thus been overlayed on the universal control character in the correction line. The program then overlays the delete control character with a space, indicating that the character in the line to be corrected corresponding to the space at which "D" appeared in the correction line is to appear as is. The next step is to transfer The next character from the line to be corrected to the working store slot in which the space was just added in the correction line. In the present example, this turns out to be a space, namely the space existing between the words "iss" and "green."

The next character detected in the correction line is a universal control character followed by an insert control character and a carriage return. In response to this, the system determines the next available memory page, as stored in next vacant memory register 84, and puts the line number (01) and this page number into working store immediately following the insert control character. In other words, four numerals, representing the address in memory at which the insert is to appear, are inserted in the correction line immediately following the insert control character. After the four numerals are so inserted, the remainder of the line to be corrected is added to the correction as is. The useful contents of working store, starting with the first working store character slot, now appear as follows:

"The grass is,IO1$P_1P_2$ green.C/R"

This much of the contents of working store are then transferred to MEM 82, and the entire contents of MAS 85, which now includes as its current page and line numbers the page and line numbers at which the insert is to appear, are transferred to PSR 67(J). Also present in MAS 85 in slots (6), (7), (8) and (9) are the page and line number at which the insert is made, so that the system can return to that line after the insert has been completed. These numbers too are stored in PSI 67(J), as is the entry address for the program into the Input mode to permit entry of the insert material during the next active cycle for terminal J. Control is then returned to the multiplexer and scanning is resumed. It is to be noted, however, that, if there is no insert to be effected during the Edit mode, rather than program the system to go into the Input mode during the next multiplexer cycle for the terminal, the terminal is programmed to go back to Select mode so that the typist can then enter any mode desired.

In the example chosen, the next multiplexer cycle for terminal J results in processing of the insert material. Processing of this material is effected in the same manner described above for the Input mode. Thus the typist, in the next line, will have inserted the following:

"always,IC/R."

When this is transferred to WS 72, the system automatically replaces the insert control character, I, with an end-of-insert control character. Following the end of the insert control character, there is inserted the page and line number of the original text at which the insert appeared. The page and line number are then followed by a carriage return and the entire line, consisting of the word "always" followed by the universal control character, the end-of-insert control character, the page and line number of the original text in which the insert appeared, and the carriage return, is stored in MEM 82 at the insert address. The contents of MAS, which now include the appropriate address to place the system in Select mode during the next sampling cycle, are transferred to PSR 67(J). Control is then returned to the multiplexer and scanning of the various terminals resumes.

During the next cycle for terminal J, if the typist wishes to summon fourth and additional line for purposes of editing, the procedure described above is repeated and the appropriate control characters are inserted as needed.

The system is capable of deleting an entire word if, in the Edit mode, a universal control character followed by a delete control character appears in a correction line at a location corresponding to a space in the line to be corrected. Under such circumstances, the entire word following the universal control character is deleted from the line to be corrected. The system is also capable of accepting inserts of indefinite length. More particularly, whereas the example described above had a single word insert, it is possible to insert a line, a paragraph, or multiple pages if desired. Processing of the inserted material continues on a line-by-line basis each processing cycle, in the same manner as described above for the Input mode. Such processing continues until the universal control character followed by an insert control character is detected at the insert material. At such time, the insert control character is changed to an end of insert character by the system and the procedure described above at the end of the insert in the example is effected.

It is also possible to terminate the Edit mode by providing a universal control character immediately followed by an "end of correction" control character. This technique is employed where the correction is not an insert but rather some other correction or deletion in the line being corrected. The effect of this control character, when detected, is to cause only the changes preceding that control character to be effected and does not require the typist to insert spaces until she reaches the end of the line. More particularly, if the typist, upon making a correction in a line, where to then depress the carriage return key, all of the letters in the line to be corrected which follow this carriage return would be effectively deleted from the correction line. The universal control character followed by the end of correction character, on the other hand, automatically transfers, intact, all of the original characters from the line to be corrected to the correction line.

Another capability of the present system is that which permits the typist, upon discovering that the wrong line has been summoned for editing, to type in a universal control character followed by an end-of-text control character and thereby return the system automatically to Select mode. This permits the typist to avoid altering in any way the text material in an erroneously summoned line.

ALTERNATIVE SYSTEM APPROACH - GENERALIZED CONCEPT

As described above, one of the objects of the present invention is to provide a configurable special purpose computer; that is, a computer which combines the economy of a stored program special purpose computer with the flexibility of a general purpose computer. To this extent it will be appreciated that the preferred embodiment can, with minor modification, perform numerous processing tasks. For example, the system as described above, can be employed as a central credit checking system with only a change in the program stored in instruction memory 160. A retail clerk would need only key in a particular character at a terminal followed by customer identification data. The processor would then retrieve from MEM 82 the stored credit information for the identified customer and this would be displayed for the clerk at the terminal. Each customer's credit information would thus be a unit record. In addition to credit checking, various other processing tasks, such as accounting, inventory control, etc., could be effected by storing the appropriate program in Instruction Memory 160 and, in some cases, providing additional hardware components as required. To this end, one processor may be provided with the capability of performing multiple processing tasks, the terminal signaling the task to be performed by providing, when in select mode, the appropriate character to effectuate the desired one of a plurality of stored programs. Hardware can be made of a plug-in functionally modular nature, well-known in the electronics art, so that the system can be easily rendered capable of performing those processing tasks requiring additional hardware as well as respective stored programs. In addition the various components (counters, registers, etc.) may be used, if necessary, for more than one processing task. Moreover, these hardware components can serve different functions when employed in different processing tasks. For example, the Second Line Character Counter and Interword Space Counter are employed for different purposes during Edit mode than during Print mode. This concept can be extended so that a given component performs a different function for text processing than for credit checking.

While this system flexibility is inherent in the preferred embodiment described above, a more generalized approach toward achieving such flexibility is illustrated in FIG. 8. More particularly, FIG. 8 represents an alternative embodiment of the system control circuitry which is designated as block 18 in FIGS. 1 and 2 and is illustrated in detail for the preferred embodiment in FIGS. 3 and 5. It is important to note that the alternative approach of FIG. 8 could be readily employed in the processing system disclosed above. The underlying theory for the alternative embodiment will be discussed before describing FIG. 8 in detail.

Whereas sixteen different processing function signals are decoded from the various operation codes listed in Table II, a generalized embodiment need only perform the following four basic processing functions:

1. Transfer of data
   a. from a register to another register
   (b) from a register to a counter
   (c) from a counter to a register
   (d) from a counter to another counter
2. Compare data at a comparison register with data at any counter or register
3. Increment a counter
4. Decrement a counter Under this approach only two bits in each operation code need be reserved for function designation. In addition, a number of bits must be reserved for designation source and sink units as required. The number of such bits required depends upon the number of counters and registers present in the system. If there are N counters and M registers, then X-bits of each operation code must be reserved for source and sink designation, where X is an integer such that:

$$\log_2 (N+M) \leq x \leq 1 + \log_2 (N+M)$$

This value for $x$ of course assumes that the contents of each counter or register are capable of being transferred to all other counters and registers. A holding register, similar to party line memory unit 245 described above, would be required to accommodate this capability. This universality of transfer capability permits the processor to be adapted to many processing tasks by simply providing appropriate stored programs.

It is to be noted that this approach does not require reservation of operation code bits to designate the class of the instruction. This is primarily true because the instruction need not have a variable number of portions and therefore would only have one class. A variable length instruction could be employed in this embodiment; however, even this would not require class-designating bits in the operation code because, since each instruction word is a different combination of bits, a decoder could easily be designated to provide a class signal in response to each instruction word. The same holds true for the preferred system embodiment, wherein operation code decoder 62 could be designated to provide the proper class signal for each of the fifty-three operation codes in Table II, even if the class code bits were eliminated from the operation code words.

With the above in mind, the following detailed description of the circuit of FIG. 8 will permit a clear understanding of the processing power and flexibility provided by the present invention.

Figure 8A:
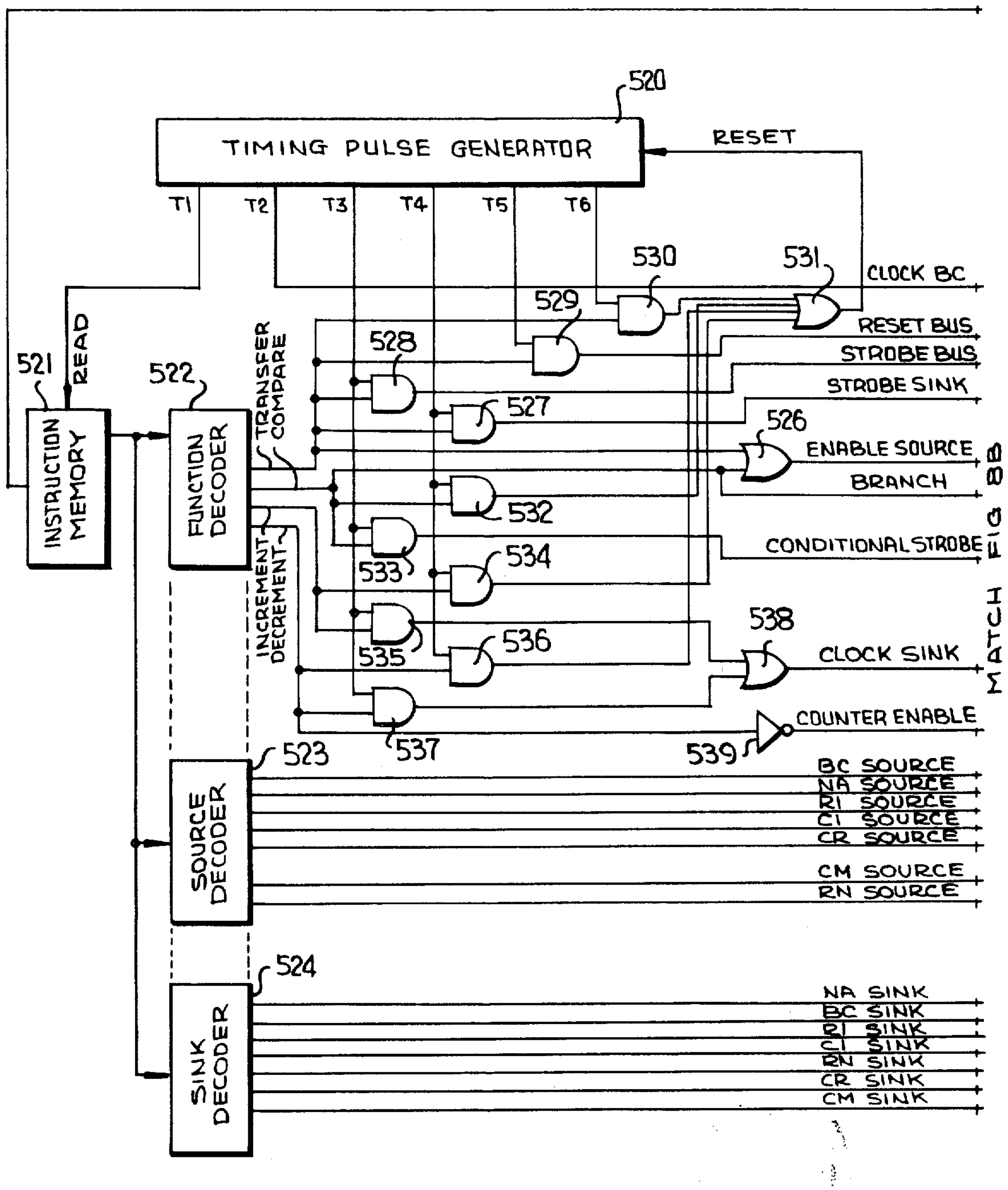
FIG. 8 is a schematic illustration of an alternative embociment of the processing circuitry and process sequencing circuitry of the present invention.

Referring now to FIG. 8A of the accompanying drawings there is illustrated a timing pulse generator 520 capable of providing sequential timing pulses T1 through T6 on discrete signal lines and capable of being reset at any time so that the next sequential pulse is T1. Timing Pulse Generator 520 can thus be a ring counter, but has incorporated therewith logic circuitry which differs from that provided for ring counter 130 of FIG. 5. The latter always operates on a six, eight or 10 pulse cycle depending upon the class of the effective instruction. The number of pulses per cycle for generator 520, as is described in detail below, depends upon the function performed by the instruction.

Timing pulse T1 is applied to the read input terminal of an Instruction Memory unit 521, the latter being substantially the same as Instruction Memory 160 in the preferred embodiment described above. Although either fixed or variable length instructions may be employed in the embodiment of FIG. 8, it is assumed for purposes of the present discussion that a plurality of fixed length instructions, each corresponding to an operation code, are sequentially stored and selectively addressable in unit 521. Each operation code contains two bits for designating the function of the operation code and X-bits (as defined above) to designate the source and/or sink units affected by the operation code. Each operation code word has respective portions thereof applied to a function decoder 522, a source decoder 523, and a sink decoder 524 which provide respective binary function, source and sink output signals. The four function signals provided by function decoder 522 are TRANSFER, COMPARE, INCREMENT and DECREMENT, corresponding to the four minimum functions required for the system.

The TRANSFER function signal is applied to the following gates:

1. to two-input OR gate 526, which also receives the COMPARE function signal, and provides an ENABLE SOURCE signal;

2. to two-input AND gate 527, which also receives T4 and provides a STROBE SINK signal;

3. to two-input AND gate 528 which also receives T3 and provides a STROBE BUS signal;

4. to two-input AND gate 529 which also receives T5 and provides a RESET BUS signal; and 5. to two-input AND gate 530 which also receives T6 and which applies its output signal to four-input OR gate 531; the latter, when binary one resets timing pulse generator 520.

The COMPARE function signal, in addition to supplying a second input signal to OR gate 526, serves to:

1. provide a BRANCH signal to be described below with respect to FIG. 8b;

2. prime two-input AND gate 532 which also receives T4 and provides another input signal to four-input OR gate 531; and 3. prime two-input AND gate 533 which also receives T3 and provides a CONDITIONAL STROBE signal.

The INCREMENT function signal serves to:

1. prime two-input AND gate 534 which also receives T4 and provides another input signal for OR gate 531; and 2. prime two-input AND gate 535 which receives T3 and applies an input signal to two-input OR gate 538; the latter provides a CLOCK SINK signal.

The DECREMENT function signal serves to:

1. prime two-input AND gate 536 which also receives T4 and provides the other input signal for OR gate 531;

2. prime two-input AND gate 537 which also receives T3 and provides the other input signal for OR gate 538;

3. feed logic inverter 539 which provides a COUNTER ENABLE signal.

Source Decoder 523 provides the various source signals required, one each for each counter and register employed. These counters and registers are described in relation to FIG. 8b. The various signals are as follows: BC SOURCE; NA SOURCE; R1 SOURCE; C1 SOURCE; CR SOURCE; CM SOURCE; and RN SOURCE. Likewise Sink Decoder 524 provides the following sink signals: BC SINK; NA SINK; R1 SINK; C1 SINK; CR SINK; CM SINK: and CN SINK. Of course as additional counters and registers are employed in the system, corresponding source and sink signals are provided.

Figure 8B:
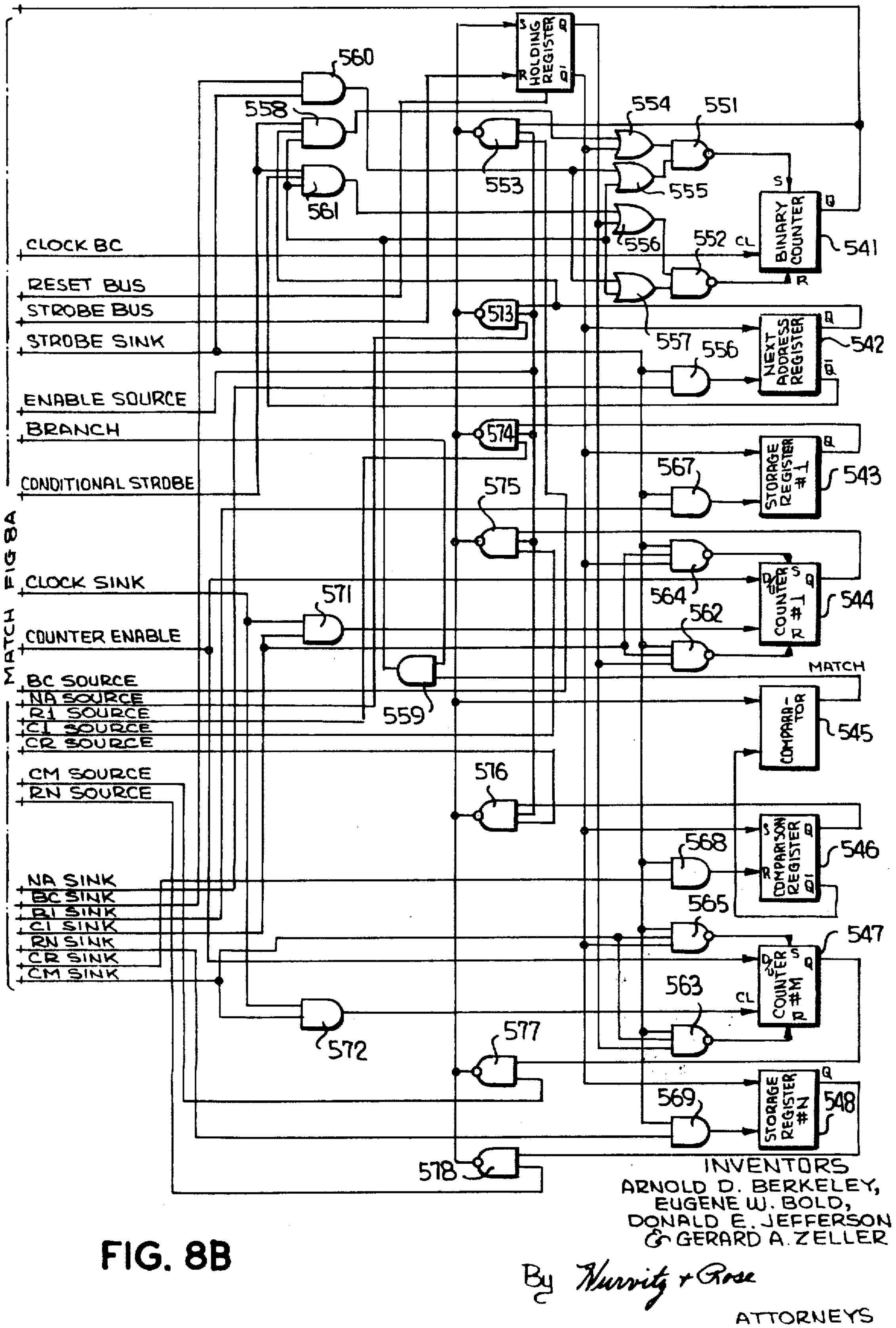

Referring now to FIG. 8B, the various counters and registers employed for the typical generalized system are illustrated as follows: Binary Counter 541; Next Address Register 542; Storage Register 543; Counter (No. 1) 544; Comparison Register 546; Counter (No. M) 547; and Register (No. N) 548. In addition there is provided a comparator 545 and a holding register 549, the latter serving a function analogous to that served by Party Line Memory 245 in the preferred embodiment. For purposes of the following explanation, the following is assumed.

1. A counter can be set and reset by imposing a binary zero on its set and reset input terminals respectively.

2. A counter can be incremented by imposing a binary one on its ENABLE input and a binary one on its clock input.

3. A counter can be decremented by imposing a binary zero on its ENABLE input and a binary one on its clock input.

4. A register can be set by imposing the desired signal, either a binary one or a binary zero, on its data input and a binary one on its clock input.

5. The output of Comparator 545 is a binary one if and only if there is an equality between the signals on both sets of inputs.

6. Counters and Registers contain as many stages as are required for their respective count and/or storage capacities.

7. Registers may store multiple or single characters and when storing multiple characters may be addressable.

8. The output signals of either counters or registers are available as either binary ones or binary zeroes at all times.

In addition, Binary Counter 541 serves an analogous function to that of Binary Counter 161 of the preferred embodiment in that it addresses (via an appropriate address decoder, not illustrated) instruction memory 521. Next Address Register 542 likewise serves an analogous function to that of NAR 63 in the preferred embodiment, and the function of comparison register 546 is analogous to that of Match Character Register 64 in the preferred embodiment.

The various set and reset input terminals of Binary Counter 541 receive input signals from respective two-input NAND gates 551 and 552, which serve as sink gates for the Binary Counter. The same shorthand scheme of representing as employed in FIG. 5 is employed in FIG. 8B so that the various source and sink gates actually represent a plurality of such gates. The data signals from the various q output terminals of Binary Counter 541, in addition to being used for addressing the instruction memory 521, are fed to respective three-input source NAND gates 553 for the Binary Counter. The input signals for NAND gates 551 are supplied by respective ones of two-input OR gates 554 and from the signal two-input OR gates 555; the input signals for NAND gates 552 are supplied by respective ones of three-input OR gates 556 and the single two-input OR gate 557. Each OR gate 554 receives a respective $\bar{Q}$ signal from holding register 549 and the output signal from a respective one of three-input AND gates 558. OR gate 555 and OR gate 557, there being only one of each, receive the output signal from a two-input AND gate 559 and the output signal from a two-input AND gate 560. OR gates 556 each receive the Q signal from a respective stage of holding register 549. Each OR gate 556 also receives the output signals from AND gate 559 and three-input AND gates 561.

AND gates 558 are employed to transfer data from Next Address Register 542 to Binary Counter 541 during a compare function operation and each receives as input signals: a respective Q signal from Next Address Register 542; the CONDITIONAL STROBE signal; and the output signal from AND gate 559. The latter receives the BRANCH Signal and the MATCH Signal which is binary one whenever a match between two binary words is detected at comparator 545.

AND gate 560 is employed during transfers of data to Binary Counter 541 and receives as input signals the STROBE SINK and BC SINK signals. Each of AND gates 541, also employed during transfer of data to Binary Counter 541, receive the CONDITIONAL STROBE signal, the output signal from AND gate 559, and a respective $\bar{Q}$ signal from Next Address Register 542.

The Q signals from holding register 549 are applied to respective three-input NAND gates 562 at Counter (No. 1) 544 and to respective three-input NAND gates 563 at Counter (No. M) 547. The $\bar{Q}$ signals from holding register 549 are applied to the data input terminal of respective stages at each of Next Address Register 542, Storage Register (No. 1) 543, Comparison Register 546, and Storage Register (No. N) 548. In addition the $\bar{Q}$ signals from holding register 549 are applied to respective ones of three -input NAND gates 564 at Counter (No. 1) 544 and to respective ones of three-input NAND gates 565 at Counter (No. M) 547.

NAND gates 562 and NAND gates 564 all receive the STROBE SINK signal and the C1 SINK signal. Gates 562 apply their output signals to respective reset terminals at Counter (No. 1) 544, and gates 564 apply their output signals to respective set terminals at Counter (No. 1) 544. Gates 563 and gates 565 serve the same functions for Counter (No. M) 547 as gates 562 and 564 respectively serve for Counter (No. 1) 544. Each of gates 563 and gates 565 receive the STROBE SINK signal and the CM SINK signal.

Next Address Register 542 has associated therewith a two-input AND gate 566 which feeds the various reset terminals at that register. A similar two-input AND gate 567, 568, and 569 is associated with Storage Register (No. 1) 543, Comparison Register 546, and Storage Register (No. N) 548, respectively. All four of these two-input AND gates receive the STROBE SINK signal. Gates 566 receives the NA SINK signal, gate 567 receives the R1 SINK signal, gate 568 receives the CR SINK signal, and gate 569 receives the RN SINK signal.

The input signal to the Clock input terminals of Binary Counter 541 is the CLOCK BC signal (T2 from Timing Pulse Generator 520). The clock signal for Counter (No. 1) 544 is received from two-input AND gate 571 which has as its two-input signals the CLOCK SINK and C1 SINK signals. Counter (No. M) 547 receives its clock signal from two-input AND gate 572 which has as its input signals the CLOCK SINK and CM SINK signals.

The only elements remaining undescribed in FIG. 8B are three-input NAND gates 573, 574, 575 and 576 and two-input NAND gate 577 and 578. Each represents a plurality of NAND gates serving respectively, as the source NAND gates for Next Address Register 542, Storage Register (No. 1) 543, Counter (No. 1) 544, Comparison Register 546, Counter (No. M) 547, and Storage Register (No. N) 548. Each source NAND gate has its output terminal connected to the set input terminal of a respective stage in Holding Register 549. More specifically every NAND gate associated with the first bit in a counter or register has its output terminal wire-OR connected to the set input terminal of the first bit in holding register 549. Likewise, all bits are wire-OR connected in this manner. Each source NAND gate receives the source signal for its associated register or counter and the Q signal from its associated stage in that register or counter. In addition, source gates 553, 573, 574, 575 and 576 receive the ENABLE SOURCE signal from OR gate 526.

In operation, the various processor control signals are generated by circuitry illustrated in FIG. 8A and effect the desired results at the circuitry in FIG. 8B. Although only one function is active in any one one operational cycle, many successive operational pulses can be generated in sequence to perform a multiplicity of operations. There are also generated some signals which are level signals representing the binary one state of the function. Such signals are the ENABLE SOURCE signal and the BRANCH signal. As previously discussed, T1 provides a READ signal for instruction memory 521 of the function being performed. On the other hand, T3 provides a STROBE BUS signal if the function active at that time is a transfer function, or it provides a CONDITIONAL STROBE signal if the compare function is active, or it provides a CLOCK SINK signal if the active function is either increment or decrement. The T4 signal provides a STROBE SINK signal if the active function is transfer, and provides a RESET signal to time pulse generator 520 if the active function is either compare, increment, or decrement. The only signal generated at T5 is the RESET BUS signal which is active only when the transfer function is active. Similarly, T6 generates a RESET signal for time pulse generator 520 only during the transfer function.

To minimize circuit loading for a transfer function, transfers are made through holding register 549. The TRANSFER signal generates first and ENABLE SOURCE signal which, operating through appropriate source enable gates with a particular source signal, enables the output of the selected source register or counter and applies the complement of the data in the source storage register or counter to the data terminals of holding register 549. At T3 a STROBE BUS pulse clocks the holding register to enter the data appearing at the holding register data terminals. At T4 the designated sink unit receives a STROBE SINK pulse which transfers the complement of the data in the holding register 549 to the sink unit. Therefore, at the completion of pulse T4, the data has been transferred from the source unit to the sink unit. At T5 holding register 549 is reset. At T6 timing pulse generator 520 is reset, thereby completing the transfer function.

If the compare function is active then the source NAND gates for the designated source are enabled by the ENABLE SOURCE signal. The complement of the source data appears at the holding register data terminals. The complement of the source data also appears thus at one set of input terminals for the comparator 545. The other input terminals for comparator 545 receive the $\bar{Q}$ output signals from comparison register 546. When the data at the two sets of input terminals are identical, a binary one MATCH signal is provided by comparator 545 and is ANDED with the BRANCH signal at AND gate 559 to provide an enabling signal for the input NAND gates 551 and 552 at Binary Counter 541. This permits the binary count to be set to the data contained in Next Address Register 542. If no match is obtained the function is completed at T4 and Timing Pulse Generator 520 is reset so that the next sequential instruction at instruction memory 521 is evoked. However, if a match is obtained at T3, and a CONDITIONAL STROBE signal is generated to activate input NAND gates 551 and 522 for binary counter 541 when the function is completed at pulse T4, the next instruction to be addressed will be that one which is in Next Address Register 542.

Note that in this operation the increment of the binary counter and the set of the binary counter are carried out in a way different from that disclosed in the preferred embodiment. In the preferred embodiment, the SET BC signal and the INCREMENT BC signal occur simultaneously so that the set (or reset) signal can override the increment. However, in the embodiment of FIG. 8 binary counter 541 is incremented at T2; if a match occurs at T3, the incremented count is overriden by setting in the new desired count. Since the READ pulse for instruction memory 521 occurs at T1, the only information extracted from that memory is that which is addressed at the end of the previous function cycle. Therefore, transfer of data to binary counter 541 can be made with the same timing pulse with which a transfer would have been made to any other counter.

To carry out the increment or the decrement function, it is to be noted that both the INCREMENT and DECREMENT signals generate an operational signal, the CLOCK SINK signal, at T3. Since the counters are of the type which increment when a binary one is present at the enable input terminal, it is possible to effect a decrement operation with the inverted DECREMENT signal, designated as the COUNTER ENABLE signal; that is, the COUNTER ENABLE input is binary one at all times except when the decrement function is active. Therefore, all that is required to increment a counter is to generate a CLOCK SINK pulse. To decrement a counter the COUNTER ENABLE signal is made binary zero and the CLOCK SINK pulse effects the decrement. At T4 which either the increment or the decrement function active, the timing pulse generator 520 is reset, thus limiting the required timing cycle for increment or decrement to four pulses.

The variable pulse timing cycle provides the system of FIG. 8A and 8B with an asynchronous timing capability, each function requiring no more time for completion than absolutely necessary. A fixed length instruction is assumed and it is assumed that the appropriate next address number can be set in the Next Address Register 541 by having the program incrementing a counter (for example counter No. M) to the desired next address number and then transferring this number to Next Address Register 542. Achieving a desired match character in comparison register 546 may be by the same technique. Alternatively, all of the required next address and match character numbers may be initially stored in appropriate registers (not illustrated) and transferred to Next Address Register 542 or Comparison Register 546 on command. This is not to say that a variable-length instruction, including next address and match character numbers where required, is precluded in the embodiment of FIGS. 8A and 8B. On the contrary, it will be readily appreciated that both of the disclosed embodiments can function with either a fixed or variable length instruction format and that the program would have to be arranged accordingly.

GENERAL CONSIDERATIONS

The system as disclosed above utilizes a single Memory 82 in which various pages of a document are stored in random order and are retrievable in proper sequence. For some applications it is desirable to also have the pages of a document stored in consecutive order to permit document display by some special off-line equipment, for example by a photo-composition device. For this purpose it is clear that the randomly recorded document pages can be transferred from Memory 82 in sequence to an additional memory unit (core, disk, tape, etc.) compatible with the off-line equipment.

Whereas the preferred embodiment, as disclosed, considers a line of text as a unit record for purposes of processing, it is clear that the principles of the present invention also encompass unit records of different length such as a character, a word, a specified number of lines, a page, etc. The terminal line buffer capacity would be chosen accordingly. Whereas a carriage return designates the end of a unit record in the preferred embodiment, a space would designate the end of a word record, and a specified number of carriage returns would designate the end of a multi-line or page record. In addition, the end of a page could be designated by a specified character count rather than a carriage return count.

It is also to be understood that while the preferred embodiment has been described as supplying input characters from a manually actuable keyboard unit, automatic actuation of the various input signals to the system from any one or more terminals is possible. For example, a stored document in proper machine-language format may be employed to supply both text and control character data for processing and storage by the system.

In addition, while multiplexing many data terminals is disclosed in the preferred embodiment, an individual terminal may be connected to the system and processed as required without multiplexing.

It is to be understood that some terminals may have both input and output capability as disclosed, or only one of these.

As mentioned briefly in describing the special print terminal, it is often desirable to re-sequence a stored document. Re-sequencing is particularly advantageous where a stored document includes a number of short inserts, each requiring only a few lines of a page but to which a full memory page is allocated in accordance with the preferred embodiment. To prevent inefficient use of Memory 82 by such inserts, one or two memory tracks may be reserved for re-sequencing purposes and additional circuitry could be provided to transfer the document to the reserved pages with the inserts in proper sequence. Another approach would be to transfer data to an off-line storage device, preferably a page at a time, so as not to interfere with normal processing.

While we have described and illustrated specific embodiments of our invention, it will be clear that variations of the details of construction which are specifically illustrated and described may be resorted to without departing from the true spirit and scope of the invention as defined in the appended claims.

APPENDIX

This appendix contains sample programs which are operative with the circuitry illustrated in FIGS. 5A through 5H to achieve processing of test characters in the manner described hereinabove. The programs describe SELECT (S), INPUT (I), EDIT (C), PRINT and LIST (P), ERASE (E), and JUSTIFIED LINE LENGTH DESIGNATION (L) modes. The operation codes which form the program are those listed in TABLE II. The following abbreviations are employed to reduce the size of the appendix:

| Abbreviation | Complete Terminology |
|---|---|
| BEC | BEGIN EDIT CONTROL character |
| BRN | BRANCH |
| BSC | BACKSPACE CHARACTER |
| BTC | BEGIN TEXT (Input) CONTROL character |
| CCC | CENTER CONTROL CHARACTER |
| DCC | DELETE CONTROL CHARACTER |
| DEC | DECREMENT |
| EIC | END of INSERT CHARACTER |
| ELC | Carriage Return Character |
| EPC | END of PAGE CHARACTER |
| ERA | ERASE |
| ETC | END of TEXT CONTROL character |
| FLC | FLUSH LEFT CONTROL character |
| FRC | FLUSH RIGHT CONTROL character |
| HCC | HEADER (TAB) CONTROL CHARACTER |
| ICC | INSERT CONTROL CHARACTER |
| INC | INCREMENT |
| INT | INTERROGATE |
| KLC | KILL LINE CONTROL character |
| LST | LIST control character |
| LSTP | SPECIAL LIST control character |
| PNT | PRINT control character |
| PNTP | SPECIAL PRINT control character |
| RST | RESET |
| SCR | SPECIAL CARRIAGE RETURN character |
| SLC | SET LINE-LENGTH CONTROL character |
| SPC | SPACE character |
| TRA | TRANSFER |
| UCC | UNIVERSAL CONTROL CHARACTER |

SELECT

| Instruction | | Explanation |
|---|---|---|
| S0101 | RST CC | |
| S0102 | TRA NAR (4) TO TC | |
| S0103 | TRA NA(S0305) TO MAS | Starting Address |
| S0104 | TRA NAR(9) TO TC | |
| S0105 | TRA NAR(90) TO MAS | Line Length |
| S0106 | TRA NAR(0) TO TC | |
| S0107 | TRA MAS TO PSR | Initialize |
| S0108 | BRN: TRA NAR(S0110) TO BC ON MATCH OF MCR(11) AND TC | |
| S0109 | TRA NAR(S0107) TO BC | |
| S0110 | INC CC | Count Channels |
| S0201 | INT NEXT CHANNEL | |
| S0202 | BRN: TRA NAR(S0208) TO BC ON MATCH OF MCR("N") AND CC | "N" is Number of |

| | | |
|---|---|---|
| S0203 | TRA NAR(S0102) TO BC | Channels |
| S0204 | TRA NAR(0) TO TC | Set PSR |
| S0205 | TRA MAS TO PSR | |
| S0206 | BRN: TRA NAR(S0208) TO BC ON MATCH OF MCR(11) AND TC | |
| S0207 | TRA NAR(S0205) TO BC | |
| S0208 | INT NEXT CHANNEL | Next Channel |
| S0209 | TRA NAR(0) TO TC | |
| S0210 | TRA PSR TO MAS | |
| S0301 | BRN: TRA NAR(S0303) TO BC ON MATCH OF MCR(11) AND TC | |
| S0302 | TRA NAR(S0210) TO BC | |
| S0303 | TRA NAR(4) TO TC | |
| S0304 | TRA MAS TO BC | Starting Instruction |
| S0305 | TRA TLB TO ILB | |
| S0306 | RST CC | |
| S306.1 | DEC CC | |
| S0307 | TRA ILB TO WS | Get First Line |
| S0308 | BRN: TRA NAR(S0310) TO BC ON MATCH OF MCR(ELC) AND I/O | |
| S0309 | TRA NAR(S0307) TO BC | |
| S0310 | RST CC | |
| S0401 | TRA WS TO I/O | First Character Only |
| S0402 | BRN: TRA NAR(I0101) TO BC ON MATCH OF MCR(BTC) AND I/O | Input |
| S0403 | BRN: TRA NAR(C0101) TO BC ON MATCH OF MCR(BEC) AND I/O | Edit |
| S0404 | BRN: TRA NAR(P0101 TO BC ON MATCH OF MCR(LST) AND I/O | List |
| S0405 | BRN: TRA NAR(P0101) TO BC ON MATCH OF MCR(PNT) AND I/O | Print |
| S0406 | BRN: TRA NAR(P0101) TO BC ON MATCH OF MCR(PNTP) AND I/O | Printer |
| S0407 | BRN: TRA NAR(P0101) TO BC ON MATCH OF MCR(LSTP) AND I/O | Printer |
| S0408 | BRN: TRA NAR(E0101) TO BC ON MATCH OF MCR(ERA) AND I/O | Erase |
| S0409 | BRN: TRA NAR(L0101) TO BC ON MATCH OF MCR(SLC) AND I/O | Set Line Length |
| S0410 | RST CC | Error Condition |
| S0501 | TRA NAR(?) TO WS | Insert ? in Output Stream |
| S0502 | INC CC | |
| S0503 | TRA NAR(ELC) TO WS | Insert Delimiter |
| S0504 | DEC CC | Back to Beginning of Line |
| S0505 | TRA WS TO ILB | |
| S0506 | TRA ILB TO TLB | Output Error Message |
| S0507 | TRA NAR(4) TO TC | |
| S0508 | TRA NAR(S0305) TO MAS | Store Return Address |
| S0509 | TRA NAR(S0204) TO BC | |

INPUT

| Instruction | | Explanation |
|---|---|---|
| I0101 | TRA NAR(2) TO TC | |
| I0102 | TRA NVM TO MAS | Store Vacant Page Address |
| I0103 | TRA NVM TO MAS | |
| I0104 | LOC NVM | Find Next Vacant Memory |
| I0105 | RST LC | |
| I0106 | RST CC | |
| I0107 | TRA NAR(2) TO TC | |
| I0108 | TRA MAS TO WS | Move Page Number to Storage |
| I0109 | INC CC | |
| I0110 | TRA MAS TO WS | |
| I0201 | TRA NAR(ELC) TO WS | Store Delimiter |
| I0202 | RST CC | |
| I0203 | TRA WS TO ILB | |
| I0204 | BRN: TRA NAR(I0206) TO BC ON MATCH OF MCR(ELC) AND I/O | |
| I0205 | TRA NAR(I0203) TO BC | |
| I0206 | TRA ILB TO TLB | Display Document Number |
| I0207 | TRA NAR(4) TO TC | |
| I0208 | TRA NAR(I0210) TO MAS | Store Next Cycle Address |
| I0209 | TRA NAR(S0204) TO BC | Return Control |
| I0210 | TRA TLB TO ILB | |
| I0301 | RST CC | |
| I0301 | DEC CC | |
| I0302 | TRA ILB TO WS | Bring in Next Line |
| I0303 | BRN: TRA NAR(I0309) TO BC ON MATCH OF MCR(ELC) AND I/O | |
| I0304 | BRN: TRA NAR(I0306) TO BC ON MATCH OF MCR(BSC) AND I/O | |
| I0305 | TRA NAR(I0302) TO BC | |
| I0306 | DEC CC | Overlay Backspace Character |
| I0307 | DEC CC | Overlay Character in Error |
| I0308 | TRA NAR(I0302) TO BC | |
| I0309 | DEC CC | Decrement to Check for Control |
| I0401 | DEC CC | |
| I0402 | TRA WS TO I/O | Transfer Character for Comparison |
| I0403 | BRN: TRA NAR(I0405) TO BC ON MATCH OF MCR(UCC) AND I/O | |
| I0404 | TRA NAR(I0710) TO BC | |
| I0405 | INC CC | |
| I0406 | TRA WS TO I/O | |
| I0407 | BRN: TRA NAR(I0501) TO BC ON MATCH OF MCR(KLC) AND I/O | Kill Line |
| I0408 | BRN: TRA NAR(I0503) TO BC ON MATCH OF MCR(ETC) AND I/O | End Text |
| I0409 | BRN: TRA NAR(I0610) TO BC ON MATCH OF MCR(ICC) AND I/O | Insert |
| I0410 | TRA NAR(I0710) TO BC | If None of the Above |
| I0501 | RST CC | Ignore Current Line |
| I0502 | TRA NAR(I0207) | Return Control |
| I0503 | RST CC | |
| I0504 | TRA WS TO MEM | Output Current Line |
| I0505 | INC LC | |
| I0506 | RST CC | |
| I0507 | TRA NAR(UCC) TO WS | Build End Text Lines |
| I0508 | INC CC | |
| I0509 | TRA NAR(ETC) TO WS | |
| I0510 | INC CC | |
| I0601 | TRA NAR(ELC) TO WS | |
| I0602 | RST CC | |
| I0603 | TRA WS TO MEM | Put Out Immediately after Text |
| I0604 | TRA NAR(0) TO TC | |
| I0605 | TRA NAR(3) TO MAS | Store Last Line Number |
| I0606 | TRA NAR(0) TO MAS | |
| I0607 | RST CC | |
| I0608 | TRA WS TO MEM | Put Out on Last Physical Line |
| I0609 | TRA NAR(S0507) TO BC | Transfer Control |
| I0610 | TRA NAR(EIC) TO WS | Overlay ICC with an EIC |
| I0701 | TRA NAR(5) TO TC | |
| I0702 | INC CC | |
| I0703 | BRN: TRA NAR(I0706) TO BC ON MATCH OF MCR(9) AND TC | |
| I0704 | TRA TO WS | Output Return Page and Line Address |
| I0705 | TRA NAR(I0702) TO BC | |
| I0706 | TRA NAR(ELC) TO WS | Insert Delimiter |
| I0707 | RST CC | |
| I0708 | TRA WS TO MEM | Output Line |
| I0709 | TRA NAR(S0507) TO BC | Return Control |
| I0710 | RST CC | Line W/O Control Function |
| I0801 | TRA WS TO MEM | Output Current Line |
| I0802 | INC LC | |
| I0803 | BRN: TRA NAR(I0805) TO BC ON MATCH OF MCR(30) AND LC | Page Overflow |
| I0804 | TRA NAR(I0207) TO BC | Return Control if No Overflow |
| I0805 | RST CC | |

| | | |
|---|---|---|
| I0806 | TRA NAR(EPC) TO WS | Store End Page Symbol |
| I0807 | INC CC | |
| I0808 | TRA NAR(0) TO WS | Insert Line Number |
| I0809 | INC CC | |
| I0810 | TRA NAR(1) TO WS | |
| I0901 | INC CC | |
| I0902 | TRA NVM TO WS | Insert Next Page Number |
| I0903 | INC CC | |
| I0904 | TRA NVM TO WS | |
| I0905 | INC CC | |
| I0906 | TRA NAR(ELC) TO WS | Insert Delimiter |
| I0907 | RST CC | |
| I0908 | TRA WS TO MEM | Store Line |
| I0909 | RST CC | |
| I0910 | INC CC | Bump Past EPC |
| I1001 | TRA WS TO ILB | Display Page Number |
| I1002 | TRA ILB TO TLB | |
| I1003 | RST LC | |
| I1004 | LOC NVM | Find Next Vacant Memory |
| I1005 | TRA NAR(I0207) TO BC | |

EDIT

| Instruction | | Explanation |
|---|---|---|
| C0101 | TRA NAR(0) TO TC | |
| C0102 | INC CC | |
| C0103 | TRA WS TO MAS | Store Line and Page Numbers |
| C0104 | BRN: TRA NAR(C0106) TO BC ON MATCH OF MCR(4) AND TC | |
| C0105 | TRA NAR(C0102) TO BC | |
| C0106 | RST CC | |
| C0107 | TRA MEM TO WS | Bring in Line to be Corrected |
| C0108 | RST CC | Inhibit |
| C0109 | TRA WS TO ILB | Data |
| C0110 | RST CC | Ready |
| C0201 | TRA ILB TO WS | |
| C0202 | TRA NAR(ELC) TO WS | |
| C0203 | DEC CC | |
| C0204 | TRA NAR(SCR) TO WS | |
| C0205 | RST CC | |
| C0206 | TRA WS TO ILB | |
| C0207 | BRN: TRA NAR(C0209) TO BC ON MATCH OF MCR(ELC) AND I/O | |
| C0208 | TRA NAR(C0206) TO BC | |
| C0209 | TRA ILB TO TLB | Display Line to Operator |
| C0210 | TRA NAR(4) TO TC | |
| C0301 | TRA NAR(C0303) TO MAS | Store Return Address |
| C0302 | TRA NAR(S0204) TO BC | Return Control |
| C0303 | RST CC | |
| C0301.1 | DEC CC | |
| C0304 | TRA TLB TO ILB | |
| C0305 | TRA ILB TO WS | Input New Line |
| C0306 | BRN: TRA NAR(C0402) TO BC ON MATCH OF MCR(ELC) AND I/O | |
| C0307 | BRN: TRA NAR(C0309) TO BC ON MATCH OF MCR(BSC) AND I/O | |
| C0308 | TRA NAR(C0305) TO BC | |
| C0309 | DEC CC | Overlay Backspace Character |
| C0310 | DEC CC | Overlay Error Character |
| C0401 | TRA NAR(C0305) TO BC | |
| C0402 | TRA CC TO 2LCC | Old Line Pointer |
| C0403 | TRA MEM TO WS | Input Old Line |
| C0404 | RST CC | |
| C0405 | TRA CC TO IWSC | Point to New Line |
| C0406 | TRA WS TO I/O | Shift Single Character |
| C0407 | BRN: TRA NAR(C0501) TO BC ON MATCH OF MCR(SPC) AND I/O | |
| C0408 | BRN: TRA NAR(C0601) TO BC ON MATCH OF MCR(UCC) AND I/O | |
| C0409 | BRN: TRA NAR(C0906) TO BC ON MATCH OF MCR(ELC) AND I/O | |
| C0410 | TRA NAR(C0507) TO BC | |
| C0501 | TRA NAR (4) TO TC | |
| C0502 | TRA 2LCC TO CC | Point to Old Line |
| C0503 | TRA WS TO MAS | Shift Old Character |
| C0504 | TRA IWSC TO CC | Point to New Line |
| C0505 | TRA NAR (4) TO TC | |
| C0506 | TRA MAS TO WS | Overlay Space with old Character |
| C0507 | INC IWSC | Bump New Line Pointer |
| C0508 | INC 2LCC | Bump Old Line Pointer |
| C0509 | TRA IWSC TO CC | Point to New Line |
| C0510 | TRA NAR (C0406) TO BC | Get Next Character |
| C0601 | INC IWSC | Bump Pointer Past UCC |
| C0602 | INC CC | |
| C0603 | TRA WS TO I/O | |
| C0604 | BRN: TRA NAR (C0609) TO BC ON MATCH OF MCR (DCC) AND I/O | |
| C0605 | BRN: TRA NAR (C0803) TO BC ON MATCH OF MCR (ETC) AND I/O | |
| C0606 | BRN: TRA NAR (C0805) TO BC ON MATCH OF MCR (ECC) AND I/O | |
| C0607 | BRN: TRA NAR(C0909) TO BC ON MATCH OF MCR(ICC) AND I/O | |
| C0608 | TRA NAR(C 0508) TO BC | |
| C0609 | TRA 2LCC TO CC | Point to Old Line |
| C0610 | TRA WS TO I/O | |
| C0701 | BRN: TRA NAR(C0707) TO BC ON MATCH OF MCR(SPC) AND I/O | Delete Word |
| C | INC 2LCC | Pass Over Incorrect Character |
| C0703 | TRA IWSC TO CC | Point to New Line |
| C0704 | TRA NAR(SPC) TO WS | Overlay DCC with a Blank |
| C0705 | DEC IWSC | Point Back to UCC |
| C0706 | TRA NAR(C0501) TO BC | |
| C0707 | INC CC | |
| C0708 | TRA WS TO I/O | |
| C0709 | BRN: TRA NAR(C0801) TO BC ON MATCH OF MCR)SPC) AND I/O | |
| C0710 | TRA NAR(C0707) TO BC | Get Next Character |
| C0801 | TRA CC TO 2LCC | Bump Pointer Past Delete |
| C0802 | TRA NAR(C0703) TO BC | |
| C0803 | RST CC | Error Condition - Get Out |
| C0804 | TRA NAR(C0509) TO BC | Return Control |
| C0805 | TRA NAR(4) TO TC | |
| C0806 | TRA NAR(S 0305) TO MAS | Store Return Address |
| C0807 | TRA 2LCC TO CC | |
| C0808 | TRA WS TO ILB | Shift Remainder of Old Line |
| C0809 | BRN: TRA NAR (C0901) TO BC ON MATCH OF MCR(ELC) AND I/O | |
| C0810 | TRA NAR(C0808) TO BC | |
| C0901 | DEC IWSC | |
| C0902 | TRA IWSC TO CC | Set to end of Correction |
| C0903 | TRA TLB TO ILB | Plus One |
| C0903.1 | TRA ILB TO WS | Combine Both Portions |
| C0904 | BRN: TRA NAR(C0906) TO BC ON MATCH OF MCR(ELC) AND I/O | |
| C0905 | TRA NAR(C0903) TO BC | |
| C0906 | RST CC | |
| C0907 | TRA WS TO MEM | Output Updated Line |
| C0908 | TRA NAR(S0204) to BC | Return Control |
| C0909 | TRA NAR(0) TO TC | |
| C0910 | INC CC | |
| C1001 | TRA MAS TO WS | Store Return Page number |
| C1002 | BRN: TRA NAR(C1004) TO BC ON MATCH OF MCR(4) AND TC | |
| C1003 | TRA NAR(C0910) TO BC | |
| C1004 | DEC CC | Point Back to First Digit Line Number |
| C1005 | DEC CC | |
| C1006 | DEC CC | |
| C1007 | BRN: TRA NAR(C1103) TO BC ON MATCH OF MCR(9) AND TC | |
| C1008 | TRA NAR(5) TO TC | |
| C1009 | TRA WS TO MAS | Shift Line and Page Numbers for Return from ICC |
| C1010 | BRN: TRA NAR(C1004) TO BC ON MATCH OF MCR(9) AND TC | |
| C1101 | INC CC | |
| C1102 | TRA NAR(C1009) TO BC | |

| | | |
|---|---|---|
| C1103 | TRA NAR(2) TO | |
| C1104 | TRA NVM TO MAS | Store New Page Number |
| C1105 | TRA NVM TO MAS | |
| C1106 | RST LC | |
| C1107 | TRA NAR(0) TO TC | |
| C1108 | TRA MAS TO WS | Store Go to Line and Page Numbers |
| C1109 | INC CC | |
| C1110 | BRN: TRA NAR(C1202) TO BC ON MATCH OF MCR(4) AND TC | |
| C1201 | TAR NAR(C1108) (103 BC | |
| C1202 | TRA CC TO IWSC | Store Location in New Line |
| C1203 | TRA NAR(4) TO TC | |
| C1204 | TRA NAR(I0210) TO MAS | Store Return Address |
| C1205 | LOC NVM | Find Next Vacant Memory |
| C1206 | TRA NAR(C0807) TO BC | |

PRINT AND LIST

| | INSTRUCTION | EXPLANATION |
|---|---|---|
| P0101 | TRA NAR(0) TO TC | Beginning and Ending Line Page Numbers |
| P0102 | INC CC | |
| P0103 | TRA WS TO MAS | |
| P0104 | BRN: TRA NAR(P(P0106) TO BC ON MATCH OF MCR(10) AND TC | |
| P0105 | TRA NAR(P0102) TO BC | |
| P0106 | RST CC | Initialize CC Pointer |
| P0107 | TRA CC TO MAS | (Note: TC = 10 from P0104) |
| P0108 | TRA NAR(4) TO TC | |
| P0109 | TRA WS TO I/O | Check Mode |
| P0110 | BRN: TRA NAR(P0204) TO BC ON MATCH OF MCR(PNT) AND I/O | Print |
| P0201 | BRN: TRA NAR(P0206) TO BC ON MATCH OF MCR(LST) AND I/O | List |
| P0202 | BRN: TRA NAR(P0208) TO BC ON MATCH OF MCR(PNTP) AND I/O | Print at Printer |
| P0203 | BRN: TRA NAR(P0303) TO BC ON MATCH OF MCR(LSTP) AND I/O | List at Printer |
| P0204 | TRA NAR(P0306) TO MAS | Entry Address for Print |
| P0205 | TRA NAR(S(S0204) TO BC | Set PSR |
| P0206 | TRA NAR(P0305) TO MAS | ENtry Address for List |
| P0207 | TRA NAR(S0204) TO BC | Set PSR |
| P0208 | TRA NAR(P0306) TO MAS | Entry Address For Print |
| P0209 | TRA NAR(0) (O) TO TC | |
| P0210 | TRA MAS TO PSRP | Set PSRP |
| P0301 | BRN: TRA NAR(S0208) TO BC ON MATCH OF MCR (11) AND TC | |
| P0302 | TRA NAR(P0210) TO BC | |
| P0303 | TRA NAR(P0305) TO MAS | Entry Address for List |
| P0304 | TRA NAR(P0209) TO BC | Set PSRP |
| P0305 | TRA NAR(P0306) TO BC | List Entry (Note: If MAS(5) has P0305: List If MAS(5) HAS P0306: Print) |
| P0307 | TRA MAS TO MCR | |
| P0308 | TRA MCR TO IWSC | Set Line Length |
| P0309 | RST CC | Put Current Line and Page |
| P0310 | TRA NAR(0) TO TC | |
| P0401 | TRA MAS TO WS | Number in WS |
| P0402 | BRN: TRA NAR(P0405) TO BC ON MATCH OF MCR(4) AND TC | |
| P0403 | INC CC | |
| P0404 | TRA NAR(P0401) TO BC | Check |
| P0405 | RST CC | If |
| P0406 | TRA NAR(5) TO TC | Last |
| P0407 | TRA MAS TO MCR | Line and Page |
| P0408 | TRA WS TO I/O | Number |
| P0409 | BRN: TRA NAR(P0501) TO BC ON MATCH OF MCR | |

| | | |
|---|---|---|
| | AND I/O | |
| P0410 | TRA NAR(P0509) TO BC | Not Last |
| P0501 | INC CC | Check for |
| P0502 | BRN: TRA NAR(P0504) TO BC ON MATCH OF MCR(5) AND CC | All Digits |
| P0503 | TRA NAR(P0407) TO BC | |
| P0504 | RST CC | |
| P0505 | TRA MEM TO WS | Last Line to WS |
| P0506 | TRA NAR(10) TO TC | |
| P0507 | TRA MAS TO CC | Pointer to first Character in Line |
| P0508 | TRA NAR(P2504) TO BC | Output Last Line |
| P0509 | RST CC | Process Next Line |
| P0510 | TRA MEM TO WS | |
| P0601 | TRA NAR(10) TO TC | |
| P0602 | TRA MAS TO CC | Character Pointer |
| P0603 | TRA CC TO 2LCC | |
| P0604 | BRN: TRA NAR(P0606) TO BC ON MATCH OF MCR(1) AND CC | If First Position Check for Control Character |
| P0605 | TRA NAR(P0610) TO BC | Process Text |
| P0606 | TRA WS TO I/O | Check Control |
| P0607 | BRN: TRA NAR(P2501) TO BC ON MATCH OF MCR(ELC) AND I/O | paragraph |
| P0608 | BRN: TRA NAR(P0708) TO BC ON MATCH OF MCR(UCC) AND I/O | universal Control |
| P0609 | BRN: TRA NAR(P1804 ) TO BC ON MATCH OF MCR(EPC) AND I/O | End Of Page |
| P0610 | INC 2LCC | Second Line Pointer |
| P0701 | INC CC | Next Character |
| P0702 | DEC IWSC | Count for Justification |
| P0703 | TRA WS TO I/O | Check for Control |
| P0704 | BRN: TRA NAR(P0903) TO BC ON MATCH OF MCR(1) AND IWSC | Line Length Reached |
| P0705 | BRN: TRA NAR(P1504) TO BC ON MATCH OF MCR(ELC) AND I/O | End of Memory Line Reached Before Line Length Reached AND check for ICC |
| P0706 | BRN: TRA NAR(P0808) TO BC ON MATCH OF MCR(UCC) AND I/O | |
| P0707 | TRA NAR(P0610) TO BC | |
| P0708 | INC CC | |
| P0709 | TRA WS TO I/O | Check for Particular Control |
| P0710 | BRN: TRA NAR(P2804) to BC ON MATCH OF MCR(FRC) AND I/O | Flush Right |
| P0801 | BRN: TRA NAR(P2804) TO BC ON MATCH OF MCR(CCC) AND I/O | Center |
| P0802 | BRN: TRA NAR(P3201) TO BC ON MATCH OF MCR(FLC) AND I/O | Flush Left |
| P0803 | BRN: TRA NAR(P2410) TO BC ON MATCH OF MCR(HCC) AND I/O | Header |
| P0804 | BRN: TRA NAR(P1804) TO BC ON MATCH OF MCR(ICC) AND I/O | Insert (Begin) |
| P0805 | BRN: TRA NAR(P1804) TO BC ON MATCH OF MCR(EIC) AND I/O | Insert (End) |
| P0806 | BRN: TRA NAR(P2504) TO BC ON MATCH OF MCR(ETC) AND I/O | End of Text |
| P0807 | TRA NAR(P0610) TO BC | Process Next Character |
| P0808 | INC CC | Control Check |
| P0809 | TRA WS to I/O | |
| P0810 | BRN: TRA NAR (P1804) TO BC ON MATCH OF MCR (ICC) AND I/O | |
| P0901 | BRN: TRA NAR (P1804) TO BC ON MATCH OF MCR (EIC) AND I/O | Insert: Get Next *Line* |
| P0902 | TRA NAR (p0610) to BC | PROCESS |
| P0903 | BRN: TRA NAR (P1004) TO BC ON MATCH OF MCR (ELC) AND I/O | Line Requires one space for Just-ification |

| | | |
|---|---|---|
| P0904 | INC CC | |
| P0905 | TRA WS TO I/O | Next Character |
| P0906 | BRN: TRA NAR (P1005) TO BC ON MATCH OF MCR (ELC) AND I/O | Line is justified As it Stands |
| P0907 | INC 2LCC | |
| p0908 | BRN: TRA NAR (P1006) TO BC ON MATCH OF MCR(SPC) AND I/O | this part of Mem Line is justified |
| P0909 | DEC CC | Find first |
| P 0910 | DEC 2LCC | Previous Interword Space |
| P1001 | Inc IWSC | |
| P1002 | TRA WS TO I/O | |
| P1003 | TRA NAR (P0908) TO BC | |
| P1004 | INC IWSC | One Space Needed |
| P1005 | INC CC | |
| P1006 | TRA NAR (ELC) TO WS | Fix End of Output Line |
| P1007 | BRN: TRA NAR (P1303) TO BC ON MATCH OF MCR(1) AND IWSC | Line justified |
| P1008 | TRA NAR (10) TO TC | |
| P1009 | TRA MAS TO CC | Reset Pointer |
| P1010 | TRA NAR(P1102) TO BC | |
| P1101 | INC CC | |
| P1102 | TRA 1-WS TO ILB | Pass Initial Spaces |
| P1103 | BRN: TRA NAR(P1101) TO BC ON MATCH OF MCR(SPC) AND I/O | |
| P1104 | INC CC | |
| P1105 | TRA 1-WS TO ILB | Line To Output |
| P1106 | BRN: TRA NAR(P1109) TO BC ON MATCH OF MCR(ELC) AND I/O | Need additional interword Spaces |
| P1107 | BRN: TRA NAR(P1205) TO BC ON MATCH OF MCR(SPC) AND I/O | Insert Space |
| P1108 | TRA NAR(P1104) TO BC | |
| P1109 | RST CC | Reset Pointer |
| P1110 | TRA ILB TO WS | Bring Line Back to Insert Additional Spaces |
| P1201 | BRN: TRA NAR(P1203) TO BC ON MATCH OF MCR(ELC) AND I/O | Get Entire Line |
| P1202 | TRA NAR(P1110) TO BC | |
| P1203 | RST CC | Reset Pointer |
| P1204 | TRA NAR(P1102) TO BC | |
| P1205 | TRA 1-WS TO ILB | Interword Space |
| P1206 | INC CC | |
| P1207 | TRA 1-WS TO ILB | Do Not Check Following Character for Space |
| P1208 | INC CC | |
| P1209 | DEC IWSC | Count Interword Spaces |
| P1210 | BRN: TRA NAR(P1305) TO BC ON MATCH OF MCR(1) AND IWSC | Line Finished |
| P1301 | BRN: TRA NAR(P1109) TO BC ON MATCH OF MCR(ELC) AND I/O | Need Additional Spaces |
| P1302 | TRA NAR(P(P1105) TO BC | Continue Inserting Spaces |
| P1303 | TRA NAR(10) TO TC | |
| P1304 | TRA MAS TO CC | Save Pointer |
| P1305 | TRA WS TO ILB | Output Remainder of Line |
| P1306 | BRN: TRA NAR(P1308) TO BC ON MATCH OF MCR(ELC) AND I/O | Complete Line |
| P1307 | TRA NAR(P1305)TO BC | |
| P1308 | TRA WS TO I/O | |
| P1309 | BRN: TRA NAR(P1501) TO BC ON MATCH OR MCR(ELC) AND I/O | Second ELC: Set up for next line on next Proc ssing cycle |
| P1310 | INC 2LCC | |
| P1401 | TRA 2LCC TO CC | Save Pointer to Character in second Line which will Be Pointer In First Line |
| P1402 | TRA NAR(10) TO TC | |

| | | |
|---|---|---|
| P1403 | TRA CC TO MAS | Next Processing Cycle |
| P1404 | RST CC | |
| P1405 | TRA NAR(4) TO TC | Test For List Or Print |
| P1406 | TRA MAS TO WS | |
| P1407 | TRA WS TO I/O | |
| P1408 | BRN: TRA NAR(P2609) TO BC ON MATCH OF NCR(P0305) AND I/O | List |
| P1409 | TRA ILB TO TLB | Print: Output Finished Line |
| P1410 | TRA NAR(S0204) TO BC | Reset for Next Cycle |
| P1501 | INC LC | First Character of Second Line Becomes First Character of First Line For Next Cycle |
| P1502 | RST CC | |
| P1503 | TRA NAR(P1402) TO BC | |
| P1504 | INC LC | Next Line |
| P1505 | INC CC | First Character |
| P1506 | TRA CC TO 2LCC | Save Pointer |
| P1507 | TRA MEM TO WS | Next Line in WS |
| P1508 | TRA 2LCC TO CC | Restore Pointer |
| P1509 | TRA WS TO I/O | Check Control |
| P1510 | BRN: TRA NAR(P1709) TO BC ON MATCH OF MCR(ELC) AND I/O | paragraph |
| P1601 | BRN: TRA NAR(P1705) TO BC ON MATCH OF MCR(UCC) AND I/O | universal Control |
| P1602 | BRN: TRA NAR(P1804) TO BC ON MATCH OF MCR(EPC) AND I/O | End of Page |
| P1603 | TRA NAR((4) TO TC | Check For List Or Print |
| P1604 | DEC CC | |
| P1605 | TRA MAS TO WS | |
| P1606 | TRA WS TO I/O | |
| P1607 | BRN: TRA NAR(P1703) TO BC ON MATCH OF MCR(P0305) AND I/O | List |
| P1608 | TRA NAR(SPC) to WS | Print: Insert Space |
| P1609 | RST 2LCC | Second Line Pointer |
| P1610 | INC CC | Count the Space |
| P1701 | DEC IWSC | |
| P1702 | TRA NAR(P0703) TO BC | Continue Processing |
| P1703 | TRA NAR(—) TO WS | List: Insert "—" Between Lines |
| P1704 | TRA NAR(P1609) TO BC | Next Line |
| P1705 | INC CC | Second Line |
| P1706 | TRA WS TO I/O | Test for Control |
| P1707 | BRN: TRA NAR(P1804) TO BC ON MATCH OF MCR(ICC) AND I/O | Insert |
| P1708 | BRN: TRA NAR(P1804) TO BC ON MATCH OF MCR(EIC) AND I/O | |
| P1709 | TRA NAR(10) TO TC | End of Document or Header or Other Special Line |
| P1710 | TRA MAS TO CC | Reset Pointer |
| P1801 | TRA WS TO ILB | Output Previous Line (Unjustified) |
| P1802 | BRN: TRA NAR(P1502) TO BC ON MATCH OF MCR(ELC) AND I/O | Complete Line |
| P1803 | TRA NAR(P1801) TO BC | |
| P1804 | TRA NAR(0) TO TC | End of Page or Insert |
| P1805 | INC CC | |
| P1806 | TRA WS TO MAS | Line and Page Number |
| P1807 | BRN: TRA NAR(P1809) TO BC ON MATCH OF MCR(4) AND TC | |
| P1808 | TRA NAR(P1805) TO BC | |
| P1809 | DEC CC | Move Pointer Back to First Position |
| P1810 | DEC CC | |
| P1901 | DEC CC | |
| P1902 | DEC CC | |
| P1903 | TRA WS TO I/O | |
| P1904 | BRN: TRA NAR(P1505) TO BC ON MATCH OF MCR(EPC) AND I/O | End of Page |
| P1905 | BRN: TRA NAR(1506) TO BC ON MATCH OF MCR(ICC) AND I/O | |
| P1906 | DEC CC | End of Insert |
| P1907 | TRA NAR(SPC) TO WS | Insert (ICC): Move Space |

| | | |
|---|---|---|
| | | between words |
| P1908 | INC CC | |
| P1909 | TRA CC TO 2LCC | |
| P1910 | TRA MEM TO WS | Next Line to WS |
| P2001 | TRA 2LCC TO CC | Reset Pointer |
| P2002 | TRA WS TO I/O | |
| P2003 | INC CC | |
| P2004 | BRN: TRA NAR(P2006) TO BC ON MATCH OF MCR(ICC) AND I/O | End of Insert |
| P2005 | TRA NAR(P2002) TO BC | |
| P2006 | TRA NAR(0)TO TC | Save MAS |
| P2007 | TRA MAS TO PSR | |
| P2008 | BRN: TRA NAR(P2010) TO BC ON MATCH OF MCR(11) AND TC | |
| P2009 | TRA NAR(P2006) TO BC | |
| P2010 | TRA NAR(10) TO TC | |
| P2101 | INC CC | |
| P2102 | INC CC | |
| P2103 | INC CC | |
| P2104 | INC CC | |
| P2105 | TRA CC TO MAS | |
| P2106 | TRA IWSC TO CC | Save IWSC |
| P2107 | TRA NAR(8) TO TC | |
| P2108 | TRA CC TO MAS | |
| P2109 | RST CC | |
| P2110 | TRA CC TO IWSC | Count Characters |
| P2201 | TRA 2LCC TO CC | |
| P2202 | TRA NAR(4) TO TC | Move |
| P2203 | TRA CC TO MAS | Second |
| P2204 | TRA NAR(10) TO TC | Part |
| P2205 | TRA MAS TO CC | Of |
| P2206 | TRA NAR(9) TO TC | Line |
| P2207 | TRA WS TO MAS | In |
| P2208 | TRA CC TO MAS | WS |
| P2209 | TRA 2LCC TO CC | To |
| P2210 | TRA NAR(9) TO TC | Join ..... |
| P2301 | TRA MAS TO WS | . . . With |
| P2302 | TRA MAS TO CC | First |
| P2303 | INC IWSC | Line |
| P2304 | TRA WS TO I/O | |
| P2305 | BRN: TRA NAR(P2309) TO BC ON MATCH OF MCR(ELC) AND I/O | Finished |
| P2306 | INC CC | |
| P2307 | INC 2LCC | |
| P2308 | TRA NAR(P2206) TO BC | |
| P2309 | TRA IWSC TO CC | Count to CC |
| P2310 | TRA CC TO 2LCC | Set 2LCC |
| P2401 | TRA NAR(8) TO TC | |
| p2402 | TRA MAS TO CC | |
| P2403 | TRA CC TO IWSC | Restore IWSC |
| P2404 | TRA NAR(4) TO TC | |
| P2405 | TRA MAS TO CC | |
| P2406 | TRA NAR(0) TO TC | Restore MAS |
| P2407 | TRA PSR TO MAS | |
| P2408 | BRN: TRA NAR(P0702) TO BC ON MATCH OF MCR(11) AND TC | Continue Process |
| P2409 | TRA NAR(P2407) TO BC | |
| P2410 | INC CC | Header, Flush Right, Center |
| P2501 | TRA WS TO ILB | Paragraph, Flush Left |
| P2502 | BRN: TRA NAR(P1501) TO BC ON MATCH OF MCR(ELC) AND I/O | Complete Line |
| P2503 | TRA NAR(P2501) TO BC | |
| P2504 | INC CC | Last Line of Document |
| P2505 | TRA WS TO ILB | |
| P2506 | RST CC | Put |
| P2507 | TRA ILB TO WS | Special |
| P2508 | TRA NAR(ELC) TO WS | Control Character |
| P2509 | DEC CC | Before ELC |
| P2510 | TRA NAR(SCR) TO WS | To Suppress |
| P2601 | TRA WS TO ILB | Data Ready |
| P2602 | BRN: TRA NAR(P2604) TO BC ON MATCH OF MCR(ELC) AND I/O | Complete Line |
| P2603 | TRA NAR(P2505) TO BC | |
| P2604 | TRA NAR(4) TO TC | Set for |
| P2605 | TRA NAR(S0305) TO MAS | Select |
| P2606 | REL PSRP | Release busy signal on PSRP |
| P2607 | TRA ILB TO TLB | Output Line |
| P2608 | TRA NAR(S0204) TO BC | Reset PSR |
| P2609 | TRA ILB TO WS | Line Back to WS to Add Line and Page Number |
| P2610 | BRN: TRA NAR(P2607) TO BC ON MATCH OF MCR(ELC) AND I/O | Complete line |
| P2701 | TRA NAR(P2609) TO BC | |

| | | |
|---|---|---|
| P2702 | DEC CC | Space In Place of ELC After Last |
| P2703 | TRA NAR(SPC) TO WS | Character of Line |
| P2704 | TRA NAR(0) TO TC | Line and Page Number to WS |
| P2705 | INC CC | |
| P2706 | TRA MAS TO WS | |
| P2707 | BRN: TRA NAR(P2709) TO BC ON MATCH OF MCR(4) AND TC | |
| P2708 | TRA NAR(P2610)TO BC | |
| P2709 | INC CC | |
| P2710 | TRA NAR(ELC) TO WS | ELC at End of Output Line |
| P2801 | RST CC | |
| P2801.1 | TRA WS TO ILB | |
| P2802 | BRN: TRA NAR(P1409) TO BC ON MATCH OF MCR(ELC) AND I/O | Output |
| P2803 | TRA NAR(P2801) TO BC | |
| P2804 | TRA NAR(9) TO TC | Flush Right, Center |
| P2805 | TRA MAS TO MCR | |
| P2806 | TRA MCR TO IWSC | Set Line Length |
| 2807 | RST 2LCC | Initialize |
| P2808 | INC CC | Next Character |
| P2809 | TRA WS TO I/O | |
| P2810 | BRN: TRA NAR(P2903) TO BC ON MATCH OF MCR(ELC) AND I/O | count characters |
| P2901 | INC 2LCC | |
| P2902 | TRA NAR(P2808) TO BC | |
| P2903 | RST CC | |
| P2904 | INC CC | Check whether Flush Right or Center |
| P2905 | TRA WS TO I/O | |
| P2906 | BRN: TRA NAR(P3007) TO BC ON MATCH OF MCR(CCC) AND I/O | Center |
| P2907 | DEC 2LCC | Flush Right |
| P2908 | TRA 2LCC TO CC | Number of |
| P2909 | TRA CC TO MCR | Character in Line |
| P2910 | RST CC | |
| P3001 | INC CC | |
| P3002 | TRA NAR(SPC) TO WS | Output Spaces |
| P3003 | TRA 1-WS TO ILB | |
| P3004 | DEC IWSC | Count |
| P3005 | BRN: TRA NAR(P2410) TO BC ON MATCH OF MCR AND IWSC | Output |
| P3006 | TRA NAR(P3003) TO BC | |
| P3007 | INC IWSC | Center |
| P3008 | BRN: TRA NAR(P3004) TO BC ON MATCH OF MCR(0) AND I/O | Put "0" in MCR |
| P3009 | TRA 2LCC TO CC | Number of Characters |
| P3010 | DEC CC | |
| P3101 | DEC IWSC | Set Number of Characters |
| P3102 | BRN: TRA NAR(P3104) TO BC ON MATCH OF MCR AND CC | |
| P3103 | TRA NAR(P3010) TO BC | |
| P3104 | RST 2LCC | |
| P3105 | TRAC CC TO MCR | Find Beginning Point |
| P3106 | BRN: TRA NAR(P2907) TO BC ON MATCH OF MCR AND IWSC | of Centered |
| P3107 | DEC IWSC | Text |
| P3108 | BRN: TRA NAR(P2907) TO BC ON MATCH OF MCR AND IWSC | |
| P3109 | INC CC | |
| P3110 | TRA NAR(P3105) TO BC | |
| P3201 | INC CC | Flush Left |
| P3202 | TRA WS TO I/O | |
| P3203 | BRN: TRA NAR(P3201) TO BC ON MATCH OF MCR(SPC) AND I/O | |
| P3204 | TRA NAR(P2501) TO BC | Output |

ERASE

| INSTRUCTION | | EXPLANATION |
|---|---|---|
| E0101 | RST CC | |
| E0102 | TRA WS TO ILB | Set Data Ready for |
| E0103 | TRA ILB TO TLB | Next Cycle |
| E0104 | RST CC | Move Document |
| E0105 | TRA NAR(2) TO TC | Number to |
| E0106 | TRA WS TO MAS | MAS |
| E0107 | INC CC | |
| E0108 | TRA WS TO MAS | |
| E0109 | TRA NAR(E0204) TO MAS | Set Next Entry |
| E0110 | TRA NAR(0) TO TC | |

| | | |
|---|---|---|
| E0201 | TRA NAR(3) TO MAS | Last Line Number to |
| E0202 | TRA NAR(0) TO MAS | MAS |
| E0203 | TRA NAR(S0204) TO BC | Return |
| E0204 | TRA MEM TO WS | Get Last Line of Page to be Erased |
| E0205 | ERA NVM | Erase |
| E0206 | RST CC | Check |
| E0207 | INC CC | For |
| E0208 | TRA WS TO I/O | Last Page |
| E0209 | BRN: TRA NAR(E0310) TO BC ON MATCH OF MCR(ETC) AND I/O | |
| E0210 | INC CC | Not Last Page |
| E0301 | INC CC | |
| E0302 | TRA NAR(2) TO TC | Next |
| E0303 | TRA WS TO MAS | Page Number |
| E0304 | INC CC | To |
| E0305 | TRA WS TO MAS | MAS |
| E0306 | RST CC | Set |
| E0307 | TRA WS TO ILB | Data |
| E0308 | TRA ILB TO TLB | Ready |
| E0309 | TRA NAR(S0204) TO MAS | Return |
| E0310 | TRA NAR(4) TO TC | Last Page |
| E0401 | TRA NAR(S0305) TO MAS | Set for Select |
| E0402 | TRA NAR(S0204) TO BC | Return |

JUSTIFIED LINE LENGTH DESIGNATION

| INSTRUCTION | | EXPLANATION |
|---|---|---|
| L0101 | TRA WS TO ILB | |
| L0102 | RST CC | |
| L0103 | TRA ILB TO WS | |
| L0104 | BRN: TRA NAR(L0106) TO BC ON MATCH OF MCR(ELC) AND I/O | |
| L0105 | DEC CC | Backspace |
| L0106 | DEC CC | |
| L0107 | TRA NAR(L0103) TO BC | Continue Line |
| L0108 | DEC CC | Adjust CC to Point |
| L0109 | DEC CC | To Last Character |
| L0110 | TRA NAR(9) TO TC | |
| L0201 | TRA CC TO MAS | Line Length |
| L0202 | TRA WS TO I/O | "T" or "P" |
| L0203 | BRN: TRA NAR(L0205) TO BC ON MATCH OF MCR(P) AND I/O | |
| L0204 | TRA NAR(S0507) TO BC | "T," Finished |
| L0205 | TRA NAR(0) TO TC | "P" |
| L0206 | TRA MAS TO PSRP | Set PSRP |
| L0207 | BRN: TRA NAR(L0209) TO BC ON MATCH OF MCR(11) AND TC | |
| L0208 | TRA NAR(L0206) TO BC | |
| L0209 | REL PSRP | Release PSRP |
| L0210 | TRA NAR(S0507) TO BC | |

What is claimed is:

1. A special purpose system for processing data characters comprising:

a plurality of on line data terminals, each having means for providing a ready indication when ready to have a unit record of data characters associated therewith processed, a unit record of data characters comprising a variable but limited number of data characters and terminated by a predetermined characteristic of the last data character in each unit record;

data storage means for storing said data characters;

means for providing a ready indication for each data terminal when that terminal is ready to have data processed;

terminal selection means for monitoring said plurality of data terminals to detect ready indications;

means responsive to detection of a ready indication for a data terminal for enabling transfer of data characters between that data terminal and said data storage means;

processing means for processing a unit record of data characters associated with each data terminal at which a ready indication is detected by said terminal selection means, said processing means including means for inhibiting detection of ready indications at said data terminals by said terminal selection means until said processing means processes a single unit record of data characters in its entirety;

wherein the maximum time required for processing an entire unit record of data characters is T, wherein M is the number of said plurality of data terminals; wherein NT is the minimum time required by a data terminal between the termination of one unit record and the initiation of another unit record, wherein $M > N$, and wherein said terminal selection means includes inhibiting means for preventing monitoring of more than N data terminals in any monitoring sequence.

2. The system according to claim 1 wherein said inhibiting means includes means for assuring that each data terminal for which a processing job has been initiated is monitored upon providing a ready indication until such time as that processing job is completed.

3. The system according to claim 1 wherein said inhibiting means includes counter means for keeping count of all data terminals for which a processing job is in progress, and means for preventing sampling of any additional terminals when the count in said counter means is N.

4. A data processing system for selectively effecting one of a plurality of data processing jobs, said system comprising:

means for storing a plurality of programs, one program for each of said plurality of data processing jobs, each program comprising a plurality of sequentially stored and selectively addressable processing instructions;

means for permanently storing certain control characters in said system for reference;

terminal means for sequentially providing data characters to be processed intermixed with control characters to indicate the manner in which said data characters are to be processed;

processing means for processing said data characters in accordance with the processing instruction addressed at said means for storing;

means for comparing control characters provided by said terminal means with control characters stored in said system and identifiable by an addressed instruction; and means responsive to comparison of said control characters for addressing respective predetermined out-of-sequence instructions, each predetermined instruction being part of a different one of said programs.

5. The system according to claim 4 wherein said means for storing is a read-only memory unit.

6. The system according to claim 4 wherein said processing means comprises a plurality of circuits arranged to be readily added to or removed from said system, and means for selectively operatively interconnecting pairs of said circuits in response to respective addressed instructions.

7. The method of processing unit records of data characters for a plurality of data terminals, a unit record comprising a variable but limited number of data characters terminated by a predetermined characteristic of the last data character in the unit record, said method comprising the steps of:

a. providing a ready indication for each data terminal when that data terminal is ready to have a unit record of data processed;

b. sequentially sampling said plurality of data terminals until a ready indication is detected for a sampled data terminal;

c. processing an entire unit record in a predetermined manner for each data terminal upon detection of a ready indication for that terminal;

d. resuming sampling of said plurality of data terminals upon completion of processing of an entire unit record;

wherein there are M data terminals, only N of which can have data characters processed therefor at any one time, M being greater than N, said method further including the steps of:

e. maintaining a count of the number of data terminals for which a processing job is in progress; and f. preventing processing of data characters for any data terminal other than those having a processing job in progress when said count equals N.

8. The method according to claim 7 wherein step (e) includes the steps of:

g. incrementing said count by one for each data terminal which has a processing job initiated; and h. decrementing said count by one for each data terminal which has a processing job terminated.

9. In a system for processing data characters in the form of a plurality of coded signals wherein a plurality of data characters are sequentially stored a unit record at a time in a data memory unit and are retrievable a unit record at a time upon command in the sequence stored, wherein a unit record comprises a variable number of data characters and has a predetermined maximum length, editing means for selectively modifying the stored data characters, said editing means comprising:

first means responsive to a predetermined command for storing, in a directly accessible vacant portion of said data memory unit, data characters to be inserted between two of said sequentially stored data characters;

second means responsive to said predetermined command for storing, as part of the unit record containing said two of said sequentially stored data characters, an insert control character and the address of said vacant portion of said data memory unit; and third means responsive to a command requiring retrieval and display of the stored data characters for retrieving and displaying said data characters in the same sequence in which they were stored, said third means including: means responsive to retrieval of the unit record containing said insert control character for retrieving from said vacant portion of said data memory unit the characters to be inserted; and means for displaying said retrieved data characters to be inserted in sequence following display of the first of said two sequentially stored data characters.

10. The system according to claim 9 including control means for examining each unit record retrieved and wherein said third means includes means responsive to detection of said insert control character by said control means for retrieving for display the data characters at the portion of said data memory unit whose address was stored in said data memory by said second means along with said insert control character.

11. The system according to claim 10 wherein said second means includes means for storing in said memory unit along with said data characters to be inserted an end-of-insert control character, and wherein said third means includes means responsive to detection of said end-of-insert control character for retrieving and displaying the second of said two of said stored data characters and the characters stored thereafter.

12. The system according to claim 11 employed for text processing wherein said data characters are text characters and wherein said memory unit is arranged in groups of memory segments, each memory segment being either vacant or having a unit record of text characters stored therein; and wherein said vacant portion of said memory unit is a vacant group of memory segments.

13. The system according to claim 12 further comprising:

a plurality of data terminals capable of supplying documents of text characters to said system for processing;

terminal selection means for monitoring each of said data terminals to determine if the monitored terminal is ready to have a unit record of text characters from its current document processed;

means for allocating a respective group of memory segments to each terminal upon detection by said terminal selection means that said terminal has a first unit record of text characters for processing;

means for storing each unit record received from each terminal in sequential memory segments of the group allocated to that terminal; and means for storing unit records of text characters to be inserted in said vacant group of memory segments.

14. The method of processing data in a machine in which individual instructions are sequentially evoked to indicate a processing function to be performed at various processing circuits, each processing function including one or more processing steps, said method comprising the steps of:

a. activating a function signal in response to each evoked instruction to designate the processing function to be performed in response to the evoked instructions;

b. activating a source signal in response to at least some evoked instructions to designate a processing circuit from which data is to be transferred during the processing function performed in response to the evoked instruction; and c. activating a sink signal in response to at least some evoked instructions to designate a processing circuit at which stored data is to be altered during the processing function performed in response to the evoked instruction;

d. providing a sequence of timing pulses on respective ones of a plurality of individual signal lines;

e. performing at least one processing step in response to each of said timing pulses; and f. recycling said sequence of timing pulses upon completion of the last processing step to be performed in response to each evoked instruction;

wherein at least one of said processing functions involves a first transfer of data between two of said processing circuits, and at least another of said processing functions involves a different transfer of data between two of said processing circuits, said first and said different transfers of data being accomplished via a common transfer path.

15. The method according to claim 14 further comprising the steps of:

sequentially generating at a terminal, by operator-controlled means, unit records of data characters to be processed and control characters to control the processing of said data characters, each unit record being terminated by a specific end-of-record character;

transferring each unit record to processing means;

examining each unit record to determine whether any of the characters contained in said unit record are control characters;

in response to transfer of a unit record to said processing means, addressing in a predetermined sequence a plurality of individually addressable processing instructions stored in an instruction memory containing a plurality of programs, each program including a plurality of said instructions respectively representing processing steps to be performed, wherein said addressing begins with a predetermined address for each such unit record;

performing the respective processing steps specified by each addressed instruction and continuing with the next instruction in said predetermined sequence until detection of at least one control character in a transferred unit record;

in response to detection of a control character, addressing an out-of-sequence instruction determined by that control character;

storing each transferred unit record in a data memory upon completion of at least one processing step specified by the control characters contained in that unit record.

16. A programmed special purpose data processing system comprising:

an instruction memory having a multiplicity of selectively addressable coded program instructions stored sequentially therein, groups of said instructions representing a plurality of data processing programs capable of being effected by said system, each individual instruction representing one or more data processing steps;

controllable addressing means for addressing said instructions one at a time;

terminal means comprising an on-line operator-controlled keyboard capable of sequentially generating and receiving alphanumeric characters in the form of coded signals, some of said characters representing data characters and others of said characters representing control characters signifying which program instructions are to be utilized in processing data characters;

a data memory having a multiplicity of uniquely addressed directly accessible storage segments for storing respective unit records of said alphanumeric characters;

means for individually addressing said segments of said data memory;

processing circuitry for receiving individual unit records from said terminal and transferring the received unit records to the addressed segment of said data memory, and for receiving individual unit records from the addressed data memory segment and transferring the latter received characters to said data terminal, said processing circuitry including means for effecting one or more data processing steps on the received unit records before transferring them, said processing steps being determined by the instruction addressed at said instruction memory, wherein the sequence in which said characters are received by said processing circuitry is the same as the sequence in which said characters are generated at said terminal means;

control means responsive to reception of predetermined control characters by said processing circuitry for actuating said controllable addressing means to directly address a predetermined out-of-sequence instruction at said instruction memory.

17. The system according to claim 16 wherein said processing circuitry includes:

a plurality of individual processing circuits capable of processing data characters; and decoding means responsive to each addressed instruction for providing at least one of plural possible function signals to effect the processing steps represented by the addressed instruction, said decoding means being responsive to at least some addressed instructions for providing source and sink signals to operatively interconnect at least two of said individual processing circuits required to be interconnected in effecting the processing steps represented by said addressed instruction.

18. The system according to claim 17 wherein the completion of the one or more processing steps represented by at least two of said instructions requires unequal time intervals.

19. The system according to claim 17 wherein a plurality of said instructions each represent a plurality of processing steps, said system further comprising timing means for generating a sequence of clock pulses to sequentially initiate respective processing steps represented by the addressed instruction, and means for re-cycling said timing means upon completion of all processing steps represented by the addressed instruction, at least two of said plurality of instructions requiring different numbers of said clock pulses for completion.

20. The system according to claim 17 wherein said completely processing circuitry, under control of said instruction memory, said control characters; and decoding means, receives and processes said data characters a unit record at a time, a unit record consisting of a variable but limited number of data characters and terminated by a specific control character.

21. The system according to claim 16 wherein said processing circuitry includes:

a plurality of individual processing circuits;

a common character flow path for transferring characters between said individual processing circuit; and individual input gating means and output gating means for each of said individual processing circuits, each output gating means being responsive to application of a gating signal thereto for transferring characters from its individual processing circuit to said common character flow path, each input gating means being responsive to application of a gating signal thereto for transferring characters from said common character flow path to the individual processing circuit for that input gating means; and decoding means responsive to at least some of said addressed instructions for applying at least one of plural possible source signals as a gating signal to the output gating means of a respective processing circuit, and for applying at least one of plural possible sink signals as a gating signal to the input gating means of another respective processing circuit.

22. The system according to claim 16 wherein said processing circuitry includes:

a plurality of individual processing means, at least some of which are capable of processing data characters;

decoding means responsive to each addressed instruction for providing at least one of plural possible function signals representing a processing function to be performed in response to the addressed instruction, and for providing at least one of plural possible identification signals each identifying an individual processing means at which said processing function is to be performed; and logic means responsive to each function signal and identification signal provided by said decoding means for effecting the processing functions represented by function signals provided by said decoding means at the individual processing means identified by identification signals provided by said decoding means.

23. The system according to claim 16 wherein said controllable addressing means includes a presettable counter for addressing said instructions and control circuitry for normally incrementing said counter upon completion of the processing steps represented by the addressed instruction to address the next instruction in sequence, said control circuitry including means responsive to reception of at least one control character by said control means for presetting said counter to address an instruction out of sequence.

24. The system according to claim 16 employed for processing text documents consisting of said alphanumeric characters, wherein said terminal includes:

a standard typewriter keyboard including a plurality of individually depressible keys, each associated with an alphanumeric character;

coding means responsive to the depression of each key for providing a plurality of coded signals uniquely representing the character associated with the depressed key; and display means for displaying at said terminal the character represented by each depressed key.

25. The system according to claim 24 wherein said terminal includes decoder means responsive to coded signals received at said terminal from said processor for actuating said display means to display the character represented by the received code signals.

26. The system according to claim 16 wherein said system includes means responsive to generation of a specified control character and additional characters identifying a data memory segment at said terminal for retrieving only those characters stored in the data memory segment identified by said identification characters, and displaying the retrieved characters at said terminal.

27. The system according to claim 16 wherein certain of said control characters are permanently stored in said system, and wherein said control means includes means for comparing the stored control characters with received control characters to determine the nature of the received control character and the address of said out-of-sequence instruction.

28. The system according to claim 27 wherein the stored control characters are stored in said instruction memory, each stored control character being part of a respective instruction.

29. The system according to claim 16 wherein each of said data processing programs is selectable by generating a respective control character at said data terminal, wherein said control means is responsive to reception of individual ones of said respective control characters by said processing circuitry to actuate said controllable addressing means to address an entry instruction in a corresponding program.

30. The system according to claim 29 wherein one of said programs represents a neutral processing mode to which said system must return upon termination of any other program mode, and wherein reception of certain control characters by said processing circuitry terminates the current program mode by causing said controllable addressing means to address a predetermined instruction in the neutral mode program.

31. The system according to claim 16 wherein said instruction memory and said data memory are individually addressable; said instruction memory containing only instructions, instruction memory addresses, and control characters; said data memory storing only data characters and control characters.

32. The system according to claim 16 wherein each of said instructions is a multi-bit instruction word, a first group of bits representing a processing function to be performed when that instruction is addressed, a second group of bits representing a portion of said processing circuitry at which said processing function is to be performed, all of said instructions being devoid of any data memory addresses, and wherein is provided means for decoding the addressed instruction to cause said processing circuitry to perform the processing function represented by the addressed instruction.

33. The system according to claim 32 wherein said data terminal, said processing circuitry, and said data memory comprise a bi-directional data flow path; and wherein said controllable addressing means, said instruction memory, and said decoding means comprise a data control path, said data control path being devoid of data characters at all times.

34. The system according to claim 16 wherein to process a unit record in its entirety, said system includes means operative in some operating modes to store in said data storage means an entire unit record provided by said data terminal, and means operative in other operating modes to retrieve and display at said data terminal an entire unit record stored in said data storage means.

35. The system according to claim 16 wherein each storage segment has an address uniquely represented by one or more alphanumeric characters and wherein said processing circuitry includes retrieval means responsive to reception of the alpha-numeric characters of an address received from a data terminal for directly addressing the storage segment having that address.

36. The system according to claim 16 wherein said instruction memory being of the type wherein the contents of said instructions and their respective addresses remain constant during processing operations, said instruction memory being permanently devoid of data.

37. The system according to claim 16 wherein the processing steps performed by said processing circuitry includes all processing steps required to completely process a unit record.

38. The system according to claim 16 wherein said programs are permanently stored in said instruction memory, said instruction memory comprising a read-only memory.

39. The system according to claim 16 further comprising: means for providing a hardcopy display of a plurality of unit records.

40. The system according to claim 16 wherein said control means includes means for sensing the presence of said predetermined control characters anywhere in every unit record received by said processing circuitry.

41. The system according to claim 16 further comprising:

character sensing means for recognizing in a single unit record entered by said operator a plurality of said control characters.

42. A programmed special purpose data processing system comprising:

an instruction memory having a multiplicity of selectively addressable coded program instructions stored sequentially therein, groups of said instructions representing a plurality of data processing programs capable of being effected by said system, each individual instruction representing one or more data processing steps;

controllable addressing means for addressing said instructions one at a time in the sequence stored;

at least one on-line terminal capable of sequentially generating and receiving alphanumeric characters in the form of coded signals, some of said characters representing control characters signifying which program instructions are to be utilized in processing data characters;

a data memory having a multiplicity of uniquely addressed directly accessible storage segments for storing groups of said alphanumeric characters;

means for individually addressing said segments of said data memory;

processing circuitry for receiving alphanumeric characters from said terminal and transferring the received characters to the addressed segment of said data memory, and for receiving alphanumeric characters from the addressed data memory segment and transferring the latter received characters to said data terminal, said processing circuitry including means for effecting one or more data processing steps on the received characters before transferring the, said processing steps being determined by the instruction addressed at said instruction memory;

control means responsive to reception of predetermined control characters by said processing circuitry for actuating said controllable addressing means to directly address a predetermined out-of-sequence instruction at said instruction memory;

said system further comprising:

a plurality of on-line data terminals, each capable of sequentially generating said alphanumeric characters and receiving said alphanumeric characters;

a plurality of storage buffers, one for each data terminal, each buffer having the capacity to store at least a unit record of alphanumeric characters, wherein a unit record includes a variable but limited number of alphanumeric characters and is terminated by a predetermined alphanumeric character;

means for automatically transferring characters generated at each data terminal to the buffer for that data terminal;

means for automatically transferring characters received by each buffer from said processing circuitry to the data terminal for that buffer;

resettable means for indicating a ready condition for each data terminal when that data terminal has transferred a unit record to its buffer, and for indicating said ready condition for said data terminal when that data terminal has received a unit record from its buffer;

terminal selection means for operatively connecting only one buffer at a time to said processing circuitry, said terminal selection means including: means for sensing said ready conditions and means for operatively connecting to said processing circuitry only those buffers having ready data terminals;

and wherein said processing circuitry includes: means for transferring a unit record between said processing circuitry and the operatively connected buffer, transfer occuring in a direction determined by the instruction addressed at said instruction memory; means responsive to completion of said unit record transfer for breaking the operative connection between said processing circuitry and the operatively connected buffer and for resetting said resettable means to deactuate the ready indication for the data terminal of the buffer being disconnected.

43. The system according to claim 42 including a plurality of status memories, one for each data terminal, each status memory including allocated storage segments for storing specific status information for the data terminal associated with that status memory, at least part of said status information including the address of the instruction to be addressed when the buffer for that data terminal is next operatively connected to said processing circuitry.

44. The system according to claim 43 wherein at least some of said data terminals include means for displaying alphanumeric characters transferred to the data terminal from the buffer for that terminal; and wherein another part of the status information stored in each status memory indicates the format for characters displayed at the data terminal for that status memory.

45. The system according to claim 43 wherein another part of the status information stored in each status memory indicates the address of the segment in said data memory to be addressed when the buffer for the data terminal associated with that status memory is next connected to said processing circuitry.

46. The system according to claim 42 wherein said processing circuitry, under control of said instruction memory, is responsive to reception of a predetermined control character by said control means to display stored data characters at a data terminal other than that from which the received predetermined control character originated.

47. A programmed text processing system, comprising:

an instruction memory having a multiplicity of selectively addressable coded program instructions stored sequentially therein, groups of sequential instructions representing respective modes of text processing capable of being performed by said system, each individual instruction representing one or more text processing steps;

controllable addressing means for addressing said instructions one at a time;

terminal means comprising an operator-controlled keyboard capable of sequentially generating and receiving unit records of alphanumberic characters in the form of coded signals, said characters representing text characters to be processed and control characters signifying which text processing operations are to be effected, wherein a unit record comprises a variable but limited number of characters and is terminated by a specified end-of-record character;

a data memory having a multiplicity of uniquely addressed directly accessible storage segments, each segment storing a unit record of text characters;

means for individually addressing said segments of said data memory;

processing circuitry for receiving individual unit records from and transferring individual unit records to said terminal and the addressed segment of said data memory, and for effecting one or more processing steps on the unit record being transferred in accordance with the instruction addressed at said instruction memory, the sequence in which characters of said unit records are transferred being the same as the sequence in which said characters are generated at said terminal means;

control character sensing means for recognizing the presence of a control character located anywhere in every unit record received by said processing circuitry;

control means responsive to recognition of a control character by said processing circuitry for actuating said controllable addressing means to effect a program jump by addressing a predetermined out-of-sequence instruction at said instruction memory.

48. The system according to claim 47 wherein said terminal includes a standard typewriter keyboard for generating said alphanumeric characters, some of said characters serving both as text characters and control characters, one character generated at said keyboard being designated a universal control character indicating that a character immediately adjacent the universal control in the generated sequence of characters is a control character and not a text character, wherein said control character sensing means includes means for sensing reception of said universal control character at said processing circuitry, and wherein said control means includes means for detecting said character immediately adjacent said universal control character to control said controllable addressing means.

49. The system according to claim 48 wherein certain of said control characters are permanently stored in said system, and wherein said means for detecting comprises means for comparing the stored control characters with said character immediately adjacent said universal control character to determine which instruction is to be next addressed.

50. The system according to claim 49 wherein each permanently stored control character is stored in said instruction memory as part of a respective instruction.

51. The system according to claim 47 further comprising:

a plurality of on-line data terminals, each capable of sequentially generating said alphanumeric characters and receiving and displaying said alphanumeric characters;

a plurality of storage buffers, one for each data terminal, each buffer having the capacity to store at least a unit record of alphanumeric characters, wherein each unit record is terminated by a predetermined character;

means for automatically transferring characters generated at each data terminal to the buffer for that data terminal;

means for automatically transferring characters received by each buffer from said processing circuitry to the data terminal for that buffer for display;

resettable means for indicating a ready condition for each data terminal when a unit record has been transferred from that terminal to its buffer, and for indicating said ready condition for said data terminal when that data terminal has received a unit record from its buffer;

terminal selection means for operatively connecting only one buffer at a time to said processing circuitry, said terminal selection means including: means for sensing terminal ready conditions and means for operatively connecting to said processing circuitry only those buffers having ready data terminals, and wherein said processing circuitry includes: means for transferring a unit record between said processing circuitry and the operatively connected buffer, transfer occuring in a direction determined by the instruction addressed at said instruction memory; means responsive to completion of said unit record transfer for breaking the operative connection between said processing circuitry and the operatively connected buffer and for resetting said resettable means to deactuate the ready indication for the data terminal of the buffer being disconnected; and means for completely processing a unit record before transferring that record between the processing circuitry and the operatively connected buffer.

52. The system according to claim 51 wherein each unit record is a line of alphanumeric characters terminated by an end-of-line character, wherein each of said terminals is capable of being in any one of said text processing modes irrespective of the current modes for the others of said terminals, wherein one of said text processing modes is an input mode in which a terminal supplies text characters to be processed, wherein said storage segments in said data memory are arranged in groups of one or more storage segments, each group having a unique identification number, and wherein said processing circuitry includes:

means responsive to initiation of an input mode for a data terminal for automatically allocating an available group to that terminal;

means for storing successive unit records of text characters received from a terminal during its input mode in the one or more successive storage segments of the group currently allocated to that terminal until the one or more storage segments for the currently allocated group have received unit records;

means responsive to reception of a unit record at the last storage segment of a group and the continued input mode operation of the terminal to which that group is allocated for allocating a new group of one or more storage segments to receive subsequent unit records from that terminal;

means for storing, with the last unit record in a group of one or more storage segments, the number of the next group of one or more storage segments utilized during a terminal input mode to permit subsequent access to each of said groups in the sequence employed.

53. The system according to claim 51 wherein each of said terminals is capable of being in any one of said text processing modes irrespective of the current modes for the others of said terminals, wherein one of said text processing modes is an input mode in which a terminal supplies text characters to be processed, wherein said storage segments in said data memory are memory lines and are identified by alphanumeric characters, and wherein said processing circuitry includes:

means responsive to initiation of an input mode for a terminal for automatically allocating an available memory line to that terminal.

54. The system according to claim 51 including a plurality of status memories, one each for each data terminal, each status memory including allocated storage segments for storing specific status information for the data terminal associated with that status memory, at least part of said status information including the address of the instruction to be addressed when the buffer for that data terminal is next operatively connected to said processing circuitry.

55. The system according to claim 54 wherein another part of the status information stored in each status memory indicates the format for characters displayed at the data terminal served by that status memory.

56. The system according to claim 54 wherein another part of the status information stored in each status memory indicates the memory segment to be addressed the next time the buffer for the data terminal served by that status memory is operatively connected to said processing circuitry.

57. The system according to claim 51 wherein each of said terminals is capable of being in any one of said text processing modes irrespective of the current modes for the others of said terminals, wherein one of said text processing modes is an input mode in which a terminal supplies text characters to be processed, wherein said storage segments in said data memory are numbered and arranged in groups, each group comprising a numbered memory page, and wherein said processing circuitry includes:

means responsive to initiation of an input mode for a data terminal for automatically allocating an available memory page to that data terminal.

58. The system according to claim 51 wherein each of said terminals is capable of being in any one of said text processing modes irrespective of the current modes for the others of said terminals, wherein one of said text processing modes is an input mode in which a terminal supplies text characters to be processed, wherein said storage segments in said data memory are numbered and arranged in groups, each group comprising a numbered memory page, and wherein said processing circuitry includes:

means responsive to initiation of an input mode for a data terminal for automatically allocating an available memory page to that data terminal;

means for storing successive unit records of text characters received from a data terminal during its input mode in successive storage segments of the memory page currently allocated to that data terminal until all storage segments for the currently allocated memory page have received unit records;

means responsive to reception of a unit record at the last storage segment of a memory page and the continued input mode operation of the data terminal to which that memory page is allocated for allocating a new memory page to receive subsequent unit records from that data terminal;

means for storing the memory page numbers for each memory page employed during a data terminal input mode to permit subsequent access to each of said memory pages in the sequence employed.

59. The system according to claim 58 wherein the last-recited means for storing includes a storage location at each memory page for storing the number of the next memory page employed during the same input mode sequence.

60. The system according to claim 58 including status memory means for storing status information for each data terminal when the buffer for that terminal is not operatively connected to said processing circuitry, said status information including the memory page number and storage segment number to receive the next unit record provided by that data terminal in its input mode.

61. The system according to claim 58 wherein one of said text processing modes is an output mode wherein the system, in response to reception of a predetermined control character, automatically retrieves an entire document from said data memory for display at a selected data terminal, and wherein said processing circuitry includes:

means responsive to a data terminal in said output mode for reception of alphanumeric characters identifying the document to be displayed for retrieving stored unit records of text characters in sequence from the memory pages of that document;

means for transferring the retrieved text characters to the buffer for the selected data terminal one unit record at a time, each such unit record being transferred during a different interval of operative connection of that buffer to said processing circuitry;

means responsive to retrieval of all text characters from a memory page in a document being displayed for examining the stored memory page numbers for that document and identifying the next memory page of that document from which characters are to be retrieved.

62. The system according to claim 61 wherein said processing circuitry additionally includes justifying means for rearranging text characters retrieved from said data memory in unit records of uniform length before transferring the rearranged unit records to the buffer of the selected data terminal.

63. The system according to claim 61 wherein said output mode is a list mode, said processing circuitry including means operable in the list mode for transferring the data memory page number and storage segment number for retrieved unit records to the buffer for the selected terminal for display adjacent displayed unit records.

64. The system according to claim 63 wherein another of said text processing modes is an edit mode in which changes to individual stored unit records can be made from a selected terminal, and wherein said processing circuitry includes:

means responsive to reception of a predetermined control character accompanied by alphanumeric characters identifying a specific storage segment for retrieving the specific unit record stored in said specific storage segment and transferring said specific unit record to the buffer of the selected terminal for display;

means responsive to the next unit record received from said selected terminal after display of said specific unit record for comparing said next unit record and said specific unit record; and means for storing in said specific storage segment a corrected unit record representing said specific unit record as corrected by said next unit record.

65. The system according to claim 63 wherein another of said text processing modes is an edit mode in which deletions of characters in individual stored unit records can be effected from a selected terminal, and wherein said processing circuitry includes:

means responsive to reception of a predetermined control character accompanied by alphanumeric characters identifying a specific storage segment for retrieving the specific unit record stored in said specific storage segment and transferring said specific unit record to the buffer of the selected terminal for display;

means responsive to the next unit record received from said selected terminal after display of said specific unit record for comparing said next unit record and said specific unit record character by character;

means responsive to reception of a "delete character" control character identifying a specific text character to be deleted for composing a corrected unit record corresponding to said specific unit record with the identified character deleted; and means for storing in said specific storage segment said corrected unit record.

66. The system according to claim 63 wherein another of said text processing modes is an edit mode in which text characters in individual stored unit records can be replaced from a selected terminal, and wherein said processing circuitry includes:

means responsive to reception of a predetermined control character accompanied by alphanumeric characters identifying a specific storage segment for retrieving the specific unit record stored in said specific storage segment and transferring said specific unit record to the buffer of the selected terminal for display;

means responsive to the next unit record received from said selected terminal after display of said specific unit record for comparing said next unit record and said specific unit record; and means responsive to text character differences between said next unit record and said specific unit record for replacing the stored specific unit record text character with a correspondingly positioned replacement character in said unit record.

67. The system according to claim 63 wherein another of said text processing modes is an edit mode in which inserts in individual stored unit records can be made from a Selected terminal, and wherein said processing circuitry includes:

means responsive to reception of a predetermined control character accompanied by alphanumeric characters identifying a specific storage segment for retrieving the specific unit record stored in said specific storage segment and transferring said specific unit record to the buffer of the selected terminal for display;

means responsive to the next unit record received from said selected terminal after display of said specific unit record for comparing said next unit record and said specific unit record;

means responsive to the location of an "insert" control character in said next unit record for allocating a portion of said data memory to receive text characters from said selected terminal;

means for transferring to successive storage segments in said allocated portion of data memory all unit records received from said selected terminal after said next unit record and before an "end-of-insert" control character is received at said processing circuitry;

means for composing a modified unit record comprising said specific unit record plus characters identifying the location in said unit record at which said insert is made and the memory page and storage segment number of said allocated portion of data memory;

means for storing the page and line number of said specific storage segment in said allocated portion of data memory;

means for storing said modified unit record in said specific storage segment; and means responsive to retrieval of said modified unit record during said output mode for retrieving the inserted unit records from said successive storage segment in said allocated portion of said data memory and transferring the inserted unit records to the buffer of the selected terminal for display at the point of insert in said modified unit record.

68. The system according to claim 47 wherein one of said alphanumeric characters is a backspace character and wherein said processing circuitry includes means for deleting from each received unit record all backspace characters and the text character immediately preceding each backspace character.

69. The system according to claim 47 wherein said data terminal includes a typewriter keyboard and generates a carriage return character at the end of each line of generated text characters, and wherein said unit record is a line of text characters and is terminated by said carriage return character.

70. The system according to claim 47 wherein one of said text processing modes is an output mode wherein text characters are retrieved from said data memory and displayed at a data terminal, and wherein said processing circuitry includes justifying means for rearranging retrieved text characters into unit records of uniform length before the retrieved text characters are transferred to a data terminal for display.

71. The system according to claim 70 wherein each unit record is a line of text characters, and wherein said justifying means includes:

means for retrieving from said data memory as many text characters as required to fill a text line of predetermined length; and means for adding interword spaces as necessary to achieve said predetermined length.

72. The system according to claim 70 wherein said output mode is a list mode, wherein said processing circuitry includes means for transferring memory segment identification characters for display with each unit record to be displayed, said memory segment identification characters indicating the data memory segment from which the displayed unit record was retrieved.

73. The system according to claim 72 wherein another of said text processing modes is an edit mode wherein the text characters stored in any data memory segment can be retrieved and individually displayed in response to generation of an edit mode control character and memory segment identification characters at a data terminal, said processing circuitry including means responsive to reception of said edit mode control character and accompanying memory segment identification characters for retrieving the text characters stored in the identified data memory segment and transferring the retrieved text characters to a data terminal for display as a unit record to be edited.

74. The system according to claim 73 wherein said processing circuitry includes means operative in the edit mode to respond to a predetermined terminal-initiated command for deleting identified individual text characters from the unit record to be edited before storing that unit record in the data memory segment from which it was retrieved.

75. The system according to claim 73 wherein said processing circuitry includes means operative in the edit mode to respond to a predetermined terminal-initiated command and one or more accompanying text characters for replacing specified characters in said unit record to be edited with said accompanying text characters before storing that unit record in the data memory segment from which it was retrieved.

76. The system according to claim 73 wherein said processing circuitry includes means operative in the edit mode to respond to a predetermined terminal-initiated insert command and accompanying text characters for storing said accompanying text characters in available data memory segments and for inserting in said unit record to be edited said insert control character and the data memory segment address at which the first of said accompanying text characters is stored.

77. The system according to claim 47 wherein one of said text processing modes is an edit mode, said processing circuitry including means responsive to a terminal-initiated edit command accompanied by data memory segment identification characters for retrieving and displaying only the unit record of text characters stored in the data memory segment identified by said identification characters.

78. The system according to claim 47 wherein each storage segment has an address uniquely represented by one or more alphanumeric characters and wherein said processing circuitry includes retrieval means responsive to reception of the alphanumeric characters of an address received from a data terminal for directly addressing the storage segment having that address.

79. The system according to claim 78 operable in an insert mode wherein an insert control character is provided by said terminal and is accompanied by text characters to be inserted into a stored document at a specified location, said system further comprising:

means responsive to an insert control character provided by said terminal for allocating an available segment of said data memory to receive said text characters to be inserted;

means for inserting in the unit record containing said specified location of the address of said allocated available segment; and means for storing in said allocated available segment said text characters to be inserted.

80. The system according to claim 47 employed for processing text documents consisting of said alphanumeric characters, wherein said terminal includes:

a standard typewriter keyboard including a plurality of individually depressible keys, each associated with an alphanumeric character;

coding means responsive to the depression of each key for providing a plurality of coded signals uniquely representing the character associated with the depressed key; and display means for displaying at said terminal the character represented by each depressed key.

81. The system according to claim 47 further comprising:

character sensing means for recognizing in a single unit record entered by said operator a plurality of said control characters.

82. A data processing system of the stored program type in which data is supplied from one or more terminals and is processed in accordance with said program, said system being characterized by an addressable instruction memory for storing said program, said instruction memory including a multiplicity of sequentially arranged and individually addressable N-bit storage locations, said program comprising multiple instructions stored in packed sequence in said instruction memory, each instruction including a first N-bit portion stored in an N-bit storage location and indicating the processing function to be performed when that instruction is addressed, a number of said instructions also including an N-bit next-address portion stored in the N-bit storage location immediately following the N-bit storage location of the first portion of that instruction and representing the address of some other N-bit storage location in said instruction memory, and some of said number of instructions additionally including an N-bit character portion stored in the N-bit storage location immediately following the storage location of the next address portion of that instruction, said character portion of said instruction representing a character to be compared to processing; said data processing further including a presettable counter for normally sequentially addressing said N-bit storage locations; means responsive to an addressed instruction having a next address portion but no character portion for presetting said binary counter to the address in said next address portion; and means responsive to an addressed instruction having all three instruction portions for presetting said counter to the address in said next address portion in accordance with the result of a comparison of the character portion of the addressed instruction with another character in said system.

83. The system according to claim 82 wherein said first portion of each instruction includes: a first group of bits representing a processing function to be performed; a second group of bits identifying a first portion of said system to be utilized in performing said processing function; and a third group of bits identifying a second portion of said system to be utilized in performing said processing function.

84. The method of processing data in a special purpose data processing machine, said method comprising the steps of:

sequentially generating alphanumeric characters in the form of coded signals, at least some of said characters representing characters of data to be processed, at least some of said characters representing control characters signifying the manner in which said data characters are to be processed;

storing the generated characters in a buffer having at least a unit record capacity, wherein a unit record corresponds to a variable but limited number of alphanumeric characters and is terminated by a predetermined character, and wherein a control character is positionable at any of a plurality of locations in a unit record;

processing the generated characters in real time, one unit record at a time, in accordance with a stored program of individually addressable and sequentially stored program instructions, each instruction, when addressed, causing one or more processing steps to be performed on said generated characters;

recognizing the presence of a control character anywhere in every unit record being processed;

normally addressing said instructions according to the sequence in which they are stored;

unconditionally jumping to and addressing an out-of-sequence instruction in response to certain of said addressed instructions; and conditionally jumping to and addressing an out-of-sequence instruction in response to detection of a predetermined control character in a unit record being processed.

85. The method according to claim 84 wherein at least some of said instructions include an out-of-sequence address, and wherein completion of the processing caused by certain ones of said addressed instructions causes an unconditional jump to said out-of-sequence address.

86. The method according to claim 84 wherein at least some of said instructions include control character portions, and wherein said step of conditionally jumping occurs when a control character transferred from a predetermined part of said system matches the control character portion of the currently addressed instruction.

87. The method according to claim 84 wherein at least some of said instructions include control character portions, and wherein said step of conditionally jumping occurs when a control character detected in a unit record being processed matches the control character portion of the currently addressed instruction.

88. The method according to claim 84 wherein said stored program instructions are arranged in groups, each group representing a different processing mode, one of said modes being a neutral mode which must be returned to at the completion of each other mode, a predetermined instruction in said neutral mode being automatically addressed at the completion of each other mode.

89. The method according to claim 88 wherein the start and termination of said each other mode is determined by detection of a corresponding control character in the course of processing said data characters.

90. In a text processing system of the type including: an instruction memory containing plural programs representing respective text processing modes, each program comprising a plurality of individually addressable instructions for effecting specific processing steps; addressing means for individually addressing said instructions; a data memory; at least one on-line data terminal for entering text and control characters into said system and receiving text and control characters from said system; and a status memory element for said terminal for storing the address of the next instruction to be operative for said terminal during intervals when said terminal is inactive; a method of processing text characters comprising the steps of:

a. storing in said status memory element when said terminal completes one of said text processing modes the address of the entry instruction into a neutral mode which said terminal must enter before entering any other processing mode;

b. entering into said system from said terminal a mode-selecting control character and an end-of-line character, said terminal being in none of said processing modes immediately prior to entry of said characters;

c. transferring the address of said neutral mode entry instruction from said status memory element to said addressing means upon reception of said end-of-line character by said system;

d. comparing, under control of the neutral mode program, the entered mode-selecting control character with a plurality of stored mode-selecting characters to determine the text processing mode to be selected; and e. storing the address of the entry instruction for the determined mode to be selected in said storage element.

91. The method according to claim 90 wherein the entered mode-selecting control character designates an input mode to be selected in which text characters are to be entered into said system and stored in said data memory and wherein said system is arranged to process a line of said text characters at a time, wherein said end-of-line character terminates each line and is end-of-record character, and wherein said data memory is divided into plural memory pages, each memory page comprising a plurality of memory lines, said data memory being addressable at individual memory lines according to the numbers stored in a memory page counter and a memory line counter, said method further comprising the steps of:

f. allocating an available memory page to said terminal in response to determination of the input mode as the mode to be selected;

g. displaying the allocated memory page number at said terminal;

h. storing the allocated memory page number and the number of the first memory line of the allocated memory page in said status memory element;

i. entering successive lines of text characters to be processed into said memory system and processing each line when entered according to the steps of;:

i.1. transferring the address of the input mode entry instruction from said status memory element to said addressing means;

i.2. transferring to said page and line counters the page and line numbers, respectively, stored in said status memory element;

i.3. examining each character of the entered line to detect if it is an end of record character, a backspace character or an end-of-text control character;

i.4. upon detection of a backspace character, deleting the backspace character and the text character immediately preceding the backspace character from the entered line;

i.5. upon detection of an end of record character:

i.5.*a*. storing the entered line in said data memory at the line addressed according to said page and line counters;

i.5.*b*. incrementing the count in said line counter by one;

i.5.*c*. allocating a new available page if the incremented line count exceeds the number of lines in said memory pages; updating the page counter to correspond to the new available memory page number; and updating the line counter to register the number of the first line on the new available memory page;

i.6. upon detection of an end-of-text control character;

i.6.*a*. storing the entered line in said data memory at the line addressed according to said page and line counters; and i.6.*b*. changing the instruction address stored in the status memory element from the address of the input mode entry instruction to the address of the neutral mode entry instruction.

92. The method according to claim 91 wherein, upon the incremented count in said line counter exceeding the number of lines in a memory page, said method includes the additional step of:

storing an end-of-page control character and the number of new available page on the last line of the previously allocated memory page.

93. The method according to claim 92 wherein one of said text processing modes in an output mode wherein text characters are retrieved from said data memory and displayed at said terminal, said method, during said output mode, including the steps of:

sequentially retrieving lines of text characters from memory lines on a predetermined memory page;

examining the characters in each retrieved line of characters to detect said end-of-page control character;

upon detecting said end-of-page control character, sequentially retrieving lines of text characters from said new available memory page as designated by the number stored on the last line of said predetermined page;

deleting control characters from retrieved lines of characters before transferring the retrieved characters to said terminal for display.

94. The method according to claim 91 wherein during the step of examining each character of the entered line the system also detects whether or not the examined character is a kill-line control character, said method, upon detection of a kill-line control character, including the step of:

transferring the counts in said page and line counters to said status memory element without incrementing said counters.

95. The method according to claim 91 wherein, upon the incremented count in said line counter exceeding the number of lines in a memory page, said method includes the additional step of:

storing the number of said new available memory page on the previously allocated memory page.

96. The method according to claim 95 wherein one of said modes is an output mode during which the address of the entry instruction for the output mode program is stored in said status memory element, the memory page and line number of the next line to be retrieved also being stored in said status memory element, said output mode being characterized in that text characters previously stored in said data memory are retrieved in the sequence stored and displayed at said terminal, said text characters being retrieved a line at a time, each line being retrieved in accordance with the following additional steps:

transferring the address of said output mode entry instruction to said addressing means from said status memory element;

transferring the page and line numbers stored in said status memory element to said memory page and line counters, respectively;

retrieving the line of text characters stored at the memory line addressed according to the counts in said page and line counters;

incrementing the count in said line counter by one;

processing the retrieved line of text characters in accordance with a predetermined display format;

examining each retrieved character to detect an end-of-page control character or an end-of-text control character;

upon detecting an end-of-page control character, updating the count in said page counter to correspond to the number of the new available page whose number was stored on the same line as the detected end-of-page control character;

upon detecting an end-of-text control character, changing the instruction address stored in said status memory element from the address of the output mode entry instruction to the address of the neutral mode entry instruction; and transferring the retrieved and processed line of text characters to said terminal for display.

97. The method according to claim 96 wherein the step of processing the retrieved line includes the step of justifying the retrieved line such that each displayed line includes the same number of characters, said step of justifying including the steps of:

retrieving additional text characters from one or more lines of text characters stored in said data memory if required to fill out a retrieved line with fewer characters than required for justification; and inserting space characters in the retrieved line as necessary to achieve justified length where the retrieved line is shorter than justified length and the next word retrieved would render the line longer than justified length.

98. The method according to claim 97 further including the steps of:

including with each justified line transferred to said terminal the memory page and line numbers from which at least part of the displayed line was retrieved; and displaying included page and line numbers adjacent each displayed line at said terminal.

99. The method according to claim 98 wherein one of said text processing modes is an edit mode wherein individual lines of text characters stored in said data memory may be retrieved and displayed at said terminal for purposes of correction, said method, during said edit mode, including the steps of:

entering into said system the page and line number of the line in said data memory desired for display;

storing the entered page and line number in said status memory element;

transferring said page and line number to said page and line counter, respectively;

directly addressing and retrieving the text line stored at the data memory line designated by the contents of said page and line counters; and displaying the thusly retrieved text line at said terminal.

100. The method according to claim 99 further comprising the steps of:

recognize input commands in the form of control characters entered into said system from said terminal for making changes to the text line retrieved for correction, said changes being determined by the particular control character entered and including deletion of a character, deletion of a word, replacement of a text character, and insertion of new text characters; and storing the changed text line in the data memory line from which it was retrieved before being corrected.

101. The method according to claim 91 wherein one of said text processing modes is an edit mode wherein individual lines of text characters stored in said data memory may be retrieved and displayed at said terminal for purposes of correction, said method, during said edit mode, including the steps of:

entering into said system the page and line number of the line in said data memory desired for display;

storing the entered page and line number in said status memory element;

transferring said page and line number to said page and line counter, respectively;

directly addressing and retrieving the text line stored at the data memory line designated by the contents of said page and line counters; and displaying the thusly retrieved text line at said terminal.

102. The method according to claim 101 further comprising the steps of:

recognize input commands in the form of control characters entered into said system from said terminal for making changes to the text line retrieved for correction, said changes being determined by the particular control character entered and including deletion of a character, deletion of a word, replacement of a text character, and insertion of new text characters; and storing the changed text line in the data memory line from which it was retrieved before being corrected.

103. The method according to claim 343 wherein the entered mode-selecting control character designates an output mode to be selected in which text characters previously stored in said data memory are to be retrieved and displayed at said terminal, wherein said system is arranged to display a justified line of text characters at a time, each justified line terminating with an end of record character, and including the same predetermined number n of characters wherein said data memory is divided into lines, each memory line being addressable in accordance with counts stored in a line counter, and wherein previously stored lines can have a variable but limited number of characters and are terminated by and end of record character and wherein said entered mode selecting character is accompanied by an entered line number indicating the starting memory line from which text characters are to be retrieved and displayed, said method including the steps of:

F. storing the entered starting line number in said status memory element;

G. retrieving and displaying the starting line of text characters in accordance with the following steps:

G.1. transferring the line number stored in said status memory element to said line counter;

G.2. transferring the address of the entry instruction of said output mode to said addressing means from said status memory element;

G.3. retrieving the line of text characters stored in the line of said data memory addressed according to the counts in said line counter;

G.4. determining if the retrieved line has a number of text characters less than, equal to or greater than n;

G.5. upon determining that the retrieved line has n text characters: transferring the text characters in that line to said terminal for display; incrementing said line counter; and transferring the line counter contents to said status memory element;

G.6. upon determining that the retrieved line has more than n text characters, examining the nth character in the retrieved line to detect whether it is a space character;

G.6.1. if the nth character is a space character, adding a space character to the retrieved line between two words and transferring the line to said terminal for display;

G.6.2. if the nth character is not a space character, examining the n + 1th character to determine if it is a space character;

G.6.3. if the $(n + 1)$ th character is a space character: transferring the first n characters of the retrieved line followed by a system-generated end of record character to said terminal for display; storing the number $n + 1$ in said status memory element; transferring the line counter contents to said status memory element;

G.6.4. if the $(n + 1)$ th character is not a space character: counting along the line the number (x) of characters between the nth character and the nearest preceding space character; inserting x interword space characters in the retrieved line; transferring the first n − x characters in the line along with the inserted interword space characters to said terminal for display; storing the number n − x in said status memory element; and transferring the line counter contents to said storage memory element;

G.7. upon determining that the retrieved line has less than n text characters:

G.7.1. inserting a space character after the last text character in the retrieved line;

G.7.2. incrementing said line counter by one;

G.7.3. retrieving the next line of text characters from the data memory line addressed according to the contents of the page and line counter;

G.7.4. adding the characters of said next line to those of said first retrieved line to compose a new retrieved line;

G.7.5. repeating steps (G.4) through (G.7.4), inclusive as many times as necessary until a single justified line of n characters is composed and transferred to said terminal.

104. The method according to claim 103 wherein upon display of the first justified line, the display of each additional line proceeds in accordance with the following steps:

H. transferring the address of the output mode program entry instruction to said addressing means;

I. transferring the stored line count from said status memory element to said line counter;

J. retrieving the line of text stored in the data memory line addressed according to the contents of said line counter;

K. if a portion of the retrieved line was displayed as part of the previously displayed line, deleting those characters already displayed by deleting from the beginning of the line a number of text characters corresponding to the number currently stored in said status memory element in accordance with steps (G.6.3) or (G.6.4);

L. treating the remaining characters as the retrieved line and proceeding according to steps (G.4) through (G.7.5) inclusive until an end-of-text control character is detected, signifying the end of the document being displayed; and M. upon detection of an end-of-text control character, transferring the address of the entry instruction for said neutral mode program to said status memory element.

105. The method according to claim 104 further comprising the steps of:

including with each justified line transferred to said terminal for display the memory page and line number from which at least a portion of that line was retrieved; and displaying at said terminal adjacent each justified line the memory line number included therewith.

106. The method according to claim 104 wherein the text document being displayed is stored on plural data memory pages which are not necessarily in sequence, each memory page including a plurality of memory lines, wherein all but the last memory page of said text document has stored thereon the number of the next memory page containing material in said document, and wherein each memory page includes a specified maximum number of lines, said method, during said output mode, including the steps of:

determining if the count in said line counter, each time the line counter is incremented, exceeds said specified maximum number;

upon determination that the line count exceeds said specified maximum number: transferring the next memory page number stored on the current memory page to the page counter; and re-setting the line counter to the number of the first line or the next memory page.

107. The method according to claim 106 wherein the text document being retrieved has been edited during an edit mode operation wherein some additional text characters have been inserted at a point in said document corresponding to a specific character location on a memory line and page containing at least part of said document, said point being designated by the presence of an insert control character in the line containing said specific character location, said additional text characters being stored on a different memory page, beginning on a selected line on that page, and including an end-of-insert control character, said insert control character being accompanied by the numbers of said different memory page and said selected line, said end-of-insert control character being accompanied by the memory page and line numbers of said specific character location, said method further including the output mode steps of:

examining at least one character retrieved from said data memory for an insert control character and an end-of-insert control character;

upon detection of an insert control character: changing the counts in said page and line counters to said different page number and said selected line number, respectively; retrieving the line of text characters from the line in said data memory addressed according to the contents of said page and line counters and adding it to the retrieved but not yet displayed characters from the memory line containing said specific character location; and proceeding according to steps (G.4) through (G.7.5) inclusive until an end-of-insert control character is detected;

upon detection of an end-of-insert control character: changing the counts in said page and line counters to the page and line numbers of accompanying the end-of-insert control character; proceeding according to steps (G.3) through (G.7.5) inclusive.

108. The method according to claim 90 wherein the entered mode-selecting control character designates an input mode to be selected in which a document of text characters are to be entered into said system and stored in said data memory and wherein said system is arranged to process a line of said text characters at a time, each line terminating with an end-of-line character, and wherein said data memory is divided into a plurality of memory lines, each individual data memory line being directly addressable, said system additionally including means for indicating the availability status of memory lines for receiving entered lines of text characters, said method further comprising the steps of:

F. locating an available memory line;

G. allocating the located available memory line to said terminal in response to determination of the input mode as the mode to be selected;

H. displaying the allocated memory line number at said terminal;

I. storing the allocated memory line number in said status memory element;

J. entering successive lines of text characters to be processed into said system and processing each line when entered according to the steps of:

J.1. transferring the address of the input mode entry instruction from said status memory element to said addressing means;

J.2. examining each character of the entered line to detect if it is an end-of-line character or an end-of-text control character;

J.3. upon detection of an end-of-line character:

J.3*a*. storing the entered line in said data memory at the allocated memory line whose number is stored in said status memory;

J.3*b*. allocating a new available memory line for the next line of text to be entered at said data terminal;

J.3*c*. in the case of at least those allocated new memory lines which do not physically immediately follow the previously allocated memory line in which said entered line has been stored, entering the number of that new allocated memory line into said previously allocated memory line along with the said entered line;

J.4. upon detection of an end-of-text control character:

J.4*a*. storing the entered line in said data memory at the memory line whose number is stored in said status memory; and J.4*b*. changing the instruction address stored in the status memory element from the address of the input mode entry instruction to the address of the neutral mode entry instruction.

109. The method according to claim 108 wherein one of said text processing modes is an output mode wherein text characters are retrieved from said data memory and displayed at said terminal, said method, during said output mode, including the steps of:

entering into said system the number of the first line of text intended to be displayed;

sequentially retrieving lines of text characters in said document from respective data memory lines, the retrieval sequence proceeding according to the sequence in which said lines of said document were stored, the step of retrieving including the steps of:

examining each retrieved line to detect the presence of the number of another memory line;

upon detecting the number of another memory line retrieving the text characters from that line next in the retrieval sequence; and deleting control characters from retrieved lines of characters before transferring the retrieved characters to said terminal for display.

110. The method according to claim 108 wherein one of said modes is an output mode during which the address of the entry instruction for the output mode program is stored in said status memory element, the memory line number of the next line to be retrieved also being stored in said status memory element, said output mode being characterized in that text characters previously stored in said data memory are retrieved in the sequence stored and displayed at said terminal, said text characters being retrieved a line at a time, each line being retrieved in accordance with the following additional steps:

transferring the address of said output mode entry instruction to said addressing means from said status memory element;

retrieving the line of text characters stored at the memory line whose number is stored in said status memory;

processing the retrieved line of text characters in accordance with a predetermined display format;

examining each retrieved line to detect an end-of-text control character;

upon detecting an end-of-text control character, changing the instruction address stored in said status memory element from the address of the output mode entry instruction to the address of the neutral mode entry instruction; and transferring the retrieved and processed line of text characters to said terminal for display.

111. The method according to claim 110 wherein the step of processing the retrieved line includes the step of justifying the retrieved line such that each displayed line includes the same number of characters, said step of justifying including the steps of:

retrieving additional text characters from one or more lines of text characters stored in said data memory if a single retrieved line has fewer characters than the number required for a justified line; and inserting space characters in a line as necessary prior to display to achieve justified length where the line to be displayed is shorter than justified length and the next retrieved word would render the line longer than justified length.

112. The method according to claim 111 further including the steps of:

including with each justified line transferred to said terminal the memory line number from which at least part of the displayed line was retrieved; and displaying the included memory line numbers adjacent each displayed line at said terminal.

113. The method according to claim 110 wherein one of said text processing modes is an edit mode wherein an individual line of text characters stored in said data memory may be retrieved and displayed at said terminal for purposes of correction, said method, during said edit mode, including the steps of:

entering into said system the number of the memory line at which the line of text characters to be displayed is stored in said data memory;

storing the entered memory line number in said status memory element;

directly addressing and retrieving the text line stored at the data memory line whose number is stored in said status memory; and displaying the thusly retrieved text line at said terminal.

114. The method according to claim 113 further comprising the steps of:

recognizing input commands in the form of control characters entered into said system from said terminal for making changes to the text line retrieved for correction, said changes being determined by the particular control character entered and including deletion of a character, deletion of a word, replacement of a text character, and insertion of new text characters; and storing the changed text line in the data memory line from which it was retrieved before being corrected.

115. The method according to claim 108 wherein one of said text processing modes is an edit mode wherein individual lines of text characters stored in said data memory may be retrieved and displayed at said terminal for purposes of correction, said method, during said edit mode, including the steps of:

entering into said system the number of the memory line at which the line of text characters to be displayed is stored in said data memory;

storing the entered memory line number in said status memory element;

directly addressing and retrieving the text line stored at the data memory line whose number is stored in said status memory; and displaying the thusly retrieved text line at said terminal.

116. The system according to claim 108 further comprising the step of displaying at said terminal, prior to entry of each successive line of text characters, the number of the memory line allocated to that line of text.

117. The method according to claim 90 wherein the entered mode-selecting control character designates an output mode to be selected in which a document of text characters previously stored in said data memory are to be retrieved and displayed at said terminal, wherein said system is arranged to display a justified line of text characters at a time, each justified line terminating with an end of line character, and including the same predetermined number $n$ of characters wherein said data memory is divided into numbered memory lines, each memory line being directly addressable; and wherein previously stored lines can have a variable but limited number of characters and are terminated by an end-of-line character, and wherein said entered mode selecting character is accompanied by an entered memory line number from which text characters are to be retrieved and displayed, said method including the steps of:

F. storing the entered starting memory line number in said status memory element;

G. retrieving and displaying the starting line of text characters in accordance with the following steps:

G.1. transferring the address of the entry instruction of said output mode to said addressing means from said status memory element;

G.2. retrieving the line of text characters stored in the memory line whose number is stored in said status memory;

G.3. determining if the retrieved line has a number of text characters less than, equal to or greater than $n$;

G.4. upon determining that the retrieved line has $n$ text characters: transferring the text characters in that line to said terminal for display; and storing the number of the memory line containing the next line of said document in said status memory element;

G.5. upon determining that the retrieved line has more than n text characters, examining the nth character in the retrieved line to detect if it is a space character;

G.5.1. if the nth character is a space character, adding a space character to the retrieved line between two words and transferring the retrieved line to said terminal for display;

G.5.2. if the nth character is not a space character, examining the $n+1$th character to determine if it is a space character;

G.5.3. if the $(n+1)$ th character is a space character: transferring the first n characters of the retrieved line followed by a system-generated end-of-line character to said terminal for display; and storing the number $n+1$ in said status memory element;

G.5.4. if the $(n+1)$ the character is not a space character: counting along the line the number $(x)$ of characters between the nth character and the nearest preceding space character; inserting $x$ interword space characters in the retrieved line; transferring the first $n-x$ characters in the line along with the inserted interword space characters to said terminal for display; and storing the number $n-x$ in said status memory element;

G.6. upon determining that the retrieved line has less than n text characters:

G.6.1. inserting a space character after the last text character in the retrieved line;

G.6.2. retrieving the next line of text characters in said document from the data memory;

G.6.3. adding the characters of said next line to those of the immediately preceding retrieved line to compose a new retrieved line for display;

G.6.4. repeating steps (G.3) through (G.6.3.), inclusive, as many times as necessary until a single justified line of n characters is composed and transferred to said terminal.

118. The method according to claim 117 wherein upon display of the first justified line, the display of each additional line proceeds in accordance with the following steps:

H. transferring the address of the output mode program entry instruction to said addressing means;

I. retrieving the line of text stored in the data memory line whose number is stored in said status memory;

J. if a portion of the retrieved line was displayed as part of the previously displayed line, deleting those characters already displayed by deleting from the beginning of the line a number of text characters corresponding to the number $(n+1)$ or $(n-x)$ currently stored in said status memory element in accordance with steps (G.5.3.) or (G.5.4.);

K. treating the remaining characters as the retrieved line and proceeding according to steps (G.3) through (G.6.4) inclusive, until an end-of-text control character is detected, signifying the end of the document being displayed; and L. upon detection of an end-of-text control character, transferring the address of the entry instruction for said neutral mode program to said status memory element.

119. The method according to claim 118 further comprising the steps of:

including with each justified line transferred to said terminal for display the memory line number from which at least a portion of that line was retrieved;

displaying at said terminal adjacent each justified line the memory line number included therewith; and displaying, as part of those justified lines which are composed of two or more retrieved lines, a special symbol designating where one retrieved line ends and the next retrieved line begins.

120. The method according to claim 118 further comprising the output mode steps of:

examining at least one character retrieved from said data memory for a header control character;

upon detection of a retrieved header control character: transferring previously retrieved but not yet displayed text characters preceding said header control character to said terminal for display unjustified; and transferring text characters following the header control character in the retrieved line to said terminal for display unjustified.

121. The method according to claim 118 further comprising the output mode steps of:

examining at least one character retrieved from said data memory for a flush left control character;

upon detection of a retrieved flush left control character; transferring previously retrieved but not yet displayed text characters to said terminal for display unjustified; deleting any space characters between said flush left control character and the next text character; and transferring the remaining text characters following the flush left control character in the retrieved line to said terminal for display.

122. The method according to claim 118 further comprising the output mode steps of:

examining at least one character retrieved from said data memory for a flush right control character;

upon detection of a retrieved flush right control character: counting the number of text characters in the line containing the flush right control character; subtracting the latter derived number from n, the number of text characters in a justified line, to obtain a difference number; inserting at the beginning of the line containing the flush right control character a number of space characters equal to said difference number; and transferring the line with space characters added to said terminal for display.

123. The method according to claim 118 further comprising the output mode steps of:

examining at least one character retrieved from said data memory for a center control character;

upon detecting a center control character in a retrieved line; counting down with a specified counter from n, the number of characters in a justified line, while simultaneously counting up the number of text characters in the retrieved line with another counter until an end of line character is reached by said another counter; resetting said another counter; incrementing said another counter and then decrementing said specific counter repeatedly, in sequence, until the counts in both counters are equal; upon reaching count equality between the two counters, inserting a number of space characters at the beginning of the retrieved line equal to the number in said counters; and transferring the thus centered line to said terminal for display.

124. The method according to claim 117 wherein the text document being retrieved has been edited during an edit mode operation wherein some additional text characters have been stored for later insertion at a point in said document corresponding to a specific character location in a memory line containing at least part of said document, said point being designated by an insert control character in said memory line, said additional text characters being stored in one or more different selected memory lines and being terminated by an end-of-insert control character, said insert control character being accompanied by the number of the first of said selected memory lines, and said end-of-insert control character being accompanied by the memory line number containing said specific character location, said method further including the output mode steps of:

examining at least one character retrieved from said data memory for an insert control character and an end-of-insert control character;

upon detection an insert control character: retrieving the line of text characters from the first of said selected memory lines and adding it to the retrieved but not yet displayed characters from the memory line containing said specific character location; and proceeding according to steps (G.3) through (G.6.4) inclusive until an end-of-insert control character is detected;

upon detection of an end-of-insert control character, proceeding according to steps (G.2) through (G.6.4) inclusive.

125. The method according to claim 90 wherein the entered mode-selecting control character designates an edit mode in which a line of text characters is to be retrieved from said data memory and displayed at said terminal, said mode-selecting control character being accompanied by the data memory line number containing the line of text characters to be displayed, said method, after storing the address of a first entry instruction for the edit mode program in said status memory element, including the steps of:

storing the entered memory line number in said status memory element;

retrieving and displaying the line to be displayed according to the following steps:

transferring the address of said first entry instruction of said edit program to said addressing means from said status memory element;

retrieving and displaying the line of text characters stored in the data memory line whose number is stored in said status memory element; and storing the address of a second entry instruction for said edit mode program in said status memory element.

126. The method according to claim 125 wherein the displayed line is to be edited in accordance with a correction line entered into said system from said terminal, each space character in said correction line signifying no change to be made in a corresponding text character in said display line, said method further including the steps of:

examining each character in the entered correction line to detect the presence of a space character;

upon detection of a space character in the correction line leaving the corresponding character in the displayed line unaltered.

127. The method according to claim 125 wherein the displayed line is to be edited in accordance with a correction line entered into said system from said terminal, each space character in said correction line signifying no change to be made in a corresponding text character in said displayed line, said method further including the steps of:

examining each character in the entered correction line to detect the presence of a space character;

upon detection of a space character in the correction line transferring the corresponding character in the displayed line to the correction line;

after examining all characters in the correction line, storing the correction line in the memory line from which the displayed line was retrieved.

128. The method according to claim 127 wherein the presence of a delete-character control character entered as part of said correction line indicates that a specified text character determined by the position of the delete-character control character is to be deleted from the displayed line, said method including the edit mode steps of:

examining each character in the entered correction line for said delete-character control character;

upon detection of said delete-character control character in said correction line, omitting said specified character from the correction line to be stored in said data memory.

129. The method according to claim 127 wherein the presence of a text character in any position in said correction line indicates that such text character is to replace the character in the corresponding position in the displayed line, said method including the additional edit mode steps of:

examining each character in the entered correction line for a text character;

upon detection of a text character in the correction line, making no changes to that character so that it may be stored in said data memory with said correction line.

130. The method according to claim 127 wherein the presence of an insert control character entered as part of said correction line indicates that subsequent text characters to be entered represent insert text material to be inserted into a stored document at a point designated by the insert control character in said correction line and a memory line number being entered with said insert control character, termination of said insert text material being indicated by and end-of-insert control character, said method including the edit mode steps of:

examining each character in the entered correction line for an insert control character;

upon detection of an insert control character: allocating at least one available memory line for said insert text material, storing said displayed line with said insert control character and the number of the newly allocated memory line in the data memory line from which the displayed line was retrieved; storing the line number of said displayed line in said status memory element; storing the insert text material on the new allocated memory line and succeeding allocated lines as needed such that said lines are retrievable in the sequence entered;

examining each of the insert text lines for an end-of-insert control character;

upon detection of an end-of-insert control character entered into said system: storing the end-of-insert control character in said data memory in the last line of the stored insert text material; and transferring the line number of said displayed line from said status memory element to the line in said data memory containing said stored end-of-insert control character.

131. The method according to claim 90 further comprising the step of:

F. retrieving a document of successive lines of text characters for display, a line at a time, said last-mentioned step including the step of displaying with each line of text characters the address in said data memory at which that line of text characters is stored.

132. The method according to claim 131 wherein said system includes an edit mode wherein a single line of text from said document may be summoned for display, said method including the steps of:

entering into said system a special character signifying said edit mode along with a specified data memory address in which said single line of text is stored;

sensing said special character when entered into said system and retrieving the line of text stored at the data memory location having the address accompanying the entered special character; and displaying the retrieved single line of text.

133. The method according to claim 132 further comprising the steps of:

generating and displaying, proximate said displayed single line, a correction line of text characters such that character positions in said correction line are aligned with corresponding character positions in said displayed single line;

generating, as part of said correction line, a space character for each corresponding character in said displayed single line which is to remain unchanged;

generating, as part of said correction line, a replacement character for each corresponding character in said displayed single line to be replaced;

entering said correction line into said system; and storing in the data memory location having said specified data memory address a corrected line of text comprising said displayed single line modified in that replacement characters of said correction line are substituted for corresponding characters in said displayed single line.

134. The method according to claim 132 further comprising the steps of:

generating and displaying, proximate said displayed single line, a correction line of text characters such that character positions in said correction line are aligned with corresponding character positions in said displayed line;

generating a delete control character in a predetermined character position in said correction line;

entering said correction line into said system; and storing in the data memory location having said specified data memory address a corrected line of text comprising the displayed single line minus the word following the character position corresponding to the character position of said delete control character in said correction line.

135. The method according to claim 132 further comprising the steps of:

generating and displaying, proximate said displayed single line, a correction line of text characters such that character positions in said correction line are aligned with corresponding character positions in said displayed line;

generating a delete control character in a predetermined character position in said correction line;

entering said correction line into said system; and storing in the data memory location having said specified data memory address a corrected line of text comprising the displayed single line minus the character located in the character position corresponding to the position of said delete control character in said correction line.

136. The method according to claim 132 further comprising the steps of:

generating and displaying, proximate said displayed single line, a correction line of text characters such that character positions in said correction line are aligned with corresponding character positions in said displayed line;

generating an insert control character in a selected character position in said correction line;

entering said correction line into said system; and storing in the data memory location having said specified data memory address a corrected line of text comprising the displayed single line with said insert control character and an insert address included therein, said insert address corresponding to the address of a data memory location available to receive a newly generated line of text characters.

137. The method according to claim 136 further comprising:

generating a new line of text characters;

entering the new line of text characters in the data memory location having said insert address.

138. The method according to claim 137 wherein the step of retrieving said document includes the step of:

examining at least one retrieved character of each line to detect the presence of said insert control character;

upon detection of an insert control character, retrieving said new line of text from the data memory location having the insert address stored in the data memory location having said specified address; and displaying said new line of text in a display sequence such that said new line of text is displayed following that portion of the corrected line which precedes the character location at which said insert control character appeared in said correction line.

139. The method according to claim 137 wherein said single displayed line is a new line generated according to claim 137.

140. The method according to claim 138 further comprising the steps of:

generating additional new lines for insertion in said document following said new line of text;

storing said additional new lines of text in respective data memory locations;

retrieving said additional new lines of text in the sequence generated after said new line of text is retrieved; and displaying said additional new lines of text following said new line of text.

141. The system according to claim 90 wherein said system includes a mode wherein only a portion of said document is retrieved and displayed, said method comprising the steps of:

entering into said system the first and last line to be retrieved during said mode;

retrieving, a line at a time, said first line and said last line and all lines therebetween in said document, the sequence of retrieval following the sequence of said lines in said document.

142. The method according to claim 104 further comprising the output mode steps of:

examining each character retrieved from said data memory for a header control character;

upon detection of a retrieved header control character: transferring previously retrieved but not yet displayed text characters preceding said header control character to said terminal for display unjustified; and transferring text characters following the header control character in the retrieved line to said terminal for display unjustified.

143. The method according to claim 104 further comprising the output mode steps of:

examining at least one character retrieved from said data memory for a flush left control character;

upon detection of a retrieved flush left control character; transferring previously retrieved but not yet displayed text characters to said terminal for display unjustified; deleting any space characters between said flush left control character and the next text character; and transferring the remaining text characters following the flush left control character in the retrieved line to said terminal for display.

144. The method according to claim 104 further comprising the output mode steps of:

examining at least one character retrieved from said data memory for a flush right control character;

upon detection of a retrieved flush right control character: counting the number of text characters in the line containing the flush right control character; subtracting the latter derived number from *n*, the number of text characters in a justified line, to obtain a difference number; inserting at the beginning of the line containing the flush right control character a number of space characters equal to said difference number; and transferring the line with space characters added to said terminal for display.

145. The method according to claim 103 further comprising the output mode steps of:

examining each at least one character retrieved from said data memory for a center control character;

upon detecting a center control character in a retrieved line; counting down with a specified counter from n, the number of characters in a justified line, while simultaneously counting up the number of text characters in the retrieved line with another counter until a carriage return character is reached by said another counter; resetting said another counter; incrementing said another counter and then decrementing said specific counter until the counts in both counters are equal; upon reaching count equality between the two counters, inserting a number of space characters at the beginning of the retrieved line equal to the number in said counters; and transferring the now centered line to said terminal for display.

146. The method according to claim 90 wherein the entered mode-selecting control character designates an edit mode in which a line of text characters is to be retrieved from said data memory and displayed at said terminal, said mode-selecting control character being accompanied by the data memory line number containing the line of text characters to be displayed, said method, after storing the address of a first entry instruction for the edit mode program in said status memory element, including the steps of:

storing the entered memory line number in said status memory element;

retrieving and displaying the line to be displayed according to the following steps:

transferring the memory line number of the line to be displayed from said status memory element to a line counter;

transferring the address of said first entry instruction of said edit program to said addressing means from said status memory element;

retrieving and displaying the line of text characters stored in the data memory line addressed according to the contents of said line counter; and storing the address of a second entry instruction for said edit mode program in said status memory element.

147. The method according to claim 162 wherein the displayed line is to be edited in accordance with a correction line entered into said system from said terminal, each space character in said correction line signifying no change to be made in a corresponding text character in said displayed line, said method further including the steps of:

examining each character in the entered correction line to detect the presence of a space character;

upon detection of a space character in the correction line leaving the corresponding character in the displayed line unaltered.

148. The method according to claim 162 wherein the displayed line is to be edited in accordance with a correction line entered into said system from said terminal, each space character in said correction line signifying that no change is to be made in a corresponding text character in said displayed line, said method further including the steps of:

examining each character in the entered correction line to detect the presence of a space character;

upon detection of a space character in the correction line transferring the corresponding character in the displayed line to the correction line;

after examining all characters in the correction line, storing the correction line in the memory line from which the displayed line was retrieved.

149. The method according to claim 164 wherein the presence of a delete-character control character entered as part of said correction line indicates that a specified text character determined by the position of the delete-character control character is to be deleted from the displayed line, said method including the edit mode steps of:

examining each character in the entered correction line for said delete-character control character;

upon detection of said delete-character control character in said correction line, omitting said specified character from the correction line to be stored in said data memory.

150. The method according to claim 164 wherein the presence of a text character in any position in said correction line indicates that such text character is to replace the character in the corresponding position in the displayed line, said method including the additional edit mode steps of:

examining each character in the entered correction line for a text character;

upon detection of a text character in the correction line, making no changes to that character so that it may be stored in said data memory with said correction line.

151. The method according to claim 164 wherein the presence of an insert control character entered as part of said correction line indicates that subsequent text characters to be entered represent insert text material to be inserted into a stored document at a point designated by the location of said insert control character in said correction line and a memory line number entered with said insert control character, termination of said insert text material being indicated by an end-of-insert control character, said method including the edit mode steps of:

examining each character in the entered correction line for an insert control character;

upon detection of an insert control character: allocating at least one available memory line for said insert text material; storing said displayed line with said insert control character and the number of the newly allocated memory line in the data memory line from which the displayed line was retrieved; storing the line number of said displayed line in said status memory element; storing the insert text material on the new allocated memory line and succeeding allocated lines as needed in line by line sequence;

examining the insert text material for an end-of-insert control character;

upon detection of an end-of-insert control character entered into said system: storing the end-of-insert control character in said data memory in the last unit record of the stored insert text material; and transferring the line number of said displayed line from said status memory element to said data memory in the line containing said stored end-of-insert control character.

152. A programmed on-line data processing system for selectively effecting any of a plurality of data processing jobs, said system comprising:

addressable means for storing a plurality of programs, one program for each of said plurality of data processing jobs, each program remaining stored in said addressable means during processing and comprising a plurality of sequentially stored and selectively addressable processing instructions, some of said instructions including a portion which identifies a stored control character;

plural terminal means for sequentially providing data characters to be processed intermixed with control characters to indicate the manner in which said data characters are to be processed, each terminal means including means for generating a unit record of characters, a unit record consisting of a variable but limited number of characters and terminated by a predetermined character;

processing means for successively processing individual unit records such that successively processed unit records are associated with different active terminal means;

means for comparing control characters provided by said terminal means with control characters identified by an addressed instruction;

means responsive to comparison of said control characters for addressing respective predetermined out-of-sequence instructions, each predetermined instruction being part of a different one of said programs; and means for addressing a predetermined stored instruction after said processing means completes processing of a unit record in accordance with the previously addressed instruction.

153. The system according to claim 168 wherein said addressable means functions as a read-only memory during processing operations such that the location and contents of all of said instructions remain fixed.

154. In a programmed machine for automatically processing alphanumeric characters of the type in which documents of said characters are generated and stored as unit records including a variable number of characters, said characters being in the form of coded signals, the method comprising the steps of:

sequentially generating at a terminal, by operator-controlled means, unit records of data characters to be processed and control characters to control the processing of said data characters, each unit record being terminated by a specific end-of-record character;

automatically storing, in a buffer for each terminal, unit records comprising data and control characters in the sequence generated by its terminal, there being a buffer for each terminal;

detecting the termination of unit records of variable but predetermined maximum length by recognizing a specific end-of-record character;

transferring each unit record, in a set of said records comprising a document, to processing means in the sequence in which said unit records are entered at said terminal;

examining each unit record to determine whether any of the characters contained in said unit record are control characters;

in response to transfer of a unit record to said processing means, addressing in a predetermined sequence a plurality of individually addressable processing instructions stored in an instruction memory containing a plurality of programs, each program including a plurality of said instructions respectively representing processing steps to be performed, performing the respective processing steps specified by each addressed instruction and continuing with the next instruction in said predetermined sequence until detection of at least one control character in a transferred unit record;

in response to detection of a control character, addressing an out-of-sequence instruction determined by that control character;

storing each transferred unit record in a data memory upon completion of at least one processing step specified by the control characters contained in that unit record.

155. The method according to claim 202 further comprising the step of:

terminating a currently addressed program upon detection of at least one specific control character in a transferred unit record.

156. The method according to claim 202 wherein said machine has the capability of recognizing in every unit record a control character, said recognized control character being capable of location anywhere in said unit record.

157. The method according to claim 144 further comprising the step of:

processing at least one data character, in a unit record containing a specified control character, in accordance with at least two sequences of processing steps depending upon the sequential location of that control character in said unit record as generated at said terminal.

158. The method according to claim 144 further comprising the step of:

processing at least one data character, in a unit record containing a specified control character, in accordance with the sequential location of that control character in the unit record as generated at said terminal.

159. The method according to claim 144 further comprising the steps of:

inserting the storage address of one specific unit record located in said data memory into another unit record in which a specified control character generated at said terminal appears.

160. The method according the claim 202 further comprising the steps of:

inserting at least one control character into a unit record during processing of that unit record, under control of the stored instructions addressed in response to at least one control character in that unit record as generated at said terminal.

161. The method according to claim 202 further comprising the step of:

deleting at least one control character from certain unit records after retrieval of those unit records from said data memory, and displaying said certain unit records at said terminal at least with said one control character deleted.

162. The method according to claim 202 further comprising the step of:

displaying for simultaneous viewing all characters of at least one stored unit record being displayed.

163. The method according to claim 202 further comprising the step of:

providing a hard copy display of a plurality of unit records when generated at said terminal.

164. The method according to claim 202 wherein said terminal includes a keyboard and a unit record display, said method further comprising the step of:

inserting into at least some unit records, prior to display at said terminal, a function character designating a non-display function to be effected at said terminal, insertion of said function character being effected under the control of one or more instructions addressed at said instruction memory.

165. The method according to claim 202 wherein said machine operates in a plurality of different modes, wherein said control characters include a plurality of mode-selecting characters representing respective modes, and wherein said step of addressing during each mode begins with the same entry address for the processing of each unit record during that mode.

166. The method according to claim 202 wherein said addressing begins with a predetermined address for each such unit record.

167. The method of processing data characters, comprising:

a. sequentially providing data characters from a plurality of data terminals, said data characters including data characters to be processed intermixed with control characters to indicate the manner in which said data characters are to be processed, said characters being provided in unit records composed of a variable but limited number of characters and terminated by a special end-of-record character;

b. storing status information for each of a plurality of terminals, said status information comprising output format specifications;

c. detecting control characters provided from said data terminals;

d. processing said data characters in the manner indicated by detected control characters;

e. storing said unit records in respective directly accessible memory locations;

f. retrieving stored unit record upon detection of a predetermined control character; and g. displaying the data characters thus retrieved at a data terminal other than that from which they were provided;

wherein the output format of the displayed characters at said other terminals is the format stored for the data terminal which supplied the characters being displayed.

168. The method according to claim 154 further comprising the steps of:

storing status information for each data terminal and the data characters entered from that data terminal, said status information being stored in a special storage location for each terminal;

in response to a command, in the form of a control character, from a character at a second data terminal:

transferring the status information, for the data characters to be displayed, to the special storage location of said second data terminal; and retrieving the data characters to be displayed and displaying the retrieved data characters at said second data terminal.

169. In a programmed machine for automatically processing alphanumeric characters of the type in which documents of said characters are generated and stored as unit records including a variable number of characters, said characters being in the form of coded signals, the method comprising the steps of:

sequentially generating at a terminal, by operator-controlled means, unit records of data characters to be processed and control characters to control the processing of said data characters, each unit record being terminated by a specific end-of-record character;

detecting the termination of unit records of variable but predetermined maximum length by recognizing a specific end-of-record character;

transferring each unit record, in a set of said records comprising a document, to processing means in the sequence in which said unit records are entered at said terminal;

storing said transferred unit records in respective unit record segments of a data memory;

recording the availability status of a plurality of groups of segments in said data memory; wherein each segment in a group has a common availability status;

testing the availability status of said group before storing a transferred unit record in the first segment of said group;

successively storing unit records of said document in the first and succeeding consecutive segments of said group in the sequence entered at the terminal at which the unit records comprising said document are generated;

repeating the step of testing upon allocating the last segment of said group to said terminal;

allocating a group of segments found to be available to said terminal;

changing the recorded status of the thusly allocated group from available to unavailable.

170. The method according to claim 158 further comprising the step of:

storing the number of the allocated memory segment in a status memory for the terminal at which the stored unit record was generated.

171. The method according to claim 159 further comprising the step of:

cyclically scanning the recorded availability status of said plurality of groups of segments until detecting an available group.

172. A data processing system, comprising:

an instruction memory containing a plurality of programs, each program including a plurality of individually addressable processing instructions representing processing steps to be performed;

at least one on-line terminal having operator-controlled means for sequentially generating alphanumeric characters in unit record format, a unit record comprising a variable but limited number of characters and terminated by a predetermined character, at least some of said characters representing data characters, some of said characters being designated as control characters of a first type signifying respective programs to be performed on said data characters and at least some others of said characters being designated as control characters of a second type signifying respective instructions to be performed in the currently performed program;

processing means for processing in real time each unit record generated at said terminal, said processing means including means responsive to the presence of a control character of said first type in a unit record being processed for initiating performance of the program signified by that control character and responsive to the presence of a control character of said second type in a unit record being processed for performing the processing steps represented by the instruction signified by that control character.

173. The system according to claim 141 further comprising a direct access data memory for storing unit records processed by said processing means.

174. The system according to claim 172 further comprising program-controlled means for inserting at least one control character into certain unit records stored in said data memory.

175. The system according to claim 172 further comprising: means for displaying unit records stored in said data memory; and program-controlled means for deleting control characters from unit records before display.

176. The system according to claim 141 wherein said processing means includes means capable of processing a unit record having more than one control character, said control characters being capable of location in a plurality of different positions in that unit record.

177. The system according to claim 141 wherein the character position of at least one control character in a unit record corresponds to the position of data characters, in a previously stored unit record, which are to be processed according to instructions signified by that control character.

178. The system according to claim 141 further comprising means for displaying at least one entire unit record as generated at said terminal.

179. The system according to claim 141 further comprising a means for providing a hardcopy display of a plurality of unit records.

180. A programmed system for processing characters in the form of coded signals, said system comprising:

a plurality of data terminals for sequentially generating data characters to be processed intermixed with control characters to control processing of said data characters;

a buffer means for each data terminal for automatically storing data and control characters in the sequence generated by its data terminal;

means for providing a ready indication for each buffer means when that buffer means contains a unit record of data characters, wherein a unit record comprises a variable but limited number of characters and is terminated by a special end-of-record character;

an instruction memory containing a series of stored instructions located at respective addresses, said instructions being addressable individually to effect operation of said system;

a data memory segmented into sections capable of storing individual unit records, each section having its own address;

wherein said instruction memory and said data memory are independently accessible and wherein said stored instructions are devoid of data memory addresses;

means for normally addressing said stored instructions in a predetermined sequence;

means operable under the control of at least one of said addressed instructions for interrogating said buffer means to determine if a ready indication has been provided, and responsive to a ready indication provided by an interrogated buffer means for examining each character in the unit record stored in that buffer means to determine whether the character is a data character or a control character;

means responsive to the presence of data characters in the examined unit record and to the addressed instruction in said instruction memory for storing the detected data characters in a data memory section reserved for that unit record;

means responsive to detection of a control character in the examined unit record for addressing a stored instruction which is out of said predetermined sequence; and means responsive to the storage in said data memory of all data characters of the examined unit record for addressing said at least one instruction to thereby once again interrogate said buffer means.

181. The system according to claim 179 further comprising means responsive to the presence in a unit record received from a data terminal of a predetermined control character and the address of a data memory section for retrieving the unit record stored in that data memory section and displaying the retrieved unit record at that data terminal.

182. The system according to claim 179 further comprising:
a plurality of status memories, one for each operable data terminal;
means responsive to storage of all data characters of a unit record in said data memory for storing in the status memory for the data terminal which generated that unit record the data memory address at which that unit record is stored.

183. The system according to claim 179 further comprising:
a plurality of status registers, one for each operable data terminal;
means responsive to storage in said data memory of a unit record generated by a data terminal for storing in the status register for that terminal the address of the instruction to be addressed the next time a ready indication is detected at that data terminal; and
means responsive to detection of a ready indication at that data terminal for addressing the instruction memory at the address stored in the status register for that terminal.

184. A text processing system of the type in which a document of alphanumeric text characters in the form of coded signals is edited from at least one on-line data terminal and stored in groups of unit records, wherein a unit record comprises a variable but limited number of text characters and is terminated by a special end-of-record character, and wherein said data terminal includes means for generating control characters intermixed with text characters to determine the manner in which all of the text characters are to be processed, said control characters being positionable in a plurality of different character locations in said unit record, and wherein said system includes means for sensing said control characters and controlling a stored program in accordance with the detected control characters, said system further including editing means comprising means responsive to an edit control character supplied by said data terminal along with the address of a specific stored unit record for retrieving and displaying at said data terminal all characters of the specific stored unit record for simultaneous viewing, wherein changes to said specified stored unit record are effected at said data terminal by entering characters in a second unit record having character locations corresponding to character locations in said specified unit record, said system including means for reconstructing said second unit record, after entry, to reflect the corrected version of said specified stored unit record; and means for storing the reconstructed second unit record at the location previously occupied by said specified unit record.

185. The system according to claim 184 wherein said means for reconstructing comprises:
means for temporarily storing said specified unit record and said second unit record; and
means for replacing each space character in said second unit record with the text character in the corresponding location of said specified unit record.

186. The system according to claim 185, said means for reconstructing further comprising:
means responsive to the presence of a delete control character in a character location in said second unit record for deleting from said second unit record the character at that character location in said specified unit record.

187. The system according to claim 185, said means for reconstructing further comprising:
means responsive to the presence of a delete control character in a character location corresponding to a space character in said specified unit record for deleting said delete control character and the word following said space character from said second unit record.

188. The system according to claim 185 wherein said means for reconstructing further comprises:
means responsive to the presence of an insert control character in said second unit record for inserting into said second unit record the address of an available unit record storage location;
means responsive to the next unit record supplied by said data terminal for storing said next unit record at said available unit record storage location;
means for examining each character supplied by said data terminal to detect an end-of-insert control character;
means for storing subsequently supplied unit records from said data terminal at respective available unit record storage locations until detection of an end-of-insert control character in a supplied unit record; and
means responsive to detection of an end-of-insert control character in a unit record for inserting into that unit record the address of said specified stored unit record.

189. The system according to claim 188 wherein said document can be retrieved and displayed in corrected form with said next and subsequently supplied unit records appearing at the point of insert in said second unit record, said system including:
means responsive to an output mode control character supplied from said data terminal along with an identification number for said document for retrieving and displaying at said data terminal the unit records of said document in the sequence stored;
means for examining at least one character of said retrieved unit records to detect the presence of insert and end-of-insert control characters;
means responsive to detection of said insert control character in said second unit record for retrieving and displaying said next unit record stored at the address previously inserted in said second unit record;
means for retrieving and displaying said subsequent unit records in sequence to follow said second unit record;
means responsive to detection of said end-of-insert control character in a retrieved and displayed unit record for retrieving and displaying as the next unit record the unretrieved portion of said second unit record.

190. The system according to claim 188 comprising means responsive to the presence of an insert control character in said second unit record for storing the address of said specified stored unit record, and means responsive to detection of an end-of-insert control character in a supplied unit record for retrieving the stored address of said specified unit record and inserting that address into said supplied unit record.

191. In an automatic text processing machine of the type in which documents of text characters are stored for subsequent editing and display in edited form, said text characters being in the form of coded signals, the method comprising the steps of:

assigning to each stored document an identification code including the address at which the first line of said document is stored;

displaying said identification code;

storing said text characters, a line of text at a time, in respective line-storing segments of a data memory, said segments having respective addresses and being directly addressable, at least two successive lines of said document being stored in two respective non-successively positioned segments of said data memory;

inserting into a first of said two non-successively positioned segments the address of the other of said two non-successively positioned segments;

retrieving said document on command a line at a time from said data memory for display, said command including at least said first line address in said identification code, the sequence of retrieval of said lines following the sequence of said lines in said document, starting with the first line of said document as included in said command, the step of retrieving including the steps of:

examining at least some of said retrieved lines for the presence of a data memory segment address therein; and upon detecting an address in a retrieval segment, retrieving the next text line from the data memory segment having the detected address.

192. The method according to claim 191 wherein the step of retrieving said document for display includes the step of displaying with each line the address of the data memory segment in which that line is stored.

193. The method according to claim 191 wherein said machine includes an edit mode wherein a single line of text from said document may be summoned for display, said method including the steps of:

entering into said machine a special character signifying said edit mode along with a specified data memory segment address in which said single line of text is stored;

sensing said special character when entered into said machine and retrieving the line of text stored in the data memory segment having the address accompanying the entered special character; and displaying the retrieved single line of text.

194. The method according to claim 193 further comprising the steps of:

generating and displaying, proximate said displayed single line, a correction line of text characters such that character positions in said correction line are aligned with corresponding character positions in said displayed single line;

generating, as part of said correction line, a space character for each corresponding character in said displayed single line which is to remain unchanged;

generating, as part of said correction line, a replacement character for each corresponding character in said displayed single line to be replaced;

entering said correction line into said machine; and storing in the data memory segment having said specified data memory address a corrected line of text comprising said displayed single line modified in that replacement characters of said correction line are substituted for corresponding characters in said displayed single line.

195. The method according to claim 193 further comprising the steps of:

generating and displaying, proximate said displayed single line, a correction line of text characters such that character positions in said correction line are aligned with corresponding character positions in said displayed line;

generating a delete control character in a predetermined character position in said correction line;

entering said correction line into said machine; and storing in the data memory segment having said specified data memory address a corrected line of text comprising the displayed single line minus the word following the character position corresponding to the character position of said delete control character in said correction line.

196. The method according to claim 193 further comprising the steps of:

generating and displaying, proximate said displayed single line, a correction line of text characters such that character positions in said correction line are aligned with corresponding character positions in said displayed line;

generating a delete control character in a predetermined character position in said correction line;

entering said correction line into said machine; and storing in the data memory segment having said specified data memory address a corrected line of text comprising the displayed single line minus the character located in the character position corresponding to the position of said delete control character in said correction line.

197. The method according to claim 193 further comprising the steps of:

generating and displaying, proximate said displayed single line, a correction line of text characters such that character positions in said correction line are aligned with corresponding character positions in said displayed line;

generating an insert control character in a selected character position in said correction line;

entering said correction line into said machine; and storing in the data memory segment having said specified data memory address a corrected line of text comprising the displayed single line with said insert control character and an insert address included therein, said insert address corresponding to the address of a data memory segment available to receive a newly generated line of text characters.

198. The method according to claim 197 further comprising:

generating a new line of text characters;

entering the new line of text characters in the data memory segment having said insert address.

199. The method according to claim 198 wherein the step of retrieving said document includes the steps of:

examining each retrieved line of text characters for the presence of an insert control character;

upon detection of an insert control character, retrieving said new line of text from the data memory segment having the insert address stored in the data memory segment having said specified address; and displaying said new line of text in a display sequence such that said new line of text is displayed following that portion of the corrected line which precedes the character location at which said insert control character appeared in said correction line.

200. The method according to claim 199 further comprising the steps of:

generating additional new lines for insertion in said document following said new line of text;

storing said additional new lines of text in respective data memory segments;

retrieving said additional new lines of text in the sequence generated after said new line of text is retrieved; and displaying said additional new lines of text following said new line of text.

201. The method according to claim 191 wherein said machine includes a mode wherein only a portion of said document is retrieved and displayed, said method comprising the steps of:

entering into said machine the first and last line to be retrieved during said mode;

retrieving, a line at a time, said first line and said last line and all lines therebetween in said document, the sequence of retrieval following the sequence of said lines in said document.

202. The method of processing data comprising the steps of:

a. providing data to be processed;

b. individually evoking sequentially stored instructions to effect processing of said data, each instruction representing a plurality of processing steps to be performed, said instructions being represented by a plurality of bits wherein some instructions include more bits than others and wherein each instruction is coded with information to indicate the number of bits by which that instruction is represented, said instructions consisting of either N,2N, or 3N bits, each group of N bits in an instruction representing one or more processing steps to be effected, and wherein the number of timing pulses which are effective to initiate processing steps is greatest for a 3N-bit instruction and least for an N-bit instruction.

c. generating a fixed plurality of timing pulses for all evoked instructions;

d. initiating the processing steps represented by each evoked instruction with respective timing pulses;

e. determining the number of bits in each evoked instruction; and f. inhibiting initiation of processing steps by certain of said timing pulses whenever the number of bits in an evoked instruction is less than a predetermined number.

* * * * *